(12) United States Patent
Ikeda et al.

(10) Patent No.: US 8,039,065 B2
(45) Date of Patent: Oct. 18, 2011

(54) ANTIREFLECTION FILM, POLARIZING PLATE, METHOD FOR PRODUCING THEM, LIQUID CRYSTAL DISPLAY ELEMENT, LIQUID CRYSTAL DISPLAY DEVICE, AND IMAGE DISPLAY DEVICE

(75) Inventors: Akira Ikeda, Minami-Ashigara (JP); Yuuzou Muramatsu, Minami-Ashigara (JP); Kazuhiro Nakamura, Minami-Ashigara (JP); Eiichi Kato, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 805 days.

(21) Appl. No.: 10/584,634

(22) PCT Filed: Dec. 24, 2004

(86) PCT No.: PCT/JP2004/019752
§ 371 (c)(1),
(2), (4) Date: Jun. 26, 2006

(87) PCT Pub. No.: WO2005/063484
PCT Pub. Date: Jul. 14, 2005

(65) Prior Publication Data
US 2007/0146887 A1    Jun. 28, 2007

(30) Foreign Application Priority Data

| Dec. 26, 2003 | (JP) | 2003-434142 |
| Jan. 13, 2004 | (JP) | 2004-006062 |
| Feb. 12, 2004 | (JP) | 2004-035077 |
| Mar. 9, 2004 | (JP) | 2004-065991 |
| Mar. 29, 2004 | (JP) | 2004-096227 |

(51) Int. Cl.
*G02F 1/1335* (2006.01)

(52) U.S. Cl. ........................ 428/1.32; 428/1.33; 349/137
(58) Field of Classification Search .................. 428/1.3, 428/1.32–1.33; 349/137
See application file for complete search history.

(56) References Cited

U.S. PATENT DOCUMENTS
4,692,492 A * 9/1987 Gunesin ........................ 524/731
(Continued)

FOREIGN PATENT DOCUMENTS
JP        07-126552 A       5/1995
(Continued)

OTHER PUBLICATIONS

Pionteck, Jürgen; Wypych, George Handbook of Antistatics. 2007 ChemTec Publishing Online version available at: http://knovel.com/web/portal/browse/display?_EXT_KNOVEL_DISPLAY_bookid=1487&VerticalID=0.*

(Continued)

*Primary Examiner* — Sophie Hon
(74) *Attorney, Agent, or Firm* — Buchanan Ingersoll & Ronney PC

(57) ABSTRACT

To provide an antireflection film which is easily and inexpensively producible and which has an antireflection property, a scratch resistance and a stain resistance in a sufficient level, and a polarizing plate and a liquid crystal display device utilizing the antireflection film of such excellent ability, the antireflection film includes a transparent support and a low-refractive index layer having a lower refractive index than the transparent support, wherein the low-refractive index layer is an outermost layer, and the low-refractive index layer contains a hollow silica particle and a compound that reduces a surface free energy of the outermost layer.

14 Claims, 5 Drawing Sheets

U.S. PATENT DOCUMENTS

| | | | |
|---|---|---|---|
| 5,138,472 A * | 8/1992 | Jones et al. | 349/166 |
| 5,770,306 A * | 6/1998 | Suzuki et al. | 428/328 |
| 5,827,630 A * | 10/1998 | Eichorst et al. | 430/63 |
| 6,033,743 A | 3/2000 | Suzuki et al. | |
| 6,228,463 B1 * | 5/2001 | Chen et al. | 428/160 |
| 6,355,754 B1 * | 3/2002 | Olson et al. | 526/296 |
| 6,480,250 B1 * | 11/2002 | Matsufuji et al. | 349/113 |
| 6,555,216 B2 * | 4/2003 | Chen et al. | 428/322.7 |
| 6,559,911 B2 * | 5/2003 | Arakawa et al. | 349/96 |
| 6,559,915 B1 * | 5/2003 | Amimori et al. | 349/112 |
| 6,693,746 B1 * | 2/2004 | Nakamura et al. | 359/580 |
| 7,229,686 B2 * | 6/2007 | Yoshikawa et al. | 428/343 |
| 7,502,088 B2 * | 3/2009 | Suzuki et al. | 349/141 |
| 7,695,780 B2 * | 4/2010 | Ohgaru et al. | 428/1.31 |
| 2001/0028945 A1 * | 10/2001 | Chen et al. | 428/292.1 |
| 2001/0033934 A1 * | 10/2001 | Port et al. | 428/421 |
| 2002/0003593 A1 * | 1/2002 | Arakawa et al. | 349/65 |
| 2002/0018886 A1 * | 2/2002 | Matsufuji et al. | 428/328 |
| 2002/0123589 A1 * | 9/2002 | Olson et al. | 526/286 |
| 2003/0004221 A1 * | 1/2003 | Sakurai et al. | 522/15 |
| 2003/0077437 A1 * | 4/2003 | Nakamura et al. | 428/327 |
| 2003/0082237 A1 * | 5/2003 | Cha et al. | 424/490 |
| 2003/0111159 A1 * | 6/2003 | Hashimoto et al. | 156/99 |
| 2003/0124564 A1 * | 7/2003 | Trau et al. | 435/6 |
| 2003/0147140 A1 * | 8/2003 | Ito | 359/599 |
| 2003/0194533 A1 * | 10/2003 | Amimori et al. | 428/143 |
| 2003/0232155 A1 | 12/2003 | Obayashi et al. | |
| 2004/0114248 A1 * | 6/2004 | Hokazono et al. | 359/603 |
| 2005/0121654 A1 * | 6/2005 | Muraguchi et al. | 252/500 |
| 2005/0181146 A1 * | 8/2005 | Yoneyama et al. | 428/1.31 |
| 2006/0153979 A1 * | 7/2006 | Asakura et al. | 427/164 |
| 2006/0274423 A1 * | 12/2006 | Fukushige et al. | 359/659 |
| 2007/0035839 A1 * | 2/2007 | Ibuki | 359/582 |
| 2007/0036965 A1 * | 2/2007 | Fukushige et al. | 428/313.9 |
| 2007/0042173 A1 * | 2/2007 | Nagaoka et al. | 428/313.9 |
| 2008/0285133 A1 * | 11/2008 | Yoneyama et al. | 359/580 |

FOREIGN PATENT DOCUMENTS

| | | | |
|---|---|---|---|
| JP | 11-156987 A | | 6/1999 |
| JP | 2000-313709 A | * | 11/2000 |
| JP | 2001-031547 A | | 2/2001 |
| JP | 2001-1745 | | 3/2001 |
| JP | 2001-318205 A | | 11/2001 |
| JP | 2002-031715 A | | 1/2002 |
| JP | 2002-071949 A | | 3/2002 |
| JP | 2002-169020 A | | 6/2002 |
| JP | 2002-317152 A | | 10/2002 |
| JP | 2003-094470 A | | 4/2003 |
| JP | 2003-227927 A | | 8/2003 |
| JP | 2003-255103 A | | 9/2003 |
| JP | 2003-285367 A | | 10/2003 |
| JP | 2003-292831 A | | 10/2003 |
| JP | 2004-258267 A | | 9/2004 |
| JP | 2005-099778 A | | 4/2005 |
| WO | WO 03071316 A1 | * | 2/2003 |
| WO | WO 2004017105 A1 | * | 2/2004 |
| WO | WO 2004/066001 A1 | | 8/2004 |

OTHER PUBLICATIONS

Supplementary Search Report issued Aug. 17, 2009 in Corresponding European Application No. 04808102.0-2102.

A Third Party's Submission filed in Japanese Patent Application No. 2004-213206 on Jun. 7, 2010, together with an English translation thereof.

* cited by examiner

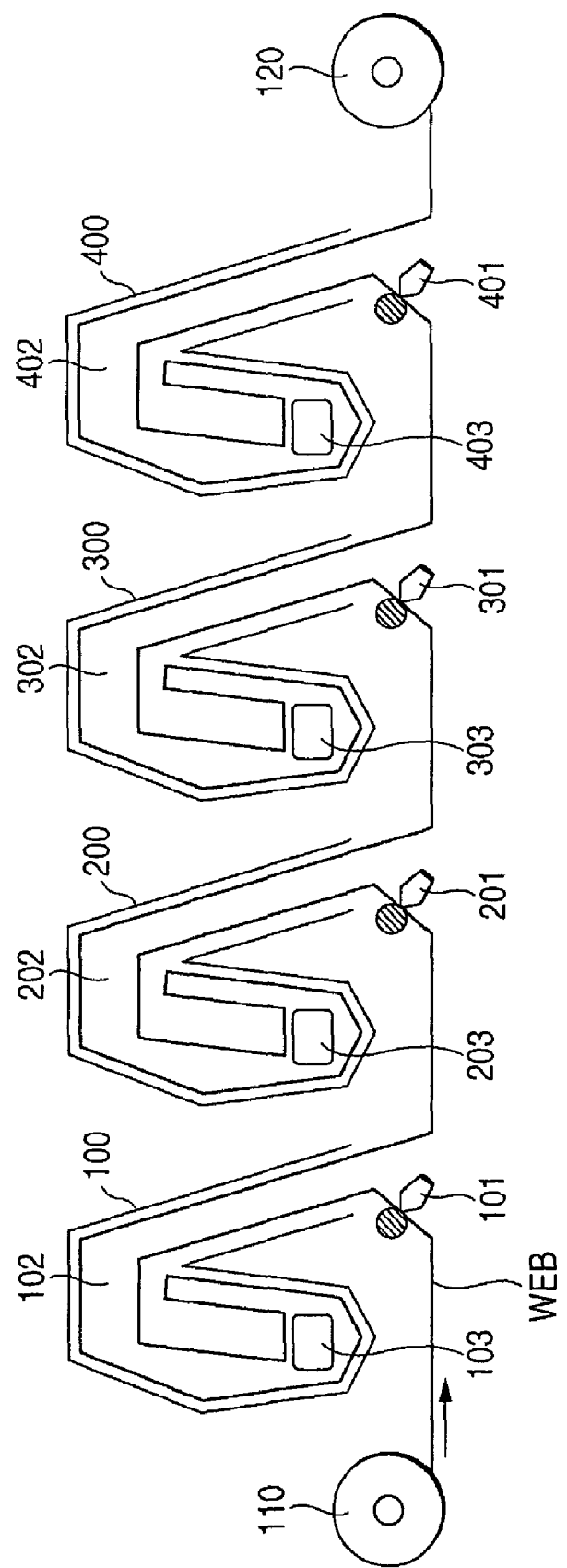

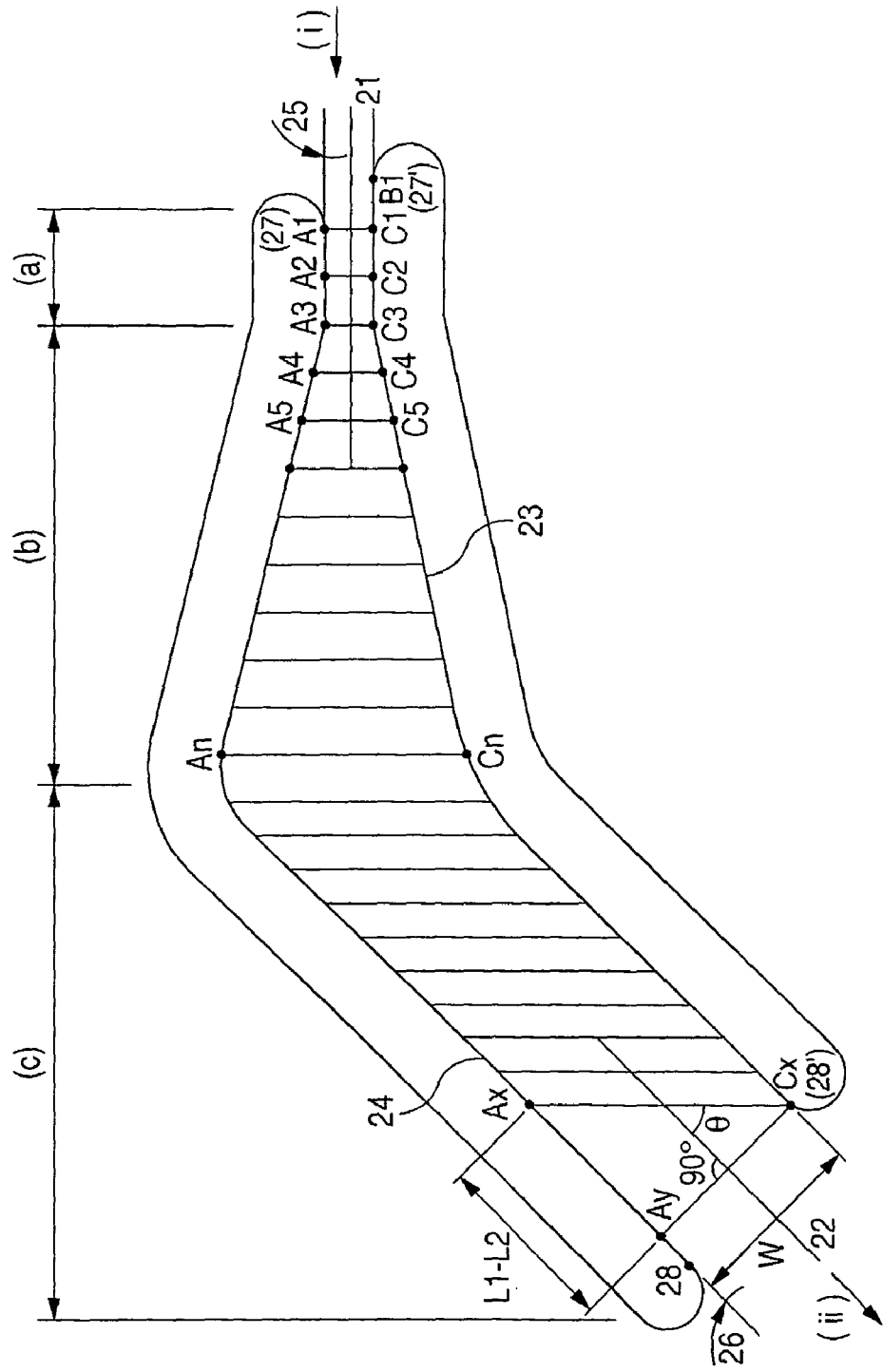

ANTIREFLECTION FILM, POLARIZING PLATE, METHOD FOR PRODUCING THEM, LIQUID CRYSTAL DISPLAY ELEMENT, LIQUID CRYSTAL DISPLAY DEVICE, AND IMAGE DISPLAY DEVICE

This application is a 371 of PCT/JP04/19752 filed Dec. 24, 2004.

TECHNICAL FIELD

The invention relates to an antireflection film, a polarizing plate comprising the same, and a method for producing them. The invention also relates to a liquid crystal display element and an image display device such as a liquid crystal display device.

BACKGROUND ART

In general, an antireflection film is disposed on the outermost surface of image display devices such as cathode-ray tube display devices (CRT), plasma display panels (PDP), electroluminescent display devices (ELD) and liquid crystal display devices (LCD). This is for preventing contrast reduction or image reflection owing to external light reflection on the displays, generally having a function of reflectivity reduction owing to light scattering on surface protrusions or to light interference of multi-layered thin films.

The antireflection film is generally produced by forming, on a transparent support, a film of a low-refractive index layer having a suitable thickness and having a lower refractive index than the transparent support. For realizing its low refractive index, the material for the low-refractive index layer is desired to have a refractive index as low as possible. Since the antireflection film is disposed on the outermost surface of displays, it is desired to have high scratch resistance. In order to realize high scratch resistance of thin films having a thickness of 100 nm or so, the films must have high mechanical strength and must be adhesive to underlying layers.

The antireflection layer of an antireflection film formed of multi-layered thin films generally has a layer constitution consisting essentially of a high-refractive index layer and a low-refractive index layer for enhancing the antireflectivity of the film. For attaining efficient antireflection, it is said that the refractive index difference between the high-refractive index layer and the low-refractive index layer must fall within a specific range (see, for example, JP-A-59-50401). For this, various methods have been investigated. $MgF_2$ and silica are used as low-refractive materials for the low-refractive index layer (see, for example, JP-A-2-245702); a fluorine-containing compound is used (see, for example, JP-A-2003-121606); or 2 or more inorganic particles are piled up to form microvoids (see, for example, JP-A-11-6902). In fact, however, all these methods are problematic in that the materials are difficult to obtain and are unstable and their films are not strong and are not resistant to staining, and sufficiently satisfactory low-refractive index materials could not as yet obtained.

For increasing the mechanical strength of films in some degree so as to make them have increased scratch resistance, a method of using fluorine sol-gel films is proposed in JP-A-2002-265866 and JP-A-2002-317152. However, this has significant limitations in that (1) curing the films requires long-time heating and the production load is therefore great, and (2) the films are not resistant to saponification solution (alkali-processing solution), and saponification of the surface of transparent plastic film substrates after the formation of antireflection film thereon could not be carried out. In addition, the films are not satisfactorily resistant to staining. For satisfying all of low-refractive index and good scratch resistance and good stain resistance, low-surface free energy compounds that have a low refractive index and have a high mechanical strength and are hardly stained on their surface are needed. However, most of such compounds are often in a trade-off relation, or that is, when one of the requirements is improved, then the other is worsened. Accordingly, it is difficult to satisfy all the requirements of refractive index reduction and improvement of scratch resistance and stain resistance.

For the intended refractive index reduction, JP-A 7-287102 discloses a technique of increasing the refractive index of a hard-coat layer to thereby reduce the refractive index of the antireflection film. However, the high-refractive index hard-coat layer causes film color mottles since the refractive index difference between the layer and the support is large, and the wavelength dependency of the refractive index of the film greatly increases.

On the other hand, in JP-A-11-189621, JP-A-11-228631 and JP-A-2000-313709, there is proposed a method of improving the scratch resistance of films by introducing a polysiloxane structure into a fluorine-containing polymer so as to lower the friction coefficient of the film surface. The method may be effective in some degree for the improvement of scratch resistance of the films, but is still unsatisfactory in that films essentially not having high strength and high interfacial adhesiveness could not be improved to have sufficient scratch resistance by the method.

JP-2003-292831 discloses a low-refractive index coating agent and an antireflection film. In this, the agent comprises at least an active energy ray-curable resin that contains a compound having a (meth)acryloyloxy group in the molecule, and hollow particles having a mean particle size of from 0.5 to 200 nm. However, this is also problematic in that, when such a thin-film system is cured in an atmosphere in which the oxygen concentration is near to that in air (oxygen concentration: about 20% by volume), the reactive group in the film could not well react owing to curing failure and therefore the scratch resistance of the cured film is not good. In addition, since the low-refractive index layer in JP-2003-292831 is not processed to be resistant to staining, this is still problematic in that stains such as finger marks or water marks may readily adhere to the films and the stains adhered to them are difficult to wipe away. These days in particular, applications such as TVs and monitors are required to have good scratch resistance and good stain resistance.

In JP-A-7-133105 and JP-A-2001-233611, hollow silica particles are proposed as a low-refractive index material. These are excellent as a low-refractive index material, but it has been found that, when they are used in a low-refractive index layer of antireflection films, their adhesiveness is poor and they detract from the commercial value of the outermost film of displays, and therefore, their amount to be used must be limited.

JP-A-7-333404 describes an antiglare antireflection film having good gas-barrier properties, antiglare properties and antireflection properties. However, since this requires a silicone oxide film to be formed in a mode of CVD, its producibility is low when compared with wet-coated films.

The recent tendency in the art is toward large panels in image display devices (e.g., LCD, PDP, CRT), especially toward liquid crystal display devices with an antiglare antireflection film disposed therein. For protecting such expensive large-panel image display devices, it is desired to further improve the protective films for antiglare films and antireflection films for them. Concretely, the films are required to have better visibility (with neither glare look nor external light reflection in display images, with high image sharpness and transparency), the display panels are not soiled by finger marks or by dust adhesion thereto, and they are highly resistant to scratching. In liquid crystal display devices (LCD), a polarizing plate is an indispensable optical material. The polarizing plate generally comprises a polarizing sheet protected by two protective films. For reducing the number of the constitutive members of liquid crystal display devices and for increasing the producibility thereof with reducing the production costs thereof, it is desired to make the protective films for the polarizing plate have an antireflection function so as to make the resulting polarizing plate enjoy better weather resistance, physical protection and antireflection. This is especially for realizing the increase in producibility, the cost reduction and the thickness reduction of the devices.

As a material of the polarizing sheet, polyvinyl alcohol (hereinafter referred to as PVA) is principally used. Briefly, a PVA film is monoaxially stretched, then colored with iodine or a dichroic dye, or it is first dyed and then stretched, and this is crosslinked with a curable compound to form a polarizing sheet. In general, the polarizing sheet is stretched in the running direction (machine direction) of a long film (stretching along machine direction), and therefore, the absorption axis of the polarizing sheet is nearly parallel to the machine direction.

The protective film is an optically-transparent film having a small birefringence, for which cellulose triacetate is mainly used. Heretofore, the protective film is stuck to the polarizing sheet in such a manner that the slow axis of the protective film could be perpendicular to the transmission axis of the polarizing sheet (or that is, in such a manner that the slow axis of the protective film could be parallel to the absorption axis of the polarizing sheet).

antireflection treatment is attained by the use of an antireflection film formed as a multi-layered product of multiple thin films of different materials having a different refractive index, and the antireflection film is so planned that it could reduce the reflection in a range of visible light. However, in the antireflection film, the thickness of the constitutive layers of the multi-layered product is constant in each layer, and therefore, in principle, the antireflection film could not completely attain its function of antireflection in the entire region of visible light.

Accordingly, in general, the antireflection film is so planned that its antireflection to light of high visibility at around 550 nm is emphasized and that its antireflection could cover a wavelength range as broad as possible. For the reasons in planning the film, the antireflection effect of the film is at present not sufficient in the other ranges than the specific wavelength range, and the reflectivity of the film in a part of a short wavelength region of visible light and in a part of a long wavelength region thereof is larger than that in the other wavelength region of the visible light region. As a result, this is problematic in that the reflected light exhibits a specific color hue and it detracts from the display quality of devices.

As opposed to it, a different investigation has been made of integrating a polarizing plate and an antireflection film to construct an integrated and stuck product so as increase the quality of display images. Concretely disclosed is an antireflection film-combined polarizing plate having a reflectivity of at most 3.5% in a range of from 380 to 700 nm (see, for example, JP-A-2003-270441).

In reflection-type or semi-transmission reflection-type liquid crystal display devices, the backlight used generally has a bright line peak at three wavelengths of 440 nm, 550 nm and 610 nm. Therefore, it is an important point to make the transmittance at these three wavelengths the same for improving the color reproducibility of the devices. An antireflection film-combined polarizing plate is proposed, of which the parallel transmittance and the cross transmittance at wavelength 440 nm, 550 nm and 610 nm are specifically defined (JP-A-2002-22952 and JP-A-2003-344656).

On the other hand, for improving display quality of devices, various optical layers in addition to polarizing plate are provided on the outermost surface of liquid crystal panels. For example, retardation plates (including λ plates such as ½ wavelength plate and ¼ wavelength plate), optical compensation films and brightness-improving films are employed. In particular, elliptically-polarizing plates or circularly-polarizing plates constructed by superposing a retardation plate on a polarizing plate that comprises a polarizing sheet and a protective layer; polarizing plates constructed by superposing an optical compensation film on a polarizing plate that comprises a polarizing sheet and a protective layer; and polarizing plates constructed by superposing a brightness-improving film on a polarizing plate that comprises a polarizing sheet and a protective layer are put into practical use.

The polarizing plate constructed by superposing a brightness-improving film on a polarizing plate that comprises a polarizing sheet and a protective layer is generally provided on the back side (lower side) of a liquid crystal cell, and it acts to increase the brightness of the image display panel of LCD (see, for example, "2003's Views and Strategies in High-Function Film Market", p. 91 (2003), by Yano Keizai Kenkyu-jo).

On the other hand, an antiglare and/or reflection reduction-processed film is proposed for the visible-side protective film of a polarizing plate that is to be disposed on the visible side (upper side) of a liquid crystal cell (see, for example, JP-A-2003-149634).

DISCLOSURE OF THE INVENTION

As in the above, an antireflection film that satisfies all the requirements of good antireflection capability, good scratch resistance and good stain resistance and further satisfies high producibility is not proposed at present.

Accordingly, an object of the invention is to provide an antireflection film that satisfies all the requirements of good antireflection capability, good scratch resistance and good stain resistance and further satisfies high producibility, and is producible in a simplified manner and inexpensively.

Another object of the invention is to provide a polarizing plate equipped with an antireflection film having the above-mentioned properties, and to provide a liquid crystal display device equipped with the polarizing plate.

Still another object of the invention is to provide a liquid crystal display device that comprises an antireflection film having the above-mentioned excellent properties.

Still another object of the invention is to provide an antireflection film that functions as a protective film for display devices, and the advantages of the film are that it prevent glaring and external light reflection on display images, it has high scratch resistance, little dust stick to it, and it is free from adhesion failure.

Still another object of the invention is provide an image display device of which the advantages are that the display images are free from glaring and external light reflection thereon, and the device has good scratch resistance and is free from adhesion failure.

Taking advantage of thinness, lightweight and power-saving, LCDs are much used as flat panel displays that are indispensable in these days of a high-level information and communication period. In particular, the development of large-panel or mobile monitors or TVs capable of expressing high-definition color images is remarkable. The high-definition color image display requires further neutralization of the color tone of display images. The large-sized display images require further uniformity of the entire panel for them. In particular, in liquid crystal monitors of 15 inches or more, it is desired to solve the problem of light leakage from around the monitor that is caused by shrinkage of the polarizing sheet with time (frame failure).

On the other hand, from the viewpoint of reducing the weight of polarizing plate members and reducing the cost thereof, it is much desired to reduce the thickness of polarizing sheets. However, it has been found that, when the polarizing sheets are thinned, then the light leakage at cross nicol on the short wave side and on the long wave side of visible light increases and therefore, the color hue of the films is shifted from neutral gray.

Accordingly, an object of the invention is to provide a polarizing plate of which the in-plane color tone is homogeneous and neutral, and which has good durability and is free from external light reflection on it.

Another object of the invention is to provide a polarizing plate which, even when the polarizing sheet thereof is thin, can prevent light leakage at cross nicol on the short wave side and on the long wave side of visible light, and can give a good color hue, and which has good durability and is free from external light reflection on it.

Still another object of the invention is to provide a polarizing plate having a polarizing sheet formed from an obliquely-stretched polymer film, in which the film is produced according to an oblique stretching method and is effective for increasing the yield of polarizing plates in the step of blanking them out. The polarizing plate has high-level quality and is inexpensive.

Still another object of the invention is to provide an image display device of good durability and high image quality, which is provided with a polarizing plate having an antireflection film formed on one side of the polarizing sheet thereof.

Liquid crystal displays are required to have a wide viewing angle and a high-speed responsibility, and are further required to have the ability to show bright and high-definition full-color images. In particular, in large-panel display devices of 20 inches or more, bright and sharp images with no uneven brightness (or luminance) are strongly desired. Further, it is also desired to increase the durability of polarizing plates for the devices and to reduce the cost thereof.

In particular, it is strongly desired to provide liquid crystal display elements having good optical properties and having good durability that may be used in the above-mentioned various liquid crystal display devices.

On the other hand, with the development of large-sized or mobile display panels as above, further desired are thin and lightweight liquid crystal display devices.

Conventional liquid crystal display devices could not satisfy all these requirements that are needed these days, and therefore it is desired to develop a liquid crystal display device that satisfies all these requirements.

Accordingly, an object of the invention is to provide a liquid crystal display element which is free from external light reflection thereon and from glaring even set in large-size liquid crystal display devices, which enables bright and sharp image displays, and which has good durability.

Another object of the invention is to provide a liquid crystal display element which has good durability and is thin and lightweight.

Still another object of the invention is to provide a liquid crystal display device which is provided with a polarizing plate having a brightness-improving film formed on one side of a polarizing sheet and a polarizing plate having an antireflection film formed on one side of a polarizing sheet, and which has good durability and has good display quality.

According to the invention, there are provided an antireflection film having the constitution mentioned below, a polarizing plate and a method for producing them, a liquid crystal display element, an image display device, and a liquid crystal display device (the following A-1 to E-12), and the above-mentioned objects are attained by these.

A-1. (first embodiment) An antireflection film comprising:
a transparent support; and
a low-refractive index layer having a lower refractive index than the transparent support, wherein the low-refractive index layer is an outermost layer of the antireflection film, and the low-refractive index layer comprises: a hollow silica particle; and a compound lowering a surface free energy of the antireflection film.

A-2. The antireflection film of above A-1, wherein the compound is at least one selected from the group consisting of a silicone compound, a fluorine-containing compound and a fluoroalkylsilicone compound.

A-3. The antireflection film of above A-2, wherein the compound is the silicone compound.

A-4. The antireflection film of any of above A-1 to A-3, wherein the low-refractive index layer comprises a binder, and the compound comprises a reactive group with the binder.

A-5. The antireflection film of any of above A-1 to A-4, wherein the compound comprises a (meth)acryloyl group.

A-6. (second embodiment) An antireflection film comprising:
a transparent support; and
a low-refractive index layer having a lower refractive index than the transparent support, wherein the low-refractive index layer is an outermost layer of the antireflection film, and the low-refractive index layer comprises: a hollow silica particle; and a binder capable of lowering a surface free energy of the antireflection film.

A-7. The antireflection film of any of above A-1 to A-6, wherein at least one of a silicone and a fluoroalkyl group is segregated at an outer surface of the low-refractive index layer such that a spectral intensity ratio Si/C or F/C in a photoelectron spectrum at the outer surface is larger by at least 5 times than that at a depth from the outer surface, the depth being equal to 80% of a thickness of the low-refractive index layer.

A-8. The antireflection film of above A-6 or A-7, wherein the binder comprises at least one of a silicone and a fluorine.

A-9. The antireflection film of any of above A-6 to A-8, wherein the binder is a fluorine-containing polymer.

A-10. The antireflection film of any of above A-6 to A-9, wherein the binder is a compound having a (meth)acryloyl group.

A-11. The antireflection film of any of above A-6 to A-10, wherein the binder is a compound represented by formula (1):

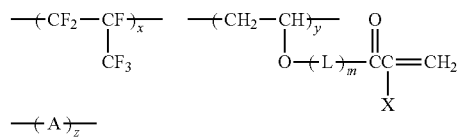

wherein L represents a linking group having from 1 to 10 carbon atoms; X represents a hydrogen atom or a methyl group; A represents a repetitive unit derived from a vinyl monomer; x, y and z each indicates mol % of the respective repetitive unit, and satisfy 30≦x≦60, 5≦y≦70 and 0≦z≦65.

A-12. The antireflection film of any of above A-1 to A-11, wherein the surface free energy is at most 25 mN/m.

A-13. The antireflection film of any of above A-1 to A-12, which comprises a layer comprising at least one of a hydrolysate of an organosilane and a partial condensate of the organosilane, wherein the hydrolysate and the partial condensate is produced in the presence of at least one of an acid catalyst and a metal chelate compound, and the organosilane is represented by formula (A):

$(R^{10})_m Si(X)_{4-m}$ wherein $R^{10}$ represents a substituted or unsubstituted alkyl group, or a substituted or unsubstituted aryl group; X represents a hydroxyl group or a hydrolyzable group; and m indicates an integer of 1 to 3.

A-16. A polarizing plate comprising an antireflection film of any of above A-1 to A-13.

A-17. A liquid crystal display device comprising an antireflection film of any of above A-1 to A-13, or a polarizing plate of above A-16.

The antireflection film of the first and second embodiments of the invention can be produced in a simplified manner and inexpensively, and has good antireflection capability, scratch resistance and stain resistance.

Further, the invention provides a polarizing plate provided with the above-mentioned antireflection film of the invention. In the liquid crystal display device of the invention that is provided with the antireflection film or the polarizing plate has good visibility and has good scratch resistance and stain resistance since the antireflection film is disposed on the outermost surface of the panel thereof.

B-1. (third embodiment) An antireflection film comprising:
a transparent support; and
a low-refractive index layer having a lower refractive index than the transparent support,
wherein
the low-refractive index layer has a refractive index of 1.30 to 1.55,
the low-refractive index layer is formed by applying a curable composition onto the transparent support; drying the curable composition; and curing the curable composition upon at least one of an ionizing irradiation and a heat application in an atmosphere having an oxygen concentration of at most 15% by volume, and
the curable composition comprises: (A) a curable substance comprising a crosslinking or polymerizing functional group; (B) a hallow inorganic particle having a mean particle size of 30% to 150% of a thickness of the low-refractive index layer, the hollow inorganic particle having a refractive index of 1.17 to 1.40; (C) at least one of a first polymerization initiator capable of generating a radical upon the ionizing irradiation and a second polymerization initiator capable of generating a radical upon the heat application; and (D) a solvent capable of dissolving or dispersing components (A) to (C).

B-2. The antireflection film of above B-1, wherein the low-refractive index layer further comprises at least one selected from the group consisting of a silicone compound, a fluorine-containing compound and a fluoroalkylsilicone compound.

B-3. The antireflection film of above B-1 or B-2, wherein the curable substance is a polyfunctional (meth)acrylate monomer.

B-4. The antireflection film of any of above B-1 to B-3, wherein the curable composition principally has the curable substance, the curable substance being a fluorine-containing polymer,
wherein the fluorine-containing polymer comprises: a fluorine atom of 35 to 85% by weight; and a crosslinking or polymerizing functional group, and
the fluorine-containing polymer is a copolymer, wherein the copolymer comprises: a first polymerizable unit of a vinyl monomer comprising a fluorine; and a second polymerization unit having a side branch, the side branch comprising a functional group of one of a (meth)acryloyl group and a glycidyl group, and the copolymer has a backbone chain consisting of a carbon atom.

B-5. The antireflection film of any of above B-1 to B-4, wherein the curable composition further comprises at least one of an organosilane compound, a hydrolysate of the organosilane compound and a partial condensate of the organosilane compound, the organosilane compound being represented by formula (A1):

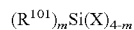

$(R^{101})_m Si(X)_{4-m}$ wherein $R^{101}$ represents an alkyl group; X represents a hydroxyl group or a hydrolyzable group; and m indicates an integer of 1 to 3.

B-6. A polarizing plate comprising:
a polarizing sheet; and
a transparent protective film on one side of the polarizing sheet, the transparent protective film comprising an antireflection film of any of above B-1 to B-5.

B-7. The polarizing plate of above B-6, which has the polarizing sheet; the transparent protective film on the other side of the polarizing sheet; and the optical compensation film in this order,
wherein
the optical anisotropic layer comprising a compound has a discotic structure,
a disc face of the discotic structure is inclined relative to a film surface of the transparent protective film, and
an angle between the disc face and the film surface varies in a depth direction of the optical anisotropic layer.

B-8. A liquid crystal display device comprising a polarizing plate of above B-6 or B-7.

B-9. A method for producing an antireflection film, which comprises:
applying a curable composition onto a transparent support;
drying the curable composition; and
curing the curable composition upon at least one of an ionizing irradiation and a heat application in an atmosphere having an oxygen concentration of not higher than 15% by volume, so as to form a low-refractive index layer having a refractive index of 1.30 to 1.55 on the transparent support,
wherein
the curable composition comprises: (A) a curable substance comprising a crosslinking or polymerizing functional group; (B) an hollow inorganic particle having a mean particle size of 30% to 150% of a thickness of the low-refractive index layer, the hallow inorganic particle having a refractive index of 1.17 to 1.40; (C) at least one of a first polymerization initiator capable of generating a radical upon the ionizing irradiation and a second polymerization initiator capable of generating a radical upon the heat application; and (D) a solvent capable of dissolving or dispersing components (A) to (C).

The antireflection film of the third embodiment of the invention has good antireflection capability and has good scratch resistance and good producibility. Accordingly, display devices such as liquid crystal display devices having the antireflection film of the invention directly or via a polarizing plate equipped with the film have good scratch resistance and have extremely good visibility as they are free from troubles of external light reflection or background scene reflection thereon.

C-1. (fourth embodiment) An antireflection film comprising:

a support comprising a cellulose acylate film, the cellulose acylate film having a thickness of 30 to 120 μm;

an antireflection layer comprising: at least one of a light-diffusing layer and a high-refractive index layer, the high-refractive index layer having a higher refractive index than the support; and a low-refractive index layer having a lower refractive index than the support in this order, wherein the cellulose acylate film is a long film having a length of 100 to 5,000 m and a width of at least 0.7 m; the cellulose acylate film has a thickness fluctuation range of −3 to 3%; and the cellulose acylate film has a curl of −7 to +7/m in a width direction of the cellulose acylate film, and the low-refractive index layer comprises a hollow silica particle having a refractive index of 1.17 to 1.40.

C-2. The antireflection film of above C-1, wherein the cellulose acylate film satisfies formulae (I) and (II):

$$2.3 \leq SA' + SB' \leq 3.0, \quad (I)$$

$$0 \leq SA' \leq 3.0 \quad (II)$$

wherein SA' means a degree of substitution with an acetyl group, the acetyl group substituting for a hydrogen atom of a hydroxyl group in a cellulose; and SB' means a degree of substitution with an acyl group having from 3 to 22 carbon atoms, the acyl group substituting for the hydrogen atom of the hydroxyl group in the cellulose.

C-3. The antireflection film of above C-1 or C-2, wherein the cellulose acylate film comprising, as a plasticizer, a polyalcohol ester of an aliphatic polyalcohol and a monocarboxylic acid, and the cellulose acylate film has a moisture permeability of 20 to 260 g/m² under a condition of 25° C. and 90% RH for 24 hours.

C-4. The antireflection film of any of above C-1 to C-3, wherein the monocarboxylic acid of the polyalcohol ester comprises at least one of an aromatic ring and an alicyclic ring.

C-5. The antireflection film of any of above C-1 to C-4, wherein the cellulose acylate film has an exudation degree of 0 to 2.0%.

C-6. The antireflection film of above C-1 to C-5, wherein the cellulose acylate film comprises a UV-absorbing copolymer of a UV-absorbing monomer having a molar extinction coefficient of at least 4,000 at 380 nm and an ethylenic unsaturated monomer, and the UV-absorbing copolymer has a weight-average molecular weight of 2,000 to 20,000.

C-7. The antireflection film of any of above C-1 to C-6, wherein the cellulose acylate film has a surface having a surface irregularity (or unevenness) based on JIS B0601-1994 such that: an arithmetical mean roughness (Ra) is from 0.0005 to 0.1 μm; a ten-point mean roughness (Rz) is from 0.001 to 0.3 μm; and a mean distance of the surface irregularity (Sm) is at most 2 μm, and the number of optical defects each having a visual size of at least 100 μm in the surface is at most 1/m².

C-8. The antireflection film of any of above C-1 to C-7, wherein each in-plane change of L*, a* and b* values in a color space CIE1976L*a*b* of a reflected light from the antireflection film is at most 20%, wherein the reflected light is a regular-reflected light to an incident light having an incident angle of 5 degree, the incident light has a wavelength of 380 nm to 780 nm, and the incident light is a light from a CIE standard light source D65.

C-9. The antireflection film of any of above C-1 to C-8, wherein a change of a mean reflectivity in wavelengths of 380 nm to 680 nm is at most 0.4% before and after a weather resistance test, and a color tone change ΔE of a reflected light is at most 15 on an L*a*b chromaticity diagram.

C-10. The antireflection film of any of above C-1 to C-9, which comprises a transparent antistatic layer comprising a conductive material between the cellulose acylate film and the light-diffusing layer or the high-refractive index layer, wherein the transparent antistatic layer has a surface resistivity of at most $2 \times 10^{12} \Omega/\square$; a haze of at most 20%; and a light transmittance at a wavelength of 550 nm of at least 50%.

C-11. The antireflection film of any of above C-1 to C-10, wherein the transparent antistatic layer is a curable resin layer comprising a conductive inorganic fine particle, the conductive inorganic fine particle having a mean primary particle size of 3 to 100 nm, and the transparent antistatic layer has a surface having a surface irregularity such that: an arithmetical mean roughness (Ra) is at most 0.03 μm; a ten-point mean roughness (Rz) is at most 0.06 μm; and a maximum height (Ry) is at most 0.09 μm.

C-12. The antireflection film of any of above C-1 to C-10, wherein the low-refractive index layer further comprises a composition comprising at least one of a hydrolysate of an organosilane and a partial condensate of the organosilane, and the organosilane is represented by formula (A2):

$$R_m Si(X)_n$$

wherein X represents —OH, a halogen atom, —OR¹⁰² or —OCOR¹⁰²; R and R¹⁰² each represents a substituted or unsubstituted alkyl group having from 1 to 10 carbon atoms; m+n=4, and m and n each indicate an integer of 0 or more.

C-13. The antireflection film of any of above C-1 to C-12, wherein the transparent antireflection layer has an outermost surface having a surface free energy of 15 to 26 mN/m and a kinematic friction factor of 0.05 to 0.20.

C-14. The antireflection film of any of above C-1 to C-13, wherein the low-refractive index layer further comprises a fluorine-containing compound having a curable reactive group.

C-15. A polarizing plate comprising:
a polarizing sheet; and
a transparent protective film on one side of the polarizing sheet, the transparent protective film comprising an antireflection film of any of above C-1 to C-14.

C-16. A polarizing plate comprising:
a polarizing sheet;
a first transparent protective film on one side of the polarizing sheet, the transparent protective film comprising an antireflection film of any of above C-1 to C-14; and
a second transparent protective film on the other side of the polarizing sheet, the second transparent protective being an optical compensation film having optical anisotropy.

C-17. An image display device comprising an antireflection film of any of above C-1 to C-14 or a polarizing plate of above C-15 or C-16.

The cellulose acylate film used as the support in the antireflection film of the fourth embodiment of the invention is a long rolled film having a length of from 100 to 5,000 m and a width of at least 0.7 m and its thickness fluctuation is within ±3%, and its curl in the direction of the width thereof is from −7/m to +7/m. The surface roughness of the film on the side thereof coated with an antireflection layer preferably has a specific roughness profile, based on JIS B0601-1994.

Accordingly, even though the film has a long rolled form, a uniform antireflection layer with no coating unevenness can be formed and, in addition, the layer may have good adhesiveness to the support. The antireflection film thus formed is prevented from having optical defects and its thickness fluctuation can be retarded, and, as a result, the color tone unevenness of the reflected light on the reflection film can be reduced.

The cellulose acylate film preferably used as the support for the antireflection film of the fourth embodiment of the invention comprises, as the principal ingredient thereof, a cellulose acylate having a specific composition ratio, and is preferably formed according to a solution-casting film-forming method. In addition, the film contains a plasticizer capable of improving the physical properties of the film (curling resistance, dimensional stability, scratch strength, moisture resistance), uniformly dispersed with no segregation therein, and the moisture permeability of the film is controlled to fall within the range as defined by the invention. As a result, the film keeps good transparency and its physical properties are improved as above.

The exudation of the plasticizer is small, and this may contribute toward the improvement of the interlayer adhesiveness of the film. The exudation means that, when the film is in a high-temperature and high-humidity environment, then the additive such as plasticizer thereto exudes from the film and vaporizes and the weight of the film is thereby reduced.

Further, the cellulose acylate film for use in the invention contains a UV-absorbing copolymer of a UV-absorbing monomer and an ethylenic unsaturated monomer, and has a specific molar extinction coefficient. Accordingly, the UV absorbent hardly deposits outside the film, and the image sharpness and the adhesiveness are good.

The antireflection film of the fourth embodiment of the invention is characterized in that each in-plane change of the $L^*$, $a^*$ and $b^*$ values of the antireflection film in a color space CIE1976$L^*a^*b^*$ of the regular-reflected light to the 5-degree incident light thereon from a CIE standard light source D65 in a wavelength range of from 380 nm to 780 nm is at most 20%, and the reflected color change $\Delta E$ before and after a weather resistance test of the film based on JIS K5600-7-7:1999 is at most 15 on an $L^*a^*b$ chromaticity diagram. Accordingly, the film satisfies the two requirements of low reflection and reflected color reduction. As in a room with a fluorescent lamp therein, when bright external light reflects on the film, then the color tone of the film is neutral and the film keeps good display image quality.

The antireflection film thus having a neutral tone of reflected light thereon and having a low refractive index can be attained by optimizing the balance between the refractive index of the low-refractive index layer and the refractive index of the translucent resin to form the antiglare hard-coat layer of the high-refractive index layer of the film Preferably, the antireflection film of the fourth embodiment of the invention additionally has a transparent antistatic layer between the support and the light-diffusing layer thereof. In particular, the layer may be formed by applying a curable composition containing conductive inorganic fine particles onto the support followed by curing it thereon. In that manner, the film having a long rolled form can be formed at high producibility. The antistatic layer thus formed in the film has a specific roughened surface with no optical defects therein, and the coating layer to be formed on it may have a uniform surface and have good adhesiveness to the underlying layer. We have found these advantages of the invention.

Further, the surface free energy of the outermost surface of The antireflection layer (the outermost surface of the antireflection film) is preferably at most 26 mN/m, and the kinematic friction factor thereof is preferably at most 0.25. More preferably, the surface free energy is from 15 to 25.8 mN/m, and the kinematic friction factor is from 0.05 to 0.25; even more preferably, the surface free energy is from 15 to 22 mN/m, and the kinematic friction factor is from 0.05 to 0.15. Within the ranges, the stain resistance of the antireflection film serving also as a protective film is good. The surface free energy control is described in detail in the section of <Low-refractive Index Layer>

The low-refractive index layer of the antireflection film of the fourth embodiment of the invention preferably contains a composition comprising any of hydrolysates and partial condensates of an organosilane. Comprising it, the adhesiveness of the layer is further improved and the surface scratch resistance thereof is also further improved.

The antireflection film of the fourth embodiment of the invention may be used as a protective film of display devices, and its advantages are that the display images do not glare and are free from external light reflection thereon, the images are sharp and their visibility is good, and the color tone of the reflected light thereon is almost neutral and the film expresses good images thereon. In addition, the film has good adhesiveness, good durability and good weather resistance. Further, the producibility of the film is good, and the film can be produced at low costs.

The polarizing plate of the invention is provided with the above-mentioned antireflection film of the invention, and has good quality and high durability.

The image display device of the invention is provided with the above-mentioned antireflection film or polarizing plate of the invention, and has good durability and good image quality.

D-1. A polarizing plate comprising:
a polarizing sheet; and
a transparent protective film on each side of the polarizing sheet,
wherein
the transparent protective film on one side of the polarizing sheet has a multi-layered antireflective film,
the multi-layered antireflective film comprises a high-refractive index layer having a higher refractive index than the transparent protective film; and a low-refractive index layer having a lower refractive index than the transparent protective film,
the high-refractive index layer and the low-refractive index layer are formed by applying each coating solution thereof in this order,
the low-refractive index layer comprises an hollow inorganic particle, the hollow inorganic particle having a refractive index of 1.17 to 1.37 and a mean particle size of 30% to 100% of a thickness of the low-refractive index layer.

D-2. The polarizing plate of above D-1, which has a first transmittance at 700 nm of 0.001% to 0.3% under a cross nicol condition and a second transmitance at 410 nm of 0.001% to 0.3% under the cross nicol condition.

D-3. The polarizing plate of above D-1 or D-2, which has:
$a^*$ and $b^*$ values in a color space CIE1976$L^*a^*b^*$ of a first regular-reflected light to a 5-degree incident light on the polarizing plate from a CIE standard light source D65 in a wavelength range of 380 nm to 780 nm, wherein the $a^*$ and $b^*$ values satisfies $0 \leq a^* \leq 7$ and $-10 \leq b^* \leq 0$; and another a* and b* values in the color space of a second regular-reflected light to an incident light having an incident angle of 5 to 45°, wherein the a* and b* values satisfies a*≧0 and b*≦0.

D-4. The polarizing plate of any of above D-1 to D-3, wherein each in-plane change of L*, a* and b* values in a color space CIE1976L*a*b* of a reflected light from the polarizing plate is at most 20%, wherein the reflected light is a regular-reflected light to an incident light having an incident angle of 5 degree, the incident light has a wavelength of 380 nm to 780 nm, and the incident light is a light from a CIE standard light source D65.

D-5. The polarizing plate of any of above D-1 to D-4, wherein the high-refractive index layer comprises two high-refractive index layers having different refractive indices, and the antireflective film has at least three layers, and the at least three layers satisfy numerical formulae (IV-2) to (IV-4):

$(m_1\lambda/4) \times 0.60 < n_1 d_1 < (m_1\lambda/4) \times 0.80$ (IV-2)

$(m_2\lambda/4) \times 1.00 < n_2 d_2 < (m_2\lambda/4) \times 1.50$ (IV-3)

$(m_3\lambda/4) \times 0.85 < n_3 d_3 < (m_3\lambda/4) \times 1.05$ (IV-3)

wherein $m_1$ is 1; $n_1$ is a refractive index of a middle-refractive index layer having a lower refractive index of the two high-refractive index layers; $d_1$ is a thickness (nm) of the middle-refractive index layer; $m_2$ is 2; $n_2$ is a refractive index of a higher-refractive index layer having a higher refractive index of the two high-refractive index layers; $d_2$ is a thickness (nm) of the higher-refractive index layer; $m_3$ is 1; $n_3$ is a refractive index of the low-refractive index layer; $d_3$ is a thickness (nm) of the low-refractive index layer; and $\lambda$ is a wavelength of a light for measurement.

D-6. The polarizing plate of any of above D-1 to D-4, wherein the high-refractive index layer is a light-scattering layer comprising: a translucent resin; and a translucent particle having a mean particle size of 0.5 to 5 μm, the translucent particle being dispersed in the translucent resin, and the high-refractive index layer has a refractive index difference between the translucent particle and the translucent resin of 0.02 to 0.5.

D-7. The polarizing plate of any of above D-1 to D-6, wherein the transparent protective film is a cellulose acylate film having a moisture permeability at 60° C. and 95% RH of 400 g/m²·24 hours to 2,000 g/m²·24 hours.

D-8. The polarizing plate of any of above D-1 to D-7, wherein a light transmittance change and polarization change of the polarizing plate before and after allowed to stand in an atmosphere at 60° C. and 90% RH for 500 hours each is at most 3% in terms of absolute value.

D-9. The polarizing plate of any of above D-1 to D-8, wherein a dimensional change in each direction of an absorption axis and polarization axis of the polarizing plate before and after allowed to stand under a heat condition of 70° C. for 120 hours is within ±0.6%.

D-10. The polarizing plate of any of above D-1 to D-9, wherein an angle between stretch axes of the transparent protective film and the polarizing sheet is from 10° to less than 90°.

D-11. The polarizing plate any of above D-1 to D-10, wherein the transparent protective film on the other side of the polarizing sheet has an optical compensation film comprising an optical anisotropic layer.

D-12. A method for producing a polarizing plate of above D-1, which comprises:

feeding a polymer film for a polarizing sheet;
holding each edge of the polymer film with a holding unit; and stretching the polymer film by imparting a tension to the polymer film while moving the holding unit in a machine direction of the polymer film wherein the stretching is performed under a condition satisfying formula (III):

$|L2-L1| > 0.4 W$ wherein L1 indicates a locus of the first holding unit from a substantial holding start point to a substantial holding release point on one edge of the polymer film; L2 indicates a locus of the second holding unit from a substantial holding start point to a substantial holding release point on the other edge of the polymer film; and W indicates a distance between two substantial holding release points of the first holding unit and the second holding unit, and a speed difference of the moving between the first holding unit and the second holding unit is less than 1%.

D-13. The method for producing a polarizing plate of above D-12, wherein the stretching is performed under keeping a volatile content of the polymer film at least 5% by volume, and the volatile content is decreased while the polymer film is shrunk.

D-14. The method for producing a polarizing plate of above D-12 or D-13, which comprises sticking a transparent protective film to one side of the polarizing sheet, the protective film having a antireflection film.

D-15. An image display device comprising a polarizing plate of any of above D-1 to D-11, the polarizing plate being disposed on an image display of the image display device.

D-16. The image display device of above D-15, which is a transmission-type, reflection-type or semi-transmission-type liquid crystal display device of any mode of TN, STN, IPS, VA or OCB.

According to the invention, there is provided a polarizing plate having a homogeneous and neutral in-plane color tone and having good durability. The polarizing plate is free from a trouble of external light reflection thereon. Even when the polarizing sheet in the polarizing plate of the invention is thin, the polarizing plate is still effective for preventing light leakage of short-wave and long-wave visible light at cross-Nicol. Accordingly, the polarizing plate gives a good color tone and has good durability, and it is free from a trouble of external light reflection thereon. In the method of the invention for producing the polarizing plate, an obliquely-stretched polymer film is used for the polarizing sheet and the yield in the step of blanking the film into a polarizing plate is high. The polarizing plate of the invention therefore has high quality and is inexpensive. The image display device of the invention has the polarizing plate on the side of the image display face thereof, and it therefore has good durability and good image quality.

E-1. A liquid crystal display element comprising:
an upper polarizing plate;
a liquid crystal cell comprising two cell substrates; and
a lower polarizing plate in this order, wherein the upper polarizing plate and the lower polarizing plate each comprises: an upper transparent protective film; a polarizing sheet; and a lower transparent protective film in this order, and the lower polarizing plate comprises a brightness-improving film, wherein
the upper transparent protective film comprises: a transparent support; and an antireflection film, the antireflection film comprising a low-refractive index layer having a lower refractive index than the transparent support, wherein the low-refractive index layer is an outermost layer of the transparent support, and the low-refractive index layer comprises a hollow inorganic particle, the hollow particle having a refractive index of 1.17 to 1.37 and a mean particle size of 30% to 100% of a thickness of the low-refractive index layer.

E-2. The liquid crystal display element of above E-1, wherein the low-refractive index layer is a cured film formed by applying and curing a curable composition, wherein the curable composition comprises: the hollow inorganic particle; s fluorine-containing polymer comprising a curable reactive group; and at least one of a hydrolysate of an organosilane and a partial condensate of the organosilane, wherein the hydrolysate and the partial condensate is produced in the presence of at least one of an acid catalyst and a metal chelate compound, and the organosilane is represented by formula (A):

$$(R^{10})_m Si(x)_{4-m}$$

wherein $R^{10}$ represents a substituted or unsubstituted alkyl group, or a substituted or unsubstituted aryl group; X represents a hydroxyl group or a hydrolyzable group; and m indicates an integer of 1 to 3.

E-3. The liquid crystal display element of above E-1 or E-2, wherein the antireflection film comprises a high-refractive index layer having a higher refractive index than the transparent support between the low-refractive index layer and the transparent support.

E-4. The liquid crystal display element of above E-1 or E-2, wherein the antireflection film has an antiglare layer having a higher refractive index than the transparent support between the low-refractive index layer and the transparent support.

E-5. The liquid crystal display element of any of above E-1 to E-4, wherein the upper polarizing plate comprises: the antireflection film; the transparent support; the polarizing sheet; and another transparent support in this order from the outermost side of the upper polarizing plate, which are stucked and integrated to form the upper polarizing plate.

E-6. The liquid crystal display element of any of above E-1 to E-5, wherein the upper polarizing plate further comprises an optical compensation film on a side adjacent to the liquid crystal cell.

E-7. The liquid crystal display element of any of above E-1 to E-6, wherein the lower polarizing plate comprises: an optical compensation film; the polarizing sheet, the transparent protective film and the brightness-improving film in this order from a side adjacent to the liquid crystal cell.

E-8. The liquid crystal display element of any of above E-1 to E-7, wherein the transparent support is a cellulose acylate film comprising a cellulose acylate satisfying formulae (I) and (II); a plasticizer having an octanol-water partition coefficient (log P) of 0 to 10; and a fine particle having a mean primary particle size of 3 to 100 nm, and the cellulose acylate film has a thickness of 20 to 120 μm:

$$2.3 \leq SA'+SB' \leq 3.0 \tag{I}$$

$$0 \leq SA' \leq 3.0 \tag{II}$$

wherein SA' means a degree of substitution with an acetyl group that substitutes for a hydrogen atom of a hydroxyl group in a cellulose; and SB' means a degree of substitution with an acyl group having from 3 to 22 carbon atoms, the acyl group substituting for the hydrogen atom of the hydroxyl group in the cellulose.

E-9. The liquid crystal display element of any of above E-1 to E-8, wherein each in-plane change of L*, a* and b* values in a color space CIE1976L*a*b* of a reflected light from the antireflection film is less than 15%, wherein the reflected light is a regular-reflected light to an incident light having an incident angle of 5 degree, the incident light has a wavelength of 380 nm to 780 nm, and the incident light is a light from a CIE standard light source D65.

E-10. The liquid crystal display element of any of above E-1 to E-8, wherein a change of a mean reflectivity of the antireflection film in wavelengths of 380 nm to 680 nm is at most 0.5% before and after a weather resistance test, and a color tone change ΔE of a reflected light form the antireflection film is at most 15 on an L*a*b chromaticity diagram.

E-11. A liquid crystal display device comprising the liquid crystal display element of any of above E-1 to E-10.

E-12. The liquid crystal display device of above E-11, which further comprises a backlight.

The liquid crystal display element of the invention gives bright and sharp display images with neither image blur nor image unevenness and with no brightness unevenness.

In the liquid crystal display element of the invention, when the antireflection film is directly laminated on the polarizing sheet, then the element can be thinned and its weight can be reduced. Using the element, the display device can be therefore thinned, and its weight can be reduced and its cost can be reduced. Since the display device comprises a specific antireflection film, its weather resistance is good and the life thereof can be therefore prolonged.

Further, when an optical compensation film id laminated on the side of the liquid crystal cell in element of the invention, the viewing angle of the device comprising the element can be broadened and this constitution is especially effective in large-panel display devices. Further, since the optical compensation film is directly formed on the protective film of the polarizing sheet, the element can be further thinned and its weight can be further reduced. Using the element, the display device can be therefore thinned, and its weight can be reduced and its cost can be reduced.

Since the liquid crystal display device of the invention is provided with the liquid crystal display element of the invention, it gives bright and sharp display images with neither image blur nor image unevenness and with no brightness unevenness.

The antireflection film of the invention can be produced in a simplified manner and inexpensively, and has good antireflection capability, scratch resistance and stain resistance. In addition, according to the invention, there is provided a method for producing an antireflection film of good film thickness uniformity.

Further, the invention provides a polarizing plate provided with the above-mentioned antireflection film of the invention. In the liquid crystal display device of the invention that is provided with the antireflection film or the polarizing plate has good visibility and has good scratch resistance and stain resistance since the antireflection film is disposed on the outermost surface of the panel thereof.

BRIEF DESCRIPTION OF THE DRAWINGS

FIG. 6 is a schematic cross-sectional view showing an example of configuration of an apparatus for coating layers in succession.

FIG. 7 is a schematic plane view showing an example of an obliquely-stretching method for a polymer film.

Figure 1:
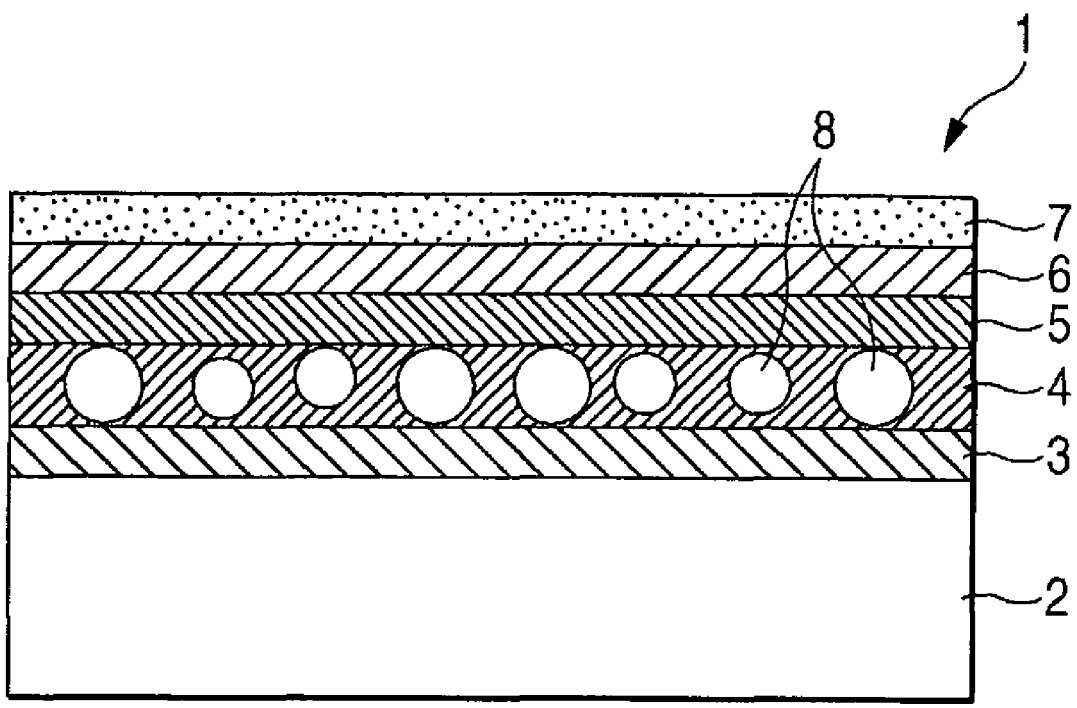
FIG. 1 is a schematic cross-sectional view showing an example of an antireflection film of the invention.

DESCRIPTION OF SYMBOLS 1 antireflection film
2 transparent substrate
3 conductive layer
4 hard-coat layer
5 middle-refractive index layer
6 high-refractive index layer
7 low-refractive index layer
8 matting particle
9 light-scattering layer
10 translucent particle
11 light-diffusing layer
12 translucent resin
13 first translucent particle
14 second translucent particle
100, 200, 300, 400 film forming unit
101, 201, 301, 401 step for applying a coating liquid
102, 202, 302, 402 step for drying coated film (or the coating liquid)
103, 203, 303, 403 step for curing coated film
(i) film introducing direction
(ii) film transporting direction to next step
(a) film introducing step
(b) film stretching step
(c) step for advancing stretched film to next step
A1 film engaging position in holding units and film stretching start position (effective start position of holding at right)
B1 film engaging position in holding units (at left)
C1 film stretching start position (effective start position of holding at left)
Cx film releasing position and reference position for film stretching end point (effective end position of holding at left)
Ay reference position for film stretching end point (effective end position of holding at right)
|L1−L2| process length difference in film holding units between left and right
W effective film width at end of stretching step
θ angle between stretching direction and film advancing direction
21 center line of film at entrance side
22 center line of film advanced to next step
23 trajectory (right) of film holding units
54 trajectory (left) of film holding units
25 film at entrance side
26 film advanced to next step
27, 27' start (engaging) point of film holding at left and right
28, 28' release point from film holding means at left and right

DETAILED DESCRIPTION OF THE INVENTION

In this description, when the numerical data indicate physical data or characteristic data, then the expression for them "a number to another number (or from a number to another number)" means the range that falls between the former number and the latter number both inclusive.
<Antireflection Film>
The basic constitution of one preferred embodiment of the antireflection film of the invention is described with reference to the drawings attached hereto.
FIG. 1 is a schematic cross-sectional view graphically showing one example of the antireflection film of the first and second embodiments of the invention. In this, the antireflection film 1 has a layer constitution of a transparent support 2, a conductive layer 3, a hard-coat layer 4, a middle-refractive index layer 5, a high-refractive index layer 6 and a low-refractive index layer 7 superposed in this order. The middle-refractive index layer 5 and the high-refractive index layer 6 are optional layers that may be present or absent in the layer constitution, and the hard-coat layer 4 may optionally contain mat particles 8 or may not. Preferably, the refractive index of the low-refractive index layer 7 is from 1.38 to 1.49. When the high-refractive index layer 6 and the middle-refractive index layer 5 are in the layer constitution, then their refractive index may satisfy the condition of "refractive index of low-refractive index layer 7<refractive index of middle-refractive index layer 5<refractive index of high-refractive index layer 6".
Though not indispensable, the conductive layer 3 is preferably in the layer constitution. It may not be between the transparent support 2 and the hard-coat layer 4, but may be in any position in the constitution of the antireflection film. If desired, the conductive layer 3 may be integrated with any layer in the layer constitution.

Figure 2:
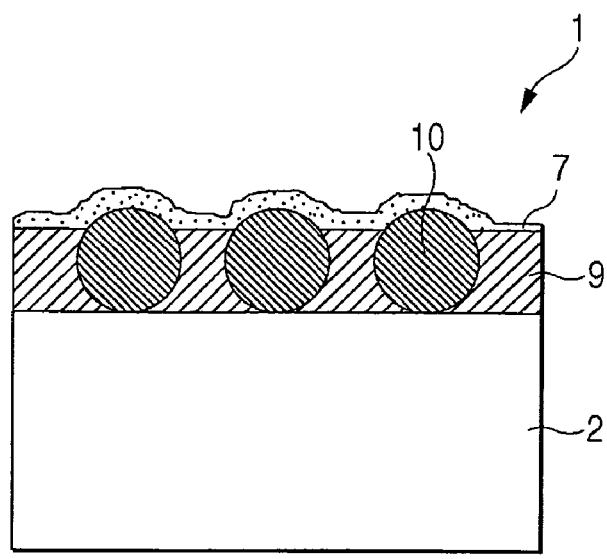
FIG. 2 is a schematic cross-sectional view showing a layer structure of an antireflection film of the invention.

FIG. 2 is a cross-sectional view graphically showing one preferred embodiment of the antireflection film of the third embodiment of the invention. This embodiment is a preferred example of an antiglare-antireflection film, and it has good scratch resistance and exhibits good antiglare capability when applied to high-definition displays.

The antireflection film 1 of the embodiment of FIG. 2 comprises a transparent support 2, a light-scattering layer 9 formed on the transparent support 2, and a low-refractive index layer 7 formed on the light-scattering layer 9.

The light-scattering layer 9 comprises a translucent resin and translucent particles 10 dispersed in the translucent resin.

In this embodiment, the light-scattering layer 9 serves as an antiglare and hard-coat layer. This is one layer in this embodiment, but may be composed of multiple layers, for example, from 2 to 4 layers. This may be disposed directly on the transparent support as in this embodiment, but may be disposed thereon via any other layer such as antistatic layer or moisture-proof layer.

In this embodiment, it is desirable that the reflected light under a C light source satisfies the condition that the a* value is from −2 to 2, the b* value is from −3 to 3 and the ratio of the minimum value to the maximum value of the refractive index within a range of from 380 nm to 780 nm falls between 0.5 and 0.99, since the color tone of the reflected light could be neutral in that condition. Also preferably, the b* value of the transmitted light under a C light source is from 0 to 3, since the yellow tone of white expression through the film could be reduced when the film is applied to display devices. Also preferably, a lattice of 120 µm×40 µm is inserted between the planar light source and the antireflection film of the invention in order that the brightness distribution standard deviation measured on the film could be at most 20. This is because when the film of the invention of that type is applied to high-definition panels, then it effectively reduces glaring on the panels.

Figure 3:
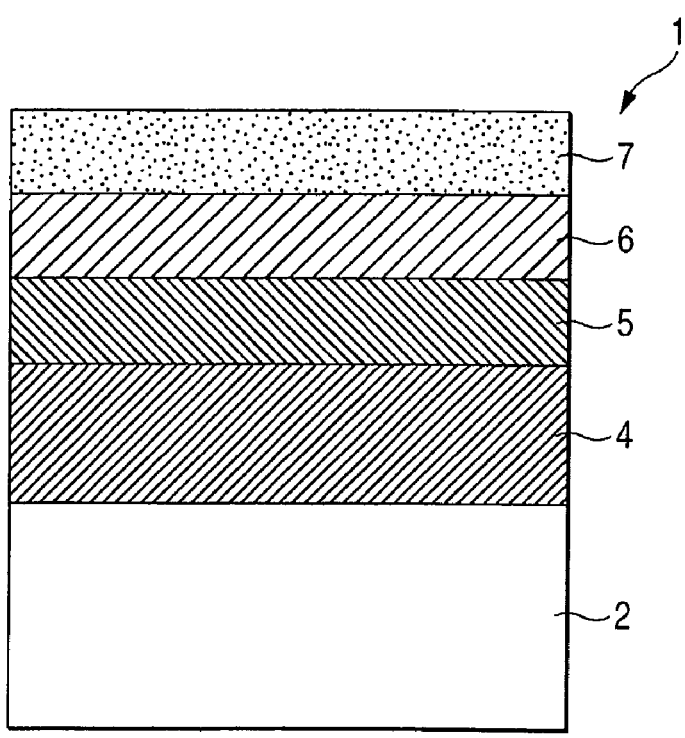
FIG. 3 is a schematic cross-sectional view showing a layer structure of a multi-layered antireflection film of the invention.

FIG. 3 a cross-sectional view graphically showing another preferred embodiment of the antireflection film of the third embodiment of the invention. This embodiment is a preferred example of a clear-type multi-layered antireflection film, and its mean refractive index is reduced to 0.5% or less. Therefore, this is preferably used in televisions and monitors.

The antireflection film 1 of this embodiment of FIG. 3 comprises a transparent support 2, a hard-coat layer 4 formed on the transparent support 2, and a middle-refractive index layer 5, a high-refractive index layer 6 and a low-refractive index layer 7 all formed on the hard-coat layer 4.

Regarding the optical properties thereof, the antireflection film of this embodiment preferably has a mirror reflectivity of at most 0.5% and a transmittance of at least 90% in order that it can prevent external light reflection thereon and can exhibit good visibility.

Figure 4:
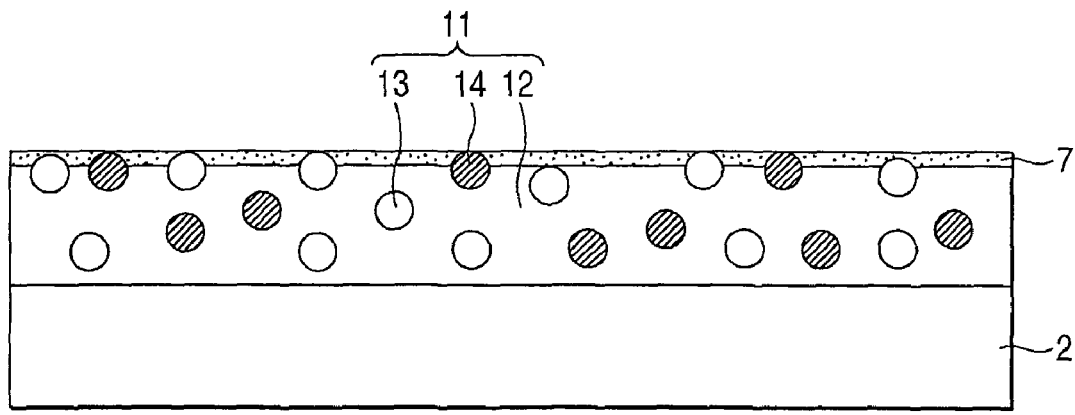
FIG. 4 is a schematic cross-sectional view showing a preferred embodiment of an antireflection film of the invention.

Based on FIG. 4 that is a schematic cross-sectional view graphically showing one preferred embodiment of the antireflection film of the fourth embodiment of the invention, one preferred example of the light-diffusing layer in the invention is described.

The antireflection film 1 comprises a support 2, a light diffusing layer 11 formed on the support 2, and a low-refractive index layer 7 formed on the light-diffusing layer 11. The light-diffusing layer 11 comprises two different types of translucent particles 13 and 14 dispersed in a translucent resin 12.

Thus planned, the light-diffusing layer may have a roughened surface with irregularities formed by the first translucent particles and the second translucent particles therein.

In FIG. 4, the surface is roughened owing to the irregularities of the translucent particles, but the light-diffusing layer with no surface roughness may be worked or mirror-finished to thereby make it have a roughened surface.

<High-refractive Index Layer>

The antireflection film of the fourth embodiment of the invention selectively comprises at least one high-refractive index layer and the above-mentioned light-diffusing layer so as to have better antireflection capability.

The refractive index of the high-refractive index layer is from 1.55 to 2.40. So far as the layer constitution of the antireflection film has a layer of which the refractive index falls within the range, then it may be said that the film contains a high-refractive index layer. The range of the refractive index generally applies to a higher-refractive index layer and a middle-refractive index layer. In this description, however, these layers are generically referred to as "high-refractive index layer". When the film comprises multiple high-refractive index layers, then they may be referred to as high-refractive index layer-1, high-refractive index layer-2 and the like depending on the refractive index difference between them.

When the film comprises both higher-refractive index layer and middle-refractive index layer, then the layer having a refractive index of from 1.8 to 2.4 may be referred to as a higher-refractive index layer, and the layer having a refractive index of from 1.55 to less than 1.8 may be referred to as a middle-refractive index layer. However, the relation of higher/middle refractive index between these layers is relative to each other, and the boundary refractive index may change by about 0.2. The refractive index may be suitably controlled depending on the type of the inorganic particles and the binder to be added and the ratio thereof.

Figure 5:
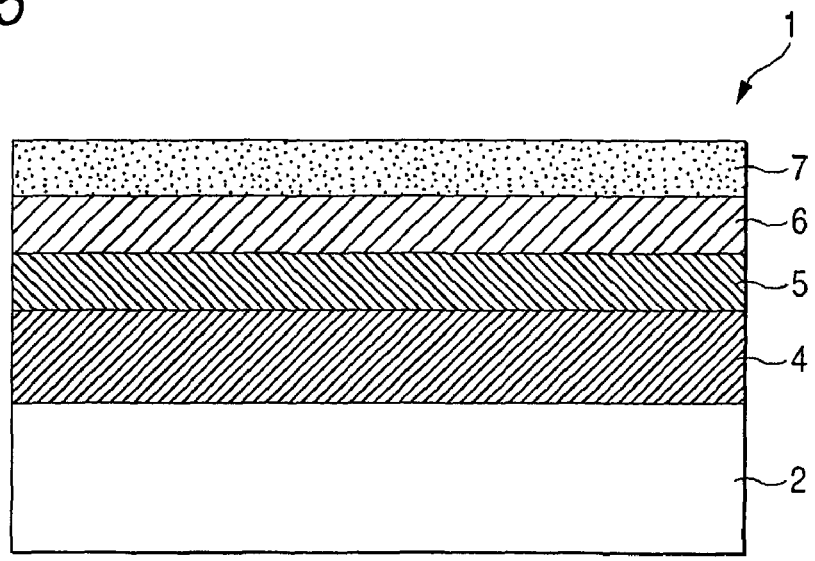
FIG. 5 is a schematic cross-sectional view showing an example employing a high-refractive index layer as a preferred embodiment of an antireflection film of the invention.

FIG. 5 is a schematic cross-sectional view graphically showing one preferred embodiment of the antireflection film of the invention that comprises a high-refractive index layer. In FIG. 5, the antireflection film 1 comprises a support 2, a hard-coat layer 4, a high-refractive index layer-1 (5), a high-refractive index layer-2 (6), and a low-refractive index layer 7.

<Low-refractive Index Layer>

First described is the low-refractive index layer in the invention.

Preferably, the low-refractive index layer in the antireflection film of the invention satisfies the following formula (IV-1) from the viewpoint of reducing the reflectivity of the layer.

$$(m\lambda/4) \times 0.7 < n_1 d_1 < (m\lambda/4) \times 1.3 \tag{IV-1}$$

wherein m is a positive odd number; $n_1$ is a refractive index of the low-refractive index layer; $d_1$ is a thickness (nm) of the low-refractive index layer; and $\lambda$ is a wavelength falling between 500 and 550 nm. Satisfying formula (IV-1) means the presence of m (this is a positive odd number, and is generally 1) that satisfies formula (IV-1) within the above-mentioned wavelength range.

The refractive index of the low-refractive index layer in the antireflection film of the invention is preferably from 1.30 to 1.55 from the viewpoint of the antireflection capability and the mechanical strength of the film. Also preferably, the refractive index of the low-refractive index layer is lower than that of the support, more preferably lower by from 0.02 to 0.2 than the refractive index of the support.

In particular, the refractive index of the low-refractive index layer in the antireflection film of the first and second embodiments of the invention is preferably from 1.38 to 1.49, more preferably from 1.38 to 1.44. In the third embodiment, the refractive index is preferably from 1.30 to 1.55, more preferably from 1.35 to 1.40. In the fourth embodiment, the refractive index is more preferably from 1.31 to 1.48.

In the antireflection film of the invention, the low-refractive index layer is preferably the outermost layer having scratch resistance and stain resistance.

The low-refractive index layer contains an inorganic particle having a hollow structure (hallow inorganic particle). Also preferably, a fluorine-containing or silicone-containing compound (a compound lowering a surface free energy of the layer) and a binder (a binder capable of lowering a surface free energy of the layer) may be introduced into the layer to thereby reduce the surface free energy of the antireflection film.

<Inorganic Particle>

The refractive index of the inorganic particle to be in the low-refractive index layer in the invention may be from 1.17 to 1.40, preferably from 1.17 to 1.35, more preferably from 1.17 to 1.30. The refractive index as referred to herein for the particle means the refractive index of the entire particle. In hollow inorganic particle, therefore, the refractive index is not for the inorganic shell part thereof alone. In this case, when the radius of the hollow of the particle is represented by "a" and the radius of the particle shell is by "b", then the porosity "x" of the particle to be represented by the following formula (V) is preferably from 10 to 60%, more preferably from 20 to 60%, most preferably from 30 to 60%.

$$x = (4\pi a^3/3)/(4\pi b^3/3) \times 100. \tag{V}$$

When the refractive index of the hollow inorganic particle is further lowered and the porosity thereof is further increased, then the thickness of the shell may be thin and the mechanical strength of the particles may be low. Therefore, from the viewpoint of the scratch resistance thereof, low-refractive index particle having a refractive index of lower than 1.17 are impracticable.

The refractive index of the inorganic particle is determined with an Abbe's refractometer (by Atago).

One example of the inorganic fine particle is a hollow silica particle. From the viewpoint of the refractive index, the hardness and the cost, hollow silica is the most preferred. The inorganic particle may be crystalline or amorphous, and may be monodispersed particle or aggregated particle so far as they satisfy the predetermined particle size. Regarding their morphology, the particle is most preferably spherical, but may be amorphous with no problem.

Methods for producing hollow silica are described, for example, in JP-A-2001-233611 and JP-A-2002-79616.

The coating amount of the inorganic particle is preferably from 1 mg/m² to 100 mg/m², more preferably from 5 mg/m² to 80 mg/m², even more preferably from 10 mg/m² to 60 mg/m², from the viewpoint of lowering the refractive index of the low-refractive index layer, improving the scratch resistance of the layer, improving the black appearance of the layer owing to the formation of protrusions of the particles, and preventing the integrated reflection on the layer from increasing.

The mean particle size of the inorganic particle is preferably from 20% to 150%, more preferably from 30% to 100%, even more preferably from 40% to 70% of the thickness of the low-refractive index layer. Accordingly, when the thickness of the low-refractive index layer is 100 nm, then the particle size of the inorganic particle is preferably from 30 nm to 150 nm, more preferably from 30 nm to 100 nm, even more preferably from 40 nm to 70 nm.

When the particle size thereof falls within the range as above, then the inorganic particle may be effective for reducing the refractive index of the low-refractive index layer, for preventing fine protrusions from being formed on the surface of the layer, for improving the black appearance of the layer and for reducing the integrated reflection on the layer.

The inorganic particle may be crystalline or amorphous. It is preferably monodispersed particle. Regarding morphology, it is most preferably spherical, but may be amorphous with no problem.

The mean particle size of the inorganic particle may be determined on electromicroscopic photographs of particles.

In the invention, hollowless silica or any other inorganic particle may be used along with the hollow inorganic particle. The other inorganic particle than silica is preferably a particle of low-refractive index compound such as fluorine particle (magnesium fluoride, calcium fluoride, barium fluoride). The particle size of the hollowless inorganic particle is preferably from 30 nm to 150 nm, more preferably from 35 nm to 80 nm, most preferably from 40 nm to 60 nm.

Preferably, at least one type of inorganic particle having a mean particle size of less than 25% of the thickness of the low-refractive index layer (this is referred to as "a small-size inorganic particle") is combined with the inorganic particles having the above-mentioned particle size (this is referred to as "a large-size inorganic particle").

Since small-size inorganic particles may exist in the space between the large-size inorganic particles, they may serve as a fixer for the large-size inorganic particles.

The mean particle size of the small-size inorganic particle is preferably from 1 nm to 20 nm, more preferably from 5 nm to 15 nm, even more preferably from 10 nm to 15 nm. Using the inorganic particle of the type is preferred in point of the cost of the materials and of the effect of the particles as fixer.

The (hollow) inorganic particle and other inorganic particle may be processed for physical surface treatment such as plasma discharge treatment or corona discharge treatment, or for chemical surface treatment with surfactant or coupling agent, in order to ensure their dispersion stability in dispersions or coating liquids and in order to enhance their affinity and bonding ability to binder components. More preferably, coupling agent is used for the treatment. The coupling agent is preferably an alkoxymetal compound (e.g., titanium coupling agent, silane coupling agent). Above all, treatment with a silane coupling agent having an acryloyl group or a methacryloyl group is especially effective.

The coupling agent is used for surface treatment as a surface-treating agent for inorganic filler in the low-refractive index layer before a coating liquid for the layer is prepared, but it is preferably added to the coating liquid for the layer as an additive thereto while the coating liquid is prepared, and it is thereby added to the layer.

The (hollow) inorganic particle and other inorganic particle are preferably dispersed in media before the surface treatment, for reducing the load of the surface treatment.

<Surface Free Energy>

With reference to S. K. Owens, *J. Appl. Polym. Sci.*, 13, 1741 (1969), the surface free energy ($\gamma s^v$: unit, mN/m) of the antireflection film of the invention is defined by the surface tension of the antireflection film that is calculated as the value $\gamma s^v$ ($=\gamma s^d + \gamma s^h$), or that is, the sum of $\gamma s^d$ and $\gamma s^h$ obtained according to the following simultaneous equations (1) and (2) from the contact angles $\theta_{H2O}$ and $\theta_{CH2I2}$ of pure water $H_2O$ and methylene iodide $CH_2I_2$ experimentally determined on the antireflection film. When $\gamma s^v$ is smaller and the surface free energy is lower, then the film has high repellency and therefore has good stain resistance. Preferably, the surface free energy of the antireflection film is at most 26 mN/m, more preferably at most 25 mN/m, even more preferably at most 20 mN/m.

$$1+\cos\theta_{H2O}=2\sqrt{\gamma s^d}(\sqrt{\gamma_{H2O}^d/\gamma_{H2O}^v})+2\sqrt{\gamma s^h}(\sqrt{\gamma_{H2O}^h/\gamma_{H2O}^v}) \quad (1)$$

$$1+\cos\theta_{CH2I2}=2\sqrt{\gamma s^d}(\sqrt{\gamma_{CH2I2}^d/\gamma_{CH2I2}^v})+2\sqrt{\gamma s^h}(\sqrt{\gamma_{CH2I2}^h/\gamma_{CH2I2}^v}) \quad (2)$$

\* $\gamma_{H2O}^d=21.8$, $\gamma_{H2O}^h=51.0$, $\gamma_{H2O}^v=72.8$, $\gamma_{CH2I2}^d=49.5$, $\gamma_{CH2I2}^h=1.3$, $\gamma_{CH2I2}^v=50.8$. After the antireflection film has been conditioned at 25° C. and 60% RH for at least 1 hour, the contact angle on it is measured under the same condition as that for the preconditioning.

The compound reducing a surface free energy (surface free energy lowering compound) and the binder capable of reducing a surface free energy (surface free energy lowering binder) for use in the invention may be any one, not limited in point of the structure and the composition thereof, so far as it is effective for significantly lowering the surface free energy defined above of the antireflection film when it is applied to the film. In general, the surface free energy depression is not linear relative to the amount of the compound applied to the film, and it may be saturated with the increase in the amount thereof. For example, in a surface free energy depression profile curve prepared by plotting the surface free energy depression points relative to the amount of a cured matrix formed of a binder such as DPHA®, the surface free energy depression relative to the amount of the compound added to the surface free energy depression saturation point is preferably at least 10 mN/m, more preferably at least 20 mN/m, even more preferably at least 25 mN/m, most preferably at least 30 mN/m.

<Surface Free Energy Lowering Compound>

The surface free energy lowering compound may be any of known silicone compounds, fluorine-containing compounds or fluoroalkylsilicone compounds. Preferably, the amount of the compound to be added to the low-refractive index layer is from 0.01 to 20% by weight of the overall solid content of the layer, more preferably from 0.05 to 10% by weight, even more preferably from 0.1 to 5% by weight.

Preferred examples of the silicone compound are those having a substituent at least in any of terminals and side branches of a compound chain that contains multiple dimethylsilyloxy units as repetitive units. The compound chain containing repetitive dimethylsilyloxy units may contain any other structural unit than dimethylsilyloxy units. Preferably, the compound contains multiple substituents that may be the same or different. Examples of preferred substituents are those containing any of an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, and amino group. Though not specifically defined, the molecular weight of the compound is preferably at most 100,000, more preferably at most 50,000, most preferably from 3,000 to 30,000. Also not specifically defined, the silicone atom content of the silicone compound is preferably at least 18.0% by weight, more preferably from 25.0 to 37.8% by weight, most preferably from 30.0 to 37.0% by weight. Examples of the preferred silicone compounds are Shin-etsu Chemical's X-22-174DX, X-22-2426, X-22-164B, X22-164C, X-22-170DX, X-22-176D, X-22-1821 (all trade names), Chisso's FM-0725, FM-7725, FM-4411, FM-5521, FM-6621, FM-1121, and Gelest's DMS-U22, RMS-033, RMS-083, UMS-182®, DMS-H21, DMS-H31, HMS-301 (all trade names), to which, however, the invention is not limited.

The fluorine-containing compound is preferably a fluoroalkyl group-having compound. Preferably, the fluoroalkyl group has from 1 to 20 carbon atoms, more preferably from 1 to 10 carbon atoms, and it may have a linear structure (e.g., —$CF_2CF_3$, $CH_2(CF_2)_4H$, —$CH_2(CF_2)_8CF_3$, —$CH_2CH_2(CF_2)_4$), or a branched structure (e.g., —$CH(CF_3)_2$, —$CH_2CF(CF_3)_2$, —$CH(CH_3)CF_2CF_3$, —$CH(CH_3)(CF_2)_5CF_2H$), or an alicyclic structure (preferably 5-membered or 6-membered, e.g., a perfluorocyclohexyl group, a perfluorocyclopentyl group, or an alkyl group substituted with any of these); or it may have an ether bond (e.g., —$CH_2OCH_2CF_2CF_3$, —$CH_2CH_2OCH_2C_4F_8H$, —$CH_2CH_2OCH_2CH_2C_2F_{17}$, —$CH_2CH_2OCF_2CF_2OCF_2CF_2H$). One molecule of the compound may have multiple fluoroalkyl groups.

Preferably, the fluorine-containing compound contains a substituent that contributes to the formation of a bond to the film of the low-refractive index layer or to the compatibility with the film. Also preferably, the compound has multiple substituents of the type, which may be the same or different. Examples of the preferred substituent are an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group. The fluorine-containing compound may be a polymer or an oligomer with a compound not containing a fluorine atom, and its molecular weight is not specifically defined. Also not specifically defined, the fluorine atom content of the fluorine-containing compound is preferably at least 20% by weight, more preferably from 30 to 70% by weight, most preferably from 40 to 70% by mas. Examples of the preferred fluorine-containing compound are Daikin's R-2020, M-2020, R-3833, M-3833 (all trade names), Dai-Nippon Ink's Megafac F-171, F-172, F-179A, Diffenser MCF-300 (all trade names), to which, however, the invention is not limited.

Examples of the fluoroalsylsilicone compound are Gelest's FMS121, FMS123, FMS131, FMS141, FMS221, to which, however, the invention is not limited. Though not specifically defined, the fluorine content and the silicone content of the compound, and examples of the preferred substituent to be in the molecule of the compound may be the same as those mentioned hereinabove for the silicone compound and the fluorine-containing compound.

The surface free energy lowering compound preferably has at least one group reactive with the binder in the molecule. Examples of the preferred reactive group are thermosetting active hydrogen atom, hydroxyl group, melamine, active energy ray-curable (meth)acryloyl group and epoxy group. Of those, especially preferred is melamine or (meth)acryloyl group.

Dust inhibitor and antistatic agent, such as known cationic surfactant or polyoxyalkylene compound may be added to the layer for making the layer dust-proof and antistatic. The silicone compound and the fluorine-containing compound may contain the structural units of the dust inhibitor and the antistatic agent as a part of their functions. When these are added to the layer as additives, then their amount is preferably from 0.01 to 20% by weight, more preferably from 0.05 to 10% by weight, even more preferably from 0.1 to 5% by weight of the overall solid content of the low-refractive index layer. Examples of the preferred compound are Dai-Nippon Ink's Megafac F-150 (trade name) and Toray-Dow Corning's SH-3747 (trade name), to which, however, the invention is not limited.

The binder that may be in the low-refractive index layer of the antireflection film of the invention is described. The binder is preferably a polymer having a saturated hydrocarbon chain or a polyether chain as the backbone structure thereof, more preferably a polymer having a saturated hydrocarbon chain as the backbone structure thereof. Also preferably, the binder polymer has a crosslinked structure.

The binder polymer having a saturated hydrocarbon chain as the backbone structure is preferably a polymer of an ethylenic unsaturated monomer. The binder polymer having a saturated hydrocarbon chain as the backbone structure and having a crosslinked structure is preferably a (co)polymer of a monomer having two or more ethylenic unsaturated groups.

The monomer having two or more ethylenic unsaturated groups includes esters of polyalcohols and (meth)acrylic acids (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, polyester polyacrylate), vinylbenzene and its derivatives (e.g., 1,4-divinylbenzene, 2-acryloylethyl 4-vinylbenzoate, 1,4-divinylcyclohexanone), vinyl sulfones (e.g., divinyl sulfone), acrylamides (e.g., methylenebisacrylamide), and methacrylamides. Two or more of these monomers may be used as combined. In this description, "(meth)acrylate" indicates "acrylate or methacrylate".

Polymerization of these ethylenic unsaturated group-having monomers may be effected through exposure to active energy rays or to heat in the presence of an optical radical initiator or a thermal radical initiator.

Accordingly, a coating liquid comprising an ethylenic unsaturated monomer, an optical radical initiator or a thermal radical initiator, a mat particles and an inorganic filler is prepared, and the coating liquid is applied onto a transparent support, and then polymerized and cured through exposure to active energy rays or to heat to form an antireflection film.

The optical radical initiator includes acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulfoniums. Examples of acetophenones are 2,2-diethoxyacetophenone, p-dimethylacetophenone, 1-hydroxydimethylphenyl ketone, 1-hydroxycyclohexyl phenyl ketone, 2-methyl-4-methylthio-2-morpholinopropiophenone, and 2-benzyl-2-dimethylamino-1-(4-morpholinophenyl)butanone. Examples of benzoins are benzoin benzenesulfonates, benzoin toluenesulfonates, benzoin methyl ether, benzoin ethyl ether, and benzoin isopropyl ether. Examples of benzophenones are benzophenone, 2,4-dichlorobenzophenone, 4,4-dichlorobenzophenone, and p-chlorobenzophenone. One example of phosphine oxides is 2,4,6-trimethylbenzoyldiphenylphosphine oxide. Various examples of the compounds are described in the Newest UV Curing Technology (p. 159, issued by Kazuhiro Takatsu, published by Gijutsu Joho Kyokai, 1991), and these are useful in the invention. Preferred examples of commercially-available, photo-cleaving optical radical polymerization initiators are Ciba Speciality Chemicals' Irgacure (651, 184, 907). Preferably, the photopolymerization initiator is used in an amount of from 0.1 to 15 parts by weight relative to 100 parts by weight of the polyfunctional monomer, more preferably from 1 to 10 parts by weight. An optical sensitizer may be added to the photopolymerization initiator. Examples of the optical sensitizer are n-butylamine, triethylamine, tri-n-butyl phosphine, Michler's ketone, and thioxanthone.

The thermal radical initiator includes organic or inorganic peroxides, and organic azo and diazo compounds. Concretely, the organic peroxides include benzoyl peroxide, halogenobenzoyl peroxide, lauroyl peroxide, acetyl peroxide, dibutyl peroxide, cumene hydroperoxide, butyl hydroperoxide; the inorganic peroxides include hydrogen peroxide, ammonium persulfate, potassium persulfate; the azo compounds include 2-azobisisobutyronitrile, 2-azobispropionitrile, 2-azobiscyclohexane-dinitrile; and the diazo compounds include diazoarinobenzene, and p-nitrobenzenediazonium.

The polymer having a polyether backbone structure that is used as the binder for the low-refractive index layer is preferably a ring-cleaved polymer of a polyfunctional epoxy compound. Ring-cleavage polymerization of a polyfunctional epoxy compound may be effected through exposure to active energy rays or to heat in the presence of an optical acid generator or a thermal acid generator. Accordingly, a coating liquid comprising a polyfunctional epoxy compound, an optical acid generator or a thermal acid generator, mat particles and an inorganic filler is prepared; and the coating liquid is applied onto a transparent support, and then polymerized and cured through exposure to active energy rays or to heat to form an antireflection film.

In place of or in addition to the monomer that has two or more ethylenic unsaturated groups for obtaining a binder polymer having a saturated hydrocarbon chain as the backbone structure and having a crosslinked structure, a monomer that has a crosslinking functional group may be used so as to introduce the crosslinking functional group into the polymer, and through the reaction of the crosslinking functional group, a crosslinked structure may be introduced into the binder polymer.

Examples of the crosslinking functional group are an isocyanate group, an epoxy group, an aziridine group, an oxazoline group, an aldehyde group, a carbonyl group, a hydrazine group, a carboxyl group, a methylol group, and an active methylene group. Vinylsulfonic acids, acid anhydrides, cyanoacrylate derivatives, melamines, etherified methylols, esters and urethanes, and metal alkoxides such as tetramethoxysilane may also be used as monomers for introducing a crosslinked structure into the polymer. A functional group that may be crosslinkable as a result of decomposition reaction, such as a blocked isocyanate group may also be used. Accordingly, in the invention, the crosslinking functional group may not be one that is directly reactive, but may be one that becomes reactive as a result of decomposition. The binder polymer having such a crosslinking functional group may be, after applied onto a support, heated to form the intended crosslinked structure.

Not specifically defined, the surface free energy lowering binder for use in the low-refractive index layer of the antireflection film of the invention may be any one that may significantly lower the surface free energy of the layer that is formed as a result of curing of an alkyl acrylate monomer such as typically DPHA®, when the binder is added to the layer. Especially preferably, the binder is such that the surface free energy of the layer cured and formed only by the binder is at most 30 mN/m, more preferably at most 25 mN/m, even more preferably at most 20 mN/m. The binder is preferably a compound containing at least one group selected from a fluoroalkyl group, a dimethylsiloxane group, and a polydimethylsiloxane (silicone) group. Before cured, the binder may be either monomer or polymer, or may be a mixture of monomer and polymer, or may b a mixture of multiple compounds.

Preferred examples of the surface free energy lowering binder for use in the low-refractive index layer is described. The surface free energy lowering binder is preferably a low-refractive index binder such as a fluorine-containing polymer. The fluorine-containing polymer preferably has a kinematic friction factor of from 0.03 to 0.15 and a contact angle to water of from 90 to 120° C., and it is preferably crosslinkable when exposed to active energy rays.

The low-refractive index layer of the antireflection film of the invention preferably contains a fluorine-containing compound. In particular, the low-refractive index layer in the invention is preferably formed of a cured fluororesin of essentially a thermosetting or ionizing radiation-curable crosslinking fluorine-containing compound.

In the invention, the expression "of essentially fluorine-containing compound" means that the content of the fluorine-containing compound in the low-refractive index layer is at least 50% by weight, more preferably at least 60% by weight of the total weight of the low-refractive index layer.

Preferably, the refractive index of the fluorine-containing compound is from 1.35 to 1.50, more preferably from 1.36 to 1.47. Also preferably, the fluorine atom content of the fluorine-containing compound is from 35 to 80% by weight.

The fluorine-containing compound includes fluorine-containing polymer, fluorine-containing surfactant, fluorine-containing ether, fluorine-containing silane compound, fluorine-containing monomer and fluorine-containing oligomer that may be referred to as fluorine-containing compound. Concretely, the compounds are described in, for example, JP-A 9-222503, paragraphs [0018] to [0026], JP-A 11-38202, paragraphs [0019] to [0030], and JP-A 2001-40284, paragraphs [0027] to [0028], and these may be used in the invention.

(Fluorine-Containing Polymer)

The fluorine-containing polymer is preferably a copolymer that comprises a fluorine atom-containing repetitive structural unit, a crosslinking or polymerizing functional group-containing repetitive structural unit, and other repetitive structural units of any other substituents. Specifically preferred is a copolymer of a fluorine-containing monomer and a comonomer for imparting a crosslinking group thereto, or that is, a fluorine-containing polymer that contains a curable reactive group serving as a crosslinking or polymerizing functional group. Other fluorine-containing polymers copolymerized with any other monomer may also be used herein.

The crosslinking or polymerizing functional group may be any known one.

Examples of the crosslinking functional group are an isocyanate group, an epoxy group, an aziridine group, an oxazoline group, an aldehyde group, a carbonyl group, a hydrazine group, a carboxyl group, a methylol group, and an active methylene group. Further, vinylsulfonic acids, acid anhydrides, cyanoacrylate derivatives, melamines, etherified methylols, esters and urethanes, and metal alkoxides such as tetramethoxysilane may also be used as monomers for introducing a crosslinked structure into the polymer. A functional group that may be crosslinkable as a result of decomposition reaction, such as a blocked isocyanate group may also be used. Accordingly, in the invention, the crosslinking functional group may not be one that is directly reactive, but may be one that becomes reactive as a result of decomposition. The compound having such a crosslinking functional group may be, after applied onto a support, heated to form the intended crosslinked structure.

The polymerizing functional group includes a radical polymerizing group and a cationic polymerizing group.

Preferred are radical polymerizing groups (e.g., (meth)acryloyl, styryl, vinyloxy), and cationic polymerizing groups (e.g., epoxy, thioepoxy, oxetanyl).

The other repetitive structural units are preferably those formed of a hydrocarbon-type copolymer component for solubility in solvent. Preferably, the fluorine-containing polymer contains the structural units of the type in an amount of about 50% by weight of the polymer. Also preferably, the fluorine-containing polymer is combined with a silicone compound.

The silicone compound is a compound having a polysiloxane structure. Preferably, this contains a curable functional group or a polymerizing functional group in the polymer chain, and this may be crosslinked to have a crosslinked structure in the film. For example, herein usable are commercially-available reactive silicones such as Silaplane (by Chisso), and compounds having a silanol group at both terminals of the polysiloxane structure thereof, as in JP-A-11-258403.

The crosslinking or polymerization reaction of the crosslinking or polymerizing group-having fluorine-containing polymer is preferably effected at the same time when the curable composition is applied onto a support for forming an outermost layer or after its application, and it may be attained through exposure of the layer to light or heat.

In this step, a polymerization initiator and a sensitizer may be used, and these may be the same as those used for the light-diffusing layer.

Not specifically defined, the comonomer includes, for example, olefins (e.g., ethylene, propylene, isoprene, vinyl chloride, vinylidene chloride), acrylates (e.g., methyl acrylate, ethyl acrylate, 2-ethylhexyl acrylate), methacrylates (e.g., methyl methacrylate, ethyl methacrylate, butyl methacrylate, ethylene glycol dimethacrylate), styrene derivatives (e.g., styrene, divinylstyrene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides, acrylonitrile derivatives.

A curing agent may be suitably added to the polymer, for example, as in JP-A-10-25388 and JP-A-10-147739.

For the low-refractive index layer, also preferably used is a sol-gel cured film that is formed through condensation curing of an organic metal compound such as a silane coupling agent and a specific fluorine-containing hydrocarbon group-having silane coupling agent in the presence of a catalyst.

For example, there are mentioned polyfluoroalkyl group-containing silane compounds and their partial hydrolytic condensates (e.g., compounds described in JP-A-58-142958, 58-147483, 58-147484); perfluoroalkyl group-containing silane coupling agents described in JP-A-9-157582; silyl compounds containing a fluorine-containing long-chin group, poly-perfluoroalkylether group (e.g., compounds described in JP-A-2000-117902, 2001-48590, 2002-53804).

The catalyst to be used herein may be any known compound, and its preferred examples are described in the above-mentioned references.

The fluorine-containing polymer for use in the low-refractive index layer includes hydrolytic dewatering condensates of perfluoroalkyl group-containing silane compounds (e.g., heptadecafluoro-1,1,2,2-tetrahydrodecyl)triethoxysilane), as well as fluorine-containing copolymers that comprise, as the constitutive components thereof, fluorine-containing monomer units and structural units for imparting crosslinking reactivity to the polymer.

Specific examples of the fluorine-containing monomers are fluoro-olefins (e.g., fluoroethylene, vinylidene fluoride, tetrafluoroethylene, perfluoro-octylethylene, hexafluoropropylene, perfluoro-2,2-dimethyl-1,3-dioxol), partially or completely fluorinated alkyl ester derivatives of (meth)acrylic acid (e.g., Biscoat 6FM (by Osaka Yuki Kagaku), M-2020 (by Daikin)), and completely or partially fluorinated vinyl ethers. Preferred are perfluoro-olefins; and more preferred is hexafluoropropylene from the viewpoint of the refractive index, solubility, transparency and availability thereof.

The structural units for imparting crosslinking reactivity to the polymer are, for example, structural units formed through polymerization of a monomer that intrinsically has a self-crosslinking functional group in the molecule, such as glycidyl (meth)acrylate or glycidyl vinyl ether; structural units formed through polymerization of a monomer having a carboxyl group, a hydroxyl group, an amino group or a sulfo group (e.g., (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid); structural units constructed by introducing a crosslinking reactive group such as a (meth)acryloyl group into those structural units through polymerization reaction (for example, the group may be introduced according to a method of reacting acrylic acid chloride on a hydroxyl group).

The fluorine-containing polymer that is especially useful for the low-refractive index layer in the invention is a random copolymer of perfluoro-olefins with vinyl ethers or vinyl esters. Especially preferably, the polymer has a group that may be subjected to crosslinking reaction by itself (e.g., radical reactive group such as (meth)acryloyl group, and ring-cleaving polymerizing group such as epoxy group or oxetanyl group). Preferably, the content of the crosslinking reactive group-containing polymer units in the polymer is from 5 to 70 mol % of all the polymer units of the polymer, more preferably from 30 to 60 mol %.

One preferred embodiment of the copolymer (fluorine-containing polymer) for use in the low-refractive index layer is a polymer of the following formula (I):

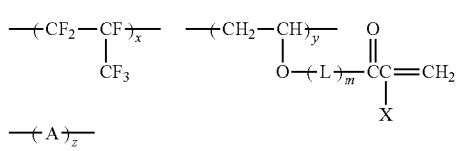

In formula (1), L represents a linking group having from 1 to 10 carbon atoms, preferably from 1 to 6 carbon atoms, more preferably from 2 to 4 carbon atoms, and it may have a linear structure, or a branched structure, or a cyclic structure, and it may contain a hetero atom selected from O, N and S.

Preferred examples of L are *—(CH$_2$)$_2$—O—**, *—(CH$_2$)$_2$—NH—**, *—(CH$_2$)$_4$—O—**, *—(CH$_2$)$_6$—O—**, *—(CH$_2$)$_2$—O—(CH$_2$)$_2$—O—**, *—CONH—(CH$_2$)$_3$—O—**, *—CH$_2$CH(OH)CH$_2$—O—**, *—CH$_2$CH$_2$O CONH(CH$_2$)$_3$—O—** (in which * indicates the linking site on the backbone structure side; and ** indicates the linking side on the (meth)acryloyl group side). m indicates 0 or 1.

In formula (1), X represents a hydrogen atom or a methyl group. From the viewpoint of the curing reactivity of the polymer, X is preferably a hydrogen atom.

In formula (1), A represents a repetitive unit derived from a vinyl monomer, and, not specifically defined, it may be any constitutive component of a monomer copolymerizable with hexafluoropropylene. From the viewpoint of the adhesiveness of the polymer to substrates, the Tg thereof (this contributes to the film hardness), the solubility thereof in solvent, the transparency thereof, the lubricity thereof, and the dust resistance and the stain resistance thereof, the unit A may be suitably selected. Depending on the object of the polymer, one or more different types of vinyl monomers may form the repetitive unit A.

Preferred examples of the vinyl monomer are vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, allyl vinyl ether; vinyl esters such as vinyl acetate, vinyl propionate, vinyl butyrate; (meth)acrylates such as methyl (meth)acrylate, ethyl (meth)acrylate, hydroxyethyl (meth)acrylate, glycidyl methacrylate, allyl (meth)acrylate, (meth)acryloyloxypropyltrimethoxysilane; styrene derivatives such as styrene, p-hydroxymethylstyrene; unsaturated carboxylic acids and their derivatives such as crotonic acid, maleic acid, itaconic acid. More preferred are vinyl ether derivatives and vinyl ester derivatives; and even more preferred are vinyl ether derivatives.

x, y and z each indicate the mol % of the constitutive components, and satisfy the following: $30 \leq x \leq 60$, $5 \leq y \leq 70$, $0 \leq z \leq 65$. Preferably, $35 \leq x \leq 55$, $30 \leq y \leq 60$, $0 \leq z \leq 25$; more preferably $40 \leq x \leq 55$, $40 \leq y \leq 55$, $0 \leq z \leq 10$.

A more preferred embodiment of the copolymer for use in the low-refractive index layer of the antireflection film of the invention is a polymer of the following formula (2):

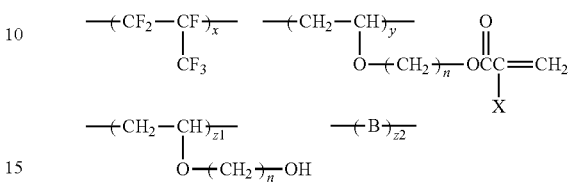

In formula (2), X, x and y have the same meanings as those in formula (1), and their preferred ranges are the same as in formula (1). n indicates an integer of $2 \leq n \leq 10$, preferably $2 \leq n \leq 6$, more preferably $2 \leq n \leq 4$. B represents a repetitive unit derived from a vinyl monomer, and it may be composed of a single composition or multiple compositions. For its examples, referred to are those mentioned hereinabove for A in formula (1). z1 and z2 each indicate the mol % of the repetitive units, and satisfy $0 \leq z1 \leq 65$ and $0 \leq z2 \leq 65$. Preferably, $0 \leq z1 \leq 30$ and $0 \leq z2 \leq 10$; more preferably $0 \leq z1 \leq 10$ and $0 \leq z2 \leq 5$.

The copolymers of formula (1) or (2) can be produced, for example, by introducing a (meth)acryloyl group into a copolymer that contains a hexafluoropropylene component and a hydroxyallyl vinyl ether component, according to any of the above-mentioned methods.

Preferred examples of the copolymers useful in the invention are described below, to which, however, the invention is not limited.

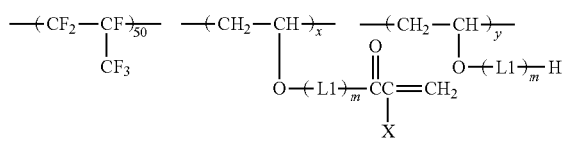

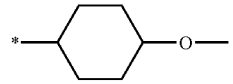

| | x | y | m | L1 | X | Number-Average Molecular Weight Mn(×10$^4$) |
|---|---|---|---|---|---|---|
| P-1 | 50 | 0 | 1 | *—CH$_2$CH$_2$O— | H | 3.1 |
| P-2 | 50 | 0 | 1 | *—CH$_2$CH$_2$O— | CH$_3$ | 4.0 |
| P-3 | 45 | 5 | 1 | *—CH$_2$CH$_2$O— | H | 2.8 |
| P-4 | 40 | 10 | 1 | *—CH$_2$CH$_2$O— | H | 3.8 |
| P-5 | 30 | 20 | 1 | *—CH$_2$CH$_2$O— | H | 5.0 |
| P-6 | 20 | 30 | 1 | *—CH$_2$CH$_2$O— | H | 4.0 |
| P-7 | 50 | 0 | 0 | — | H | 11.0 |
| P-8 | 50 | 0 | 1 | *—C$_4$H$_8$O— | H | 0.8 |
| P-9 | 50 | 0 | 1 | *—(CH$_2$)$_2$—O—(CH$_2$)$_2$—O— | H | 1.0 |
| P-10 | 50 | 0 | 1 | *—⟨cyclohexyl⟩—O— | H | 7.0 |
| P-11 | 50 | 0 | 1 | *—CH$_2$CH$_2$NH— | H | 4.0 |
| P-12 | 50 | 0 | 1 | *—CH$_2$CH$_2$OCNHCH$_2$CH$_2$O— | H | 4.5 |

-continued

| | | | | | | |
|---|---|---|---|---|---|---|
| P-13 | 50 | 0 | 1 | *—CH$_2$CH$_2$OC(=O)NHCH$_2$CH$_2$O— | CH$_3$ | 4.5 |
| P-14 | 50 | 0 | 1 | *—CH$_2$CH$_2$CH$_2$CH$_2$OC(=O)NHCH$_2$CH$_2$O— | CH$_3$ | 5.0 |
| P-15 | 50 | 0 | 1 | *—CH$_2$CH(OH)CH$_2$O— | H | 3.5 |
| P-16 | 50 | 0 | 1 | *—CH$_2$CH(CH$_2$OH)O— | H | 3.0 |
| P-17 | 50 | 0 | 1 | *—CH$_2$CH$_2$OCH$_2$—CH(OH)CH$_2$O— | H | 3.0 |
| P-18 | 50 | 0 | 1 | *—CH$_2$OCH$_2$CH(OH)—CH$_2$O— | CH$_3$ | 3.0 |
| P-19 | 50 | 0 | 1 | *—CH$_2$OCH$_2$CH(CH$_2$OH)—O— | CH$_3$ | 3.0 |
| P-20 | 40 | 10 | 1 | *—CH$_2$CH$_2$O— | CH$_3$ | 0.6 |

$$-(CF_2-CF(CF_3))_a-(CH_2-CH(O-L1-C(=O)CH=CH_2))_b-(A)_c-$$

| | a | b | c | L1 | A | Number-Average Molecular Weight Mn(×10$^4$) |
|---|---|---|---|---|---|---|
| P-21 | 55 | 45 | 0 | *—CH$_2$CH$_2$O—** | — | 1.8 |
| P-22 | 45 | 55 | 0 | *—CH$_2$CH$_2$O—** | — | 0.8 |
| P-23 | 50 | 45 | 5 | *—CH$_2$CH$_2$OC(=O)NHCH$_2$CH$_2$O—** | —CH$_2$—CH(OCH$_2$CH$_2$OH)— | 0.7 |
| P-24 | 50 | 45 | 5 | *—CH$_2$CH(OH)—CH$_2$O—** | —CH$_2$—CH(O—CH$_2$—epoxide)— | 4.0 |
| P-25 | 50 | 45 | 5 | *—CH$_2$CH(CH$_2$OH)O—** | —CH$_2$—CH(O—CH$_2$—epoxide)— | 4.0 |
| P-26 | 50 | 40 | 10 | *—CH$_2$CH$_2$O—** | —CH$_2$—CH(OCH$_2$CH$_3$)— | 4.0 |
| P-27 | 50 | 40 | 10 | *—CH$_2$CH$_2$O—** | —CH$_2$—CH(O-cyclohexyl)— | 4.0 |
| P-28 | 50 | 40 | 10 | *—CH$_2$CH$_2$O—** | —CH(CH$_3$)—CH(COOH)— | 5.0 |

-continued

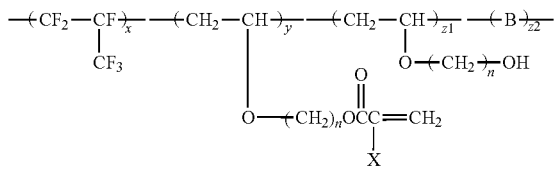

| | x | y | z1 | z2 | n | X | B | Number-Average Molecular Weight Mn(×10⁴) |
|---|---|---|---|---|---|---|---|---|
| P-29 | 50 | 40 | 5 | 5 | 2 | H | —CH₂—CH—<br>    \|<br>    O—CH₂CH₃ | 5.0 |
| P-30 | 50 | 35 | 5 | 10 | 2 | H | —CH₂—CH—<br>    \|<br>    O—C(CH₃)₃ | 5.0 |
| P-31 | 40 | 40 | 10 | 10 | 4 | CH₃ | —CH₂—CH—<br>    \|<br>    O—C₆H₁₁ | 4.0 |

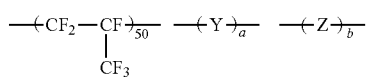

| | a | b | Y | Z | Number-Average Molecular Weight Mn(×10⁴) |
|---|---|---|---|---|---|
| P-32 | 45 | 5 | —CH(CH₃)—CH—<br>CO₂CH₂CH(OH)CH₂OC(O)C(CH₃)=CH₂ | —CH(CH₃)—CH—COOH | 4.0 |
| P-33 | 40 | 10 | —CH(CO₂H)—CH—CONHCH₂CH₂OCCH=CH₂ | succinic anhydride ring | 4.0 |

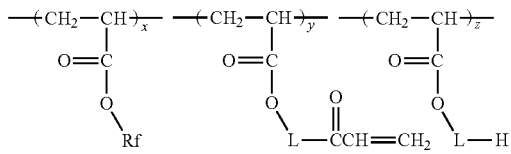

| | x | y | z | Rf | L | Number-Average Molecular Weight Mn(×10⁴) |
|---|---|---|---|---|---|---|
| P-34 | 60 | 40 | 0 | —CH₂CH₂C₈F₁₇-n | *—CH₂CH₂O— | 11 |
| P-35 | 60 | 30 | 10 | —CH₂CH₂C₄F₈H-n | *—CH₂CH₂O— | 30 |
| P-36 | 40 | 60 | 0 | —CH₂CH₂C₆F₁₂H | *—CH₂CH₂CH₂CH₂O— | 4.0 |

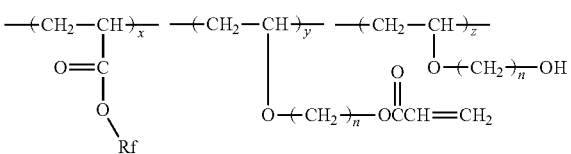

| | x | y | z | n | Rf | Number-Average Molecular Weight Mn(×10⁴) |
|---|---|---|---|---|---|---|
| P-37 | 50 | 50 | 0 | 2 | —CH₂C₄F₈H-n | 5.0 |
| P-38 | 40 | 55 | 5 | 2 | —CH₂C₄F₈H-n | 4.0 |

-continued

| P-39 | 30 | 70 | 0 | 4 | —CH₂C₈F₁₇-n | 10 |
| P-40 | 60 | 40 | 0 | 2 | —CH₂CH₂C₈F₁₆H-n | 5.0 |

*indicates the side of the polymer backbone.
**indicates the side of the acryloyl group.

The copolymers for use in the invention can be produced by preparing a precursor such as a hydroxyl group-containing polymer according to various polymerization methods of, for example, solution polymerization, precipitation polymerization, suspension polymerization, bulk polymerization or emulsion polymerization, and then introducing a (meth)acryloyl group into it through the above-mentioned polymer reaction. The polymerization reaction may be effected in any known method of batch, or semi-continuous or continuous operation.

To start the polymerization, employable is a method of using a radical initiator, or a method of exposing the system to light or radiation.

The polymerization methods and the polymerization initiation methods are described, for example, in Teiji Tsuruta, *Methods of Polymer Synthesis*, revised edition (published by Nikkan Kogyo Shinbun, 1971); Takayuki Ohtsu & Masaetsu Kinoshita, *Experimental Methods of Polymer Synthesis* (published by Kagaku Dojin, 1972, pp. 124-154).

Of the above-mentioned polymerization method, especially preferred is a solution polymerization method that uses a radical initiator. The solvent usable in the solution polymerization method includes, for example, ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol. One or more such various organic solvents may be used either singly or as combined, or a mixed solvent thereof with water may also be used.

The polymerization temperature must be set in relation to the molecular weight of the polymer to be produced and to the type of the initiator used. It may be from 0° C. or lower to 100° C. or higher, but is preferably from 50 to 100° C.

The reaction pressure may be determined suitably, but generally falls between 1 and 100 kg/cm², preferably between 1 and 30 kg/cm². The reaction time may fall between 5 and 30 hours or so.

The reprecipitation solvent for the polymer obtained is preferably isopropanol, hexane, methanol or the like.

A method of determining the segregation of a silicone or fluoroalkyl group on the surface of the low-refractive index layer is described. Using Shimadzu's ESCA-3400 (degree of vacuum, 1×10⁻⁵ Pa; X-ray source, target Mg; voltage, 12 kV; current, 20 mA), the photoelectric spectra, Si2P, F1s and C1s of the outermost surface of the antireflection film to be analyzed are measured; and the spectral intensity ratio Si2P/C1s (=Si(a)) and F1s/C1s (=F(a)) are calculated. Using the ion-etching unit (ion gun, voltage 2 kV, current 20 mA) of the device, ESCA-3400, the low-refractive index layer of the sample is cut off to have a height of ⅕ (±5%) of the original height thereof, and the photoelectric spectra, Si2P, F1s and C1s of the 80% lower site of the layer are measured; and the spectral intensity ratio Si2P/C1s (=Si(b)) and F1s/C1s (=F(b)) are calculated. The intensity change before and after the etching treatment, Si(a)/Si(b), and F(a)/F(b) are obtained. Accordingly, from the change of the Si2P/C1s ratio and the F1s/C1s ration before and after the etching treatment (photoelectric spectral intensity ratio in the uppermost surface of the low-refractive index layer/photoelectric spectral intensity ratio in the 80% lower layer from the uppermost surface of the low-refractive index layer), the surface segregation degree can be determined. F1s and C1s are the intensity read at the peak position of the photoelectric spectra. For Si2p, the intensity at the Si atom-derived peak position (with binding energy of 105 eV or so) of silicone (polydimethylsiloxane) is employed for the intensity ratio calculation, and this is differentiated from the Si atom derived from inorganic silica particles. Under various etching conditions, pre-experiments of gradually etching the surface of the low-refractive index layer in various samples are carried out, and based on the etching condition that reaches the underlying hard-coat layer or high-refractive index layer, the condition to reach a depth of 80% is determined. When only the surface characteristics are controlled, the surface-segregating compound (i.e., the surface free energy lowering compound) described in the present specification may be suitably used, and only the necessary components may be selectively positioned in the surface of the layer, and, as a result, the surface characteristics may be controlled independently of the inside characteristics of the film.

The hydrolysate and/or its partial condensate of the organosilane compound for use in the invention, or that is, the sol component (the same shall apply herein under) is described in detail herein under.

The organosilane compound is represented by the following formula (A):

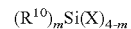

$(R^{10})_m Si(X)_{4-m}$

In formula (A), $R^{10}$ represents a substituted or unsubstituted alkyl group, or a substituted or unsubstituted aryl group. The alkyl group includes methyl, ethyl, propyl, isopropyl, hexyl, t-butyl, sec-butyl, hexyl, decyl, hexadecyl. The alkyl group preferably has from 1 to 30 carbon atoms, more preferably from 1 to 16 carbon atoms, even more preferably 1 to 6 carbon atoms. The aryl group includes phenyl, naphthyl, and is preferably a phenyl group.

X represents a hydroxyl group or a hydrolyzable group. The hydrolyzable group includes, for example, an alkoxy group (preferably having from 1 to 5 carbon atoms, e.g., methoxy, ethoxy), a halogen atom (e.g., Cl, Br, I), and $R^2COO$ (where $R^2$ is preferably a hydrogen atom or an alkyl group having from 1 to 5 carbon atoms; its examples are $CH_3COO$, $C_2H_5COO$). Preferably, it is an alkoxy group, more preferably a methoxy group or an ethoxy group. m indicates an integer of from 1 to 3. Multiple $R^{10}$'s or X's, if any, in the compound may be the same or different. m is preferably 1 or 2, more preferably 1.

Not specifically defined, the substituent that may be in $R^{10}$ includes, for example, a halogen atom (e.g., fluorine atom, chlorine atom, bromine atom), a hydroxyl group, a mercapto group, a carboxyl group, an epoxy group, an alkyl group (e.g., methyl, ethyl, i-propyl, propyl, t-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl), an acylamino group (e.g., acetylamino, benzoylamino, acrylamino, methacrylamino). These substituents may be further substituted. Of multiple $R^{10}$'s, if any, in the compound, at least one is preferably a substituted alkyl group or a substituted aryl group. In particular, vinyl-polymerizing substituent-having organosilane compounds of a formula (3) are preferred for use herein.

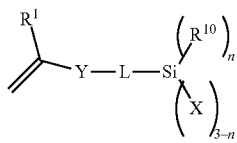
(B)

In formula (B), $R^1$ represents a hydrogen atom, or a methyl group, a methoxy group, an alkoxycarbonyl group, a cyano group, a fluorine atom, or a chlorine atom. The alkoxycarbonyl group includes methoxycarbonyl and ethoxycarbonyl. Preferably, $R^1$ is a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, even more preferably a hydrogen atom or a methyl group. Y represents a single bond or an ester group, an amido group, an ether group or an urea group. Preferably, Y is a single bond, an ester group or an amido group, more preferably a single bond or an ester group, even more preferably an ester group.

L represents a divalent linking chain. Concretely, it represents a substituted or unsubstituted alkylene group, a substituted or unsubstituted arylene group, a substituted or unsubstituted alkylene group having a linking group (e.g., ether, ester, amido) inside it, or a substituted or unsubstituted arylene group having a linking group inside it; preferably, it is substituted or unsubstituted alkylene group having from 2 to 10 carbon atoms, a substituted or unsubstituted arylene group having from 6 to 20 carbon atoms, or an alkylene group having from 3 to 10 carbon atoms and having a linking group inside it; more preferably an unsubstituted alkylene group, an unsubstituted arylene group, or an alkylene group having an ether or ester linking group inside it; even more preferably an unsubstituted alkylene group, or an alkylene group having an ether or ester linking group inside it. The substituent for these includes a halogen atom, a hydroxyl group, a mercapto group, a carboxyl group, an epoxy group, an alkyl group and an aryl group, and these substituents may be further substituted.

n indicates 0 or 1. Multiple X's, if any, in the compound may be the same or different. n is preferably 0. $R^{10}$ has the same meaning as in formula (A), and is preferably a substituted or unsubstituted alkyl group, or an unsubstituted aryl group, more preferably an unsubstituted alkyl group or an unsubstituted aryl group. X has the same meaning as in formula (A), and is preferably a halogen atom, a hydroxyl group, or an unsubstituted alkoxy group, more preferably a chlorine atom, a hydroxyl group or an alkoxy group having from 1 to 6 carbon atoms, even more preferably a hydroxyl group or an alkoxy group having from 1 to 3 carbon atoms, still more preferably a methoxy group.

Two or more different types of the compounds of formula (A) and formula (B) may be used herein, as combined. Specific examples of the compounds of formula (A) and formula (B) are shown below, to which, however, the invention is not limited.

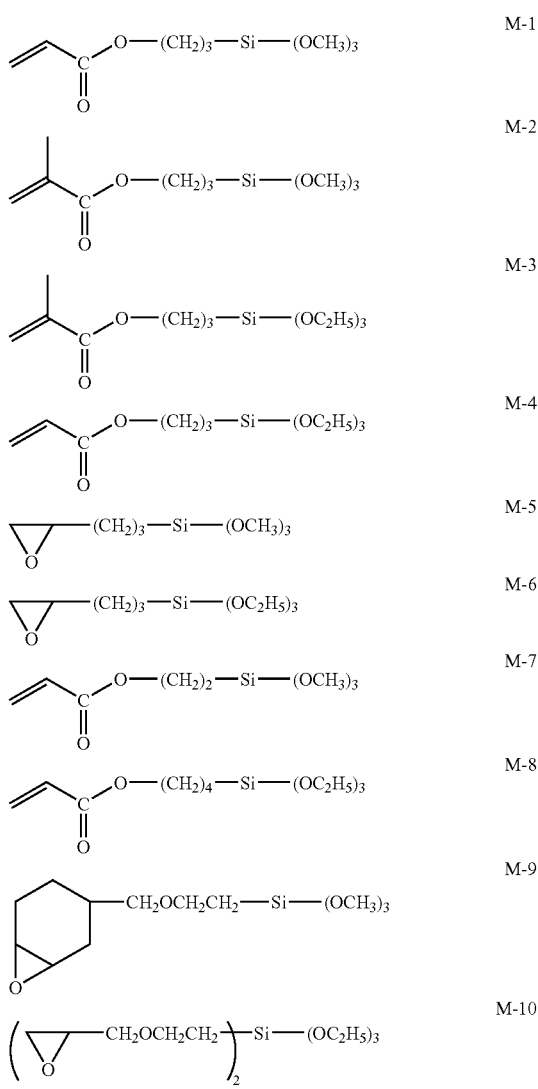

Of these examples, especially preferred are (M-1), (M-2) and (M-5).

(Acid Catalyst, Metal Chelate Compound)

It is desirable that the hydrolysates and/or condensates (sol component) of organosilanes are prepared in the presence of a catalyst. The catalyst includes inorganic acids such as hydrochloric acid, sulfuric acid, nitric acid; organic acids such as oxalic acid, acetic acid, formic acid, methanesulfonic acid, toluenesulfonic acid; inorganic bases such as sodium hydroxide, potassium hydroxide, ammonia; organic bases such as triethylamine, pyridine; and metal alkoxides such as aluminium triisopropoxide, zirconium tetrabutoxide. In view of the production stability and storage stability of the liquid of inorganic oxide fine particles, acid catalysts (inorganic acids, organic acids) and/or metal chelate compounds are used in the invention. The inorganic acid is preferably hydrochloric acid or sulfuric acid; and the organic acid preferably has an acid dissociation constant in water (pKa value at 25° C.) of at most 4.5. More preferred are hydrochloric acid, sulfuric acid, and organic acids having an acid dissociation constant in water of at most 3.0; even more preferred are hydrochloric acid, sulfuric acid, and organic acids having an acid dissociation constant in water of at most 2.5; still more preferred are organic acids having an acid dissociation constant in water of at most 2.5; further more preferred are methanesulfonic acid, oxalic acid, phthalic acid, and malonic acid; especially preferred is oxalic acid.

When the hydrolyzable group of the organosilane is an alkoxy group and the acid catalyst is an organic acid, then the carboxyl group or the sulfo group of the organic acid may supply proton, and therefore the amount of water to be added may be reduced. Concretely, the amount of water to be added to the reaction system may be from 0 to 2 mols, preferably from 0 to 1.5 mols, more preferably from 0 to 1 mol, even more preferably 0 to 0.5 mols, relative to 1 mol of the alkoxide group of the organosilane. When an alcohol is used as the solvent, then an embodiment of adding substantially no water to the system is also preferred.

The amount of the acid catalyst to be used is described. When the acid catalyst is an inorganic acid, then its amount may be from 0.01 to 10 mols, preferably from 0.1 to 5 mols relative to the hydrolyzable group; but when the acid catalyst is an organic acid, then its most preferred amount varies depending on the amount of water added to the system. Concretely, when water is added to the system, the amount of the organic acid to be added thereto may be from 0.01 to 10 mol %, preferably from 0.1 to 5 mol % relative to the hydrolyzable group. However, when substantially no water is added, then the amount of the organic acid to be added may be from 1 to 500 mol %, preferably from 10 to 200 mol %, even more preferably from 20 to 200 mol %, still more preferably from 50 to 150 mol %, further more preferably from 50 to 120 mol % relative to the hydrolyzable group.

The treatment may be attained by stirring the system at 15 to 100° C., and it suitably controlled depending on the reactivity of the organosilane.

Not specifically defined, any metal chelate compound having a center metal selected from Zr, Ti or Al may be preferably used herein. Within the category, two or more different types of metal chelate compounds may be used as combined. Specific examples of the metal chelate compound for use in the invention are zirconium chelate compounds such as tri-n-butoxyethylacetacetate zirconium, di-n-butoxybis(ethylacetacetate)zirconium, n-butoxytris(ethylacetacetate)zirconium, tetrakis(n-propylacetacetate)zirconium, tetrakis(acetylacetacetate)zirconium, tetrakis(ethylacetacetate)zirconium; titanium chelate compounds such as diisopropoxy-bis(ethylacetacetate)titanium, diisopropoxy-bis(acetylacetate)titanium, diisopropoxy-bis(acetylacetone)titanium; aluminium chelate compounds such as diisopropoxyethylacetacetate aluminium, diisopropoxyacetylacetnate aluminium, isopropoxybis(ethylacetacetate)aluminium, isopropoxybis(acetylacetonate)aluminium, tris(ethylacetacetate)aluminium, tris(acetylacetonate)aluminium, monoacetylacetonate-bis(ethylacetacetate) aluminium.

Of those metal chelate compounds, preferred are tri-n-butoxyethylacetacetate zirconium, diisopropoxybis(acetylacetonate)titanium, diisopropoxyethylacetacetate aluminium, and tris(ethylacetacetate)aluminium. One or more of these metal chelate compounds may be used either singly or as combined. Partial hydrolysates of these metal chelate compounds may also be used.

In the invention, the metal chelate compound is used preferably in a ratio thereof to the organosilane of from 0.01 to 50% by weight, more preferably from 0.1 to 50% by weight, even more preferably from 0.5 to 10% by weight from the viewpoint of the condensation speed and of the mechanical strength of the polymer film.

In the invention, when the hydrolysate and the partial condensate of the organosilane compound is produced through treatment in the presence of the above-mentioned metal chelate compound, then it is desirable that at least any of β-diketone compounds and β-diketo-ester compounds is in the above-mentioned curable composition. These serve as a stability improver for the curable composition for use in the invention. Specifically, it may be considered that the compound may coordinate with the metal atom in the above-mentioned metal chelate compound (zirconium, titanium or aluminium compound) to thereby retard the action of the metal chelate compound that may promote the condensation of the hydrolysate and partial condensate of the organosilane compound, and to thereby improve the storage stability of the curable composition. For the β-diketone compounds and the β-diketo-ester compounds, preferred are the ligands used in the specific examples of the metal chelate compounds mentioned hereinabove.

Specific examples of the β-diketone compounds and the β-diketo-ester compounds are acetylacetone, methyl acetacetate, ethyl acetacetate, n-propyl acetacetate, i-propyl acetacetate, n-butyl acetacetate, sec-butyl acetacetate, t-butyl acetacetate, 2,4-hexanedione, 2,4-heptanedione, 3,5-heptanedione, 2,4-octanedione, 2,4-nonanedione, 5-methylhexanedione. Of those, preferred are ethyl acetacetate and acetylacetone; and more preferred is acetylacetone. One or more such β-diketone compounds and β-diketo-ester compounds may be used herein either singly or as combined. In the invention, the amount of the β-diketone compound and the β-diketo-ester compound is preferably at least 2 mol %, more preferably from 3 to 20 mols relative to 1 mol of the metal chelate compound from the viewpoint of the storage stability of the composition.

The amount of the organosilane compound or its sol component (when the two are added, then their total amount) to be in the composition is preferably from 0.1 to 50% by weight, more preferably from 0.5 to 20% by weight, most preferably from 1 to 10% by weight of the total solid content of the low-refractive index layer.

When the organosilane compound is directly added to the low-refractive index layer while as it is, then the organosilane compound may partly vaporize while the solvent is removed by drying. In such a case, therefore, a relatively large amount of the compound must be added to the layer. On the other hand, when the compound is added thereto as a sol component thereof, then its amount may be relatively reduced. Accordingly, this is favorable since the characteristics such as the refractive index of the layer are easy to control.

The organosilane compound that is preferably used in the third embodiment of the invention is an organosilane compound of the following formula (A1):

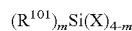

wherein $R^{101}$ represents an alkyl group; X represents a hydroxyl group or a hydrolyzable group; and m indicates an integer of from 1 to 3.

The above-mentioned organosilane compound or its sol component is preferably combined with the above-mentioned polyfunctional (meth)acrylate monomer for improving the scratch resistance of the polymer film, especially for improving both The antireflection capability and the scratch resistance of the polymer film.

The organosilane compound or its sol component is in a curable composition, and the curable composition is applied onto a substrate, dried and exposed to ionizing radiation or heat or to the two for polymerization or condensation and curing to form a low-refractive index layer, in which the organosilane compound or its sol component functions as a binder in the layer. When the organosilane compound or its sol component is combined with the above-mentioned polyfunctional (meth)acrylate monomer, then they may be co-crosslinked and the hardness of the polymer film formed is further improved.

In formula (A1), $R^{101}$ represents a substituted or unsubstituted alkyl group. The alkyl group includes methyl, ethyl, propyl, isopropyl, hexyl, decyl, hexadecyl. The alkyl group preferably has from 1 to 30 carbon atoms, more preferably from 1 to 16 carbon atoms, even more preferably from 1 to 6 carbon atoms.

X represents a hydroxyl group or a hydrolyzable group. The hydrolyzable group includes, for example, an alkoxy group (preferably having from 1 to 5 carbon atoms, e.g., methoxy, ethoxy), a halogen atom (e.g., Cl, Br, I), and $R^2COO$ (where $R^2$ is preferably a hydrogen atom or an alkyl group having from 1 to 5 carbon atoms; its examples are $CH_3COO$, $C_2H_5COO$). Preferably, it is an alkoxy group, more preferably a methoxy group or an ethoxy group.

m indicates an integer of from 1 to 3, and is preferably 1 or 2, more preferably 1.

Multiple $R^{101}$'s or X's, if any, in the compound may be the same or different.

Of the organosilane compounds of formula (A1), preferred are the vinyl-polymerizing substituent-having organosilane compounds of formula (B).

Specific examples of the compounds of formula (A1) are (M-1) to (M-10) mentioned hereinabove.

The organosilane compounds preferably used in the fourth embodiment of the invention are organic silyl compounds of the following formula (A2):

wherein X represents —OH, a halogen atom, —OR$^{102}$ or —OCOR$^{102}$; R and $R^{102}$ each represent a substituted or unsubstituted alkyl group having from 1 to 10 carbon atoms; m+n=4, and m and n each indicate an integer of 0 or more.

The compound of formula (A2) forms a matrix according to a sol-gel process of hydrolysis combined with mutual condensation. In the invention, the compound of formula (A2) includes compounds of the following four formulae:

 (a)

 (b)

 (c)

 (d)

The component (a) is described concretely. Concrete examples of the compound are tetramethoxysilane, tetraethoxysilane, tetra-isopropoxysilane, tetra-n-propoxysilane, tetra-n-butoxysilane, tetra-sec-butoxysilane, tetra-tert-butoxysilane. Especially preferred are tetramethoxysilane and tetraethoxysilane.

The component (b) is described. In the component (b), R is a substituted or unsubstituted alkyl group having from 1 to 10 carbon atoms, for example, it includes an alkyl group such as methyl, ethyl, n-propyl, i-propyl; and γ-chloropropyl, vinyl, $CF_3CH_2CH_2CH_2$—, $C_2F_5CH_2CH_2CH_2$—, $C_3F_7CH_2CH_2CH_2$—, $C_2F_5CH_2CH_2$—, $CF_3OCH_2CH_2CH_2$—, $C_2F_5OCH_2CH_2CH_2$—, $C_3F_7OCH_2CH_2CH_2$—, $(CF_3)_2CHOCH_2CH_2CH_2$—, $C_4F_9CH_2OCH_2CH_2CH_2$—, 3-(perflourocyclohexyloxy)propyl, $H(CF_2)_4CH_2OCH_2CH_2CH_2$—, $H(CF_2)_4CH_2CH_2CH_2$—, 3-glycidoxypropyl, 3-acryloxypropyl, 3-methacryloxypropyl, 3-mercaptopropyl, phenyl, 3,4-epoxycyclohexylethyl. X in the organosilane is —OH, a halogen atom, or is preferably an alkoxy group having from 1 to 5 carbon atoms, or an acyloxy group having from 1 to 4 carbon atoms. For example, it includes a chlorine atom, a methoxy group, an ethoxy group, an n-propyloxy group, an i-propyloxy group, an n-butyloxy group, a sec-butyloxy group, a tert-butyloxy group, and an acetyloxy group.

Specific examples of the component (b) are methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, 3-chloropropyltrimethoxysilane, 3-chloropropyltriethoxysilane, vinyltrimethoxysilane, vinyltriethoxysilane, 3-glycidoxypropyltrimethoxysilane, 3-glycidoxypropyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimethoxysilane, 3,4-epoxycyclohexylethyltriethoxysilane, $CF_3CH_2CH_2CH_2Si(OCH_3)_3$, $C_2F_5CH_2CH_2CH_2Si(OCH_3)_3$, $C_3F_7CH_2CH_2CH_2Si(OCH_3)_3$, $C_2F_5OCH_2CH_2CH_2Si(OCH_3)_3$, $C_3F_7OCH_2CH_2CH_2Si(OC_2H_5)_3$, $(CF_3)_2CHOCH_2CH_2CH_2Si(OCH_3)_3$, $C_4F_9CH_2OCH_2CH_2CH_2Si(OCH_3)_3$, $H(CF_2)_4CH_2OCH_2CH_2CH_2Si(OCH_3)_3$, 3-(perfluorocyclohexyloxy)propylsilane.

Of those, preferred are fluorine atom-having organosilanes. When R is an organosilane not having a fluorine atom, then methyltrimethoxysilane or methyltriethoxysilane is preferred. One or more different types of the above-mentioned organosilanes may be used herein either singly or as combined.

The component (c) is described. The component (c) is an organosilane represented by $R_2Si(X)_2$ (in which R has the same meaning as in the organosilane for the component (b) mentioned above). Two R's may not be the same substituent. In the composition of the invention, the component is hydrolyzed and condensed to give a hydrolysate or a partial condensate or their mixture, and these serve as a binder in the composition, and soften the coating film and improve the alkali resistance of the film.

Specific examples of the organosilanes are dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, diphenyldimethoxysilane, diphenyldiethoxysilane, $(CF_3CH_2CH_2)_2Si(OCH_3)_2$, $(CF_3CH_2CH_2CH_2)_2Si(OCH_3)_2$, $(C_3F_7OCH_2CH_2CH_2)_2Si(OCH_3)_2$, $[H(CF_2)_6CH_2OCH_2CH_2CH_2]_2Si(OCH_3)_2$, $(C_2F_5CH_2CH_2)_2Si(OCH_3)_2$. Preferred are fluorine atom-having organosilanes. When R is an organosilane not having a fluorine atom, then dimethyldimethoxysilane and dimethyldiethoxysilane are preferred. One or more different types of the organosilanes for the component (c) may be used herein either singly or as combined.

The component (d) is described. The component (d) is an organosilane represented by a formula $R_3Si(X)$ (in which R has the same meaning as in the organosilane for the component (b) mentioned hereinabove). Three R's may not be the same substituents. In the composition of the invention, the component acts to make the coating film hydrophobic and to improve the alkali resistance of the coating film.

Specific examples of the triorganosilane are trimethylmethoxysilane, trimethylethoxysilane, triethylmethoxysilane, triethylethoxysilane, tri-n-propylmethoxysilane, tri-n-propylethoxysilane, tri-i-propylmethoxysilane, tri-i-propylethoxysilane, triphenylmethoxysilane, triphenylethoxysilane.

In the invention, the ratio of the components (a) to (d) is as follows: To the standard of the component (a), the ratio of the component (b) is from 0 to 150% by weight, preferably from 5 to 100% by weight, more preferably from 10 to 60% by weight. The ratio of the component (b) to the standard of the component (a) is from 0 to 100% by weight, preferably from 1 to 60% by weight, more preferably from 1 to 40% by weight. The ratio of the component to the standard of the component (a) is from 0 to 10% by weight, preferably from 0.1 to 5% by weight, more preferably from 0.5 to 3% by weight. Of the components (a) to (d), when the proportion of the component (a) lower than 30% by weight, then the adhesiveness and the curability of the coating film may lower.

<Solvent>

The solvent for use in the coating composition to form the low-refractive index layer in the invention may be any one satisfying the requirements that it can dissolve or disperse the constitutive components, it can readily form a uniform face profile in the coating step and in the drying step, it ensures liquid storability, and it has a suitable saturated vapor pressure. From these viewpoints, various solvents may be selected for the composition.

In particular, when a low-refractive index layer is directly formed on the antiglare hard-coat layer, as in FIG. 3, it is desirable to use a coating liquid that contains a low-boiling-point solvent having a boiling point of not higher than 100° C. The coating liquid may contain a high-boiling-point solvent, but the amount of the low-boiling-point solvent therein is much larger than that of the high-boiling-point solvent. Specifically, the coating liquid containing only a low-boiling-point solvent or containing a larger amount of a low-boiling-point solvent along with a much smaller amount of a high-boiling-point solvent may give a coating film of better antireflectivity as compared with any others. This may be because, while the coating liquid is applied onto the rough surface of the antiglare hard-coat layer in a mode of wet coating and then the resulting coating layer is dried to remove the solvent and to lose its flowability, the coating liquid may flow from the protrusions to the recesses of the rough surface to thereby prevent uneven coating in some degree. The solvent having a boiling point of not higher than 100° C. includes, for example, hydrocarbons such as hexane (boiling point 68.7° C.), heptane (98.4° C.), cyclohexane (80.7° C.), benzene (80.1° C.); halogenohydrocarbons such as dichloromethane (39.8° C.), chloroform (61.2° C.), carbon tetrachloride (76.8° C.), 1,2-dichloroethane (83.4° C.), trichloroethylene (87.2° C.); ethers such as diethyl ether (34.6° C.), diisopropyl ether (68.5° C.), dipropyl ether (90.5° C.), tetrahydrofuran (66° C.); esters such as ethyl formate (54.2° C.), methyl acetate (57.8° C.), ethyl acetate (77.1° C.), isopropyl acetate (89° C.); ketones such as acetone (56.1° C.), 2-butanone (=methyl ethyl ketone, 79.6° C.); alcohols such as methanol (64.5° C.), ethanol (78.3° C.), 2-propanol (82.4° C.), 1-propanol (97.8° C.); cyano compounds such as acetonitrile (81.6° C.), propionitrile (97.4° C.); and carbon disulfide (46.2° C.). Of those, preferred are ketones and esters; and more preferred are ketones. Of the ketones, especially preferred is 2-butanone.

the solvent having a boiling point of 100° C. or higher includes, for example, octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (=MIBK, 115.9° C.), 1-butanol (117.7° C.), dimethyl sulfoxide (189° C.). Preferred are cyclohexanone and 2-methyl-4-pentanone.

<Other Substances to be in Low-Refractive Index Layer>

The low-refractive index layer in the invention may contain a small amount of a curing agent selected from, for example, polyfunctional epoxy compounds, polyfunctional isocyanate compounds, aminoplasts, polybasic acids and their anhydrides, in addition to the above-mentioned materials therein, from the viewpoint of the interlayer adhesiveness between the low-refractive index layer and the underlying layer that is in direct contact with the low-refractive index layer. When the curing agent is added, its amount is preferably at most 30% by weight, more preferably at most 20% by weight, even more preferably at most 10% by weight of the total solid content of the low-refractive index layer film.

For making the layer have dust-resistant and antistatic properties, a dust-resistant or antistatic agent such as known cationic surfactants or polyoxyalkylene compounds may also be added to the layer. The dust-resistant and the antistatic properties may be a part of the function of the structural units of the above-mentioned silicone compound and the fluorine-containing compound. When the dust-resistant agent and the antistatic agent are added to the layer, its amount is preferably from 0.01 to 20% by weight, more preferably from 0.05 to 10% by weight, even more preferably from 0.1 to 5% by weight of the total solid content of the low-refractive index layer. Examples of preferred compounds for the agent are Dai-Nippon Ink's Megafac F-150 (trade name) and Toray-Dow Corning's SH-3748 (trade name), but these are not limitative.

The low-refractive index layer may contain micro-voids. For this, concretely referred to are the descriptions given in JP-A-9-222502, 9-288201, 11-6902.

Organic fine particles may also be used in the invention. For these, for example, referred to are the compounds described in JP-A 11-3820, paragraphs [0020] to [0038]. Their morphology may be the same as that of the above-mentioned inorganic fine particles.

Preferably, the thickness of the low-refractive index layer is from 20 to 300 nm, more preferably from 40 to 200 nm.

Preferably, the surface energy of the low-refractive index layer of the antireflection film of the fourth embodiment of the invention is at most 26 mN/m, more preferably from 15 to 25.8 mN/m. The surface energy of the layer falling within the range is preferred in view of the stain resistance of the film, and the low-refractive index layer of the antireflection film of the fourth aspect of the invention expresses the property as it is a fluorine-containing cured resin film of a fluorine compound-containing thermosetting or ionizing radiation-curable crosslinking fluorine-containing compound. In particular, when the content of the fluorine-containing compound in the outermost low-refractive index layer is at most 50% by weight of the total weight of the outermost layer, then the entire film surface is even and stable.

The surface energy of solid may be obtained according to a contact angle method, a wet heat method and an adsorption method, as in *Basis and Application of Wetting* (published by Realize, Dec. 10, 1989). A contact angle method is preferably employed for the film of the invention. Concretely, two different solutions each having a known surface energy are applied onto the protective film of a polarizing plate to give their drops thereon. At the intersection made by the surface of the liquid drop and the film surface, the angle between the tangential line to the liquid drop and the film surface and including the liquid drop is defined as a contact angle of the liquid drop to the film surface. From the thus-defined contact angle, the surface energy of the film can be calculated.

Preferably, the contact angle of the outermost surface to water is at least 90°, more preferably at least 95°, even more preferably at least 100°.

Also preferably, the kinematic friction factor of the surface of the low-refractive index layer is at most 0.25, more preferably from 0.03 to 0.20, even more preferably from 0.03 to 0.15. The kinematic friction factor as referred to herein is the kinematic friction factor between the surface of low-refractive index layer and a stainless steel ball having a diameter of 5 mm, when the stainless steel ball is moved on the surface of the layer under a load of 0.98 N applied thereto, at a speed of 60 cm/min.

Preferably, the hardness of the low-refractive index layer is at least a grade H, more preferably at least a grade 2H, most preferably at least a grade 3H, according to a pencil hardness test in JIS K5400.

Also preferably, the degree of abrasion of the layer is as small as possible, according to a T-bar test in JIS K6902.

(Curing Method)

The low-refractive index layer of the antireflection film of the third aspect of the invention may be formed by applying a coating composition onto an underlying layer, then drying it to remove the solvent, and curing it through exposure thereof to ionizing radiation and/or heat in an atmosphere having a predetermined temperature or at a predetermined temperature of the film surface, preferably in an atmosphere having an oxygen concentration of at most 15% by volume. In the invention, the ionizing radiation may be any ordinary one that causes excitation or ionization when it passes through a substance. This includes corpuscular rays and electromagnetic waves that are generally referred to as radiations. Concretely, it includes $\alpha$ rays, $\beta$ rays, $\gamma$ rays, high-energy particles, neutrons, electronic rays, light rays (UV rays and visible rays). The ionizing radiations especially preferred for use in the invention are UV rays and visible rays.

During curing, the oxygen concentration may be at most 15% by volume, preferably at most 1% by volume, more preferably at most 0.3% by volume. If the oxygen concentration during curing is over 15% by volume, then the radical deactivation owing to oxygen may be remarkable since the film thickness of the low-refractive index layer after the solvent removal from it is 0.1 µm or so, or that is, the film is extremely thin (in other words, the surface area of the film per unit volume is large) and since the hollow-structured inorganic fine particles that are indispensably in the low-refractive index layer may contain air, and, as a result, the properties such as the scratch resistance, concretely the resistance to steel wool abrasion and to eraser abrasion that will be mentioned herein under, of the cured film may be fatally worsened. For the important purpose of preventing the scratch resistance of the layer from being lowered because of these reasons, the coating layer is cured in an atmosphere having an oxygen concentration of at most 15% by volume, in the invention.

The layers that are optionally in the antireflection film of each aspect of the invention, in addition to the low-refractive index layer therein, are described below.

First Aspect and Second Embodiment of the Invention (High (Middle)-Refractive Index Layer)

When a high-refractive index layer is in the antireflection film of the invention, then its refractive index is preferably from 1.65 to 2.40, more preferably from 1.70 to 2.20. When a middle-refractive index layer is in the film, then its refractive index is so controlled that it could be between the refractive index of the low-refractive index layer and that of the high-refractive index layer. Preferably, the refractive index of the middle-refractive index layer is from 1.55 to 1.80. Also preferably, the haze of the high-refractive index layer and the middle-refractive index layer is at most 3%.

For the high-refractive index layer and the middle-refractive index layer in the invention, preferably used is a cured product of a composition that is prepared by dispersing inorganic fine particles having a high refractive index in a monomer, an initiator and an organic substituted silicon compound such as those described hereinabove for the hard-coat layer. The inorganic fine particles are preferably oxides of metal (e.g., aluminium, titanium, zirconium, antimony). In view of their refractive index, most preferred are fine particles of titanium dioxide. When a monomer and an initiator are sued, then the coating layer is cured through exposure to active energy rays or heat for polymerization, whereby it gives a middle-refractive index layer or a high-refractive index layer having good scratch resistance and good adhesiveness. Preferably, the mean particle size of the inorganic fine particles is from 10 to 100 nm.

The fine particles of titanium dioxide are especially preferably inorganic fine particles comprising titanium dioxide as the principal ingredient thereof and containing at least one element selected from cobalt, aluminium and zirconium. The principal ingredient as referred to herein means that its content (% by weight) is the largest of all the constitutive ingredients of the particles. In the invention, the inorganic fine particles that comprise titanium dioxide as the principal ingredient thereof preferably have a refractive index of from 1:90 to 2.80, more preferably from 2.10 to 2.80, even more preferably from 2.20 to 2.80. Also preferably, the weight-average particle size of the primary particles of the inorganic fine particles that comprise titanium dioxide as the principal ingredient thereof is from 1 to 200 nm, more preferably from 1 to 150 nm, even more preferably from 1 to 100 nm, still more preferably from 1 to 80 nm.

The particle size of the inorganic fine particles may be determined according to a light scattering method or through electromicroscopy. Preferably, the specific surface area of the inorganic fine particles is from 10 to 400 $m^2/g$, more preferably from 20 to 200 $m^2/g$, most preferably from 30 to 150 $m^2/g$. Also preferably, the crystal structure of the inorganic fine particles that comprise titanium dioxide as the principal ingredient thereof comprises a rutile structure, a mixed rutile/anatase structure, an anatase structure or an amorphous structure as the principal ingredient thereof. More preferably, it comprises a rutile structure as the principal ingredient thereof. The principal ingredient as referred to herein means that its content (% by weight) is the largest of all the constitutive ingredients of the particles.

Containing at least one element selected from Co (cobalt), Al (aluminium) and Zr (zirconium), the inorganic fine particles that comprise titanium dioxide as the principal ingredient thereof may retard the photocatalytic activity of titanium dioxide therein and are therefore effective for improving the weather resistance of the high-refractive index layer and the middle-refractive index layer in the invention. Especially preferably, the additional element is Co (cobalt). Also preferably, two or more different types of additional elements may be in the inorganic fine particles.

<Dispersant>

A dispersant may be used for dispersing the inorganic fine particles that comprise titanium dioxide as the principal ingredient thereof, in the high-refractive index layer and the middle-refractive index layer in the invention. Preferably, an anionic group-having dispersant is used for dispersing the inorganic fine particles that comprise titanium dioxide as the principal ingredient thereof. For the anionic group, effectively used are an acidic proton-having group such as a carboxyl group, a sulfonic acid group (and a sulfo group), a phosphoric acid group (and a phosphono group), a sulfonamido group, and their salts. More preferred are a carboxyl group, a sulfonic acid group, a phosphoric acid group and their salts; and even more preferred are a carboxyl group and a phosphoric acid group. The number of the anionic groups to be in one molecule of the dispersant may be at least one. For further improving the dispersibility of the inorganic fine particles, multiple anionic groups may be in the dispersant. Preferably, at least two anionic groups may be in the dispersant on average, more preferably at least 5 anionic groups, even more preferably at least 10 anionic groups therein. One molecule of the dispersant may contain different types of anionic groups.

Also preferably, the dispersant contains a crosslinking or polymerizing functional group. The crosslinking or polymerizing functional group includes an ethylenic unsaturated group that may undergo radical addition reaction or polymerization (e.g., (meth)acryloyl, allyl, styryl, vinyloxy), a cationic polymerizing group (e.g., epoxy, oxetanyl, vinyloxy), a polycondensation-reactive group (e.g., hydrolyzing silyl, N-methylol). Preferred is an ethylenic unsaturated group-having functional group. The dispersant to be used for dispersing the inorganic fine particles that comprise titanium dioxide as the principal ingredient thereof in the high-refractive index layer in the invention preferably has an anionic group and a crosslinking or polymerizing functional group, in which the crosslinking or polymerizing functional group is preferably in the side branches of the dispersant. Not specifically defined, the weight-average molecular weight (Mw) of the dispersant that has an anionic group and a crosslinking or polymerizing functional group, in which the crosslinking or polymerizing functional group is in the side branches of the dispersant, is preferably at least 1,000. More preferably, the weight-average molecular weight (Mw) of the dispersant is from 2,000 to 1,000,000, even more preferably from 5,000 to 200,000, still more preferably from 10,000 to 100,000.

The amount of the dispersant to be used is preferably from 1 to 50% by weight of the inorganic fine particles, more preferably from 5 to 30% by weight, most preferably from 5 to 20% by weight. Two or more different types of the dispersants may be used herein, as combined.

<Method of Forming High (Middle)-Refractive Index Layer>

The inorganic fine particles that comprise titanium dioxide as the principal ingredient thereof is used as the dispersion thereof in forming the high-refractive index layer and the middle-refractive index layer in the invention. The inorganic fine particles are dispersed in a dispersion medium in the presence of the above-mentioned dispersant. The dispersion medium is preferably a liquid having a boiling point of from 60 to 170° C. Examples of the dispersion medium are water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenohydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), ether alcohols (e.g., 1-methoxy-2-propanol). Preferred for the dispersion medium are toluene, xylene, methyl ethyl ketone, methyl isobutyl ketone, cyclohexanone and butanol; and more preferred are methyl ethyl ketone, methyl isobutyl ketone and cyclohexanone.

The inorganic fine particles are dispersed with a disperser. Examples of the disperser are sand grinder mill (e.g., bead mill with pin), high-speed impeller mill, pebble mill, roller mill, attritor and colloid mill. Especially preferred are sand grinder mill and high-speed impeller mill. The particles may be subjected to pre-dispersion treatment. Examples of the disperser to be used for pre-dispersion treatment are ball mill, three-roll mill, kneader and extruder. Preferably, the inorganic fine particles are dispersed as fine as possible in the dispersion medium, and the weight-average particle size of the particles dispersed therein is from 1 to 200 nm, preferably from 5 to 150 nm, more preferably from 10 to 100 nm, even more preferably from 10 to 80 nm. Finely dispersed to at most 200 nm in size, the inorganic fine particles may be in the high-refractive index layer and the middle-refractive index layer not detracting from the transparency of the layers.

Preferably, the high-refractive index layer and the middle-refractive index layer in the invention are formed as follows: To the dispersion prepared by dispersing the inorganic fine particles in the dispersion medium as in the above, preferably added are a binder precursor necessary for matrix formation (e.g., active energy ray-curable polyfunctional monomer or polyfunctional oligomer that will be mentioned herein under), and a photopolymerization initiator to prepare a coating composition for high-refractive index layer and middle-refractive index layer, and the coating composition is applied onto a transparent support and this is then cured thereon through crosslinking reaction or polymerization of the active energy ray-curable compound (e.g., polyfunctional monomer or polyfunctional oligomer) to form the intended high-refractive index layer or middle-refractive index layer.

Preferably, simultaneously with or after the coating operation to form the high-refractive index layer and the middle-refractive index layer, the binder for the layer is crosslinked or polymerized with the dispersant. The binder in the high-refractive index layer and the middle-refractive index layer thus formed takes the anionic group of the dispersant therein, for example, through the crosslinking or polymerization reaction of the above-mentioned preferred dispersant and the active energy ray-curable polyfunctional monomer or polyfunctional oligomer. In addition, the anionic group in the binder in the high-refractive index layer and the low-refractive index layer has the function of keeping the dispersion condition of the inorganic fine particles, and the crosslinked or polymerized structure thereof makes the binder have a film-forming ability, and after all, the binder improves the physical strength, the chemical resistance and the weather resistance of the inorganic fine particles-containing high-refractive index layer and middle-refractive index layer.

The functional group of the active energy ray-curable polyfunctional monomer or polyfunctional oligomer is preferably one that is polymerizable through exposure to light, electron rays or radiations. Above all, it is more preferably a photopolymerizing functional group. The photopolymerizing functional group is, for example, an unsaturated polymerizing functional group such as a (meth)acryloyl group, a vinyl group, a styryl group and an allyl group. Above all, preferred is a (meth)acryloyl group. In this description, the expressions of "(meth)acrylate" and "(meth)acryloyl" mean "acrylate or methacrylate", and "acryloyl or methacryloyl", respectively.

Specific examples of the photopolymerizing functional group-having photopolymerizing polyfunctional monomer are alkylene glycol (meth)acrylic diesters such as neopentyl glycol acrylate, 1,6-hexanediol di(meth)acrylate, propylene glycol di(meth)acrylate; polyoxyalkylene glycol (meth) acrylic diesters such as triethylene glycol di(meth)acrylate, dipropylene glycol di(meth)acrylate, polyethylene glycol di(meth)acrylate, polypropylene glycol di(meth)acrylate; polyalcohol (meth)acrylic diesters such as pentaerythritol di(meth)acrylate; ethylene oxide or propylene oxide adduct (meth)acrylic diesters such as 2,2-bis{4-(acryloxy-diethoxy) phenyl}propane, 2,2-bis{4-acryloxy-polypropoxy) phenyl}propane.

Further, epoxy (meth)acrylates, urethane (meth)acrylates and polyester (meth)acrylates are also preferred for the photopolymerizing polyfunctional monomer.

Above all, preferred are esters of polyalcohols and (meth) acrylic acid. More preferred are polyfunctional monomers having at least 3 (meth)acryloyl groups in one molecule. Concretely, they are trimethylolpropane tri(meth)acrylate, trimethylolethane tri(meth)acrylate, 1,2,4-cyclohexane tetra (meth)acrylate, glycerol triacrylate, pentaerythritol tetra (meth)acrylate, pentaerythritol tri(meth)acrylate, dipentaerythritol triacrylate, dipentaeiythritol pentaacrylate, dipentaerythritol tetra(meth)acrylate, dipentaerythritol hexa (meth)acrylate, tripentaerythritol triacrylate, and tripentaerythritol hexaacrylate.

Two or more different types of polyfunctional monomers may be used herein as combined. Preferably, a photopolymerization initiator is used for the polymerization of the photopolymerizing polyfunctional monomer. The photopolymerization initiator is preferably a photo-radical polymerization initiator and a photo-cationic polymerization initiator. More preferred is a photo-radical polymerization initiator. The photo-radical polymerization initiator includes, for example, acetophenones, benzophenones, Michler's benzoylbenzoate, α-amyloxime esters, tetramethylthiuram monosulfide and thioxanthones.

Some photo-radical polymerization initiators are commercially available, and, for example, they are Nippon Kayaku's Kayacure (DETX-S, BS-100, BDMK, CTX, BMS, 2-EAQ, ABQ, CPTX, EPD, ITX, QTX, BTC, MCA), Ciba-Speciality Chemicals' Irgacure (651, 184, 500, 907, 369, 1173, 2959, 4265, 5263), Sartomer's Esacure (KIP100F, KB1, EB3, BP, X33, KTP46, KT47, KIP150, TZT).

In particular, a photo-cleavable photo-radical polymerization initiator is preferred for use herein. The photo-cleavable photo-radical polymerization initiator is described, for example, in the *Latest UV Curing Technology* (p. 159, issued by Kazuhiro Takahashi, published by the Technology Information Association, 1991). Some photo-curable photo-radical polymerization initiators are commercially available, and for example, they are Ciba-Speciality Chemicals' Irgacure (651, 184, 907).

Preferably, the photopolymerization initiator is used in an amount of from 0.1 to 15 parts by weight relative to 100 parts by weight of the polyfunctional monomer, more preferably from 1 to 10 parts by weight. A photosensitizer may be used in addition to the photopolymerization initiator. Specific examples of the photosensitizer are n-butylamine, triethylamine, tri-n-butyl phosphine, Michier's ketone and thioxanthone. Some photosensitizers are commercially available, and, for example, they are Nippon Kayaku's Kayacure (DMBI, EPA). Preferably, the photopolymerization reaction is attained through exposure to UV rays after the formation and drying of the high-refractive index layer. The high-refractive index layer in the invention may contain a compound of formula (A) mentioned above and/or its derivative compound.

For forming a low-refractive index layer on the high-refractive index layer to construct the antireflection film of the invention, it is desirable that the refractive index of the high-refractive index layer is from 1.55 to 2.40, more preferably from 1.60 to 2.20, even more preferably from 1.65 to 2.10, most preferably from 1.80 to 2.00.

The high-refractive index layer may contain resin, surfactant, antistatic agent, coupling agent, viscosity improver, coloration inhibitor, colorant (pigment, dye), defoaming agent, leveling agent, flame retardant, UV absorbent, IR absorbent, tackifier, polymerization inhibitor, antioxidant, surface modifier, conductive metal fine particles, in addition to the above-mentioned components (inorganic fine particles, polymerization initiator, photosensitizer).

In forming the high-refractive index layer, it is desirable that the crosslinking reaction or the polymerization reaction of the active energy ray-curable compound is attained in an atmosphere having an oxygen concentration of at most 10% by volume. Formed in the atmosphere having an oxygen concentration of at most 10% by volume, the advantages of the high-refractive index layer are that its physical strength, chemical resistance and weather resistance are improved and, in addition, its adhesiveness to adjacent layers is improved. More preferably, the crosslinking reaction or the polymerization reaction of the active energy ray-curable compound to form the layer is effected in an atmosphere having an oxygen concentration of at most 6% by volume, more preferably at most 4% by volume, even more preferably at most 2% by volume, most preferably at most 1% by volume.

When the antireflection film is applied to liquid crystal display devices, an undercoat layer with particles having a mean particle size of from 0.1 to 10 µm added thereto may be additionally formed or the particles may be added to the hard-coat layer to give a light-scattering hard-coat layer, for the purpose of further improving the viewing angle characteristics of the film. The mean particle size of the particles is preferably from 0.2 to 5.0 µm, more preferably from 0.3 to 4.0 µm, even more preferably from 0.5 to 3.5 µm.

The refractive index of the particles is preferably from 1.35 to 1.80, more preferably from 1.40 to 1.75, even more preferably from 1.45 to 1.75. The particle size distribution of the particles is preferably as narrow as possible. The particle size distribution of the particles may be indicated by an S value represented by the following formula, and it is preferably at most 1.5, more preferably at most 1.0, even more preferably at most 0.7.

$$S=[D(0.9)-D(0.1)]/D(0.5)$$

wherein
D(0.1) means a 10%—corresponding particle size of the integral value of the volume-equivalent particle size;
D(0.5) means a 50%—corresponding particle size of the integral value of the volume-equivalent particle size;
D(0.9) means a 90%—corresponding particle size of the integral value of the volume-equivalent particle size.

Preferably, the difference between the refractive index of the particles and the refractive index of the undercoat layer is at least 0.02, more preferably from 0.03 to 0.5, even more preferably from 0.05 to 0.4, still more preferably from 0.07 to 0.3. The particles to be added to the undercoat layer may be the inorganic particles or the organic particles described hereinabove for the antiglare layer. Preferably, the undercoat layer is formed between the hard-coat layer and the transparent support. As the case may be, the undercoat layer may serve also as a hard-coat layer. When the particles having a mean particle size of from 0.1 to 10 µm are added to the undercoat layer, then the haze of the undercoat layer is preferably from 3 to 60%, more preferably from 5 to 50%, even more preferably from 7 to 45%, still more preferably from 10 to 40%.

In the antireflection film of the invention, an inorganic filler is preferably added to the constitutive layers for the purpose of increasing the film strength. The inorganic filler to be added to the constitutive layers may be the same or different in the layers, and it is desirable that the type and the amount of the filler to be added to the layers are varied in accordance with the necessary properties including the refractive index, the film strength, the thickness and the coatability of the constitutive layers. Not specifically defined, the shape of the inorganic filler for use in the invention may be any one, for example, including spherical, tabular, fibrous, rod, amorphous or hollow structures. Any of these structures are preferred in the invention, but spherical fillers are more preferred as their dispersibility is good. The type of the inorganic filler is not also specifically defined. However, amorphous fillers are preferred. For example, metal oxides, nitrides, sulfides or halides are preferred; and metal oxides are more preferred.

The metal atom of the metal oxides includes Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni. For obtaining transparent cured films, the mean particle size of the inorganic filler is preferably from 0.001 to 0.2 µm, more preferably from 0.001 to 0.1 µm, even more preferably from 0.001 to 0.06 µm. The mean particle size of the particles is determined by the use of a Coulter counter. In the invention, the method of using the inorganic filler is not specifically defined. For example, the inorganic filler may be used in dry, or may be used after dispersed in water or in an organic solvent. In the invention, a dispersion stabilizer is preferably used for preventing the aggregation and deposition of the inorganic filler. For the dispersion stabilizer, herein usable are polyvinyl alcohol, polyvinyl pyrrolidone, cellulose derivatives, polyamides, phosphates, polyethers, surfactants, silane coupling agents, titanium coupling agents. In particular, silane coupling agents are preferred as effective for enhancing the strength of the cured films. The amount of the silane coupling agent serving as a dispersion stabilizer is not specifically defined. For example, the amount may be at least 1 part by weight relative to 100 parts by weight of the inorganic filler. The method of adding the dispersion stabilizer is not also specifically defined. For example, the stabilizer may be previously hydrolyzed before it is added to the system, or the silane coupling agent serving as a dispersion stabilizer may be mixed with an inorganic filler and then it may be hydrolyzed and condensed. Of the two, the latter is preferred. The inorganic filler to be added to the constitutive layers will be described herein under.

(Hard-Coat Layer)

The hard-coat layer of the antireflection film of the invention is described below.

The hard-coat layer comprises a binder which is to impart a hard coat property to the layer, optionally mat particles which are to impart an antiglare property thereto, and an inorganic filler which is for making the layer have a high refractive index, for preventing the layer from being shrunk after crosslinking, and for increasing the mechanical strength of the layer. The binder is preferably a polymer having a saturated hydrocarbon chain or a polyether chain as the backbone structure thereof, more preferably a polymer having a saturated hydrocarbon chain as the backbone structure thereof. Also preferably, the binder polymer has a crosslinked structure. The binder polymer having a saturated hydrocarbon chain as the backbone structure thereof is preferably a polymer of an ethylenic unsaturated monomer. The binder polymer having a saturated hydrocarbon chain as the backbone structure thereof and having a crosslinked structure is preferably a (co)polymer of a monomer having at least two ethylenic unsaturated groups. For forming a high-refractive index layer, it is desirable that the monomer structure for the polymer contains an aromatic ring, and at least one atom selected from halogen atoms except fluorine, and sulfur atom, phosphorus atom and nitrogen atom.

The monomer having at least two ethylenic unsaturated groups includes esters of polyalcohols and (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,3,5-cyclohexanetriol triacrylate, polyurethane polyacrylate, polyester polyacrylate), vinylbenzene and its derivatives (e.g., 1,4-divinylbenzene, 2-acryloylethyl 4-vinylbenzoate, 1,4-divinylcyclohexanone), vinyl sulfones (e.g., divinyl sulfone), acrylamides (e.g., methylenebisacrylamide), and methacrylamides.

Specific examples of the high-refractive index monomer are bis(4-methacryloylthiophenyl) sulfide, vinylnaphthalene, vinylphenyl sulfide, 4-methacryloxyphenyl-4'-methoxyphenyl thioether.

The polymerization of the ethylenic unsaturated group-having monomer may be effected through exposure to active energy rays or heat in the presence of a photoradical polymerization initiator or a thermal radical polymerization initiator.

Accordingly, a coating liquid that contains an ethylenic unsaturated group-having monomer, a photoradical initiator or a thermal radical initiator, mat particles and an inorganic filler is prepared, and this is applied onto a transparent support and then polymerized and cured through exposure to active energy rays or heat to form an antireflection film.

The polymer having a polyether structure as the backbone structure thereof is preferably a ring-opened polymer of a polyfunctional epoxy compound. The ring-opening polymerization of the polyfunctional epoxy compound may be effected through exposure to active energy rays or heat in the presence of an optical acid generator or a thermal acid generator. Accordingly, a coating liquid that contains a polyfunctional epoxy compound, an optical acid generator or a thermal acid generator, mat particles and an inorganic filler is prepared, and this is applied onto a transparent support and then polymerized and cured through exposure to active energy rays or heat to form an antireflection film.

In place of or in addition to the monomer that has at least two ethylenic unsaturated groups, a crosslinking functional group-having monomer may be used so as to introduce a crosslinking functional group into the polymer, and the crosslinking functional group is reacted to thereby introduce a crosslinked structure into the binder polymer. Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Vinylsulfonic acids, acid anhydrides, cyanoacrylate derivatives, melamines, etherified methylols, esters and urethanes, and metal alkoxides such as tetramethoxysilane may also be used as monomers for introducing a crosslinked structure into the polymer. A functional group that may be crosslinkable as a result of decomposition reaction, such as a blocked isocyanate group may also be used. Accordingly, in the invention, the crosslinking functional group may not be one that is directly reactive, but may be one that becomes reactive as a result of decomposition.

The binder polymer having such a crosslinking functional group may be, after applied onto a support, heated to form the intended crosslinked structure.

The hard-coat layer may optionally contain mat particles, for example, inorganic compound particles or resin particles having a mean particle size of from 1 to 10 μM, preferably from 1.5 to 7.0 μm. Specific examples of the mat particles are inorganic compound particles such as silica particles, $TiO_2$ particles; and resin particles such as crosslinked acrylic particles, crosslinked styrene particles, melamine resin particles, benzoguanamine resin particles. Of those, more preferred are crosslinked styrene particles. Regarding their shape, the mat particles may be either true-spherical or amorphous. Two or more different types of mat particles may be used herein as combined. The amount of the mat particles that may be in the antiglare hard-coat layer formed herein is preferably from 10 to 1,000 mg/m², more preferably from 30 to 100 mg/m². In an especially preferred embodiment of the hard-coat layer, crosslinked styrene particles are used as the mat particles and large crosslinked styrene particles having a particle size of larger than ½ of the thickness of the hard-coat layer account for from 40 to 100% of all the crosslinked styrene particles in the layer. In this, the particle size distribution of the mat particles is determined according to a Coulter counter method, and the thus-determined distribution is converted into a particle number distribution.

In addition to the above-mentioned mat particles, the hard-coat layer preferably contains an inorganic filler for further increasing the refractive index of the layer. The inorganic filler comprises an oxide of at least one metal selected from titanium, zirconium, aluminium, indium, zinc, tin and antimony, and has a mean particle size of from 0.001 to 0.2 μm, preferably from 0.001 to 0.1 μm, more preferably from 0.001 to 0.06 μm. Specific examples of the inorganic filler that may be used in the hard-coat layer are $TiO_2$, $ZrO_2$, $Al_2O_3$, $In_2O_3$, $ZnO$, $SnO_2$, $Sb_2O_3$, ITO. $TiO_2$ and $ZrO_2$ are especially preferred in view of their ability to increase the refractive index of the layer: Preferably, the inorganic filler is subjected to surface treatment with a silane coupling agent or a titanium coupling agent. For the treatment, preferably used is a surface-treating agent that may give a functional group capable of reacting with a binder, to the filler surface. The amount of the inorganic filler to be added to the layer is preferably from 10 to 90%, more preferably from 20 to 80%, even more preferably from 30 to 75% of the total weight of the hard-coat layer. Since the filler's particle size is sufficiently smaller than the wavelength of light, the filler does not cause light scattering therearound, and the dispersion formed by dispersing the filler in the binder polymer behaves as an optically uniform substance as a whole.

The total refractive index of the mixture of the binder and the inorganic filler in the hard-coat layer in the invention is preferably from 1.57 to 2.00, more preferably from 1.60 to 1.80.

In order to control the refractive index to fall within the range as above, the type of the binder and the inorganic filler and the blend ratio of the two may be suitably selected and determined. The selection and the determination could be readily done through previous experiments.

Preferably, the thickness of the hard-coat layer is from 1 to 10 μm, more preferably from 1.2 to 6 μm.

Thus constructed, the antireflection film of the invention may have a haze value of from 3 to 20%, preferably from 4 to 15%, and its mean reflectivity at from 450 to 650 nm may be at most 1.8%, preferably at most 1.5%. Having a haze value and a mean reflectivity each falling within the range as above, the antireflection film of the invention realizes good antiglare and antireflection properties not detracting from the transmitted image quality.

Third Embodiment of the Invention (Light-Scattering Layer)

The light-scattering layer is formed for the purpose of imparting a light diffusion property owing to at least any of surface light scattering or internal light scattering, to the film, and for the purpose of imparting thereto a hard coat property of improving the scratch resistance of the film. Accordingly, it is desirable that the light-scattering layer contains a translucent resin for imparting the hard coat property to the film and translucent particles for imparting the light-scattering property thereto, and may optionally contain an inorganic filler which is for making the layer have a high refractive index, for preventing the layer from being shrunk after crosslinking, and for increasing the mechanical strength of the layer.

For imparting the hard coat property to the film, the thickness of the light-scattering layer is preferably from 1 to 10μμ, more preferably from 2 to 6 μm. When its thickness falls within the range as above, the layer may satisfactorily impart the hard coat property to the film, and its workability is not worsened, for example, it is not curled or it does not become brittle.

The translucent resin is preferably the binder polymer described hereinabove in the section of the "hard-coat layer" in the first and second embodiments of the invention.

The translucent particles to be in the light-scattering layer are for the purpose of imparting an antiglare property to the layer. The mean particle size of the particles may be from 0.5 to 5 μm, preferably from 1.0 to 4.0 μm. If the mean particle size is smaller than 0.5 μm, then the light scattering angle distribution may broaden to a broad angle, and the letter resolution of displays may be lowered and the surface roughness of the layer may be difficult to form. As a result, the antiglare property of the layer may be insufficient, and the layer is therefore undesirable. On the other hand, if the mean particle size is larger than 5 μm, then the thickness of the light-scattering layer must be increased, and if so, there occur some problems in that the layer will greatly curl and the material cost may increase.

Specific examples of the translucent particles are inorganic compound particles such as silica particles, $TiO_2$ particles; and resin particles such as acrylic particles, crosslinked acrylic particles, methacrylic particles, crosslinked methacrylic particles, polystyrene particles, crosslinked styrene particles, melamine resin particles, benzoguanamine resin particles. Of those, more preferred are crosslinked styrene particles, crosslinked acrylic particles, crosslinked acrylstyrene particles, and silica particles.

Regarding their shape, the translucent particles may be spherical or amorphous.

Two or more different types of translucent particles may be used herein as combined. Translucent particles having a larger particle size may impart an antiglare property to the layer, while those having a smaller particle size may impart different optical properties to it. For example, when an antireflection film is stuck to a high-definition display of 133 ppi or more, then the display is required to have no optical problem of, for example, glaring such as that mentioned hereinabove. Glaring is caused by pixel expansion or reduction owing to the surface roughness of the film (the surface roughness may contribute to the antiglare property of the film) to lose the brightness uniformity of the film. When translucent particles having a smaller particle size than those acting to impart an antiglare property to the film and having a different refractive index than the binder are used as combined with large-size translucent particles, then the antiglare property of the film may be significantly improved.

Regarding the particle size distribution thereof, the translucent particles are most preferably monodispersed ones, and the particles having a particle size as near as possible to one another are more desirable. For example, when particles having a particle size larger by at least 20% than the mean particle size thereof are defined as coarse particles, then it is desirable that the proportion of the coarse particles is at most 1%, more preferably at most 0.1%, even more preferably at most 0.01% by number of all the particles. The translucent particles having such a particle size distribution can be obtained through classification after the production reaction thereof, and when the classification frequency is increased, then the particles may have a more preferred particle size distribution.

The translucent particles may be incorporated into the light-scattering layer preferably in an amount of from 3 to 30% by weight, more preferably from 5 to 20% by weight of the total solid content of the light-scattering layer, in view of the light-scattering effect, the image resolution, the surface whitening and the surface glaring of the layer.

Preferably, the density of the translucent particles is from 10 to 1000 mg/m$^3$, more preferably from 100 to 700 mg/m$^3$.

The particle size distribution of the translucent particles may be determined according to a Coulter counter method, and the thus-determined distribution is converted into a particle number distribution.

In addition to the above-mentioned translucent particles, the light-scattering layer preferably contains an inorganic filler for further increasing the refractive index of the layer. The inorganic filler comprises an oxide of at least one metal selected from titanium, zirconium, aluminium, indium, zinc, tin and antimony, and has a mean particle size of at most 0.2 μm, preferably at most 0.1 μm, more preferably at most 0.06 μm.

On the contrary, in the light-scattering layer that comprises high-refractive index translucent particles in order to increase the refractive index difference from the translucent particles, silicon oxide is also preferably used for lowering the refractive index of the light-scattering layer. The preferred particle size of the silicon oxide particles is the same as that of the above-mentioned inorganic filler.

Specific examples of the inorganic filler that may be used in the light-scattering layer are $TiO_2$, $ZrO_2$, $Al_2O_3$, $In_2O_3$, ZnO, $SnO_2$, $Sb_2O_3$, ITO, $SiO_2$. $TiO_2$ and $ZrO_2$ are especially preferred in view of their ability to increase the refractive index of the layer. Preferably, the inorganic filler is subjected to surface treatment with a silane coupling agent or a titanium coupling agent. For the treatment, preferably used is a surface-treating agent that may give a functional group capable of reacting with a binder, to the filler surface.

When the inorganic filler is used, its amount to be added to the layer is preferably from 10 to 90%, more preferably from 20 to 80%, even more preferably from 30 to 75% of the total weight of the light-scattering layer.

Since the filler's particle size is sufficiently smaller than the wavelength of light, the filler does not cause light scattering therearound, and the dispersion formed by dispersing the filler in the binder polymer behaves as an optically uniform substance as a whole.

The light-scattering layer may also contain at least any of the above-mentioned organosilane compound and its sol component.

The amount of the sol component that may be added to the layer except the low-refractive index layer is preferably from 0.001 to 50% by weight, more preferably from 0.01 to 20% by weight, even more preferably from 0.05 to 10% by weight, still more preferably from 0.1 to 5% by weight of the total solid content of the layer to which the component is added. The limitation on the amount of the organosilane compound or its sol component to be added to the light-scattering layer is not so severe as compared with that to the low-refractive index layer. Therefore, the organosilane compound is preferably used in the light-scattering layer.

The refractive index of the bulk of the mixture of the translucent resin and the translucent particles in the invention is preferably from 1.48 to 2.00, more preferably from 1.50 to 1.80. For controlling the refractive index to fall within the range as above, the type of the translucent resin and the translucent particles and the blend ratio of the two may be suitably determined and selected. The selection and the determination could be readily done through previous experiments.

In the invention, the refractive index difference between the translucent resin and the translucent particles (the refractive index of the translucent particles—the refractive index of the translucent resin) is preferably from 0.02 to 0.2, more preferably from 0.05 to 0.15. When the difference falls within the range, then the internal scattering effect of the layer is sufficient, and the layer does not glare and the film surface does not become cloudy.

Preferably, the refractive index of the translucent resin is from 1.45 to 2.00, more preferably from 1.48 to 1.70.

Also preferably, the refractive index of the translucent particles is from 1.40 to 1.80, more preferably from 1.45 to 1.70.

The refractive index of the translucent resin may be directly measured by the use of an Abbe's refractometer, or may be quantitatively determined through reflection spectrometry or spectral ellipsometry.

The coating composition for the light-scattering layer in the invention contains a fluorine-containing surfactant or a silicone-type surfactant or both the two, in order that the light-scattering layer formed may have good surface uniformity, not having coating troubles such as coating unevenness, drying unevenness and spot defects. In particular, a fluorine-containing surfactant is preferred since it is more effective for preventing the surface defects of the antireflection film of the invention, such as the coating unevenness, the drying unevenness and the spot defects thereof, even when its amount added to the layer is small.

The surfactant is for improving the surface uniformity of the layer formed and for improving the rapid coatability of the coating composition to thereby increase the producibility of the antireflection film.

One preferred example of the fluorine-containing surfactant is a fluoro-aliphatic group-containing copolymer (this may be hereinafter abbreviated to "fluoropolymer"). Useful examples of the fluoropolymer are acrylic resins and methacrylic resins that contain repetitive units corresponding to the following monomer (i) and repetitive units corresponding to the following monomer (ii), and their copolymers with vinyl monomers copolymerizable with them.

(i) Fluoro-aliphatic group-containing monomer of the following formula (3):

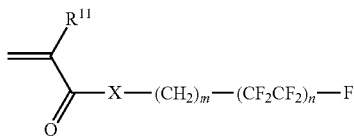

In formula (3), $R^{11}$ represents a hydrogen atom or a methyl group; X represents an oxygen atom, a sulfur atom, or —N($R^{12}$)—. $R^{12}$ represents a hydrogen atom, or an alkyl group having from 1 to 4 carbon atoms, concretely a methyl group, an ethyl group, a propyl group or a butyl group, preferably a hydrogen atom or a methyl group. X is preferably an oxygen atom.

In formula (3), m is preferably an integer of from 1 to 6, more preferably 2.

In formula (3), n is from 1 to 3. A mixture of the monomers where n is from 1 to 3 may also be used herein.

(ii) Monomer of the following formula (4) that is copolymerizable with the above (i):

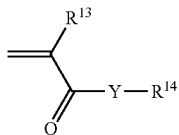

In formula (4), $R^{13}$ represents a hydrogen atom or a methyl group, Y represents an oxygen atom, a sulfur atom, or —N($R^{15}$)—. $R^{15}$ represents a hydrogen atom, or an alkyl group having from 1 to 4 carbon atoms, concretely a methyl group, an ethyl group, a propyl group or a butyl group, preferably a hydrogen atom or a methyl group. Y is preferably an oxygen atom, —N(H)— or —N(CH$_3$)—.

$R^{14}$ represents an optionally-substituted, linear, branched or cyclic alkyl group having from 4 to 20 carbon atoms. The substituent for the alkyl group for $R^{14}$ includes a hydroxyl group, an alkylcarbonyl group, an arylcarbonyl group, a carboxyl group, an alkylether group, an arylether group, a halogen atom such as fluorine, chlorine or bromine, a nitro group, a cyano group and an amino group, to which, however, the substituent is not limited. Preferred examples of the linear, branched or cyclic alkyl group having from 4 to 20 carbon atoms are linear or branched butyl, pentyl, hexyl, heptyl, octyl, nonyl, decyl, undecyl, dodecyl, tridecyl, tetradecyl, pentadecyl, octadecyl and eicosyl group; a mono-cycloalkyl group such as cyclohexyl and cycloheptyl groups; and a polycycloalkyl group such as bicycloheptyl, bicyclodecyl, tricycloundecyl, tetracyclododecyl, adamantyl, norbornyl and tetracyclodecyl groups.

The copolymerization ratio of the fluoro-aliphatic group-containing monomer of formula (3) that is to be in the fluoropolymer for use in the invention is at least 10 mol %, preferably from 15 to 70 mol %, more preferably from 20 to 60 mol % of the total copolymerization amount of all the constitutive monomers of the fluoropolymer.

Preferably, the weight-average molecular weight of the fluoropolymer for use in the light-scattering layer is from 3,000 to 100,000, more preferably from 5,000 to 80,000.

The preferred amount of the fluoropolymer to be in the light-scattering layer is from 0.001 to 5% by weight, more preferably from 0.005 to 3% by weight, even more preferably from 0.01 to 1% by weight of the coating liquid to form the light-scattering layer. Falling within the range, the fluoropolymer is sufficiently effective, and the coating layer can be dried with no trouble, and, in addition, the fluoropolymer does not have any negative influence on the film properties (e.g., reflectivity, scratch resistance).

Examples of the specific structure of the fluoropolymer for use in the invention are mentioned below, to which, however, the invention is not limited. The numeral written for each formula indicates the molar fraction of the monomer component. Mw means the weight-average molecular weight of the polymer.

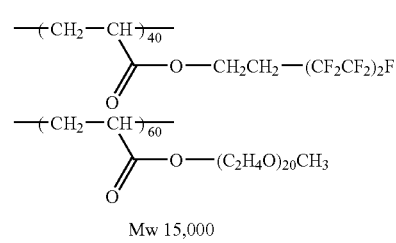

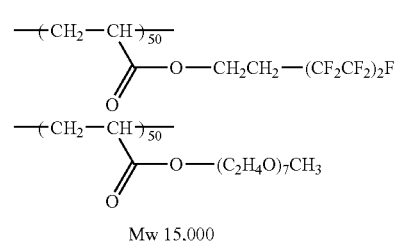

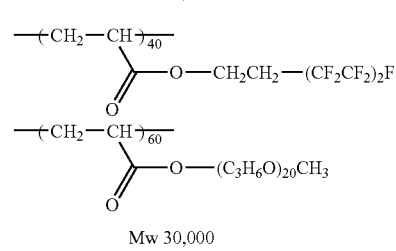

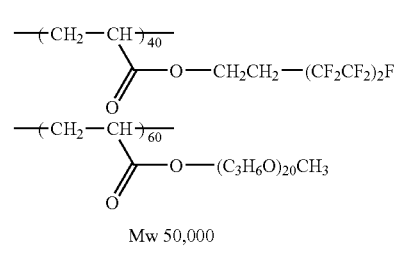

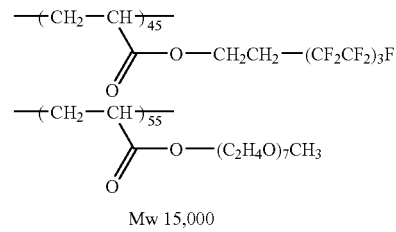

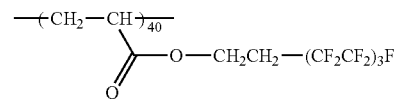

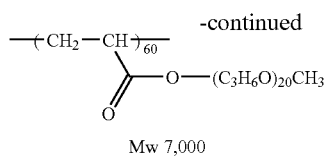

Mw 7,000

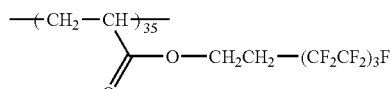

Mw 20,000

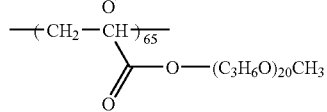

Mw 20,000

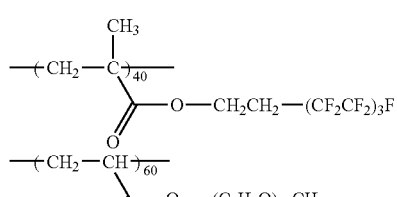

Mw 15,000

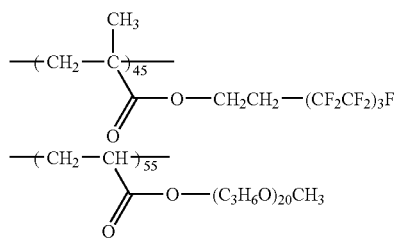

Mw 40,000

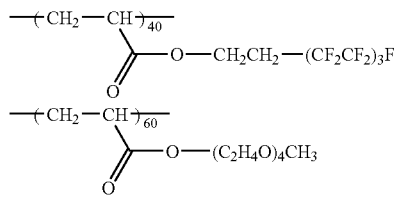

Mw 15,000

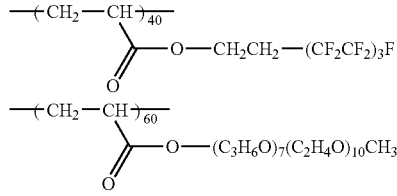

Mw 20,000

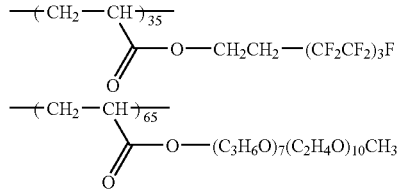

Mw 25,000

FP-7

FP-8

FP-9

FP-10

FP-11

FP-12

However, when the above-mentioned fluoropolymer is used in the light-scattering layer, then the surface energy of the light-scattering layer may lower owing to the segregation of the F atom-containing functional group in the surface of the layer, and, as a result, when a low-refractive index layer is overcoated on the light-scattering layer, there may occur a problem in that The antireflection capability of the film may be thereby worsened. This will be because the wettability of the curable composition to form the low-refractive index layer may be worsened and, as a result, the low-refractive index layer formed may have fine surface unevenness that could not be visually detected and its surface uniformity may be thereby worsened. For solving the problem, we the inventors have found that it is effective to control the surface energy of the light-scattering layer so as to fall preferably between 20 $mN \cdot m^{-1}$ and 50 $mN \cdot m^{-1}$, more preferably between 30 $mN \cdot m^{-1}$ and 40 $mN \cdot m^{-1}$, by specifically controlling the structure of the fluoropolymer to be used in the layer and the amount thereof. To realize the surface energy level as above, it is necessary that the ratio of the fluorine atom-derived peak to the carbon atom-derived peak, F/C, determined through X-ray photoelectron spectrometry falls between 0.1 and 1.5.

Apart from the above, a different method may be employed. Concretely, when the upper layer is formed, a fluoropolymer capable of being extracted out in a solvent in forming the upper layer is selected so as to prevent the polymer from being segregated in the surface of the lower layer (=interface of the upper and lower layers), and the adhesiveness between the upper layer and the lower layer is ensured. As a result, even in a mode of high-speed coating, the antireflection film formed can still has planar surface uniformity and has good scratch resistance. According to still another method of preventing the reduction in surface free energy, the surface energy of the light-scattering layer before the formation of the low-refractive index layer thereon may be controlled to fall within the range as above, and the intended object may also be attained.

Examples of the fluoropolymer that may be extracted out in the solvent used in forming the upper layer are homopolymers of a monomer of the following formula (5), and copolymers of the monomer of formula (5) and a monomer of the following formula (6).

(i) Fluoro-aliphatic group-containing monomer of the following formula (5):

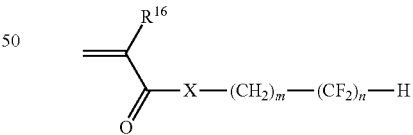

In formula (5), $R^{16}$ represents a hydrogen atom, a halogen atom, or a methyl group, and is preferably a hydrogen atom or a methyl group. X represents an oxygen atom, a sulfur atom, or —N($R^{17}$)—, and is preferably an oxygen atom or —N($R^{17}$)—, more preferably an oxygen atom. $R^{17}$ represents a hydrogen atom, or an optionally-substituted alkyl group having from 1 to 8 carbon atoms, and is preferably a hydrogen atom or an alkyl group having from 1 to 4 carbon atoms, more preferably a hydrogen atom or a methyl group. X is preferably an oxygen atom.

In formula (5), m indicates an integer of from 1 to 6 and is preferably an integer of from 1 to 3, more preferably 1.

In formula (5), n indicates an integer of from 1 to 18, and is preferably an integer of from 4 to 12, more preferably an integer of from 6 to 8.

The fluoropolymer may contain two or more different types of the fluoro-aliphatic group-containing monomer of formula (5) as the constitutive components thereof.

(ii) Monomer of the following formula (6) that is copolymerizable with the above (i):

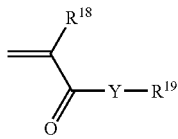

In formula (6), $R^{18}$ represents a hydrogen atom, a halogen atom or a methyl group, and is preferably a hydrogen atom or a methyl group. Y represents an oxygen atom, a sulfur atom, or $-N(R^{20})-$, and is preferably an oxygen atom or $-N(R^{20})-$, more preferably an oxygen atom. $R^{20}$ represents a hydrogen atom, or an alkyl group having from 1 to 8 carbon atoms, and is preferably a hydrogen atom or an alkyl group having from 1 to 4 carbon atoms, more preferably a hydrogen atom or a methyl group.

$R^{19}$ represents an optionally-substituted, linear, branched or cyclic alkyl group having from 1 to 20 carbon atoms, a poly(alkyleneoxy) group-containing alkyl group, or an optionally-substituted aromatic group (e.g., phenyl group or naphthyl group). Preferably, it is a linear, branched or cyclic alkyl group having from 1 to 12 carbon atoms, or an aromatic group having from 6 to 18 carbon atoms in total, more preferably a linear, branched or cyclic alkyl group having from 1 to 8 carbon atoms.

Specific examples of the fluoropolymer are mentioned below.

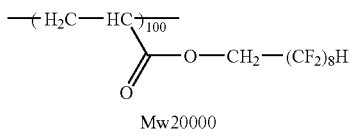

P-1

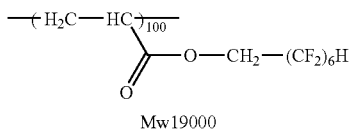

P-2

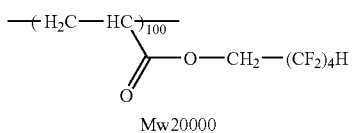

P-3

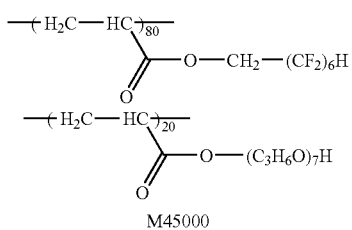

P-4

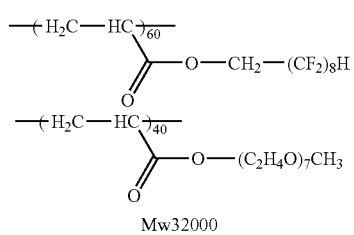

P-5

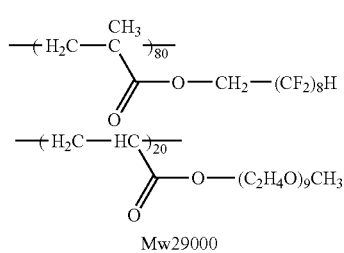

P-6

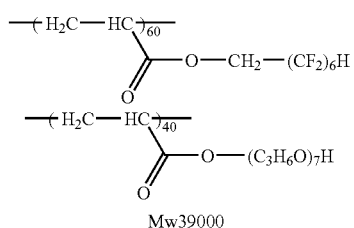

P-7

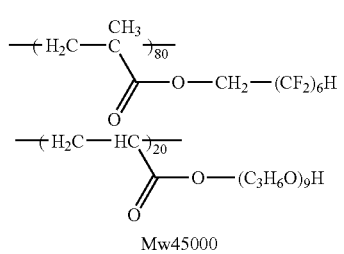

P-8

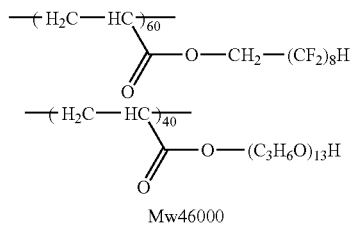

P-9

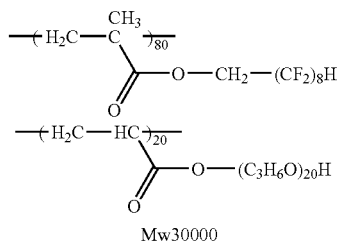

P-10

When a low-refractive index layer is overcoated on the light-scattering layer and when the reduction in the surface energy is prevented at that time, then the antireflection capability of the film may be prevented from worsening. When the light-scattering layer is formed, it is desirable that a fluoropolymer is used so as to lower the surface tension of the coating liquid and to increase the surface uniformity of the layer formed, and it is also desirable that the producibility is kept high by employing a rapid coating method. After the formation of the light-scattering layer, the layer is then subjected to surface treatment such as corona treatment, UV treatment, thermal treatment, saponification treatment or solvent treatment, preferably to corona treatment whereby the surface free energy is prevented from lowering. Accordingly, the surface energy of the light-scattering layer before the formation of the low-refractive index layer thereon is controlled to fall within the above-mentioned range, and the intended object can be thereby attained.

We, the present inventors have confirmed that the scattered light intensity distribution determined by a goniophotometer is correlated with the effect of improving the viewing angle of displays. Specifically, when the light emitted by a backlight is diffused to a higher degree by the light diffusion film disposed on the surface of the polarizing plate on the viewing side, then the viewing angle characteristics is more bettered. However, if the light is too much diffused, then it may cause some problems in that the backward scattering may increase and the front brightness may decrease, or the scattering may be too great and the image sharpness may be thereby lowered. Accordingly, it is necessary to control the scattered light intensity distribution to fall within a predetermined range. Given that situation, we, the present inventors have further studied and, as a result, have found that, in order to attain the desired visibility characteristic, the scattered light intensity at a light-outgoing angle of 30° in a scattered light profile, which is specifically correlated with the viewing angle-improving effect of displays, is preferably from 0.01% to 0.2%, more preferably from 0.02% to 0.15% relative to the light intensity at a light-outgoing angle of 0°.

The scattered light profile can be formed by analyzing the light-scattering film by the use of an automatically angle-varying photometer, GP-5 Model by Murakami Color Technology Laboratory.

A thixotropic agent may be added to the coating composition for forming the light-scattering layer in the invention. The thixotropic agent includes silica and mica having a size of at most 0.1 µm. In general, the amount of the agent to be added is preferably from 1 to 10 parts by weight or so relative to 100 parts by weight of the UV-curable resin in the composition.
(High-refractive Index Layer, Middle-Refractive Index Layer)

The antireflection film of the invention may comprise a high-refractive index layer and a middle-refractive index layer so as to have better antireflection capability.

The refractive index of the high-refractive index layer is from 1.55 to 2.40. So far as the layer constitution of the antireflection film has a layer of which the refractive index falls within the range, then it may be said that the film contains a high-refractive index layer. The range of the refractive index generally applies to high-refractive index layer and middle-refractive index layer. In this description, however, these layers are generically referred to as "high-refractive index layer".

When the film comprises both high-refractive index layer and middle-refractive index layer, then the layer having a higher refractive index than the support, the light-scattering layer and the middle-refractive index layer may be referred to as a high-refractive index layer, and the layer of which the refractive index is higher than that of the support and the light-scattering layer but is lower than that of the high-refractive index layer may be referred to as a middle-refractive index layer. The refractive index may be suitably controlled depending on the type of the inorganic fine particles and the binder to be added and the ratio thereof.

<Inorganic Fine Particles Comprising Titanium Dioxide as the Principal Ingredient Thereof>

The high-refractive index layer and/or the middle-refractive index layer contains inorganic fine particles that comprise titanium dioxide as the principal ingredient thereof and contain at least one element selected from cobalt, aluminium and zirconium. The principal ingredient as referred to herein means that its content (% by weight) is the largest of all the constitutive ingredients of the particles.

In the invention, the inorganic fine particles that comprise titanium dioxide as the principal ingredient thereof preferably have a refractive index of from 1.90 to 2.80, most preferably from 2.20 to 2.80. Also preferably, the weight-average particle size of the primary particles of the inorganic fine particles is from 1 to 200 nm, more preferably from 2 to 100 nm, even more preferably from 2 to 80 nm.

Since the inorganic fine particles that comprise titanium dioxide as the principal ingredient thereof contain at least one element selected from Co, Al and Zr, the photocatalytic activity of titanium dioxide in the particles may be retarded and the particles may improve the weather resistance of the high-refractive index layer.

The inorganic fine particles that comprise titanium dioxide as the principal ingredient thereof for use in the invention may be subjected to surface treatment. The surface treatment may be effected by the use of a cobalt-containing inorganic compound, or an inorganic compound such as $Al(OH)_3$ or $Zr(OH)_4$, or an organic compound such as a silane coupling agent. Through such surface treatment, the inorganic fine particles that comprise titanium dioxide as the principal ingredient thereof for use in the invention may have a core/shell structure as in JP-A-2001-166104.

Regarding the shape of the inorganic fine particles comprising titanium dioxide as the principal ingredient thereof, which are to be in the high-refractive index layer and/or the middle-refractive index layer, the particles are preferably grain-shaped, spherical, cubic, spindle-shaped, or amorphous, more preferably amorphous or spindle-shaped.
<Dispersant>

A dispersant may be used for dispersing the inorganic fine particles. Preferably, an anionic group-having dispersant is used for the dispersion.

For the anionic group, effectively used are an acidic proton-having group such as a carboxyl group, a sulfonic acid group (and a sulfo group), a phosphoric acid group (and a phosphono group), a sulfonamido group, and their salts. More preferred are a carboxyl group, a sulfonic acid group, a phosphoric acid group and their salts; and even more preferred are a carboxyl group and a phosphoric acid group. The number of the anionic groups to be in one molecule of the dispersant may be at least one, but is preferably at least 2, more preferably at least 5, even more preferably at least 10 on average. One molecule of the dispersant may contain different types of anionic groups. Also preferably, the dispersant contains a crosslinking or polymerizing functional group.
<High-Refractive Index Layer, etc., and Method for Forming Them>

The inorganic fine particles that comprise titanium dioxide as the principal ingredient thereof is used as the dispersion thereof in forming the high-refractive index layer and/or the middle-refractive index layer in the invention.

The inorganic fine particles are dispersed in a dispersion medium in the presence of the above-mentioned dispersant.

The dispersion medium is preferably a liquid having a boiling point of from 60 to 170° C. Examples of the dispersion medium are water, alcohols, ketones, esters, aliphatic hydrocarbons, halogenohydrocarbons, aromatic hydrocarbons, amides, ethers, ether alcohols. Preferred are toluene, xylene, methyl ethyl ketone, methyl isobutyl ketone, cyclohexanone and butanol.

More preferred for the dispersion medium are methyl ethyl ketone, methyl isobutyl ketone and cyclohexanone.

The inorganic fine particles are dispersed with a disperser. Examples of the disperser are sand grinder mill (e.g., bead mill with pin), high-speed impeller mill, pebble mill, roller mill, attritor and colloid mill. Especially preferred are sand grinder mill and high-speed impeller mill. The particles may be subjected to pre-dispersion treatment. Examples of the disperser to be used for pre-dispersion treatment are ball mill, three-roll mill, kneader and extruder.

Preferably, the inorganic fine particles are dispersed as fine as possible in the dispersion medium, and the weight-average particle size of the particles dispersed therein is from 1 to 200 nm, preferably from 5 to 150 nm, more preferably from 10 to 100 nm, even more preferably from 10 to 80 nm.

Finely dispersed to at most 200 nm in size, the inorganic fine particles may be in the high-refractive index layer not detracting from the transparency of the layer.

Preferably, the high-refractive index layer and/or the middle-refractive index layer in the invention are formed as follows: To the dispersion prepared by dispersing the inorganic fine particles in the dispersion medium as in the above, preferably added are a binder precursor necessary for matrix formation (this may be the same as in the above-mentioned light-scattering layer), and a photopolymerization initiator to prepare a coating composition for high-refractive index layer, and the coating composition is applied onto a transparent support and this is then cured thereon through crosslinking reaction or polymerization of the ionizing radiation-curable compound (e.g., polyfunctional monomer or polyfunctional oligomer) to form the intended layer.

Preferably, a photopolymerization initiator is used for the polymerization of the photopolymerizing polyfunctional monomer. The photopolymerization initiator is preferably a photo-radical polymerization initiator and a photo-cationic polymerization initiator. More preferred is a photo-radical polymerization initiator. For the photo-radical polymerization initiator, the same as those used in the above-mentioned antiglare hard-coat layer may also be used in the high-refractive index layer and/or the middle-refractive index layer.

The binder to be in the high-refractive index layer and/or the middle-refractive index layer preferably has a silanol group. Since the binder in the layers additionally has a silanol group, the physical strength, the chemical resistance and the weather resistance of the high-refractive index layer and/or the middle-refractive index layer can be further improved.

A silanol group may be introduced into the binder, for example, as follows: A crosslinking or polymerizing functional group-having compound is added to the coating composition for the high-refractive index layer, then the coating composition is applied onto a transparent support, and the dispersant and the polyfunctional monomer or polyfunctional oligomer are crosslinked or polymerized whereby a silanol group may be introduced into the binder.

Also preferably, the binder in the high-refractive index layer and/or the middle-refractive index layer contains an amino group or a quaternary ammonium group. The monomer having an amino group or a quaternary ammonium group is effective for keeping good dispersibility of inorganic fine particles in high-refractive index layer and is effective for forming high-refractive index layer and middle-refractive index layer having good physical strength, chemical resistance and weather resistance.

The crosslinked or polymerized binder has a structure in which the backbone chain of the polymer is crosslinked or polymerized. Examples of the backbone chain of the polymer are polyolefins (saturated hydrocarbons), polyethers, polyureas, polyurethanes, polyesters, polyamines, polyamides, and melamine resins. Preferred are polyolefin backbone chains, polyether backbone chains and polyurea backbone chains; more preferred are polyolefin backbone chains and polyether backbone chains; and most preferred are polyolefin backbone chains.

The binder is preferably a copolymer having anionic group-containing repetitive units and crosslinked or polymerized structure-containing repetitive units. The ratio of the anionic group-containing repetitive units in the copolymer is preferably from 2 to 96 mol %, more preferably from 4 to 94 mol %, most preferably from 6 to 92 mol %. The anionic group-containing repetitive unit may have two or more anionic groups. The ratio of the crosslinked or polymerized structure-containing repetitive units in the copolymer is preferably from 4 to 98 mol %, more preferably from 6 to 96 mol %, most preferably from 8 to 94 mol %.

The high-refractive index layer and/or the middle-refractive index layer may contain any other inorganic fine particles in addition to the above-mentioned inorganic fine particles that comprise titanium dioxide as the principal ingredient thereof. The additional inorganic fine particles may be the same as those to be in the above-mentioned antiglare hard-coat layer. Preferably, the particles are dispersed in the high-refractive index layer and/or the middle-refractive index layer as fine as possible. For the preferred particle size of the dispersed particles and the preferred primary particle size of the particles, referred to are those mentioned in the section of the antiglare hard-coat layer.

The content of the inorganic fine particles to be in the high-refractive index layer is preferably from 10 to 90% by weight, more preferably from 15 to 80% by weight, even more preferably from 15 to 75% by weight, relative to the weight of the high-refractive index layer. Two or more different types of inorganic fine particles may be used in the high-refractive index layer, as combined.

When a low-refractive index layer overlies the high-refractive index layer, then the refractive index of the high-refractive index layer is preferably higher than that of the transparent support.

A binder may also be preferably in the high-refractive index layer, which is obtained through crosslinking or polymerization reaction of an aromatic ring-containing ionizing radiation-curable compound, an ionizing radiation-curable compound containing a halogen element (e.g., Br, I, Cl) except fluorine, or an ionizing radiation-curable compound containing an atom of S, N or P.

For forming a low-refractive index layer on the high-refractive index layer to construct an antireflection film, it is desirable that the refractive index of the high-refractive index layer is from 1.55 to 2.40, more preferably from 1.60 to 2.20, even more preferably from 1.65 to 2.10, most preferably from 1.80 to 2.00.

The high-refractive index layer and/or the middle-refractive index layer may contain resin, surfactant, antistatic agent, coupling agent, viscosity improver, coloration inhibitor, colorant (pigment, dye), antiglare particles, defoaming agent, leveling agent, flame retardant, UV absorbent, IR absorbent, tackifier, polymerization inhibitor, antioxidant, surface modifier, conductive metal fine particles, in addition to the above-mentioned components (inorganic fine particles, polymerization initiator, photosensitizer).

The thickness of the high-refractive index layer and/or the middle-refractive index layer may be suitably designed depending on their use. When the high-refractive index layer and/or the middle-refractive index layer serve as the optical interference layer that will be mentioned herein under, then the layer thickness is preferably from 30 to 100 nm, more preferably from 50 to 170 nm, even more preferably from 60 to 150 nm.

The crosslinking reaction or the polymerization reaction of the ionizing radiation-curable compound in the formation of the high-refractive index layer and/or the middle-refractive index layer is preferably effected in an atmosphere having an oxygen concentration of at most 10% by volume, more preferably at most 6% by volume, even more preferably at most 2% by volume, most preferably at most 1% by volume.

<Other Layers>

Other layers may be disposed between the transparent support and the light-scattering layer in the invention. For example, they are an antistatic layer (this is when the surface resistivity from the display side must be lowered, or when there occurs a problem of dust adhesion to panel surface), a hard-coat layer (this is when the light-scattering layer may be omitted), a moisture-proof layer, an adhesiveness-improving layer, and a interference fringes-preventing layer.

These layers may be formed in any known methods.

Fourth Embodiment

The antireflective film in the invention comprises the cellulose acylate film support having provided thereon by coating a light-diffusing layer or a high-refractive index layer, and a antireflective layer comprising a low-refractive index layer having a refractive index lower than that of the support.

Further, it is preferred for the antireflective film in the invention to have an average reflectivity (mirror reflectivity) in wavelengths of from 380 to 680 nm of 3% or less, and a haze value of from 0.1 to 60% (when the antireflective film takes the constitution of a light-diffusing layer and a low-refractive index layer, the haze value is from 10 to 60%, and when the constitution comprises a high-refractive index layer and a low-refractive index layer, from 0.1 to 5%), more preferably the average reflectivity is 2% or less and the haze value is from 0.2 to 55% (in the case of the constitution of a light-diffusing layer and a low-refractive index layer, the haze value is from 10 to 55%, and in the case of a high-refractive index layer and a low-refractive index layer, from 0.2 to 4%). The degree of haze value greatly varies according to the reflection preventing mechanism.

By specifying the ranges of the optical characteristics of the reflection-preventing film as above, a high grade image display can be obtained, e.g., a picture does not look too whitish and blurring of an image display can be prevented, the reduction of contrast and the fluctuation of hue due to the variation of visual angles can be sufficiently suppressed, there are no external light reflection and glaring of a picture, and excellent in reflection prevention.

The mirror reflectivity of an outgoing angle of −5° is measured at the incident angle of 5° in the wavelength region of from 380 to 780 nm with a spectrophotometer, and the average reflectivity in the wavelength region of from 450 to 650 nm is computed. The mirror reflectivity at the incident angle of 5° is the rate of the strength of light reflected at the normal direction minus 5° of the sample to the light subjected to incidence from the normal direction plus 5°, and this becomes a measure of the mirroring of the background by mirror reflection.

(Light-Diffusing Layer)

The light-diffusing layer in the invention comprises at least one kind of translucent particles having an average particle size of from 0.5 to 7 μm dispersed in a translucent resin, the difference in refractive index between the translucent particles and the translucent resin is from 0.02 to 0.2, and the translucent particles account for a proportion of from 3 to 30 weight % of the total solids content of the light-diffusing layer. Particles of internal diffusion series that substantially do not have a light diffusing effect by surface unevenness are also included in the translucent particles.

(Translucent Particles)

The translucent particles in the invention are monodispersed particles having an average particle size of from 0.5 to 7.0 μm, preferably from 1.5 to 4.0 μm. The translucent particles may be particles of organic compounds or inorganic compounds. When the average particle size is less than 0.5 μm, light diffusing effect becomes small, and when it exceeds 7.0 μm, the film thickness becomes thick and curling of the film increases and also light diffusing effect becomes small.

The smaller the particle size variation, the smaller are the scattering characteristics, so that the design of the haze value becomes easy.

Translucent particles are not particularly restricted so long as they are high in transparence, and the difference in refractive index between the translucent particles and the translucent resin comes to the above numeric value. For example, as organic fine particles, polymethyl methacrylate beads (refractive index: 1.49), acryl-styrene copolymer beads (refractive index: 1.54), melamine beads (refractive index: 1.57), polycarbonate beads (refractive index: 1.57), crosslinked polystyrene beads (refractive index: 1.61), polyvinyl chloride beads (refractive index: 1.60), and benzoguanamine-melamine-formaldehyde beads (refractive index: 1.68) are exemplified.

As inorganic fine particles, silica beads (refractive index: 1.44) and alumina beads (refractive index: 1.63) are exemplified. For the purpose of preventing precipitation and reduction of the refractive index, hollow inorganic beads are also preferably used.

The difference in refractive index between the translucent particles and the translucent resin is from 0.02 to 0.20, particularly preferably from 0.04 to 0.10. When the difference is greater than 0.20, the film becomes white turbid, and when it is smaller than 0.02, sufficient light diffusion effect cannot be obtained. Similarly to the refractive index, when the addition amount of the translucent particles to the translucent resin is too large, the film becomes white turbid, and when the addition amount is too small, sufficient light diffusion effect cannot be obtained, so that the translucent particles account for a proportion of from 3 to 30 weight % of the total solids content of the light-diffusing layer, particularly preferably from 5 to 20 weight %.

Two or more kinds of different translucent particles may be used in combination. When two or more translucent particles are used, to effectively control the refractive index by mixture of several kinds of particles, it is preferred that the difference in refractive index between the translucent particles having the highest refractive index and the translucent particles having the lowest refractive index be from 0.02 to 0.10, particularly preferably from 0.03 to 0.07. It is also possible to impart a glare-proof property to the light-diffusing layer by translucent particles having greater particle size and imparting other optical characteristics by translucent particles having smaller particle size. For example, when a antireflective film is stuck on a highly precise display of 133 ppi or more, the film is required to be free from unfavorable condition in optical performance called glare. The glare results from the loss of uniformity of brightness by expansion or contraction of pixels by the unevenness of the surface of a film (attributable to a glare-proof property), but the glare can be greatly improved by using translucent particles having a smaller particle size than the particle size of the translucent particles providing a glare-proof property and having a refractive index different from the refractive index of the translucent resin in combination.

When such translucent particles are added, since the translucent particles are liable to precipitate in the translucent resin, inorganic filler, e.g., silica, may be added for the purpose of precipitation prevention. The more the amount of inorganic filler, the more effective is the precipitation prevention of the translucent particles. However, too large an amount of inorganic filler gives a malefic effect to the transparency of the light-diffusing layer. Accordingly, it is preferred to use inorganic filler having a particle size of 0.5 µm or less in an amount not impairing the transparency of the light-diffusing layer, e.g., less than 0.1 weight % or so.

(Translucent Resin)

As translucent resins for forming the light-diffusing layer, resins curable by ultraviolet rays or electron beams, i.e., (1) ionizing radiation curable resins, (2) ionizing radiation curable resins mixed with thermoplastic resins and solvents, and (3) thermosetting resins are mainly preferably used.

The thickness of the light-diffusing layer is generally from 0.5 to 50 µm or so, preferably from 1 to 20 µm, and more preferably from 2 to 10 µm.

The refractive index of the translucent resin is preferably from 1.51 to 2.00, more preferably from 1.51 to 1.90, still more preferably from 1.51 to 1.85, and particularly preferably from 1.51 to 1.80. The refractive index of the translucent resin is a value obtained by measuring the translucent resin not containing translucent particles.

(1) As the ionizing radiation curable resins, oligomers or prepolymers, such as (meth)acrylate (hereinafter acrylate and methacrylate are collectively described as (meth)acrylate in the specification) of polyfunctional compounds, e.g., preferably resins having an acrylate-based functional group such as relatively low molecular weight polyester resins, polyether resins, acrylic resins, epoxy resins, urethane resins alkyd resins, spiroacetal resins, polybutadiene resins, polythiol polyene resins and polyhydric alcohols are exemplified. In using them, from 3 to 30 parts by weight of a reactive dilutent is added to 100 parts by weight of the ionizing radiation curable resins.

As the reactive diluents, monofunctional monomers and polyfunctional monomers such as ethyl (meth)acrylate, ethylhexyl (meth)acrylate, styrene, vinyltoluene and N-vinyl pyrrolidone, e.g., trimethylolpropane tri(meth)acrylate, EO-modified trimethylolpropane tri(meth)acrylate; ditrimethylolpropane tetra(meth)acrylate, hexanediol (meth)acrylate, tripropylene glycol di(meth)acrylate, diethylene glycol di(meth)acrylate, pentaerythritol tri(meth)acrylate, pentaerythritol tetra(meth)acrylate, dipentaerythritol hexa(meth)acrylate, mixture of dipentaerythritol hexa(meth)acrylate and penta(meth)acrylate, 1,6-hexanediol di(meth)acrylate, and neopentyl glycol di(meth)acrylate are exemplified.

Of these reactive diluents, in particular polyfunctional monomers can also be used alone or in combination as binders without the above resins.

In particular in the invention, it is preferred to use urethane acrylate as oligomer and dipentaerythritol hexa-(meth)acrylate as monomer as mixture.

When the ionizing radiation curable resins are used as ultraviolet curable resins, photopolymerization initiators, such as acetophenones, benzophenones, Michler's benzoylbenzoate, α-amyloxime ester, thioxanthones, e.g., 1-hydroxycyclohexyl phenyl ketone, and 2-methyl-1-[4-(methylthio)phenyl]-2-morpholinopropane, and photosensitizers, e.g., n-butylamine, triethylamine, tri-n-butylsulfone and DETX-S can be mixed to the ionizing radiation curable resins.

As commercially available photoradical polymerization initiators, KAYACURE manufactured by Nippon Kayaku Co., Ltd. (e.g., DETX-S, BP-100, BDMK, CTX, BMS, 2-EAQ, ABQ, CPTX, EPD, ITX QTX, BTC, MCA, etc.), Irgacure manufactured by Ciba Geigy Japan Limited (e.g., 651, 184, 500, 907, 369, 1173, 2959, 4265, 4263, etc.), and Esacure manufactured by Sartomer Company Inc. (KIP100F, KB1, EB3, BP, X33, KT046, KT37, KIP150 and TZT) are exemplified.

(2) The ionizing radiation curable resins mixed with thermoplastic resins and solvents are the mixture comprising from 20 to 100 parts by weight of thermoplastic resins and from 20 to 400 parts by weight of solvents mixed to 100 parts by weight of the ionizing radiation curable resins.

As the thermoplastic resins, e.g., cellulose ester resins (e.g., nitrocellulose, acetylcellulose, cellulose acetate propionate, ethylhydroxyethyl cellulose, etc.), vinyl chloride resins, vinyl acetate resins, ABS resins, polyacetal, polycarbonate, polystyrene, polymethyl methacrylate, polyphenylene ether, polyamide, polyethylene terephthalate and olefin resins are exemplified.

Specifically, as the thermoplastic resins, any of generally used thermoplastic resins may be used, but from the viewpoints of the adhesion with a cellulose acylate film as the support, and the transparency as the film formed, cellulose resins, e.g., nitrocellulose, acetylcellulose, cellulose acetate propionate, ethylhydroxyethyl cellulose, etc., are preferred.

As the solvents, solvents for transparent resins shown below are preferably used.

(3) The thermosetting resins include, e.g., phenolic resins, urea resins, diallyl phthalate resins, melamine resins, guanamine resins, unsaturated polyester resins, polyurethane resins, epoxy resins, aminoalkyd resins, melamine-urea co-condensation resins, silicone resins and polysiloxane resins.

If necessary, conventionally known compounds (e.g., a curing agent and a curing accelerator) are added to the thermosetting resins, such as a curing agent, e.g., a crosslinking agent (e.g., epoxy compounds, polyisocyanate compounds, polyol compounds, polyamine compounds, melamine compounds, etc.) and a polymerization initiator (e.g., azobis compounds, organic peroxidation compounds, organic halogen compounds, onium salt compounds, etc.), and a polymerization accelerator (e.g., organic metallic compounds, acid compounds, basic compounds, etc.). Specifically, the compounds described in Shinzo Yamashita and Tosuke Kaneko, Kakyozai Handbook (Handbook of Crosslinking Agent), Taiseisha Co. (1981) are exemplified. These compounds are preferably used in an amount of from 0.01 to 30 parts by weight to 100 parts by weight of the thermosetting resins to be used.

Further, monomers having a high refractive index and/or super fine particles of metallic oxides having a high refractive index can be added to the translucent resins.

As the examples of the high refractive index monomers, bis(4-methacryloylthiophenyl)sulfide, vinylnaphthalene, vinylphenyl sulfide, and 4-methacryloxyphenyl-4'-methoxyphenyl thioether are exemplified.

As the super fine particles of metallic oxides having a high refractive index, those having a refractive index of from 1.70 to 2.80 and an average particle size of primary particles of from 3 to 150 nm are preferred. If the refractive index of the particles is less than 1.70, the effect of increasing the refractive index of the film is small, and if the refractive index is greater than 2.80, there are cases where the super fine particles are colored, which is not preferred. When the particles having a primary average particle size greater than 150 nm are used, the haze value of the light-diffusing layer formed becomes high and the transparency of the light-diffusing layer may be damaged, while primary average particle size less than 3 nm is not preferred in view of the maintenance of a high refractive index. In the invention, more preferred super fine particles of metallic oxides are particles having a refractive index of from 1.80 to 2.80 and a primary average particle size of from 3 to 100 nm, and still more preferred super fine particles are particles having a refractive index of from 1.80 to 2.80 and a primary average particle size of from 5 to 80 nm.

As the preferred super fine particles of metallic oxides having a high refractive index, particles containing oxides, composite oxides or sulfides of Ti, Zr, Ta, In, Nd, Sn, Sb, Zn, La, W, Ce, Nb, V, Sm or Y as the main component are exemplified. The main component used here means the component of the most content (weight %) among the components constituting the particles. The particles containing, as the main component, oxide or composite oxide containing at least one metallic element selected from Ti, Zr, Ta, In and Sn are preferably used in the invention. The super fine particles of metallic oxides for use in the invention may contain various elements in the particles, e.g., Li, Si, Al, B, Ba, Co, Fe, Hg, Ag, Pt, Au, Cr, Bi, P and S may be contained.

As the specific examples of the super fine particles of metallic oxides, $ZrO_2$, $TiO_2$, $Al_2O_3$, $In_2O_3$, ZnO, $SnO_2$, $Sb_2O_3$ and ITO are exemplified. Of these particles, $ZrO_2$ is most preferably used.

The super fine particles of metallic oxides may be subjected to surface treatment. The surface treatment is performed with inorganic compounds and/or organic compounds to modify the surface properties of the particles, to adjust the wetting properties of the surfaces of the super fine particles of metallic oxides, to thereby better atomization in an organic solvent, and to improve the dispersibility and dispersion stability of the particles in the composition for forming the light-diffusing layer. As the inorganic compounds for giving physicochemical adsorbing properties to the particle surface, e.g., inorganic compounds containing silicon ($SiO_2$, etc.), inorganic compounds containing aluminum ($Al_2O_3$, $Al(OH)_3$, etc.), inorganic compounds containing cobalt ($CoO_2$, $Co_2O_3$, $Co_3O_4$, etc.), inorganic compounds containing zirconium ($ZrO_2$, $Zr(OH)_4$, etc.), and inorganic compounds containing iron ($Fe_2O_3$, etc.) are exemplified.

As the examples of the organic compounds for use in the surface treatment, surface property modifiers of inorganic fillers, such as metallic oxides and inorganic pigments so far been known, e.g., the compounds described in Ganryo Bunsan Anteika to Hyomen Shori Gijutsu-Hyoka (Pigment Dispersion Stabilization and Techniques of Surface Treatment-Evaluation), Chapter 1, published by Gijutsu Joho Kyokai (2001) are exemplified.

Specifically, organic compounds having a polar group compatible with the surfaces of the super fine particles of metallic oxides and coupling compounds are exemplified.

The examples of the polar groups compatible with the surfaces of the super fine particles of metallic oxides include a carboxyl group, a phosphono group, a hydroxyl group, a mercapto group, a cyclic acid anhydride group, and an amino group are exemplified, and compounds having at least one polar group in the molecule are preferred. For example, long chain aliphatic carboxylic acids (e.g., stearic acid, lauric acid, oleic acid, linoleic acid, linolenic acid, etc.), polyol compounds (e.g., pentaerythritol triacrylate, dipenta-erythritol pentaacrylate, ECH-modified glycerol triacrylate, etc.), phosphono group-containing compounds (e.g., EO-(ethylene oxide)-modified phosphoric acid triacrylate, etc.), and alkanolamine (e.g., ethylenediamine EO adduct (5 mols), etc.) are exemplified.

As the coupling compounds, well-known organic metallic compounds including a silane coupling agent, a titanate coupling agent and an aluminate coupling agent are exemplified. A silane coupling agent is most preferred. Specifically, the compounds disclosed in JP-A-2002-9908 and JP-A-2001-310423, paragraphs [0011] to [0015] are exemplified.

The addition amount of the monomers having a high refractive index and/or the super fine particles of metallic oxides having a high refractive index is preferably from 10 to 90 parts by weight to 100 parts by weight of the translucent resin, more preferably from 20 to 80 parts by weight.

It is preferred for the light-diffusing layer to contain, as a surface binder, an organic silyl compound represented by formula a described later in detail in the item of the low-refractive index layer, and/or the hydrolyzed product of the organic silyl compound, and/or the partial condensate of the hydrolyzed product.

As the specific examples of the surface binders, e.g., KBM-5103 and KBM-503 (commercial products, manufactured by Shin-Etsu Chemical Co., Ltd.), and/or the hydrolyzed products thereof, and/or the partial condensates of the hydrolyzed products are exemplified as preferred compounds.

The addition amount of the surface binders is preferably from 1 to 50 parts by weight to 100 parts by weight of the total solids content of the composition for forming the light-diffusing layer, more preferably from 2 to 30 parts by weight.

Further, it is preferred to add a surfactant to the light-diffusing layer to improve the surface uniformity of the anti-reflective film of the invention. As the examples of the surfactants, e.g., perfluoroalkyl group-substituted (meth) acrylate copolymers having from 6 to 12 carbon atoms, and perfluorovinyl ether copolymers having from 6 to 12 carbon atoms are exemplified.

The addition amount of the surfactants is preferably from 0.01 to 20 parts by weight to 100 parts by weight of the total solids content of the composition for forming the light-diffusing layer, more preferably from 0.1 to 10 parts by weight.

The process of forming the light-diffusing layer on the support is described below.

In the invention, the light-diffusing layer is formed by coating the composition for forming the light-diffusing layer prepared by dissolving and dispersing in a coating solvent the transparent resin, transparent particles, and various additives used according to necessity on the support and drying.

The solvents for coating can be arbitrarily selected from water and organic solvents, and liquids having a boiling point of 50° C. or higher are preferred as the coating solvents, and organic solvents having a boiling point of from 60 to 180° C. are more preferred.

As the organic solvents, alcohols, ketones, esters, amides, ethers, ether esters, hydrocarbons and halogenated hydrocarbons are exemplified. Specifically, alcohols (e.g., methanol, ethanol, propanol, butanol, benzyl alcohol, ethylene glycol, propylene glycol, ethylene glycol monoacetate, etc.), ketones (e.g., methyl ethyl ketone, methyl isobutyl ketone, cyclohexanone, methylcyclohexanone, etc.), esters (e.g., methyl acetate, ethyl acetate, propyl acetate, butyl acetate, ethyl formate, propyl formate, butyl formate, ethyl lactate, etc.), aliphatic hydrocarbons (e.g., hexane, cyclohexane, etc.), halogenated hydrocarbons (e.g., methylchloroform, etc.), aromatic hydrocarbons (e.g., benzene, toluene, xylene, etc.), amides (e.g., dimethylformamide, dimethylacetamide, n-methylpyrrolidone, etc.), ethers (e.g., dioxane, tetrahydrofuran, ethylene glycol dimethyl ether, propylene glycol dimethyl ether, etc.), ether alcohols (e.g., 1-methoxy-2-propanol, ethyl cellosolve, methyl carbinol, etc.) are exemplified. These solvents may be used alone or two or more may solvents be used in combination. Preferred dispersion media are toluene, xylene, methyl ethyl ketone, methyl-isobutyl ketone, cyclohexanone and butanol. Coating solvents mainly comprising a ketone solvent (e.g., methyl ethyl ketone, methyl isobutyl ketone, cyclohexanone, etc.) are also preferably used.

The light-diffusing layer can be formed by coating a light-diffusing layer-forming composition by well known thin film-forming methods, such as dip coating, air knife coating, curtain coating, roller coating, wire bar coating, gravure coating, micro-gravure coating or extrusion coating, allowing the coated layer to stand until the surface unevenness configuration of the translucent layer by the first and second translucent particles is sufficiently formed, drying, and irradiating with light and/or heat A coating method by micro-gravure coating method is particularly preferred.

The micro-gravure coating method used in the invention is a coating method with a gravure roll having a diameter of from about 10 to 100 mm, preferably from about 20 to 50 mm, and carved with a gravure pattern all around, the gravure roll is reversely rotated under the support and to the traveling direction of the support, at the same time, an excessive coating solution is scraped off with a doctor blade from the surface of the gravure roll, and the prescribed amount of the coating solution is transferred to the downside of the support at the position where the upside of the support is in a free state. The support in a roll is continuously unwound, and at least one layer of a hard-coat layer and a low-refractive index layer containing a fluorine-containing polymer can be coated on one side of the unwound support by the micro-gravure coating method.

As the coating conditions by the micro-gravure coating method, the line number of the gravure pattern carved on the gravure roll is preferably from 50 to 800 lines/inch, more preferably from 100 to 300 lines/inch, the depth of the gravure pattern is preferably from 1 to 600 µm, more preferably from 5 to 200 µm, the number of revolutions of the gravure roll is preferably from 3 to 800 rpm, more preferably from 5 to 200 rpm, and the traveling rate of the support is preferably from 0.5 to 100 m/min, more preferably from 1 to 50 m/min.

It is preferred to irradiate the coated composition with light to expedite the curing of the light-transmitting resin. It is also preferred to perform heating treatment in the latter half of the photo-curing treatment. Drying may be carried out by air drying at a low temperature of about room temperature or drying may be performed by heating. The heating temperature is from 40 to 180° C., preferably from 80 to 150° C. Drying time is preferably from 0.5 to 60 minutes.

The light sources of light irradiation may be any of electron beams, ultraviolet rays and near infrared rays. For example, in the case of electron beam curing, electron beams having energy of from 50 to 1,000 KeV, preferably from 100 to 300 KeV, emitted from various electron beam accelerators, e.g., Cockcroft Walton type, Van De Graaff type, resonance transformer type, insulating core transformer type, linear type, Dynamitoron type, and high frequency type accelerators are exemplified, and in the case of ultraviolet ray curing, ultraviolet rays emitted from, e.g., an extra-high pressure mercury lamp, a high pressure mercury lamp, a low pressure mercury lamp, a carbon arc, a xenon arc, and a metal halide lamp are exemplified. As the light sources of ultraviolet rays, available various kinds of laser light sources of the wavelengths of from 350 to 420 nm, e.g., extra-high pressure, high pressure, middle pressure and low pressure mercury lamps, a chemical lamp, a carbon arc lamp, a metal halide lamp, a xenon lamp and sunbeams, may be made multi-beams for use in irradiation. As the light sources of near infrared rays, a halogen lamp, a xenon lamp and a high pressure sodium lamp are exemplified, and available various kinds of laser light sources of the wavelengths of from 750 to 1,400 nm may be made multi-beams for use in irradiation.

In the case of photoradical polymerization by light irradiation, polymerization can be performed in the air or inert gas, but it is preferred to make the oxygen concentration in the atmosphere as low as possible for the purpose of shortening the induction period of polymerization of the radical polymerizable monomer, or sufficiently increasing the polymerization rate. The intensity of irradiation of ultraviolet rays is preferably from 0.1 to 100 mW/cm$^2$ or so, and the irradiation dose on the coated layer surface is preferably from 100 to 1,000 mJ/cm$^2$. The temperature distribution of the coating layer in a light irradiation process is preferably controlled to be uniform as far as possible, preferably within ±3° C., more preferably within ±1.5° C. In this range of the temperature, the polymerization reaction in the in-plane direction and depth direction in the layer uniformly progresses.

(High-Refractive Index Layer and Middle Refractive Index Layer)

The preferred embodiments of the high-refractive index layer and the middle refractive index layer in the fourth embodiment are the same as those in the third embodiment.

The antireflective film in the fourth embodiment may further be provided with a hard-coat layer, a transparent antistatic layer, a primer layer, an electromagnetic shielding layer, an undercoat layer and a protective layer.

(Hard-Coat Layer)

A hard-coat layer is used for the purpose of giving physical strength to the reflection-preventing film according to necessity, and it is preferred to provide the hard-coat layer between the support and the light-diffusing layer. It is preferred to form the hard-coat layer by the crosslinking reaction or the polymerization reaction of ionizing radiation curable compounds. Therefore, it is preferred to use ionizing radiation curable polyfunctional monomers and polyfunctional oligomers in the coating composition. As polymerizable functional groups, unsaturated polymerizable functional groups, e.g., a (meth)acryloyl group, a vinyl group, a styryl group and an allyl group are exemplified. Above all, a (meth)acryloyl group is preferred. Specifically, those described above in detail in the transparent resins for the light-diffusing layer are preferred.

It is preferred for the hard-coat layer to contain inorganic fine particles having an average particle size of primary particles of 200 nm or less. As the specific examples of the inorganic fine particles, the inorganic fine particles that are mixed in the cellulose acylate film described above are preferably used.

Oligomers or polymers, or both oligomers and polymers, having a weight average molecular weight of 500 or more may be added to the hard-coat layer for giving brittleness. As the oligomers and polymers, (meth)acrylate based-, cellulose based- and styrene-based polymers, urethane acrylate and polyester acrylate are exemplified. Poly(glycidyl (meth)acrylate) and poly(allyl (meth)acrylate) having functional groups at the side chains are preferred.

The content of oligomers or polymers, or both oligomers and polymers, in the hard-coat layer is preferably from 5 to 80 weight % to the total weight of the hard-coat layer, more preferably from 25 to 70 weight %, and particularly preferably from 35 to 65 weight %.

The strength of the hard-coat layer is preferably H or higher by a pencil hardness test according to JIS K5400, more preferably 2H or higher, and most preferably 3H or higher.

Further, in Taber's test according to JIS K5400, the smaller the abrasion amount of a sample piece before and after the test, the better is the sample.

When a hard-coat layer is formed by across linking reaction or polymerization reaction of an ionizing radiation curable compound, the crosslinking reaction or polymerization reaction is preferably performed in the atmosphere of oxygen concentration of 10 vol % or less. A hard-coat layer excellent in physical strength and chemical resistance can be formed by performing the reaction in the atmosphere of oxygen concentration of 10 vol % or less.

It is preferred to perform the crosslinking reaction or polymerization reaction of an ionizing radiation curable compound in the atmosphere of oxygen concentration of 6 vol % or less, more preferably 4 vol % or less, particularly preferably 2 vol % or less, and most preferably 1 vol % or less. As a means to make oxygen concentration 10 vol % or less, it is preferred to replace the atmosphere (nitrogen concentration: about 79 vol % and oxygen concentration: about 21 vol %) with another gas, and a particularly preferred means is to replace the atmosphere with nitrogen gas (nitrogen purge).

It is preferred to form a hard-coat layer by coating a coating composition for hard coat forming on the surface of a transparent support.

As coating solvents, the ketone solvents, e.g., methyl ethyl ketone, isobutyl ketone and cyclohexanone, as shown in the high-refractive index layer are preferred in the point of adhesion properties. Solvents other than ketone solvents may also be contained. The content of ketone solvents is preferably 10 weight % or more of the total solvents contained in a coating composition, more preferably 30 weight % or more, and still more preferably 60 weight % or more.

The thickness of the hard-coat layer is preferably from 0.3 to 20 μm more preferably from 0.6 to 10 μm.

(Transparent Antistatic Layer)

It is preferred in the invention to provide a transparent antistatic layer between the support and the light-diffusing layer containing electrically conductive materials in the point of static prevention on the surface of a film. For the protection of the outer surface energy of the polarizing plate on the visible side provided on the display of an IPS mode and a VA mode of a liquid crystal mode, it is preferred to provide an electrically conductive layer as the transparent electrostatic layer.

A transparent antistatic layer can be formed by conventionally well-known methods, e.g., a method of coating an electrically conductive coating solution containing electrically conductive fine particles and reactive curing resins, a method of forming a hardened film of electrically conductive polymers, and a method of forming an electrically conductive thin film by depositing or sputtering metals or metallic oxides for forming a transparent film are exemplified.

As the electrically conductive fine particles, fine particles made out of metallic oxides or nitrides are preferred. As the examples of metallic oxides or nitrides, tin oxide, indium oxide, zinc oxide and titanium nitride are exemplified. Tin oxide and indium oxide are particularly preferred.

The thickness of the transparent antistatic layer is preferably from 0.01 to 10 μm, more preferably from 0.03 to 7 μm, and still more preferably from 0.05 to 5 μm.

The surface resistance of the transparent antistatic layer is preferably from $2 \times 10^{12} \Omega/\square$ or less, more preferably from $10^5$ to $10^{12} \Omega/\square$, still more preferably from $10^5$ to $10^9 \Omega/\square$, and most preferably from $10^5$ to $10^8 \Omega/\square$. The surface resistance of the transparent antistatic layer can be measured according to a four-probe method.

The haze value of the transparent antistatic layer is preferably 25% or less, more preferably 20% or less, and most preferably 15% or less. The light transmittance of the transparent antistatic layer of the light of the wavelength of 550 nm is preferably 50% or more, more preferably 60% or more, and most preferably 70% or more. This is the value obtained by subtracting the measured value of the sample before coating the antistatic layer from the measured value of the sample after coating. By providing various functional layers on the antistatic layer, the haze value and the light transmittance generally greatly fluctuate.

(Surface Configuration of Transparent Antistatic Layer)

It is preferred that the surface of the transparent antistatic layer formed in the invention has the configurations of minute surface irregularity of the sizes that do not have optical influence, and the arithmetic mean roughness value (Ra) of the surface irregularity of the film according to JIS B0601-1994 is 0.03 μm or less, the ten point average roughness (Rz) is 0.06 μm or less, and the maximum height (Ry) is 0.09 μm or less, more preferably the arithmetic mean roughness value (Ra) is from 0.001 to 0.03 μm, and the ten point average roughness (Rz) is from 0.001 to 0.06 μm, and still more preferably the arithmetic mean roughness value (Ra) is from 0.001 to 0.015 μm, the ten point average roughness (Rz) is from 0.002 to 0.05 μm, and the maximum height (Ry) is 0.05 μm or less, and particularly preferably the arithmetic mean roughness value (Ra) is from 0.001 to 0.010 μm, the ten point average roughness (Rz) is from 0.002 to 0.025 μm, and the maximum height (Ry) is 0.04 μm or less.

Further, in the above minute surface irregularity of the sizes that do not have optical influence, it is preferred that the ratio of the arithmetic mean roughness (Ra) to the ten point average roughness (Rz), (Ra/Rz) is 0.15 or more, the average distance of the surface irregularity of the film (Sm) is 2 μm or less. Here, the relationship between Ra and Rz shows the uniformity of the surface irregularity. Preferably the ratio (Ra/Rz) is 0.17 or more, and the average distance (Sm) is from 1 to 0.01 μm.

The configurations of the surface irregularity can be evaluated with an atomic force microscope (AFM).

By specifying the configuration and distribution of the surface irregularity of the entire surface of the transparent antistatic layer, anchoring effect is given uniformly and sufficiently to the entire surface of the film and adhesion can be maintained even when an upper layer is continuously formed on a long film. Further, after storage for a long period of time, adhesion properties can be retained without fluctuation.

The adhesion of the transparent antistatic layer with the upper layer (the light-diffusing layer) provided on the electrically conductive cured film of the invention is 50 mg or less in the abrasion amount in the Taber's abrasion test based on JIS K-6902. Specifically, this value corresponds to the abrasion amount after 500 rotations with the load of 1 kg. The abrasion amount is preferably 40 mg or less. In this range of the abrasion amount, scratch resistance as the antireflective layer can be sufficiently maintained.

<Characteristics of Antireflective Film> (Fourth Embodiment)

(Optical Characteristics)

The average value of the mirror reflectivity in the wavelength region of from 450 to 650 nm at incidence of 5° of the antireflective film of the invention (i.e., average reflectivity) is 2.5% or less, preferably 1.8% or less, and more preferably 1.4% or less.

The mirror reflectivity at the incident angle of 5° is the rate of the strength of light reflected at the normal direction minus 5° of the sample to the light subjected to incidence from the normal direction plus 5°, and this becomes a measure of the mirroring of the background by mirror reflection. When the antireflective film is used as the film having a glare-proof function, the strength of light reflected at the normal direction minus 5° becomes weak by the part of the scattered light attributable to the surface irregularity provided for the purpose of giving glare-proof. Accordingly, mirror reflectivity can be said to be the measuring method that reflects the contribution of both glare-proof property and reflection preventing property.

When the average value of the mirror reflectivity in the wavelength region of from 450 to 650 nm at incidence of 5° of the reflection-preventing film of the invention (i.e., average reflectivity) is greater than 2.5%, one feels uneasy about the mirroring of the background and visibility unfavorably lowers when the film is applied to the surface film of a display.

By making L* value, a* value and b* value of CIE 1976 L*a*b* color space indicating the tint of the light of specular reflection to the incident light at an angle of 5° of CIE standard light source D65 in the wavelength region of from 380 to 780 nm respectively in the range of $3 \leqq L^* \leqq 20$, $-7 \leqq a^* \leqq 7$ and $-10 \leqq b^* \leqq 10$, the tints of the reflected light of from red purple to blue purple, which have been problems in a multi-layer reflection-preventing film, are reduced, further, by making L*, a* and b* values within the range of $3 \leqq L^* \leqq 10$, $0 \leqq a^* \leqq 5$ and $-7 \leqq b^* \leqq 0$, respectively, the tints sharply lowered. When the film is used in a liquid crystal display, the tint is neutral in the case where outer light of high brightness such as a fluorescent lamp in a room is slightly mirrored, which is not annoyed at all. In detail, a reddish tint is strong in the case of $a^* > 7$ and a cyan tint is strong in the case of $a^* < -7$, which are not preferred. A bluish tint is strong when b* value is $b^* < -7$, and a yellowish tint is strong when b* value is $b^* > 0$, which are not preferred.

In the invention, it is preferred that each value of L*, a* and b* is constant on the entire image displayed, in particular, it is preferred that the rate of change of each value of in-plane is 20% or less, more preferably 8% or less. When the rate of change is in this range, uniform reflection preventing performance and good visibility can be secured.

Mirror reflectivity and tint are measured with a spectrophotometer V-50 (manufactured by JASCO Corporation) equipped with an adaptor ARV-474. Reflection preventing properties can be evaluated by the measurement of the mirror reflectivity of an outgoing angle of −5° at the incident angle of 5° in the wavelength region of from 380 to 780 nm, and the computation of the average reflectivity in the wavelength region of from 450 to 650 nm. Further, by computing L* value, a* value and b* value of CIE 1976 L*a*b* color space indicating the tint of the light of specular reflection to the incident light at an angle of 5° of CIE standard light source D65 from the measured reflection spectra, the tints of the reflected lights can be evaluated.

The tint unevenness of reflected light resulting from the thickness unevenness of the reflection-preventing film can be greatly reduced by suppressing the fluctuation width of the cellulose acylate support thickness in the above range, by suppressing the tint and the fluctuation width of the support itself in the above range, and by forming the antireflective layer free from coating unevenness on the coating surface of the film whose configurations of irregularity are uniformalized.

The tint of reflected light is more neutral and the reflection-preventing film is excellent in weatherproofness.

The tint uniformity of reflected light can be found from the reflection spectra of the reflected light in the wavelength region of from 380 to 680 nm. The rate of change of tint is obtained by finding each average value of a* and b* on L*a*b* chromaticity diagram, dividing the difference of the maximum value and the minimum value of each of a* value and b* value (AA) by the average value and multiplying by 100. The rate of change is preferably 30% or less, more preferably 20% or less, and most preferably 8% or less.

ΔE, which is the change of tint before and after the weatherproof test of the reflection-preventing film of the invention, is preferably 15 or less, more preferably 10 or less, and most preferably 5 or less.

When the reflection-preventing film has such a tint, the change of the average reflectivity of the reflection-preventing film nm in the wavelength region of from 380 to 680 before and after the weatherproof test is preferably 0.4% or less, more preferably 0.2% or less.

When the change of the average reflectivity is in this range, low reflection is compatible with the reduction of the tint of the reflected light, and, for instance, when the reflection-preventing film is used at the outermost surface of an image display, the tint is neutral in the case where outer light of high brightness such as a fluorescent lamp in a room is slightly mirrored, and the grade of the image displayed increases, and preferred.

The reflection-preventing film in the invention is characterized in that these optical characteristics and the mechanical characteristics substantially hardly change even after the weatherproof test. In particular, the antireflective film is characterized in that the change of these characteristics is restrained after the weatherproof test.

The weatherproof test in the invention is a weatherproof test based on JIS K5600-7-7: 1999, and means a weatherproof test with sunshine weather meter (S-80, manufactured by Suga Test Instruments Co., Ltd.) and 50% humidity for 150 hours of treating time.

The reflection-preventing film having reflected light of such a neutral tint and low reflectivity can be obtained by optimizing the balance of the refractive index of a low-refractive index layer and the refractive index of the translucent resin used in the light-diffusing layer.

It is preferred that the surface free energy of the reflection-preventing film of the invention is from 15 to 26 mN/m and the coefficient of dynamic friction is from 0.05 to 0.20 for controlling moisture permeability, more preferably the surface free energy is from 17 to 22 mN/m and the coefficient of dynamic friction is from 0.07 to 0.15.

(Electrical Conductivity)

It is preferred for the antireflective film in the invention to have electrical conductivity as shown below irrespective of the above and later liquid crystal modes.

That is, it is preferred that the perpendicular peeling electrification measured at ordinary temperature and ordinary humidity with either triacetyl cellulose (TAC) or polyethylene terephthalate (PET) is from −200 pc (pico-coulomb)/cm$^2$ to +200 pc (pico-coulomb)/cm$^2$, more preferably from −100 pc/cm$^2$ to +100 pc/cm$^2$, and more preferably from −50 pc/cm$^2$ to +50 pc/cm$^2$. Here, the unit of pc (pico-coulomb) is $10^{-12}$ coulomb.

More preferably, the perpendicular peeling electrification measured at ordinary temperature and 10% RH is from −100 pc/cm² to +100 pc/cm², more preferably from −50 pc/cm² to +50 pc/cm², and most preferably 0 pc/cm².

The measuring method of the perpendicular peeling electrification is as follows.

A measuring sample is in advance allowed to stand in the environment of measuring temperature and humidity for 2 hours or more. A measuring apparatus comprises a table on which a measuring sample is put, and a head for holding the opposite film and capable of repeating pressing and peeling on the measuring sample from the upside, and an electrometer for measuring the quantity of electrification is coupled to the head. A antireflective film to be measured is put on the table, and TAC or PET is attached to the head. The measuring part of the sample is destaticized, and the head is pressed against the sample and peeled repeatedly, the value of electrification is read at the first peeling time and the fifth peeling time and these values are averaged. This procedure is repeated with three new samples, all the values are averaged and this is taken as the perpendicular peeling electrification.

There are cases where samples are charged with electricity in a plus quantity or a minus quantity according to the opposite films and the kind of measuring samples, but the problem is the greatness of the absolute value.

Further, the absolute value of electrification generally becomes greater in a low humidity environment. Since the antireflective film in the invention is also small in this absolute value, the film is preferred as the protective film of a polarizing plate.

By bringing the absolute value of perpendicular peeling electrification at ordinary temperature and 10% RH into the above range, the antireflective film in the invention is excellent in dust-proofness, so that preferred.

By adjusting the proportion of various elements of the surface of the reflection-preventing film, the absolute value of perpendicular peeling electrification can be brought into the above range.

When the reflection-preventing film in the invention is used as the polarizing plate on the visible side of the liquid crystal display of a liquid crystal mode, such as TN or OCB, the surface resistance value of the protective film is preferably $1 \times 10^{11} \Omega/\square$ or more. By making the absolute value of perpendicular peeling electrification small, the grade of image display does not lower while maintaining dust-proofness. The measuring method of surface resistance value is a circular electrode method described in JIS. That is, the electric current value of one minute after the application of voltage is read, and surface resistance value (SR) is found therefrom.

<Transparent Support>

It is preferred to use plastic films as the transparent support of the reflection-preventing film of the invention. The examples of the polymers to form plastic films include cellulose ester (e.g., triacetyl cellulose, diacetyl cellulose), polyamide, polycarbonate, polyester (e.g., polyethylene terephthalate, polyethylene naphthalate), polystyrene, polyolefin, norbornene resin (e.g., Arton, trade name, manufactured by JSR Corporation), and amorphous polyolefin (Zeonex, trade name, manufactured by Zeon Corporation). Of these polymers, triacetyl cellulose, polyethylene terephthalate and polyethylene naphthalate are preferred, and triacetyl cellulose is particularly preferred. When the antireflective film of the invention is used for a liquid crystal display, the film is arranged at the outermost surface of the display by a means of providing an adhesive layer on one side of the film and the like. In the case where triacetyl cellulose is used as the transparent support, since triacetyl cellulose is used as the protective film for protecting the polarizing sheet of the polarizing plate, it is preferred to use the reflection-preventing film of the invention as the protective film as it is in view of the cost.

It is preferred for a reflection-preventing film to have a transparent substrate (a transparent support) exclusive of the case where a reflection-preventing film is directly provided on a CRT image display surface and the surface of a lens. The light transmittance of a transparent substrate is preferably 80% or more, more preferably 86% or more. The haze value of a transparent substrate is preferably 2.0% or less, more preferably 1.0% or less. The refractive index of a transparent substrate is preferably from 1.4 to 1.7. As a transparent substrate, plastic films are preferred to a glass plate. The examples of the materials of plastic films include cellulose ester, polyamide, polycarbonate, polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g., syndiotactic polystyrene), polyolefin (e.g., polypropylene, polyethylene, polymethylpentene), polysulfone, polyether sulfone, polyallylate, polyether imide, polymethyl methacrylate and polyether ketone. Of these, cellulose ester, polycarbonate, polyethylene terephthalate and polyethylene naphthalate are preferred. In particular, when a transparent substrate is used in a liquid crystal display, cellulose acylate film is preferably used. Cellulose acylate is manufactured from cellulose by esterification.

The support of cellulose acylate film of the invention has a thickness of from 30 to 120 μm, preferably from 30 to 100 μm, and more preferably from 30 to 80 μm. When the film thickness is in the above range, breaking of the support and generation of wrinkles in the manufacture are suppressed, the thickness of a polarizing plate and a display can be reduced, and excellent optical characteristics, economic advantages, productivity and processing efficiency are ensured.

A cellulose acylate film for use in the invention as the support is a long film in a roll state having a length of from 100 to 5,000 m, a width of from 0.7 to 2 m. A antireflective film, a protective film of a polarizing plate and an image display can be made thin and light weight by using the film, excellent optical characteristics, such as the improvement of contrast and the nominal brightness by the increase of transmittance, can be stably obtained, and a wide and long support can be easily handled without causing a problem of, e.g., generation of wrinkles.

The fluctuation width of the film thickness is within ±3%, preferably within ±2.5%, more preferably within ±1.5%. When the fluctuation width is in this range, the thickness of the support substantially does not influence the reflection preventing properties.

To make the fluctuation width of a film thickness within ±3%, (1) not containing a low molecular weight polymer (an oligomer) of cellulose acylate, (2) controlling the concentration and viscosity, in casting, of the solution (dope), obtained by dissolving a polymer film-forming composition containing cellulose acylate as the main component in an organic solvent, and (3) controlling the drying temperature of the film surface and the air quantity and air direction when drying air is used in drying process, are effective methods. A dissolving process, a casting process and a drying process are described in the item of "Manufacturing method of cellulose acylate film" later.

The cellulose acylate film for use in the invention has a curling value in the width direction of from −7/m to +7/m, preferably from −5/m to +5/m. In providing a antireflective layer on a long and wide cellulose acylate film (for example, a long film having a length of 100 to 5,000 m and a width of 0.7 to 1.5 m), which is described later, handling of the film becomes easy and breaking of the film is suppressed when the curling value in the width direction is in the above range. In addition, generation of dusts due to strong contact of the film with conveying roller at edge part or central part, and adhesion of foreign matters to the film can be prevented, further, the frequency of point defect and coating streak of a antireflective film and a polarizing plate can be confined to the tolerance. By specifying the curling value to the above range, entering of bubbles during sticking of a polarizing sheet can be prevented.

The curling value can be measured according to the measuring method provided by American National Standards Institute (ANSI/ASCPH1.29-1985).

As the celluloses of the materials of cellulose acylate films for use in the invention, cotton linter, kenaf, and wood pulp (hardwood pulp, softwood pulp) are known, and cellulose esters obtained from any material cellulose can be used, and mixture of cellulose materials may be used as the case may be.

Cellulose acylate is manufactured from cellulose by esterification, however, not that the above particularly preferred celluloses are used as they are, but linters, kenafs and pulps are refined and used.

In the invention, cellulose acylate means carboxylic esters having from 2 to 22 total carbon atoms of cellulose.

As the acyl groups having from 2 to 22 carbon atoms of cellulose acylates for use in the invention, aliphatic groups or aryl groups may be used with no particular limitation, e.g., alkylcarbonyl ester, alkenylcarbonyl ester, cycloalkyl-carbonyl ester, aromatic carbonyl ester and aromatic alkylcarbonyl ester of celluloses are exemplified, and each of which may further have a substituted group. Of these groups, as preferred acyl groups, acetyl, propionyl, butanoyl, heptanoyl, hexanoyl, octanoyl, decanoyl, dodecanoyl, tridecanoyl, tetradecanoyl, hexadecanoyl, octadecanoyl, cyclohexanecarbonyl, adamantanecarbonyl, oleoyl, phenyl-acetyl, benzoyl, naphthylcarbonyl and cinnaoyl groups can be exemplified. Of these groups, more preferred acyl groups are acetyl, propionyl, butanoyl, pentanoyl, hexanoyl, cyclohexanecarbonyl, dodecanoyl, octadecanoyl, olcoyl, benzoyl, naphthylcarbonyl and cinnamoyl.

The synthesizing methods of cellulose acylate are described in detail in Hatsumei Kyokai Kokai Giho, Kogi No. 2001-1745 (published by Hatsumei Kyokai, Mar. 15, 2001), on page 9.

It is preferred that the degree of substitution of cellulose to hydroxyl groups of the cellulose acylate in the invention should satisfy the following formulae (I) and (II).

$$2.3 \leq SA' + SB' \leq 3.0 \qquad (I)$$

$$0 \leq SA' \leq 3.0 \qquad (II)$$

Here, SA' represents the degree of substitution by acetyl groups substituting for the hydrogen atoms of the hydroxyl groups of cellulose, and SB' represents the degree of substitution by acyl groups having from 3 to 22 carbon atoms and substituting for the hydrogen atoms of the hydroxyl groups of cellulose. In addition, SA represents acetyl groups substituting for the hydrogen atoms of the hydroxyl groups of cellulose, and SB represents acyl groups having from 3 to 22 carbon atoms substituting for the hydrogen atoms of the hydroxyl groups of cellulose.

Glucose units having β-1,4 bonding that constitutes cellulose have free hydroxyl groups at the 2-, 3- and 6-positions. Cellulose acylate is a polymer obtained by the esterification of a part or all of these hydroxyl groups by acyl groups. The degree of substitution of acyl groups means the rate of the esterification of cellulose with each of the 2-, 3- and 6-positions (esterification of 100% with each position is represented by the degree of substitution 1).

In the invention, the sum total of the degrees of substitutions of SA and SB (SA'+SB') is more preferably from 2.6 to 3.0, and particularly preferably from 2.80 to 3.00.

The degree of substitution of SA (SA') is more preferably from 1.4 to 3.0, and particularly preferably from 2.3 to 2.9.

It is preferred that the following equation (II') is satisfied at the same time.

$$0 \leq SB'' \leq 1.2 \qquad (II')$$

Here, SB" represents acyl groups having 3 or 4 carbon atoms substituting for the hydrogen atoms of the hydroxyl groups of cellulose.

Preferably, 28% or more of SB" are the substituents of the hydroxyl groups at the 6-positio, more preferably 30% or more are the substituents of the hydroxyl groups at the 6-positio, still more preferably 31% or more, and particularly preferably 32% or more are the substituents of the hydroxyl groups at the 6-positio. Further, cellulose acylate films in which the sum total of the degrees of substitutions of SA' and SB" at the 6-position of cellulose acylate is 0.8 or more, preferably 0.85 or more, and particularly preferably 0.90 or more, are also exemplified as preferred cellulose acylate films. By using these cellulose acylate, a solution having good solubility can be prepared and, in particular, a preferred solution can be manufactured in a non-chlorine organic solvent.

The degree of substitution can be obtained by calculation from the measurement of the degree of bonding of fatty acids bonded to the hydroxyl groups in cellulose. Measurement can be performed based on ASTM D-817-91 and ASTM D-817-96.

The state of the substitution of acyl groups on hydroxyl groups can be measured by $^{13}$C-NMR method.

It is preferred that the polymer components constituting the cellulose acylate film of the invention substantially comprise cellulose acylate having the above definition. "Substantially" means 55 weight % or more of the entire polymer component, preferably 70 weight % or more, and more preferably 80 weight % or more. Cellulose acylate may be used alone or two or more kinds may be used in combination.

The degree of polymerization of cellulose acylate preferably used in the invention is from 200 to 700 in viscosity average polymerization degree, preferably from 230 to 550, more preferably from 230 to 350, and particularly preferably from 240 to 320 in viscosity average polymerization degree. A viscosity average polymerization degree can be measured according to the limiting viscosity method by Uda et al. (Kazuo Uda and Hideo Saito, Sen'i Gakkai-Shi (Bulletin of Association of Fibers), Vol. 18, No. 1, pp. 105 to 120, (1962)). Details thereof are also disclosed in JP-A-9-95538.

The number average molecular weight Mn of the cellulose acylate is preferably in the range of from $7 \times 10^4$ to $25 \times 10^4$, more preferably from $8 \times 10^4$ to $15 \times 10^4$. The ratio of the weight average molecular weight Mw and n, Mw/Mn, of the cellulose acylate is preferably from 1.0 to 5.0, more preferably from 1.0 to 3.0. The average molecular weight and the molecular weight distribution of cellulose acylate can be measured with a high performance liquid chromatography, from which Mn and Mw, and Mw/Mn can be computed.

Cellulose acylates satisfying the above formulae (I) and (II) are preferably used for the cellulose acylate film of the invention.

It is preferred for the cellulose acylate film according to the invention to contain hydrophobic fine particles for improving the mechanical strength and the dimensional stability of the film, and improving moisture resisting properties. The primary average particle size of the fine particles is preferably from 1 to 100 nm from the viewpoint of suppressing the haze value, and the apparent specific gravity of the fine particles is preferably 70 g/liter or more. The addition amount of the fine particles is from 0.01 to 10 parts by weight to 100 parts by weight of the cellulose acylate, particularly preferably from 0.05 to 7 parts by weight.

The specific examples of preferred fine particles as inorganic compounds include compounds containing silicon, silicon dioxide, titanium oxide, zinc oxide, aluminum oxide, barium oxide, zirconium oxide, strontium oxide, antimony oxide, tin oxide, tin oxide-antimony, calcium carbonate, talc, clay, calcined caolin, calcined calsium silicate, hydrate calcium silicate, aluminum silicate, magnesium silicate, calcium phosphate, ITO, and zinc antimonate. Inorganic compounds containing silicon and zirconium oxide are more preferred. Silicon dioxide is particularly preferably used for the capability of suppressing the haze increase of the cellulose acylate film.

The fine particles are preferably surface-treated with hydrophobitization treatment. As the surface treating compounds, organic compounds having polar groups having the affinity with the surfaces of the fine particles and coupling agents are preferably used.

(Plasticizer)

A plasticizer is a component added for giving flexibility to the cellulose acylate film, for improving dimensional stability, moisture resisting properties and for reducing curling. As the plasticizers for use in the invention, conventionally known plasticizers as the plasticizers for cellulose acylate may be used in combination. As these conventional plasticizers, e.g., phosphoric ester plasticizers, phthalic ester plasticizers, and glycolate plasticizers can be preferably used. As the phosphoric ester plasticizers, triphenyl phosphate, tricresyl phosphate, cresyl diphenyl phosphate, octyl diphenyl phosphate, diphenyl vinyl phosphate, trioctyl phosphate, and tributyl phosphate, as the phthalic ester plasticizers, diethyl phthalate, dimethoxyethyl phthalate, dimethyl phthalate, dioctyl phthalate, dibutyl phthalate, and di-2-ethylhexyl phthalate, and as the glycolate plasticizers, butylphthalylbutyl glycolate, ethylphthalylethyl glycolate, and methylphthalyl-ethyl glycolate can be preferably used. It is preferred that plasticizers are dispersed on stably in a film, excellent in exuding properties and hardly hydrolyzable.

As further preferred plasticizers for use in the invention, plasticizers having a boiling point of 200° C. or higher and in a liquid state at 25° C., and solids having a melting point of from 25 to 250° C. are exemplified. As still more preferred plasticizers, plasticizers having a boiling point of 250° C. or higher and in a liquid state at 25° C., and solids having a melting point of from 25 to 200° C. are exemplified. When a plasticizer is a liquid, refining is performed by distillation under reduced pressure, and the higher the degree of vacuum, the more preferred. In the invention, it is particularly preferred to use plasticizers having vapor pressure of 1,333 Pa or less at 200° C., more preferably compounds having vapor pressure of 667 Pa or less, and still more preferably vapor pressure of from 133 to 1 Pa.

For the improvement of adhesion properties, it is preferred that the cellulose acylate film in the invention has moisture permeability of from 20 to 300 (g/m², 24 h, 25° C., 90% RH), more preferably from 20 to 260 (g/m², 24 h, 25° C., 90% RH), and most preferably from 20 to 200 (g/m², 24 h, 25° C., 90% RH).

The exuding property in the invention means the property that the weight of a film reduces by the precipitation or evaporation of the additives, e.g., plasticizers, out of the film under high temperature high humidity environment. Specifically, the weight of a sample is measured after being allowed to stand at 23° C., 55% RH for one day, and then allowed the sample at 80° C., 90% RH for two weeks, further allowed to stand for two weeks, still further allowed to stand at 23° C., 55% RH for one day, and then the weight of the sample is measured, and the exuding property is computed by the equation shown below:

Exuding property={(weight of sample before treatment−weight of sample after treatment)/weight of sample before treatment}×100(%)

The exuding property is preferably 2.0% or less, more preferably 1.0% or less, still more preferably 0.5% or less, and still further preferably 0.1% or less.

In the next place, aliphatic polyhydric alcohol esters that are used as plasticizers in the invention are described in detail. The aliphatic polyhydric alcohol esters in the invention are esters of divalent or higher aliphatic polyhydric alcohol and one or more monocarboxylic acids.

(Aliphatic Polyhydric Alcohol)

The aliphatic polyhydric alcohols which are used in the invention are divalent or higher alcohols and represented by the following formula (7):

$R^1\text{—}(OH)_n$ wherein $R^1$ represents an n-valent aliphatic organic group, n represents an integer of 2 or more, and a plurality of OH groups each represents an alcoholic or phenolic hydroxyl group.

As the n-valent aliphatic organic groups, an alkylene group (e.g., a methylene group, an ethylene group, a trimethylene group, a tetramethylene group), an alkenylene group (e.g., an ethenylene group), an alkynylene group (e.g., an ethynylene group), a cycloalkylene group (e.g., a 1,4-cyclohexanediyl group), an alkanetriyl group (e.g., a 1,2,3-propanetriyl group) are exemplified. The n-valent aliphatic organic groups include those having a substituent (e.g., a hydroxyl group, an alkyl group, a halogen atom). n is preferably from 2 to 20.

The examples of preferred polyhydric alcohols include, e.g., adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylol-ethane and xylitol. Triethylene glycol, tetraethylene glycol, dipropylene glycol, tripropylene glycol, sorbitol, trimethylolpropane and xylitol are particularly preferred.

(Monocarboxylic Acid)

The monocarboxylic acids in the polyhydric alcohols in the invention are not especially restricted and well-known aliphatic monocarboxylic acids, alicyclic monocarboxylic acids, and aromatic monocarboxylic acids can be used. It is preferred to use alicyclic monocarboxylic acids and aromatic monocarboxylic acids from the point of capable of improving moisture permeability and retentability. As the preferred examples of monocarboxylic acids, the following shown acids can be exemplified but the invention is not limited thereto. As the aliphatic monocarboxylic acids, fatty acids having from 1 to 32 carbon atoms and a straight chain or side chain can be preferably used. The carbon atom is more preferably from 1 to 20, and still more preferably from 1 to 10. When acetic acid is used, the compatibility with cellulose ester is preferably increased, and it is also preferred to use the mixture of acetic acid and other monocarboxylic acids.

As preferred aliphatic monocarboxylic acids, saturated fatty acids, e.g., acetic acid, propionic acid, butyric acid, valeric acid, capric acid, enanthic acid, caprylic acid, pelargonic acid, capric acid, 2-ethylhexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and unsaturated fatty acids, e.g., undecylenic acid, oleic acid, sorbic acid, linoleic acid, linolenic acid and arachidonic acid are exemplified. Each of these monocarboxylic acids may further have a substituent.

As preferred alicyclic monocarboxylic acids, carboxylic acids, e.g., cyclopentanecarboxylic acid, cyclohexane-carboxylic acid, cyclooctanecarboxylic acid, bicyclononanecarboxylic acid, bicyclodecanecarboxylic acid, norbornenecarboxylic acid, and adamantanecarboxylic acid, and derivatives of these carboxylic acids can be exemplified. As preferred aromatic monocarboxylic acids, aromatic monocarboxylic acids obtained by introducing an alkyl group to the benzene ring of benzoic acid, e.g., benzoic acid and toluic acid, aromatic monocarboxylic acids having two or more benzene rings, e.g., biphenylcarboxylic acid, naphthalenecarboxylic acid and tetrahydronaphthalenecarboxylic acid, and derivatives of these carboxylic acids can be exemplified. Benzoic acid is particularly preferred.

(Polyhydric Alcohol Ester)

The molecular weight of the polyhydric alcohol esters for use in the invention is not particularly restricted, but the molecular weight is preferably from 300 to 1,500, more preferably from 350 to 750. The molecular weight is preferably larger in the light of exuding property, and preferably smaller in the point of compatibility with cellulose ester.

The carboxylic acids in the polyhydric alcohol esters in the invention may be one kind, or may be a mixture of two or more kinds. The OH groups in the polyhydric alcohol may be entirely esterified, or a part of the OH groups may remain as OH groups. It is preferred to have three or more aromatic rings or cycloalkyl rings in the molecule.

The examples of polyhydric alcohol esters for use in the invention are shown below.

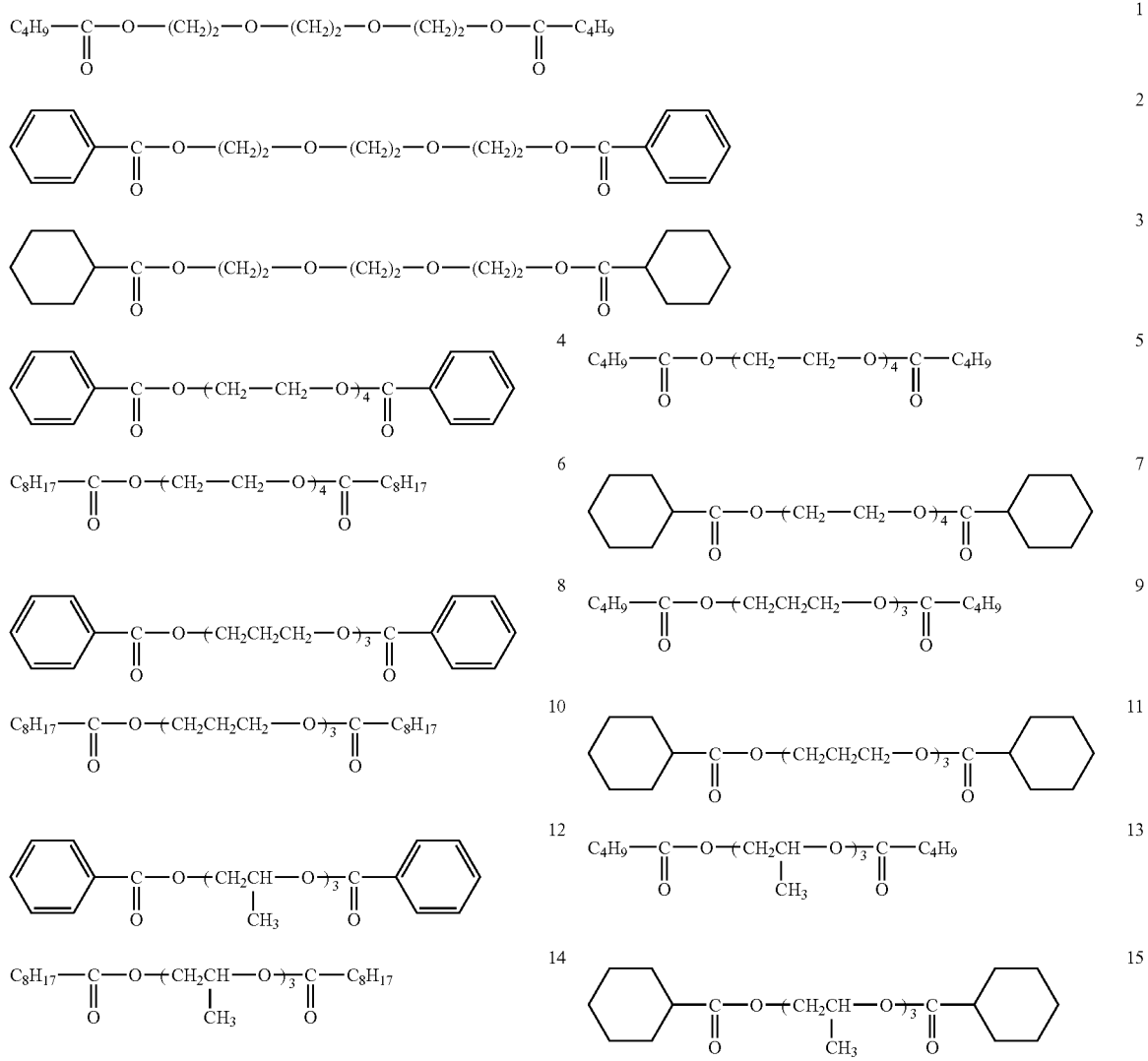

-continued
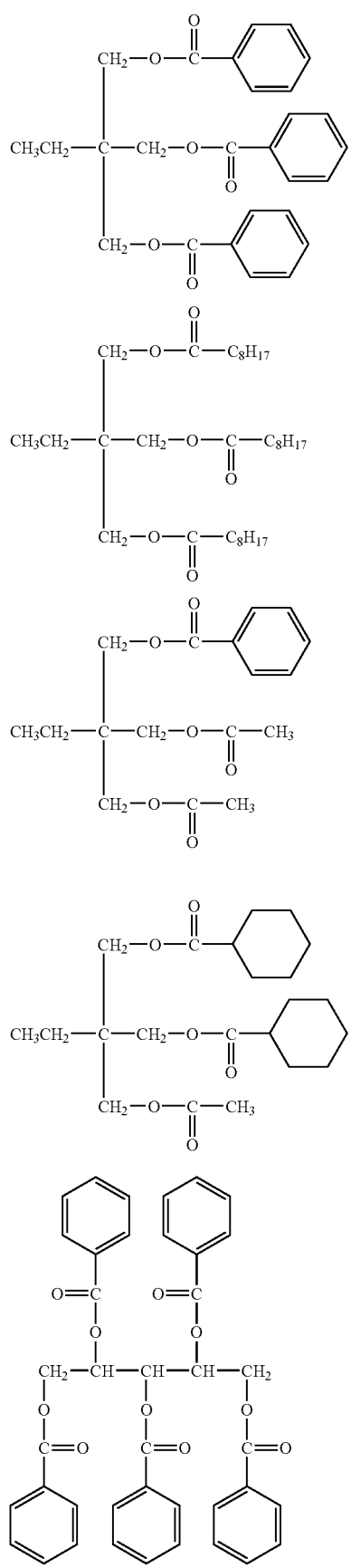
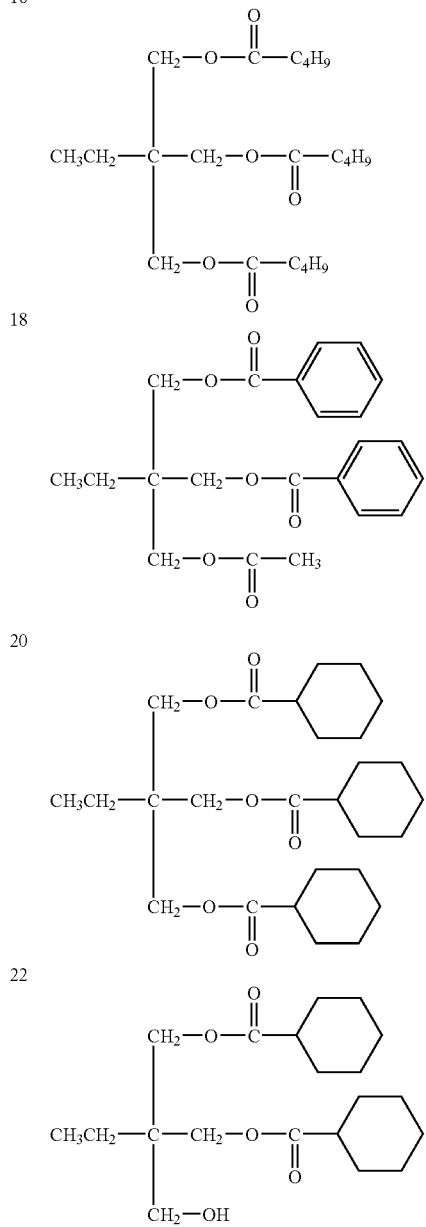

-continued
26
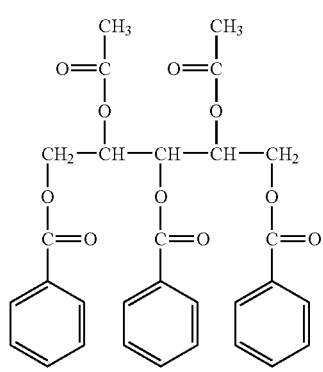
27
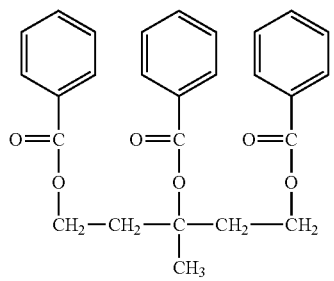
28
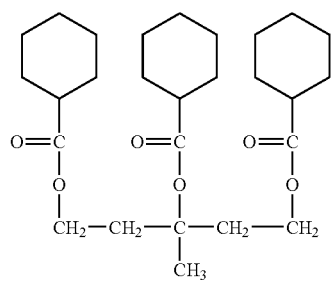
29
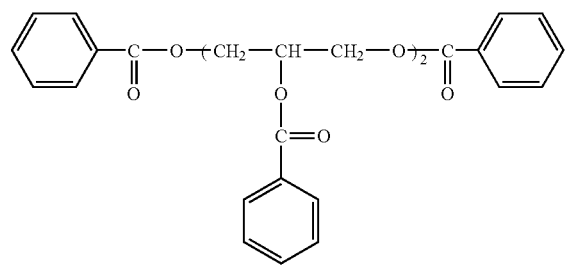
30
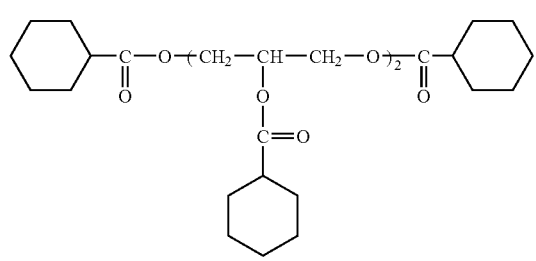
31
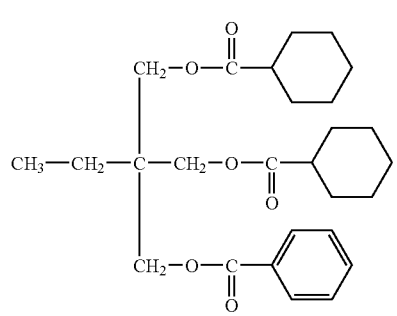
32
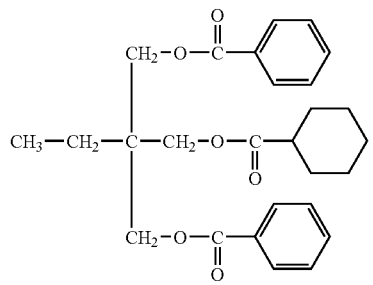
33
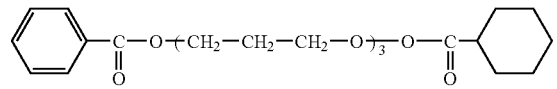
34
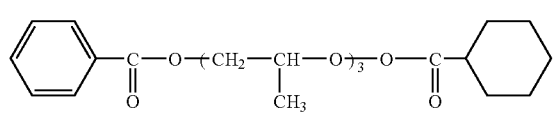
35
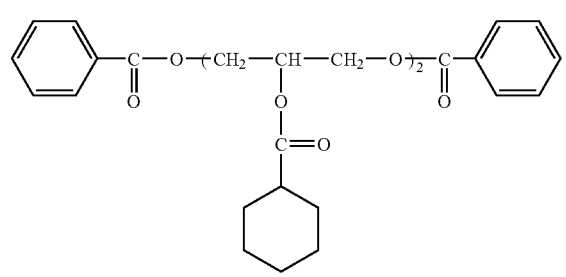

The kinds and addition amounts of polyhydric alcohol esters influence the physical properties of the film, such as moisture permeability, in particular exuding property, and adhesion properties, so that these are determined from comprehensive viewpoint.

The addition amount is preferably from 3 to 30 weight % to the cellulose acylate, more preferably from 5 to 25 weight %, and particularly preferably from 5 to 20 weight %.
(Ultraviolet Absorber)

The cellulose acylate film in the invention contains ultraviolet absorbers for the purpose of the improvement of lightfastness of the film itself, for the purpose of prevention of deterioration of liquid crystal compounds of a polarizing plate and an image display, and organic EL compounds of image display members.

It is preferred to use ultraviolet absorbers excellent in absorbing properties of ultraviolet rays of the wavelengths of 370 nm or less from the point of the deterioration prevention of liquid crystal, small in absorption of the visible rays of the wavelengths of 400 nm or more as far as possible from the point of good image displaying property.

For example, oxybenzophenone compounds, benzotriazole compounds, salicylic ester compounds, benzophenone compounds, cyano acrylate compounds and nickel complex compounds are exemplified as such compounds, but the invention is not limited thereto.

The specific examples of ultraviolet absorbers are enumerated below, but the invention is not limited to these compounds.

2-(2'-Hydroxy-5'-methylphenyl)benzotriazole, 2-(2'-hydroxy-3',5'-di-tert-butylphenyl)benzotriazole, 2-(2'-hydroxy-3'-tert-butyl-5Y-methylphenyl)benzotriazole, 2-(2'-hydroxy-3',5'-di-tert-butylphenyl)-5-chlorobenzotriazole, 2-[2'-hydroxy-3'-(3",4",5",6"-tetrahydrophthalimidomethyl)-5'-methylphenyl]benzotriazole, 2,2-methylenebis[4-(1,1,3,3-tetramethylbutyl)-6-(2H-benzotriazol-2-yl)phenol], 2-(2'-hydroxy-3'-tert-butyl-5'-methylphenyl)-5-chlorobenzotriazole, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane), 2,4-bis-(n-octylthio)-6-(4-hydroxy-3,5-di-tert-butylanilino)-1,3,5-triazine, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, pentaerythritil-tetrakis[3-(3,5-di-tert-butyl-4-hydroxyphenyl)propionate], triethylene glycol bis[3-(3-tert-butyl-5-methyl-4-hydroxyphenyl) propionate], 1,6-hexanediol-bis[3-(3,5-di-tert-butyl-4-hydroxyphenyl)propionate], 2,4-bis(n-octylthio)-6-(4-hydroxy-3,5-di-tert-butylanilino)-1,3,5-triazine, 2-(2'-hydroxy-4'-hexyloxyphenyl)-4,6-diphenyltriazine, 2,2-thiodiethylenebis[3-(3,5-di-tert-butyl-4-hydroxyphenyl) propionate], octadecyl-3-(3,5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, tris(3,5-di-tert-butyl-4-hydroxybenzyl)isocyanurate, phenylsalicylate, p-tert-butylsalicylate, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane-2'-ethylhexyl-2-cyano-3,3-diphenyl acrylate, and ethyl-2-cyano-3-(3',4'-methylenedioxyphenyl)-2-acrylate.

In addition, ultraviolet absorbers disclosed in JP-A-6-148430 can also be preferably used.

Hydrazine-based metallic deactivators, e.g., N,N'-bis-[3-(3,5-di-tert-butyl-4-hydroxyphenyl)propionyl]hydrazine, and phosphorus-based process stabilizers, e.g., tris(2,4-di-tert-butylphenyl)phosphite can also be used in combination.

The addition amount of these stabilizing compounds is preferably from 0.0001 to 1.0 weight part to 100 parts by weight of cellulose acylate, more preferably from 0.001 to 0.1 weight part.

Ultraviolet absorbers according to the invention preferably have transmittance of 20% or less at wavelength of 370 nm, preferably 10% or less, and more preferably 5% or less.

Ultraviolet absorbers may be used two or more in combination. Ultraviolet absorbers may be added to a dope as a solution dissolved in organic solvents such as alcohol, methylene chloride or dioxoran, or may be directly added to a dope. Inorganic powders insoluble in organic solvents are dispersed in an organic solvent and cellulose ester with a dissolver or a sand mill and then added.

In the invention, the addition amount of ultraviolet absorbers is from 0.1 to 15 parts by weight to 100 parts by weight of the cellulose acylate, preferably from 0.5 to 10 parts by weight, and more preferably from 0.8 to 7 parts by weight.

As ultraviolet absorbers in the invention, ultraviolet absorbing polymers having little adverse effects, e.g., adhesion failure due to precipitation and the increase of the haze value, are also preferably used. These are copolymers of an ultraviolet-absorbing monomer having a molar absorption coefficient of 4,000 or more at wavelength of 380 nm and an ethylenic unsaturated monomer. Ultraviolet-absorbing copolymers having a weight average molecular weight of from 2,000 to 20,000 are preferred in the point that the precipitation of their own is small.

When the molar absorption coefficient at wavelength of 380 nm is 4,000 or more, ultraviolet-absorbing property is good and sufficient effect of shielding ultraviolet rays can be obtained, so that the optical film itself is not colored yellow and the transparency of the optical film increases.

As the ultraviolet-absorbing monomers for use in ultraviolet-absorbing copolymers, it is preferred to use ultraviolet-absorbing monomers having the molar absorption coefficient at wavelength 380 nm of 4,000 or more, preferably 8,000 or more, and more preferably 10,000 or more. When the molar absorption coefficient at wavelength 380 nm is less than 4,000, a great amount of additives are required to obtain desired ultraviolet-absorbing property, which results in the increase of the haze, the reduction of transparency due to precipitation of the ultraviolet absorber, and great tendency of the reduction of film strength.

As the ultraviolet-absorbing monomers for use in the ultraviolet-absorbing copolymers, it is necessary that the ratio of the molar absorption coefficient at 400 nm to the molar absorption coefficient at 380 nm is 20 or more, and when the ratio is less than 20, coloring of the film is great, so that it is not suitable for optical film use.

That is, for obtaining desired ultraviolet-absorbing property by suppressing the absorption of light in the vicinity of 400 nm which is nearer to visible region, it is preferred in the invention to use ultraviolet-absorbing monomers having high ultraviolet-absorbing property.

a. Ultraviolet Absorbing Monomer

As the ultraviolet absorbing monomers, salicylic acid ultraviolet absorbers (phenyl salicylate, p-tert-butyl salicylate, etc.), benzophenone ultraviolet absorbers (2,4-dihydroxybenzophenone, 2,2'-dihydroxy-4,4'-dimethoxybenzophenone, etc.), benzotriazole ultraviolet absorbers (2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-anylphenyl)benzotriazole, etc.), cyano acrylate ultraviolet absorbers (2'-ethylhexyl-2-cyano-3,3-diphenyl acrylate, ethyl-2-cyano-3-(3',4'-methylenedioxyphenyl) acrylate, etc.), triazine ultraviolet absorbers (2-(2'-hydroxy-4'-hexyloxyphenyl)-4,6-diphenyltriazine, etc.), and the compounds disclosed in JP-A-58-185677 and JP-A-59-149350 are known.

As the ultraviolet-absorbing monomers in the invention, it is preferred to arbitrarily select fundamental skeletons from the above-described various kinds of well-known ultraviolet-absorbers, introduce substituents containing an ethylenic unsaturated bond, to make polymerizable compounds, and select and use compounds having a molar absorption coefficient of 4,000 or more at wavelength 380 nm. As the ultraviolet-absorbing monomers in the invention, benzotriazole compounds are preferably used for storage stability.

A particularly preferred ultraviolet-absorbing monomer is represented by the following formula (b):

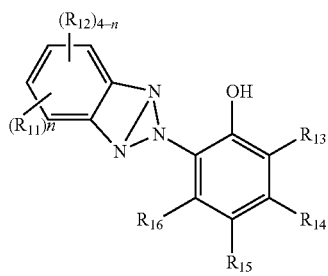

wherein $R_{11}$ represents a halogen atom, or a group substituted on the benzene ring via an oxygen atom, a nitrogen atom or a sulfur atom; $R_{12}$ represents a hydrogen atom, an aliphatic group, an aromatic group or a heterocyclic group; $R_{13}$, $R_{15}$ and $R_{16}$ each represents a hydrogen atom, an aliphatic group, an aromatic group or a heterocyclic group; and $R_{14}$ represents a group substituted on the benzene ring via an oxygen atom or a nitrogen atom, provided that at least any one of $R_{11}$ to $R_{16}$ has a group having the following structure as a partial structure; and n represents an integer of from 1 to 4.

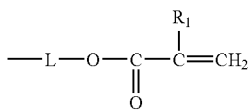

wherein L represents a divalent linking group; and $R_1$ represents a hydrogen atom or an alkyl group.

Preferred ultraviolet-absorbing monomers for use in the invention are enumerated below, but the invention is not limited thereto.

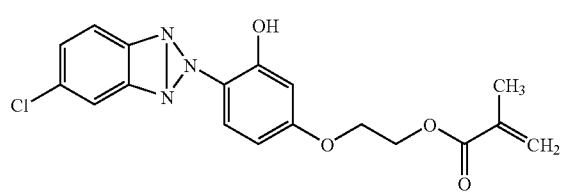
UVM-1

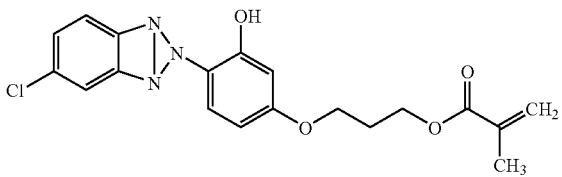
UVM-2

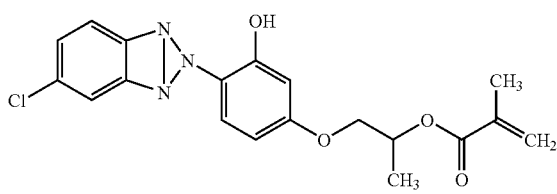
UVM-3

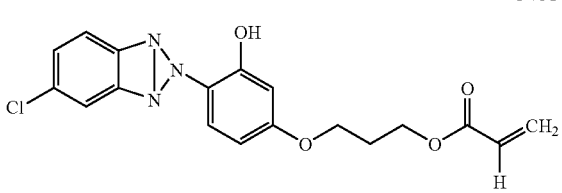
UVM-4

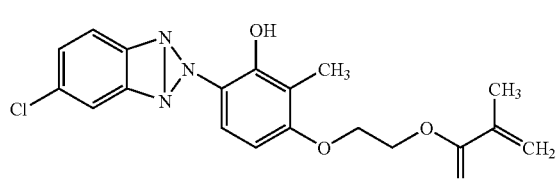
UVM-5

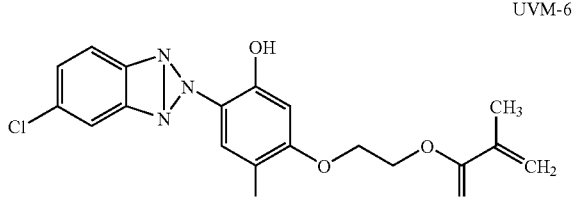
UVM-6

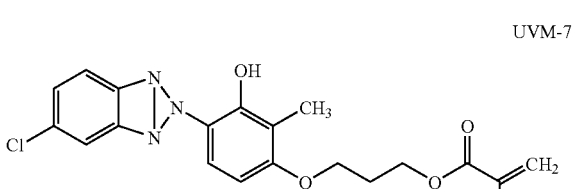
UVM-7

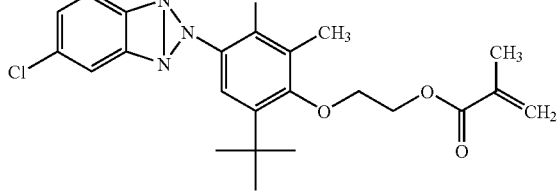
UVM-8

UVM-9
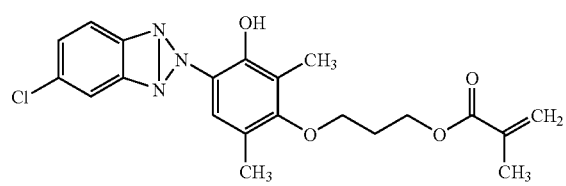

UVM-10
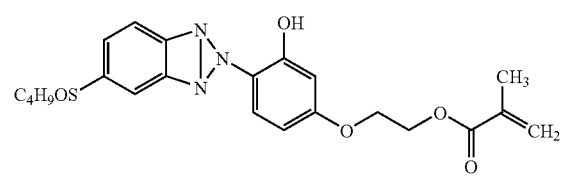

UVM-11
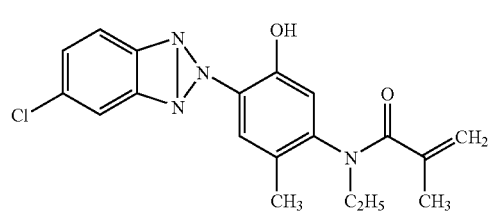

UVM-12
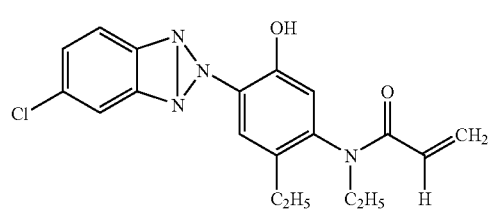

UVM-13
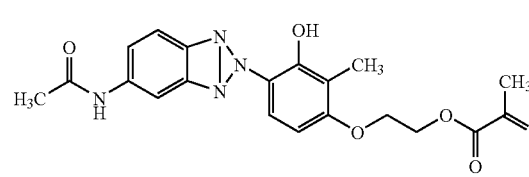

UVM-14
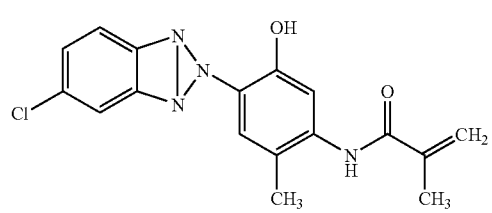

UVM-15
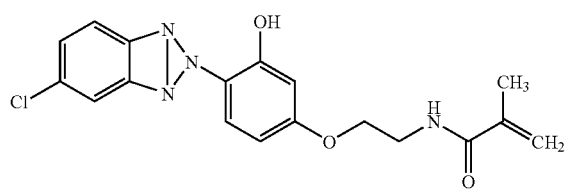

UVM-16
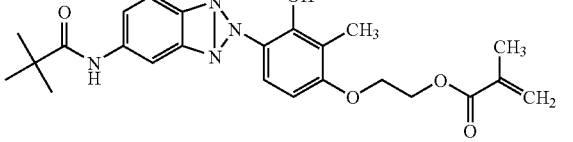

UVM-17
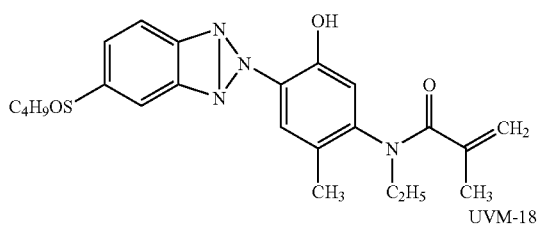

UVM-18
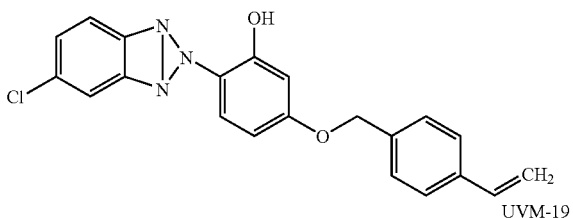

UVM-19
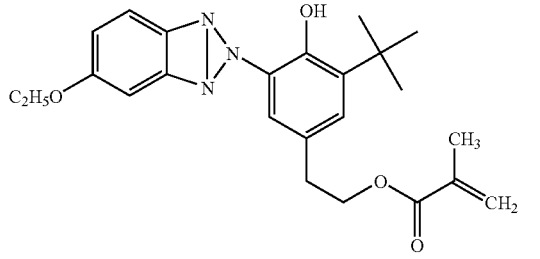

UVM-20 b. Polymer

Ultraviolet-absorbing copolymers for use in the invention are preferably copolymers of the above ultraviolet-absorbing monomers and ethylenic unsaturated monomers, and have a weight average molecular weight of from 2,000 to 20,000, more preferably from 7,000 to 15,000.

When the ultraviolet-absorbing polymer is a homopolymer of an ultraviolet-absorbing monomer, the homopolymer is followed by conspicuous increase of haze and great reduction of transparency, so that this is not suitable for optical film use. Further, a homopolymer of an ultraviolet-absorbing monomer is low in solubility in a solvent, so that this is inferior in the workability of film formation. In the case where the homopolymer has a weight average molecular weight of the above range, the compatibility with resins is good, so that exudation to the film surface and coloring do not occur even after the lapse of time.

As the ethylenic unsaturated monomers copolymerizable with the ultraviolet absorbing monomers, methacrylic acid and methacrylic ester derivatives (e.g., methyl methacrylate, ethyl methacrylate, propyl methacrylate, butyl methacrylate, i-butyl methacrylate, t-butyl methacrylate, octyl methacrylate, cyclohexyl methacrylate, 2-hydroxyethyl methacrylate, 2-hydroxypropyl methacrylate, tetrahydro-furfuryl methacrylate, benzyl methacrylate, dimethylamino-ethyl methacrylate, diethylaminoethyl methacrylate, etc.), acrylic acid and acrylic ester derivatives (e.g., methyl acrylate, ethyl acrylate, propyl acrylate, butyl acrylate, i-butyl acrylate, t-butyl acrylate, octyl acrylate, cyclohexyl acrylate, 2-hydroxyethyl acrylate, 2-hydroxy-propyl acrylate, tetrahydrofurfuryl acrylate, 2-ethoxyethyl acrylate, diethylene glycol ethoxylate acrylate, 3-methoxy-butyl acrylate, benzyl acrylate, dimethylaminoethyl acrylate, diethylaminoethyl acrylate, etc.), alkyl vinyl ether (e.g., methyl vinyl ether, ethyl vinyl ether, butyl vinyl ether, etc.), alkyl vinyl ester (e.g., vinyl formate, vinyl acetate, vinyl butyrate, vinyl caproate, vinyl stearate, etc.), acrylo-nitrile, vinyl chloride, styrene, etc., can be exemplified.

Of these ethylenic unsaturated monomers, acrylic ester and methacrylic ester having a hydroxyl group or an ether bond (e.g., 2-hydroxyethyl methacrylate, 2-hydroxypropyl methacrylate, tetrahydrofurfuryl methacrylate, 2-hydroxyethyl acrylate, 2-hydroxypropyl acrylate, tetrahydrofurfuryl acrylate, 2-ethoxyethyl acrylate, diethylene glycol ethoxylate acrylate, and 3-methoxybutyl acrylate) are preferred. These ethylenic unsaturated monomers can be used alone, or two or more may be mixed and copolymerized with ultraviolet-absorbing monomers.

The proportion of use amount of the ethylenic unsaturated monomers copolymerizable with the ultraviolet absorbing monomers is selected by considering the compatibility of the ultraviolet-absorbing copolymers to be obtained with transparent resins, the transparency and mechanical strength of the optical film, desired ultraviolet-absorbing property, the addition amount of copolymers, the increase of haze, and the solubility of the copolymers in solvents. It is preferred to blend both of them so that from 20 to 70 weight %, more preferably from 30 to 60 weight %, of the ultraviolet absorbing monomers are added to the ultraviolet-absorbing copolymers.

The ultraviolet-absorbing copolymers in the invention can be polymerized according to well-known methods, e.g., radical polymerization, anionic polymerization and cationic polymerization are exemplified. As the polymerization initiators of radical polymerization, azo compounds and peroxides are exemplified, specifically azobisisobutyro-nitrile (AIBN), azobisisobutyric diester derivatives, and benzoyl peroxides are exemplified. Polymerization solvents are not particularly limited, e.g., aromatic hydrocarbon solvents, e.g., toluene and chlorobenzene, halogenated hydrocarbon solvents, e.g., dichloroethane and chloroform, ether solvents, e.g., tetrahydrofuran and dioxane, amide solvents, e.g., dimethylformamide, alcohol solvents, e.g., methanol, ester solvents, e.g., methyl acetate and ethyl acetate, ketone solvents, e.g., acetone, cyclohexanone and methyl ethyl ketone, and aqueous solvents are exemplified. By the selection of solvents, solution polymerization of performing polymerization with uniform system, precipitation polymerization in which the formed polymer is precipitated, and emulsion polymerization of performing polymerization in a micellar state may also be applied to the invention.

The weight average molecular weight of the ultraviolet absorbing copolymers can be adjusted by well-known methods. As such a molecular weight-adjusting method, a method of adding a chain transfer agent, e.g., carbon tetrachloride, lauryl mercaptan, octyl thioglycolate, etc., is exemplified. The polymerization temperature is from room temperature to 130° C., preferably from 50 to 100° C.

The ultraviolet-absorbing copolymers are preferably mixed with cellulose acylate in a proportion of from 0.01 to 40 weight %, more preferably from 0.5 to 10 weight %. At this time, if the haze of the formed optical film is 0.5 or less, there are no limitations. The haze of the formed optical film is preferably 0.2 or less. It is more preferred that the haze of the formed optical film is 0.2 or less, and the transmittance at wavelength 380 nm is 10% or less.

When the ultraviolet-absorbing copolymers are mixed with transparent resins, if necessary, other low molecular weight compounds, high molecular weight compounds, and inorganic compounds can be used together. For example, the ultraviolet absorbing copolymers and other low molecular ultraviolet absorbers may be mixed with transparent resins at the same time, similarly, it is preferred that additives such as antioxidants, plasticizers and flame retardants are mixed at the same time.

(Other Additives)

In addition, other various additives suited to each use (e.g., a deterioration preventive (e.g., an antioxidant, a peroxide decomposer, a radical inhibitor, a metal deactivator, an acid capturer, amine), an optical anisotropy controller, a remover, an antistatic agent, an infrared absorber, etc.) can be added to the cellulose acylate composition of the invention in each preparing process, and these additives may be solids or oily matters. That is, the melting point and boiling point are not particularly restricted. Further, the compounds disclosed in JP-A-2001-194522 are used as infrared absorbing dyes.

These additives may be added at any time anywhere in manufacturing process of a dope, but a new process may be provided as the last process of manufacturing process of a dope for the addition of additives. The addition amount of each compound is not particularly restricted so long as each function can be exhibited. When the cellulose acylate film comprises multilayers, the kinds and addition amounts of additives may be different in each layer, and as disclosed in JP-A-2001-151902, this is a conventionally known technique. The details of this method are described in Hatsumei Kyokai Kokai Giho, Kogi No. 2001-1745 (published by Hatsumei Kyokai, Mar. 15, 2001), on pages 16 to 22, and materials described therein are preferably used. The addition amount of each additive is arbitrarily selected in the range of from 0.002 to 20 weight % in total composition of the cellulose acylate.

(Manufacturing Method of Cellulose Acylate Film)

The cellulose acylate film used as the support in the invention is preferably manufactured by a solvent cast method. In the solvent cast method, the cellulose acylate film is manufactured with a solution (a dope) obtained by dissolving cellulose acylate, etc. in an organic solvent.

(Preparing Process of Dope)

As the solvents used in the solvent cast method, organic solvents generally used in solvent cast methods can be used with no limitation, e.g., solvents having a solubility parameter of from 17 to 22 are preferred. Specifically, lower aliphatic hydrocarbon chlorides, lower aliphatic alcohols, ketones having from 3 to 12 carbon atoms, esters having from 3 to 12 carbon atoms, ethers having from 3 to 12 carbon atoms, aliphatic hydrocarbons having from 5 to 8 carbon atoms, and aromatic hydrocarbons having from 6 to 12 carbon atoms are exemplified.

Ethers, ketones and esters may have a cyclic structure. Compounds having two or more functional groups of any of ether, ketone and ester (i.e., —O—, —CO— and —COO—) can also be used as organic solvents. Further, organic solvents may have other functional groups, e.g., alcoholic hydroxyl groups. When the organic solvents have two or more kinds of functional groups, the carbon atom number will do in the range of the above preferable range of the carbon atom number of the compound having any of the functional group.

Specifically, the compounds described in the above Kogi No. 2001-1745, pp. 12 to 16 are exemplified.

In the invention, as the organic solvents, it is preferred to use mixed solvents of two or more organic solvents, and it is particularly preferred to use organic solvents of the mixtures of three or more solvents different from each other, wherein the first solvent is ketone having from 3 or 4 carbon atoms, and ester having from 3 or 4 carbon atoms or the mixture thereof, the second solvent is selected from ketones having from 5 to 7 and acetoacetate, and the third solvent is selected from alcohols having a boiling point of from 30 to 170° C. and hydrocarbons having a boiling point of from 30 to 170° C.

In particular, it is preferred to use mixed solvents comprising acetic esters, ketones and alcohols in a blending proportion of from 20 to 90 weight % of acetic esters, from 5 to 60 weight % of ketones, and from 5 to 30 weight % of alcohols, from the point of the solubility of cellulose acylate.

In the mixed solvent, the blending proportion of alcohols is preferably from 2 to 40 vol % in the entire solvent, more preferably from 3 to 30 vol %, and still more preferably from 5 to 20 vol %.

In the alcohols, mono-alcohol or di-alcohol having from 1 to 8 carbon atoms, and fluoro-alcohol having from 2 to 10 carbon atoms are preferred, and as more preferred alcohols, methanol, ethanol, 1-propanol, 2-propanol, 1-butanol, 2-butanol, tert-butanol, 1-pentanol, 2-methyl-2-butanol, cyclohexanol, ethylene glycol, 2-fluoroethanol, 2,2,2-trifluoroethanol and 2,2,3,3-tetrafluoro-1-propanol are exemplified. These alcohols may be used alone or two or more kinds may be mixed.

Non-halogen organic solvents not containing halogenated hydrocarbons, in particular, substantially non-chlorine solvents not containing chlorine atoms (hereinafter referred to as merely "non-chlorine solvents") are preferably used.

Halogenated hydrocarbons, e.g., methylene chloride, can be used technically with no problem, but from the aspects of global environment and working environment, it is preferred that organic solvents substantially do not contain halogenated hydrocarbons. "Substantially do not contain" means that the proportion of halogenated hydrocarbons in an organic solvent is less than 5 weight % (preferably less than 2 weight %). It is preferred that halogenated hydrocarbons, such as methylene chloride, are not detected at all from a manufactured cellulose acylate film.

As the examples of the non-chlorine solvents for use in the invention, the solvents disclosed in JP-A-2002-146043, paragraphs from [0021] to [0025] and JP-A-2002-146045, paragraphs from [0016] to [0021] are exemplified.

As the non-chlorine solvents, mixed solvents comprising at least one organic solvent selected from ether, ketone and ester having from 3 to 12 carbon atoms and alcohol, wherein the alcohol content is from 2 to 40 weight %, are preferred.

The above mixed solvents may contain aromatic or aliphatic hydrocarbons having from 5 to 10 carbon atoms in an amount of from 0 to 10 vol %. The examples of the hydrocarbons include cyclohexane, hexane, benzene, soluene and xylene.

For increasing the transparency of a film or accelerating the solubility, it is preferred to add fluoro-alcohols, other than the above organic solvents, to the dope in an amount of 10 weight % or less of the amount of entire organic solvents. As such fluoro-alcohols, the compounds disclosed in JP-A-8-143709, paragraph [0020] and JP-A-11-60807, paragraph [0037] are exemplified. These fluoro-alcohols may be used alone, or two or more may be used.

In preparing the dope in the invention, the reaction vessel may be filled with inert gas such as nitrogen gas.

Further, the viscosity of the dope just before film formation will do if casting is capable, the viscosity is generally preferably from 10 to 2,000 ps·s, particularly preferably from 30 to 400 ps·s.

With respect to the preparing methods of the dope, the method of dissolution is not particularly restricted, and dissolution may be carried out by any of room temperature dissolution, cooling dissolution, high temperature dissolution, or combination of these methods. The preparing method of the dope is disclosed in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-4-259511, JP-A-2000-273184, JP-A-11-323017 and JP-A-11-302388. The dissolving techniques of material polymers of supports in organic solvents disclosed in the above patents can be arbitrarily applied to the invention. When cellulose acylate is used as the polymer, the dope solution of cellulose acylate is generally subjected to concentration and filtration. The details of these are described in the above Kogi No. 2001-1745, p. 25. When dissolution is performed at high temperature, the dissolution temperature is higher than the boiling point of the organic solvents to be used in almost all the cases, so that organic solvents are used under pressure.

The above plasticizers, fine particles and, if necessary, other additives, e.g., retardation adjusting agents and ultraviolet absorbers are added to the dope.

(Adding and Mixing Methods of Fine Particles)

When fine particles are added to cellulose acylate, it is important that coarse particles are not present and particles are stably dispersed so as not to generate flocculation and precipitation. When these conditions are satisfied, methods are not particularly restricted and desired cellulose acylate dope can be obtained. A method of preparing the dispersion of fine particles different from the preparation of dope and mixing the dispersion with the dope is a preferable method.

Additives other than the fine particles may be added, e.g., at the stage of mixing cellulose acylate with a solvent, or may be added after the mixed solution of cellulose acylate and a solvent has been prepared. Further, fine particles may be added and mixed just before casting of dope by on-line screw type blending. These additives may be added directly, but it is preferred to dissolve them in advance in a solvent or a binder (preferably cellulose acylate), or may be dispersed and used as a stabilized solution according to cases.

(Film-Forming Process)

A manufacturing method of a film with a dope is described below. As the method and apparatus of manufacturing a cellulose acylate film, well-known solvent cast methods and solvent cast film-forming apparatus called a drum method or a band method are used.

A prepared dope (cellulose acylate solution) is taken out of a dissolver (dissolving tank), and once stored in a storage vessel, and foams contained in the dope are defoamed as the final preparation process. It is important to remove agglomerates and foreign matters from the prepared dope by accurate filtration. Specifically, it is preferred to use a filter having a pore diameter as small as possible in the range of not removing the components in the dope. In filtration, a filter having absolute filtration accuracy of from 0.1 to 100 µm, more preferably from 0.1 to 25 µm, is used. The thickness of a filter is preferably from 0.1 to 10 mm, more preferably from 0.2 to 2 mm. In that case, filtration pressure is preferably 15 kgf/cm$^2$ or less, more preferably 10 kgf/cm$^2$ or less, and still more preferably 2 kgf/cm$^2$ or less.

It is preferred to perform filtration a couple of times by making pore diameters gradually smaller for accurate filtration.

The types of filters for accurate filtration are not especially restricted so long as the filters have the above performance, e.g., a filament type, a felt type and a mesh type are exemplified. The materials of filters for accurate filtration are not especially restricted so long as the filters have the above performance and do not have adverse effects on the coating solution, e.g., stainless steel, polyethylene, polypropylene and nylon are exemplified.

The prepared dope is transferred from a discharge port to a pressure die through a pressure type quantity measuring gear pump capable of accurately feeding a prescribed amount of solution by, e.g., rotation number, the dope is uniformly cast on the metal support of the cast part running endlessly from the slit of the pressure die, and the damp-dry dope film (web) is peeled from the metal support at the peeling point where the metal support almost make a round. Both ends of the obtained web are nipped with clips and the web is transferred with a tenter while keeping the width of the web, dried, transferred with the rollers of the drying apparatus to finish drying, and wound in a prescribed length with a winder. The combination of the tenter and rollers of the drying apparatus is varied according to purpose.

The surface of the metal support used in the cast process preferably has an arithmetic mean roughness value (Ra) of 0.015 µm or less, a ten point average roughness (Rz) of 0.05 µm or less, more preferably an arithmetic mean roughness value (Ra) of from 0.001 to 0.01 µm, a ten point average roughness (Rz) of from 0.001 to 0.02 µm or less. More preferably the ratio of (Ra)/(Rz) is 0.15 or more. By the prescribed surface roughness of the metal support, a web can be easily and uniformly peeled off the metal support and the surface configuration of the film after film formation can be controlled to the range of the invention.

Each manufacturing process (casting (including co-casting), drying, peeling and stretching) described in detail in the above Kogi No. 2001-1745, pp. 25 to 30 can be preferably used. In casting process, one kind of dope may be cast by monolayer casting, or two or more kinds of dopes obtained by dissolving different kinds of polymers may be simultaneously and/or successively co-cast.

In the process of forming a film from the dope comprising the above composition, drying process is important for forming a film without agglomeration and local presence of the compounds added.

The dope on the support is generally dried by various methods, e.g., a method of applying hot air to the support from the front surface of the support (drum or belt), that is, the front surface of the web on the support, a method of applying hot air to the support from the rear surface of the drum or belt, and a heat transfer method by liquid of bringing the temperature-controlled liquid into contact with the drum or belt from the rear surface of the opposite side of the cast surface to heat the drum or belt by heat transfer, to whereby control the surface temperature are exemplified, and the heat transfer method by liquid is preferably used. The temperature of the support surface before casting may be any degree so long as the temperature is lower than the boiling point of the solvent used in the dope. However, for expediting drying, or for losing the fluidity of the dope on the support, the temperature is preferably lower than the boiling point of the solvent having the lowest boiling point by 1 to 10° C.

The drying temperature in the drying process of a cellulose acylate film obtained by drying the dope cast in belt-like is from 5 to 250° C., particularly preferably from 20 to 180° C. For further removing the residual solvent, the film is dried at 30 to 160° C. preferably gradually increasing the temperature to evaporate the residual solvent. This method is disclosed in JP-B-5-17844. The time required from casting to peeling can be shortened by this method. According to the solvents used, drying temperature, the amount of drying air and drying time are varied, so that it is preferred to select these conditions arbitrarily depending upon the kinds of solvents used and the combination.

The residual amount of solvents in the finished film is 2 weight % or less, preferably 0.4 weight % or less, for obtaining films excellent in dimensional stability. In the invention, by using a remover, peeling time can be shortened, and a cellulose acylate film free from the deterioration of surface properties (unevenness in the width direction at peeling time and rashes due to gel-like lumps left after peeling) can be obtained, since the resistance at peeling time is lowered.

Specifically, taking into consideration the maintenance of good productivity and the restraint of the occurrence of the lack of uniformity of air, average drying rate from casting of a dope to peeling is preferably more than 300 weight %/min and 1000 weight %/min or less, more preferably more than 400 weight %/min and 900 weight %/min or less, and most preferably more than 500 weight %/min and 800 weight %/min or less.

Average drying rate is the value obtained by dividing the variation of the solvent content in the cast dope by the time.

Average drying rate can be adjusted by arbitrarily adjusting the temperature of drying air, the quantity of air, the concentration of solvent gas, the surface temperature of the cast support, the temperature of the dope to be cast, the wet thickness of the dope to be cast, and the composition of the solvent of the dope to be cast.

(Peeling Process)

Peeling process is a process of peeling the web from which the solvents have been evaporated at the peeling position. The peeled web is transferred to the next process. When the residual amount (the following equation) of the solvent at peeling point is too great, peeling is difficult, while when the web is too dried on the support, a part of the web is peeled halfway. For increasing film-forming rate (a film-forming rate can be increased, since a web is peeled while the residual solvent is left as great as possible), a gel-casting method is known. This method includes a method of adding a bad solvent for cellulose ester during doping, and performing gelation after casting of dope, and a method of gelation by lowering the temperature of a metal support. By increasing the film strength at peeling time by gelation on the support, peeling can be expedited and film-forming time can be shortened. The residual amount of the solvent of the web after peeling can be determined by the length of the metal support.

It is preferred to perform peeling when the residual amount of the solvent of the web at the peeling position is from 5 to 150 weight %, more preferably from 10 to 120 weight %. In the case where a web is peeled at the time when much amount of residual solvent is left, flatness is impaired if the web is too soft, and cramp and wale streak are liable to occur due to peeling tension.

The residual amount of the solvent after peeling can be represented by the following equation.

Residual solvent amount (weight %)={$(M-N)/N$}×100 wherein M is the weight of the web at arbitrary point, and N is the weight of the web having the weight of M after drying at 110° C. for 3 hours.

In the drying process after peeling of the web from the support, the film tends to shrink in the width direction by the evaporation of the solvent. The higher the drying time, the greater is the shrinkage. It is preferred to obtain a finished film having good flatness to perform drying by controlling the shrinkage as far as possible. From this point, a method of drying by nipping both ends of the web with clips while keeping the width of the web throughout the drying process of partly (a tenter system), as disclosed in JP-A-62-46625, is preferred.

(Drying and Stretching Processes)

After peeling, in general, the web is dried with a drier of passing the web alternately on the rolls arranged in zigzag and transferring, a tenter of transferring the web by nipping both ends of the web with clips, or by both apparatus. Blowing hot air against both surfaces of the web is a general drying method, but a method of heating with microwave in place of hot air can also be used. Rapid drying is liable to damage the flatness of the finished film. Drying temperature is generally from 40 to 250° C. throughout the process, preferably from 40 to 180° C. According to the solvents used, drying temperature, the amount of drying air and drying time are varied, so that it is preferred to select drying conditions arbitrarily depending upon the kinds of solvents used and the combination.

It is preferred to perform drying on the conditions that the residual solvent amount in the finished cellulose acylate film is finally 0.01 to 1.5 weight %, more preferably from 0.01 to 1.0 weight %.

(Stretching Treatment Process)

In a casting process, a uniaxial stretching of only one direction in the casting direction (machine direction), or biaxial stretching of the casting direction and other direction (transverse direction) are preferably performed.

The mechanical strength and optical characteristics (retardation value) of the manufactured cellulose acylate film can be adjusted. The magnification of stretching is preferably from 3 to 100%.

The flatness of the film, film strength and optical characteristics can be adjusted to a prescribed range by using the following stretching methods (1) and (2) or both of them.

(1) Stretching is performed in the transverse direction by the stretching magnification of from 3 to 40%, preferably from 7 to 38%, more preferably from 15 to 35%. Subsequently, treatment is performed at 20 to 160° C. while stretching in the machine direction by the magnification of from 0.4% to 5%, preferably from 0.7% to 4%, and more preferably from 1% to 3.5%.

(2) During stretching, temperature difference is given to the front and rear surfaces. The temperature of the surface attached to the substrate (band or drum) at casting time is made higher than the temperature of the opposite surface by from 2 to 20° C., preferably from 3 to 15° C., and more preferably from 4 to 12° C.

By these methods, the local presence of additives (plasticizers, super fine particles, ultraviolet absorbers) is solved, and the optical characteristics of the obtained film are uniformalized and mechanical characteristics are improved.

Other functional layers (e.g., an adhesive layer, a dye layer, an antistatic layer, an antihalation layer, a UV-absorbing layer, a polarizing sheet, etc.) may be cast at the same time.

As described above, in the invention, it is preferred that the support is a cellulose acylate film, and the cellulose acylate film is manufactured by the solution preparing process of preparing a cellulose acylate solution by dissolving cellulose acylate in a non-chlorine solvent, the film-forming process of forming a cellulose acylate film from the cellulose acylate solution, and the stretching process of stretching the cellulose acylate film.

For making the film thickness fluctuation of the cellulose acylate film not higher than ±3%, it is effective that (1) the concentration and viscosity of the solution (dope) obtained by dissolving the cellulose acylate film in an organic solvent are adjusted at the time of casting, and (2) the drying temperature of the film surface, the quantity of air when drying air is used, and the direction of air are adjusted in the drying process.

(Characteristics of Cellulose Acylate Film (Surface Configuration))

It is preferred that the cellulose acylate film used as the support of a reflection-preventing film has a specific surface configuration. The surface configuration of the cellulose acylate film is described below.

The surface of the side of the cellulose acylate film on which a reflection-preventing film is provided has an arithmetic mean roughness value (Ra) of the surface irregularity of the film according to JIS B0601-1994 of from 0.0005 to 0.1 μm, a ten point average roughness (Rz) of from 0.001 to 0.3 μm, and a maximum height (Ry) of 0.5 μm or less, preferably (Ra) of from 0.0002 to 0.05 μm, (Rz) of from 0.005 to 0.1 μM, (Ry) of 0.3 μm or less, and particularly preferably (Ra) of from 0.001 to 0.02 μm, (Rz) of from 0.002 to 0.05 μm, and (Ry) of 0.1 μm or less.

In the above ranges, a antireflective film free of coating unevenness, having uniform coating property, and good in the adhesion of the support and the coating film can be provided.

Further, in the surface configuration of minute irregularity, it Is preferred that the ratio of the arithmetic mean roughness (Ra) to the ten point average roughness (Rz), (Ra/Rz) is 0.1 or more, the average distance of the surface irregularity of the film (Sm) is 2 μm or less. Here, the relationship between Ra and Rz shows the uniformity of the surface irregularity. More preferably, the ratio (Ra/Rz) is 0.15 or more, and the average distance (Sm) is from 1 to 0.1 μm, and particularly preferably the ratio (Ra/Rz) is 0.2 or more, and the average distance (Sm) is from 0.1 to 0.001 μm.

The configurations of surface irregularity can be evaluated with a transmission electron microscope (TEM) and an atomic force microscope (AFM).

It is preferred from the reduction of visual defects and the improvement of yield that the number of the optical defects of the visual size of 100 μm or more in the cellulose acylate film is 1 or less per m².

This optical defect can be observed with a polarizing microscope under crossed nicols by making the lag axis of the film parallel with absorption axis of polarizing plate. A defect that seems like a brightness is approximated to a circular area, and the number of brightness having the diameter of 100 μm or more is counted. Brightness having the diameter of 100 μm or more can be easily observed with the naked eyes.

That is, the cellulose acylate film has an arithmetic mean roughness value (Ra) of the surface irregularity of the film according to JIS B0601-1994 of from 0.0005 to 0.1 μm, a ten point average roughness (Rz) of from 0.001 to 0.3 μm and the average distance of the surface irregularity of the film (Sm) of 2 μm or less. Further, it is preferred that the number of the optical defects of the visual size of 100 μm or more in the cellulose acylate film is 1 or less per m².

(Optical Characteristics of Film)

The cellulose acylate film preferably has a light transmittance of 90% or more, a haze value of 1% or less, more preferably a light transmittance of 92% or more, and, a haze value of from 0 to 0.5%.

A haze value can be measured with a haze meter (MODEL 1001DP, manufactured by Nippon Denshoku Industries Co., Ltd., HR-100, manufactured by Murakami Color Research Laboratory) based on JIS-K-7105.

(Dynamic Characteristics of Film)

(Tear Strength)

It is preferred that the cellulose acylate film has tear strength based on the tearing test method of JIS K7128-2: 1998 (Elmendorf tearing method) of 2 g or more from the point of capable of sufficiently maintaining the film strength even in the above film thickness, more preferably from 5 to 25 g, and still more preferably from 6 to 25 g. The value is preferably 8 g or more, more preferably from 8 to 15 g, in terms of 60 μm.

Specifically, a piece of sample of 50 mm×64 mm is subjected to humidity conditioning at 25° C., 65% RH for 2 hours, and then the tear strength is measured with a light weight tear strength tester.

(Scratch Resistance)

Scratch resistance is preferably 2 g or more, more preferably 5 g or more, and particularly preferably 10 g or more. In this range of the scratch resistance, the scratch resistance of the surface of a film and handling property can be maintained with no problem.

The scratch resistance can be evaluated by scratching the surface of a support with a sapphire needle having 90° of an apex angle of a circular cone and the tip radius of 0.25 m, and with visually observable scratch in terms of a load (g).

(Residual Solvent Amount of Film)

Curling can be prevented by making the residual solvent amount of a support for use in the invention from 0 to 1.5%, more preferably from 0.1 to 0%.

This is probably due to the fact that lessening the residual solvent amount at the time of film-forming by the solvent cast method resulting in lessening of the free volume is the main factor.

Specifically, it is preferred to perform drying so that the residual solvent amount of the cellulose acylate film becomes from 0.01 to 1.5 weight %, more preferably from 0.01 to 1.0 weight %.

(Vapor Permeability and Moisture Content of Film)

It is preferred that the moisture permeability of the cellulose acylate film based on the method described in JIS Z0208 (25° C., 90% RH) becomes in the above range, by which the adhesion failure of the reflection-preventing film can be reduced, and the fluctuation of the tint and the reduction of angle of visibility are not caused when the film is built into a liquid crystal display as the protective film of an optical compensation lens and a polarizing plate.

Moisture permeability can be measured according to the method described in Kobunshi no Bussei II (Physical Properties of Polymers II) (Kobunshi Jikken Koza 4, Kyoritsu Publishing Co.), pp. 285 to 294, measurement of vapor permeation amount (a weight method, a thermometer method, a vapor pressure method).

It is preferred that the moisture content of the cellulose acylate film at 30° C. 85% RH is from 0.3 to 12 g/m² irrespective of the film thickness for the purpose of not impairing the adhesion with water-soluble polymer such as polyvinyl alcohol, more preferably from 0.5 to 5 g/m². When the moisture content is greater than 12 g/m², the dependency on moisture fluctuation of retardation also becomes great and not preferred.

Various additives can be added to the transparent support for the purpose of adjusting the mechanical characteristics (film strength, curling, dimensional stability, sliding property) and durability (humidity and thermal resistance, wetherproofness) of the film. For example, plasticizers (e.g., phosphoric esters, phthalic esters, esters of oilyol and fatty acid), ultraviolet inhibitors (e.g., hydroxybenzophenone compounds, benzotriazole compounds, salicylic ester compounds, cyano acrylate compounds), deterioration preventives (e.g., antioxidants, peroxide decomposer, radical inhibitors, metal deactivatora, acid capturers, amine), fine particles (e.g., $SiO_2$, $Al_2O_3$, $TiO_2$, $BaSO_4$, $CaCO_3$, $MgCO_3$, talc, kaolin), removers, antistatic agents and infrared absorbers can be exemplified. These are described in detail in Hatsumei Kyokai Kokai Giho, Kogi No. 2001-1745 (published by Hatsumei Kyokai, Mar. 15, 2001), on pages 17 to 22.

The addition amount of additives is preferably from 0.01 to 20 weight % of the transparent support, more preferably from 0.05 to 10 weight %.

A transparent substrate may be subjected to surface treatment. The examples of to surface treatments include chemical treatment, mechanical treatment, corona discharge treatment, flame treatment, UV treatment, high frequency treatment, glow discharge treatment, active plasma treatment, laser treatment, mixed acid treatment and ozone oxidation treatment. Specifically, the contents in Hatsumei Kyokai Kokai Giho Kogi No. 2001-1745 (published on Mar. 15, 2001), pp. 30 and 31, and JP-A-2001-9973 are exemplified. The preferred surface treatments are glow discharge treatment, UV treatment, corona discharge treatment and flame treatment, and more preferred treatments are glow discharge treatment and UV treatment.

<Forming Method of Antireflective Film>

The antireflective film of the invention can be formed by the following method, but the invention is not limited thereto. The forming method is described with referring to the third embodiment.

(Preparation of Coating Solution)

A coating solution containing the components to forming each layer is prepared in the first place. At that time, by suppressing the volatile content in the solvent to the smallest limit, the increase of the moisture content in the coating layer can be prevented. The moisture content in the coating layer is preferably 5% or less, more preferably 2% or less. The restraint of the volatile content in the solvent can be achieved by improving the sealing of the tank at the time of stirring after the addition of each material, and making the contact area of the coating solution with air at the working time of liquid moving to the least. A means to reduce the moisture content in the coating solution during, before and after coating may be provided.

It is preferred to provide a filter capable of removing almost all (90% or more) the foreign matters corresponding to the dry film thickness (50 nm to 120 nm or so) of the layers directly coated on the light scattering layer and the hard-coat layer (a low-refractive index layer, a middle refractive index layer) in the coating layers for forming the light scattering layer and the hard-coat layer. Since the particle size of the translucent particles for providing light diffusing property is the same or greater than the film thickness of the low-refractive index layer and the middle refractive index layer, it is preferred to perform filtration to the intermediate solution to which all the materials excluding translucent particles have been added. When the above filter capable of filtering foreign matters having small particle size is unavailable, it is preferred to perform filtration at least capable of removing almost all the foreign matters corresponding to the wet film thickness (1 to 10 μm or so) of the layer directly provided thereon. By such a means, the defect of the layer directly formed thereon can be reduced.

(Coating, Drying and Curing)

In the next place, the coating solution of the layer directly formed on the support, such as a light scattering layer or a hard-coat layer, is coated on the transparent support with dip coating, air knife coating, curtain coating, roller coating, wire bar coating, gravure coating, micro-gravure coating or extrusion coating (refer to U.S. Pat. No. 2,681,294), followed by heating and drying. Thereafter, the coated layer is hardened by at least any one of light irradiation and heating, whereby a light scattering layer or a hard-coat layer is formed.

If necessary, by making the structure of the light scattering layer multilayers, and before coating the light scattering layer, coating and curing of a smooth light scattering layer can be performed.

In the next place, a low refractive index coating layer is coated on the light scattering layer in the similar manner, and the coated layer is hardened by at least any one of light irradiation and heating, whereby a antireflective film of the invention is obtained.

In forming a light scattering layer, it is preferred to coat the coating solution directly on the substrate film or via any other layer in a wet film thickness of from 1 to 20 μm. Further, in forming a low-refractive index layer, it is preferred to coat the coating solution on the light scattering layer in a wet film thickness of from 2 to 5 μm.

The light scattering layer and a low-refractive index layer are coated directly on the substrate film or via any other layer, and then transferred as a web to a heated zone to dry the solvents. The temperature of the drying zone is preferably from 25 to 140° C., the temperature of former half of the drying zone is preferably comparatively low, and the latter half is preferably comparatively high, provided that the temperature is preferably lower than the temperature of the beginning of volatilization of the components contained in each coating solution composition other than the solvents. For example, in commercially available products of photo-radical generators used in combination with ultraviolet-curing resins, there are products that several 10% is volatilized in hot air of 120° C. in several minutes, and volatilization progresses in some monofunctional and bifunctional acrylate monomers in hot air of 100° C. In such a case, it is preferred that the drying temperature is lower than the temperature where the volatilization of the components contained in the coating solution other than the solvents begins.

Further, it is preferred that the air speed of the drying air after coating each coating solution on the substrate film is from 0.1 to 2 m/sec while the solids concentration of the coating solution is from 1 to 50% to prevent drying unevenness.

After each coating solution has been coated on the substrate film, the difference of temperature between the transfer roll in contact with the surface of the web opposite to the coating surface and the substrate film is preferably from 0 to 20° C. for preventing drying unevenness due to heat transfer by transfer roll.

After drying zine of the solvents, the web is passed through the zone where each layer of the web is hardened by any means of ionizing radiation irradiation and heating, thereby the coated layer is hardened. When the coated layer is UV-curable resin, it is preferred to harden each layer by irradiating UV-rays of irradiation dose of from 10 to 1,000 mJ/cm².

At that time, the distribution of irradiation dose in the transverse direction of the web including both ends is preferably from 50 to 100% of the maximum irradiation dose at the central part, more preferably from 80 to 100%. When nitrogen purge is necessary to reduce the oxygen concentration for accelerating the surface curing, the oxygen concentration is preferably from 0.01 to 5%, and the distribution in the transverse direction is preferably 2% or less in oxygen concentration. The conditions of curing of the low-refractive index layer are as described above.

In the case where the curing rate of the light scattering layer (100—residual functional group content) reached a certain value less than 100%, when the low-refractive index layer is provided thereon and the low-refractive index layer is hardened by any means of ionizing radiation irradiation and heating, and if the curing rate of the light scattering layer becomes higher than the curing rate before coating the lower light scattering layer, the adhesion between the light scattering layer and the low-refractive index layer is improved.

The forming method applicable to the antireflective film at large of the invention is described in detail.

Each layer of the antireflective film of the multilayer constitution can be formed with dip coating, air knife coating, curtain coating, roller coating, die coating, wire bar coating, gravure coating, or extrusion coating (refer to U.S. Pat. No. 2,681,294). When each layer is coated with gravure coating, a little coating solution as each layer of the antireflective film can be uniformly coated and preferred. Micro-gravure coating is high in film thickness uniformity and more preferred. Coating by die coating is more preferred, and the later-described coating method using a novel die coater is particularly preferred. Two or more layers may be coated simultaneously. Simultaneous coating is disclosed in U.S. Pat. Nos. 2,761,791, 2,941,898, 3,508,947, 3,526,528, and Yuji Harasaki, Coating Kogaku, p. 253, Asakura Shoten (1973).

In the antireflective film of the invention, since at least a low-refractive index layer is laminated, luminescent spot defect is conspicuous if foreign matters, e.g., dust, are present. The luminescent spot defect in the invention is a defect that is seen visually by the reflection of the coated film, and this can be detected visually by coating the back surface of the antireflective film after coating in black. A luminescent spot defect visible with eyes is generally 50 μm or more. When there are many luminescent spot defects, the yield at manufacturing lowers, so that a large-sized antireflective film cannot be manufactured.

The number of luminescent spot defects in the antireflective film in the invention is 20/m² or less, preferably 10 or less, more preferably 5 or less, and particularly preferably 1 or less.

For manufacturing the antireflective film continuously, a process of continuously feeding a support film wound in a roll, a process of coating and drying the coated solution, a process of curing the coated film, and a process of winding the support film having hardened layers are performed.

A film support is continuously fed to a clean room from the wound roll of the film support, the static electricity charged is destaticized from the film support with a destaticizer in the clean room, and then the foreign matters on the film support are removed with a dust remover. Subsequently, a coating solution is coated on the film support with a coating apparatus installed in the clean room, and the coated film support is conveyed to a drying room and dried.

The film support having dried coated layers is passed from the drying room to radiation curing room, the film support is irradiated with radiation, and the monomer contained in the coated layer is polymerized to harden. Further, the film support having hardened layers hardened by radiation irradiation is sent to a heat curing part and heated to complete curing, and film support having layers finished hardened is wound in a roll.

These processes may be performed every formation of each layer, or a plurality of coating part-drying room-irradiation curing part-heat curing room may be provided and processes may be performed continuously, but from the productivity, it is preferred to perform the formation of each layer continuously. The example of apparatus for performing coating of each layer continuously is shown in FIG. 2. The apparatus is equipped with process 110 for continuously feeding a support film wound in a roll, process 120 for winding a support film wound in a roll, and film-forming units 100, 200, 300 and 400 are provided between 110 and 120. The apparatus shown in FIG. 6 is an example of continuously coating four layers without winding, and it is of course possible to change the number of film-forming units depending upon the layer constitution. Film-forming unit 100 comprises process 101 for coating a coating solution, process 102 for drying the coated layer, and process 103 for curing the coated film.

It is more preferred that by using an apparatus equipped with three film-forming units, the support film having been coated with the hard-coat layer is continuously sent out, coated with an middle refractive index layer, a high-refractive index layer, and a low-refractive index layer in each film-forming unit, and then wound in a roll. It is more preferred that, by using the apparatus equipped with four film-forming units shown in FIG. 6, the film support wound in a roll is continuously sent out, coated with a hard-coat layer, an middle refractive index layer, a high-refractive index layer, and a low-refractive index layer in each film-forming unit, and then wound in a roll.

For manufacturing a antireflective film having less luminescent spot defects, to accurately control the degree of dispersion of high refractive index super fine particles contained in a high-refractive index layer coating solution, and accurate filtration operation of coating solutions are exemplified. At the same time, it is preferred that the coating process in the coating part and drying process in the drying room are performed in an environment of highly clean air, and the dusts on the film should be sufficiently removed. The degree of air cleanliness in the coating process and the drying process is preferably class 10 (particles having a size of 0.5 μm or more is 353/m³ or lower) or higher, more preferably class 1 (particles having a size of 0.5 μm or more is 35.5/m³ or lower) or higher, based on the standard of the degree of air cleanliness of U.S. Standard 209E. It is more preferred that the degree of air cleanliness is also high at the feeding and winding parts other than coating-drying processes.

As the dust removing method used in the dust removing process as the pre-process of coating, a method of pressing nonwoven fabric or a blade on the film surface as disclosed in JP-A-59-150571, a method of blowing highly pure air against the film to get rid of the dust on the film, and sucking the dust by the contiguous suction opening as disclosed in JP-A-10-309553, and a method of blowing compressed air vibrating by ultrasonic wave against the film to get rid of the adhered substances and sucking the removed substances as disclosed in JP-A-7-333613 (new ultra-cleaner, manufactured by Shinko Co.) are exemplified.

In addition, a method of introducing a film into a washing tank and getting rid of the adhered substances by ultrasonic wave, a method of feeding a cleaning fluid to a film, blowing and sucking with high speed air as disclosed in JP-A-49-13020, and a method of rubbing a film with a roller wet with a fluid continuously, and jetting a fluid to the rubbed surface and cleaning as disclosed in JP-A-2001-38306 can be used.

Of these dust removing methods, a method of dust removal by ultrasonic wave and a method by wet dust removal are particularly preferred for dust removing effect.

Further, before performing dust removal process, to destaticize the static electricity on a film support is particularly preferred in view of increasing dust removal effect and suppressing the adhesion of dusts. As such a dust removing method, ionizers by corona discharge, ionizers by light irradiation such as UV and soft X-rays can be used. The voltage of a film support before dust removal and coating is 1,000 V or less, preferably 300 V or less, and particularly preferably 100 V or less.

(Dispersion Medium for Coating)

Dispersion media for coating are not particularly restricted. Dispersion media can be used alone or two or more can be used as mixture. Preferred dispersion media are aromatic hydrocarbons, e.g., toluene, xylene, styrene, etc., chlorinated aromatic hydrocarbons, e.g., chlorobenzene, ortho-dichlorobenzene, etc., methane derivatives, e.g., monochloromethane, etc., chlorinated aliphatic hydrocarbons containing ethane derivatives, e.g., monochloroethane, etc., alcohols, e.g., methanol, isopropyl alcohol, isobutyl alcohol, etc., esters, e.g., methyl acetate, ethyl acetate, etc., ethers, e.g., ethyl ether, 1,4-dioxane, etc., ketones, e.g., acetone, methyl ethyl ketone, methyl isobutyl ketone, cyclohexanone, etc., glycol ethers, e.g., ethylene glycol monomethyl ether, etc., alicyclic hydrocarbons, e.g., cyclohexane, etc., aliphatic hydrocarbons, e.g., n-hexane, etc., and mixtures of aliphatic or aromatic hydrocarbons. Of these solvents, dispersion medium for coating comprising ketones alone or mixtures of two or more ketones are particularly preferred.

(Physical Characteristics of Coating Solution)

Since the possible coating rate of the upper bound of the coating method of the invention is greatly influenced by physical properties of the coating solution, it is necessary to control the physical characteristics of coating solution, in particular, viscosity and surface tension, at the coating moment.

Viscosity is preferably 2.0 [mPa·sec] or less, more preferably 1.5 [mPa·sec] or less, and most preferably 1.0 [mPa·sec] or less. The viscosity fluctuates by shear rate with the coating solution, so that the above value shows the viscosity in shear rate at the coating moment. When a thixotropic agent is added to a coating solution, the viscosity lowers at coating time when high shear is applied, and the viscosity increases at drying time when shear is not applied, so that unevenness at the time of coating is hard to occur and preferred.

The amount of a coating solution coated on a transparent support also influences the possible coating rate of the upper bound although this is not a physical property. The amount of coating solution coated on a transparent support is preferably from 2.0 to 5.0 ml/m². When the amount of a coating solution coated on a transparent support is increased, the possible coating rate of the upper bound rises and preferred, but if the amount of a coating solution coated on a transparent support is increased too much, the load applied to drying increases, so that it is preferred to decide the amount of a coating solution coated on a transparent support based on the prescription of the coating solution and conditions of the coating process.

Surface tension is preferably in the range of from 15 to 36 [mN/m]. It is preferred to add a leveling agent to a coating solution to reduce the surface tension for preventing unevenness at the time of coating and preferred. On the other hand, when the surface tension decrease too much, the possible coating rate of the upper bound lowers, so that the surface tension is more preferably from 17 to 32 [mN/m], and still more preferably from 19 to 26 [mN/m].

(Filtration)

A coating solution used for coating is preferably filtered before coating. It is preferred that a filter for the filtration has the possible smallest pore diameter in the range of not removing the components in the coating solution. In filtration, a filter having absolute filtration accuracy of from 0.1 to 10 µm, more preferably from 0.1 to 5 µm, is used. The thickness of a filter is preferably from 0.1 to 10 mm, more preferably from 0.2 to 2 mm. In that case, filtration pressure is preferably 1.5 MPa or less, more preferably 1.0 MPa or less, and still more preferably 0.2 MPa or less.

The members of filters are not especially restricted so long as the filters do not have adverse effects on the coating solution. Specifically, the same filter members as described above as the filter members of the wet dispersion of the inorganic compound are exemplified.

Further, it is also preferred to disperse the coating solution subjected to filtration just before coating by ultrasonic wave dispersion for the purpose of assisting defoaming and the maintenance of dispersion of the dispersion.

In the invention, as to the curing method of each layer of the antireflective film, it is preferred to form each layer by crosslinking reaction by light irradiation, electron beam irradiation and heating, or by polymerization reaction simultaneously with the coating of a coating composition or after coating.

When each layer of the antireflective film is formed by crosslinking reaction or polymerization reaction of ionizing radiation curable compounds, it is preferred to perform crosslinking reaction or polymerization reaction in the atmosphere of oxygen concentration of 10 vol % or less. By forming each layer in the atmosphere of oxygen concentration of 10 vol % or less, the outermost layer excellent in physical strength and chemical resistance can be obtained.

The oxygen concentration is preferably 5 vol % or less, more preferably 1 vol % or less, particularly preferably 0.5 vol % or less, and most preferably 0.1 vol % or less.

As a means for achieving oxygen concentration of 10 vol % or less, it is preferred to replace the atmosphere (nitrogen concentration: about 79 vol % and oxygen concentration: about 21 vol %) with other gas, particularly preferably to replace with nitrogen (nitrogen purge).

The light sources of light irradiation may be any of ultraviolet rays and near infrared rays. As the light sources of ultraviolet rays, extra-high pressure, high pressure, middle pressure and low pressure mercury lamps, a chemical lamp, a carbon arc lamp, a metal halide lamp, a xenon lamp and sunbeams are exemplified. Available various kinds of laser light sources of the wavelengths of from 350 to 420 nm may be made multi-beams for use in irradiation. As the light sources of near infrared rays, a halogen lamp, a xenon lamp and a high pressure sodium lamp are exemplified, and available various kinds of laser light sources of the wavelengths of from 750 to 1,400 nm may be made multi-beams for use in irradiation.

When near infrared light sources are used, they may be used in combination with ultraviolet light sources, or light irradiation may be carried out from the substrate side opposite to the coating surface side. Film curing in the depth direction in the coated layer advances without delay from the vicinity of the surface, so that a uniform and good state hardened film can be obtained.

The intensity of irradiation of ultraviolet rays is preferably from 0.1 to 100 mW/cm$^2$ or so, and the irradiation dose on the coated layer surface is preferably from 10 to 1,000 mJ/cm$^2$.

The temperature distribution of the coating layer in a light irradiation process is preferably controlled to be uniform as far as possible, preferably within ±3° C., more preferably within ±1.5° C. In this range of the temperature, the polymerization reaction in the in-plane direction and depth direction in the layer uniformly progresses and preferred.

<<Plane Opposite the Antireflection Layer on the Antireflection Film>>

Where the antireflection film of the invention is used as a polarizing plate, it is desirable to make hydrophilic the surface to be attached to a polarizing sheet, thereby improving the adhesion properties with the polarizing sheet primarily made of polyvinyl alcohol.

A method for making the film hydrophilic is either (1) that in which the above-described layers (for example, light-diffusing layer, high-refractive index layer, low-refractive index layer, and hard-coat layer) are individually applied to one or the other surface of a support which is made hydrophilic in advance or (2) that in which the above-described layers (for example, light-diffusing layer, high-refractive index layer, low-refractive index layer and hard-coat layer) are applied to one or the other surface of the support and then the surface to be attached to the polarizing sheet is made hydrophilic. The method (2) is preferable to the method (1) wherein the surface on which the light-diffusing layer is coated is also made hydrophilic, thus making it difficult to secure adhesiveness between the support and the light-diffusing layer.

(Hydrophilic Treatment)

The surface of the support may be made hydrophilic by a publicly known method. For example, treatments such as corona discharge treatment, glow discharge treatment, exposure to ultraviolet radiation, flame treatment, ozone treatment, acid treatment and alkaline saponification are given to improve the surface of the film concerned. These treatments have been described in detail on pages 30 to 32, Journal of Technical Disclosure No. 2001-1745.

(Saponification)

Of these treatments, alkaline saponification treatment is particularly preferable and quite effective in surface-treating cellulose acylate films.

(1) Dipping Method

This is a method by which an antireflection film is dipped into an alkaline solution under appropriate conditions, giving saponification to all the planes reactive with alkali on an entire film surface. This method is also preferable in terms of cost because there is no need for any particular equipment. Alkaline saponification solutions include potassium hydroxide solution and sodium hydroxide solution, with preferable normal concentrations of hydroxide ion ranging from 0.1 to 3.0N. Further, when alkaline saponification solutions contain solvents (for example, isopropyl alcohol, n-butanol, methanol, ethanol), surface active agents or wetting agents (for example, diol, glycerin) having excellent wetting performance with a film, they are improved for wetting performance with a support and also for temporal stability. Alkaline solutions are preferably at temperatures of 20 to 70° C. and more preferably 30 to 60° C.

After being dipped into alkaline solution, it is preferred that the film is washed with water thoroughly so that no alkaline compounds are left on the film or immersed into a diluted acid solution to neutralize alkaline compounds.

Another principal plane opposite a principal plane having a light-diffusing layer of the support is made hydrophilic by saponification. A protective film of the polarizing sheet is usually used in such a state that the hydrophilic surface of the support is in contact with the polarizing sheet.

The hydrophilic surface is effective in improving adhesion properties of the polarizing sheet primarily made of polyvinyl alcohol.

In view of adhesiveness with the polarizing sheet, saponification is more preferable as a lower contact angle when water is formed between the surface having a light-diffusing layer and the opposite surface of the support. However, since in the dipping method the principal plane having a light-diffusing layer is also damaged by alkaline treatment, it is important to restrict reaction conditions to the least possible extent. Where damage of the antireflection layer by alkaline treatment is indicated by the contact angle between the opposite principal plane of the support and water, the angle is preferably 20 to 50° and more preferably 30 to 45° for a support made of cellulose acylate film. Within the above range, the antireflection film is hardly damaged and is able to maintain adhesiveness with the polarizing sheet, which is preferable.

(2) Method for Coating Alkaline Solution

As a means to avoid possible damage of the antireflection film in the above-mentioned dipping method, it is preferable to employ an alkaline solution-coating method in which an alkaline solution is coated under appropriate conditions only for a principal plane and opposite side of the principal plane having an antireflection film and subjected to steps such as heating, washing with water and drying. The alkaline solution and treatment have been described in JP-A-2002-82226 and International Publication No. 02/46809.

In the third embodiment, the following method may be employed.

(1) Method for Dipping Film into Alkaline Solution

This is a method in which an antireflection film is dipped into an alkaline solution under appropriate conditions to give saponification to all surfaces reactive with alkaline compounds on a whole film surface and is preferable in reducing the production cost because there is no need for special equipment. The alkaline solution is preferably a sodium hydroxide aqueous solution. The concentration is preferably 0.5 to 3 mol/L and particularly preferably 1 to 2 mol/L. The alkaline solution is preferably at temperatures of 30 to 75° C. and particularly preferably 40 to 60° C.

It is preferred that the saponification condition should be carried out under relatively mild reaction conditions, which can be attained by selecting materials or compounds of an antireflection film or appropriately adjusting a targeted contact angle.

After being dipped into an alkline solution, it is preferred that the film is washed with water thoroughly so that no alkaline compounds are left on the film or immersed into a diluted acid solution to neutralize alkaline compounds.

Another surface opposite a surface having an antireflection layer of the transparent support is made hydrophilic by saponification. A protective film of the polarizing plate is used in such a state that the hydrophilic surface of the transparent support is in contact with the polarizing sheet.

The hydrophilic surface is effective in improving adhesiveness with an adhesive layer primarily made of polyvinyl alcohol.

In view of adhesion properties with the polarizing sheet, saponification is more preferable as a lower contact angle is formed between the surface of the transparent support opposite side of the surface having a low-refractive index layer and water. However, since in the dipping method the surface having a low-refractive index layer and the inner light scattering layer are also damaged by alkaline treatment, it is important to restrict reaction conditions to the least possible extent. Where damage of the antireflection layer by alkaline treatment is indicated by the contact angle between the opposite surface of the transparent support and water, the angle is preferably 10 to 50°, more preferably 30 to 500 and still more preferably 40 to 50° for the transparent support made of triacetyl cellulose. Within the above range, no damage is given and adhesion properties are also improved. However, an angle of 50° or more will cause problems of adhesiveness with the polarizing sheet and is therefore not preferable. In contrast, an angle of less than 10° will give greater damage to the antireflection film to deteriorate the physical strength, which is not preferable.

(2) Method for Coating Alkaline Solution

As a means to avoid possible damage of the antireflection film in the above-mentioned dipping method, it is preferable to employ an alkaline solution-coating method in which the alkaline solution is coated under appropriate conditions only to a surface opposite side of a surface having an antireflection film and subjected to steps such as heating, washing with water and drying. In this instance, the coating means to allow an alkaline solution or others to contact only with the surface to be treated with saponification, and includes a case where contact is made with a spray liquid-containing belt, in addition to spraying. These methods, however, need additional equipment and processes for coating an alkaline solution, and are inferior to (1) the dipping method in terms of production cost. Since an alkaline solution contacts only with a plane to be treated by saponification, materials vulnerable to an alkaline solution may be used to provide a layer on the opposite surface. For example, an evaporated film and a sol-gel film can be affected by an alkaline solution to cause corrosion, dissolution, peeling or other various problems. These films are not preferably used in the dipping method but can be used freely in the coating method in which they are not in contact with an alkaline solution.

Since saponification can be attained by either of the above-described methods (1) or (2) after formation of individual layers, such saponificaion may be conducted by winding out the film concerned from a roll-shaped support as a series of processes after the process for producing the aforementioned antireflection film. A process for attaching a film to a polarizing plate on a support from which the film is wound out may be performed similarly on a continuous basis, thereby producing the polarizing plate more effectively by a sheet-fed process.

(3) Method for Attaining Saponification by Laminating Antireflection Film for Protection As in the case of (2), where at least either the light scattering layer or the low-refractive index layer is insufficient in resistance against an alkaline solution, the low-refractive index layer is formed and a laminated film is then attached to the surface on which the low-refractive index layer is formed, and the resultant is dipped into the alkaline solution, by which only the plane of triacetyl cellulose opposite side of a plane on which the low-refractive index layer is formed is made hydrophilic and thereafter the laminated film is peeled off. This method is also able to give, without damage to the light scattering layer or the low-refractive index layer, hydrophilic treatment necessary as a protective film for the polarizing plate to a plane opposite side of a plane on which an antireflection layer of triacetyl cellulose film is formed. As compared with method (2), this method is advantageous in eliminating the necessity for special equipment for coating an alkaline solution, although the laminated film must be disposed as waste.

(4) Method for Dipping into Alkaline Solution After Formation of Light Scattering Layer Where layers up to a light scattering layer are resistant to an alkaline solution but a low-refractive index layer is insufficient in resistance to an alkaline solution, the layers may be dipped into the alkaline solution after formation of a light scattering layer to give hydrophilic treatment to the both sides, thereby forming a low-refractive index layer on the light scattering layer. This method is complex in the production process but advantageous in improving the adhesiveness between the light scattering layer and the low-refractive index layer particularly when the low-refractive index layer is a fluorine-containing sol-gel film or others which contain the hydrophilic group.

(5) Method for Forming Antireflection Film on Triacetyl Cellulose Film which has Already been Treated with Saponification In addition, triacetyl cellulose film may be treated in advance with saponification by dipping into an alkaline solution or others, thereby forming a light scattering layer or a low-refractive index layer directly or through another layer on one or the other plane of the film. Where the film is dipped into an alkaline solution to attain saponification, the adhesiveness can be deteriorated with the plane of triacetyl cellulose which is treated by saponification with a light scattering layer or other layers and rendered hydrophilic. In this instance, after such saponification, treatments such as corona discharge or glow discharge may be given only to the plane on which the light scattering layer or other layers are formed, thereby removing the hydrophilic plane to provide a light scattering layer or other layers, with a successful result. Further, where the light scattering layer or other layers have a hydrophilic group, a better interlayer adhesiveness may be provided.

(Polarizing Plate)

The polarizing plate of the invention comprises the above-described antireflection film which is used at least in one of the two protective films for the polarizing sheet. In the invention, use of the antireflection film on the outer-most surface makes it possible to prevent reflection of external light, providing a polarizing plate excellent in scar resistance, dirt resistance and others. Further, in the polarizing plate of the invention an antireflection film may also be used as a protective film, thereby reducing the production cost.

The following embodiments are also preferable as an antireflection film for the polarizing plate of the invention.

(Structure of Antireflection Film)

The antireflection film of the invention is made of multi-layered antireflection films consisting of at least 2 superposed layers (light transmission layer) having the light transmission property and mutually different in the refractive index. The antireflection film consisting of two-superposed layers is provided with a transparent protective film, a high-refractive index layer and a low-refractive index layer (outermost layer) and formed in this order. The transparent protective film, the high-refractive index layers and the low-refractive index layer have refractive indexes meeting the following relationship.

Refractive index of the high-refractive index layer>refractive index of the transparent protective film>refractive index of the low-refractive index layer A hard-coat layer may also be provided between the transparent protective film and the high-refractive index layer. Further, the antireflection film may also be made of a high refractive index hard-coat layer or a glare-proof high-refractive index layer and a low-refractive index layer.

The antireflection film consisting of at least three superposed layers is provided with a transparent protective film, a lower refractive index layer of two high-refractive index layers (middle-refractive index layer) and a higher refractive index layer of two high-refractive index layers (high-refractive index layer) and a low-refractive index layer (outermost layer) and formed in this order. The transparent protective film, the middle-refractive layer, the high-refractive index layer and the low-refractive index layer have refractive indexes meeting the following relationship.

Refractive index of the high-refractive index layer>refractive index of the middle-refractive layer>refractive index of the transparent protective film>refractive index of the low-refractive index layer A hard-coat layer may also be provided between the transparent protective film and the middle-refractive layer. Further, the antireflection film may be made of a middle-refractive index hard-coat layer, a high-refractive index layer and a low-refractive index layer.

The above multi-layered product constituted by individual layers in such a fashion that the middle-refractive layer, the higher-refractive index layer and the low-refractive index layer can meet the following formula (IV-2), (IV-3) and (IV-4) respectively for the designed wave length λ (400 to 680 nm) is preferable in that such layered structure is capable of producing an antireflection film with a better antireflection performance.

$$(m_1\lambda/4) \times 0.60 < n_1 d_1 < (m_1\lambda/4) \times 0.80 \quad \text{(IV-2)}$$

$$(m_2\lambda/4) \times 1.00 < n_2 d_2 < (m_2\lambda/4) \times 1.50 \quad \text{(IV-3)}$$

$$(m_3\lambda/4) \times 0.85 \leq n_3 d_3 < (m_3\lambda/4) \times 1.05 \quad \text{(IV-4)}$$

wherein $m_1$ is 1, $n_1$ is a refractive index of a lower refractive index layer (middle-refractive index layer) of the two high-refractive index layers and $d_1$ is thickness of the middle-refractive index layer (nm); $m_2$ is 2, $n_2$ is a refractive index of a higher refractive index layer (high-refractive index layer) of the two high-refractive index layers and $d_2$ is thickness of the high-refractive index layer (nm); and $m_3$ is 1, $n_3$ is refractive index of the low-refractive index layer and $d_3$ is thickness of the low-refractive index layer (nm).

In the above-described layered structure, the antireflection film is able to attain the low reflection and the reduced color of reflected light as well as the reduced variance in color resulting from an incident angle. Thus, where a polarizing plate prepared integrally with a transparent protective film to which such antireflection film is superposed is used, for example, in the first surface of a liquid crystal display device, the display device may be obtained that has a high visibility so far not attained. Where the specular reflectivity of incident light at an incident angle of 5° is 0.5% or less on average in a wave length from 450 nm to 650 nm, reduction in visibility due to reflection of external light on the display device surface can be prevented, and where the factor is 0.4% or less, reflection of external light can be substantially prevented.

Where a* and b* value of CIE 1976 L*a*b* in the color space of a regular-reflected light (or specular reflection light) is in the range $0 \leq a^* \leq 7$ to $-10 \leq b^* \leq 0$ in relation to incident light at an incident angle of 5° in a wave length from 380 nm to 780 nm coming from a CIE standard light source D65, and another specular reflection light against incident light from any angle in the range of an incident angle of 5 to 45° can meet $a^* \geq 0$ and $b^* \leq 0$ in the color space, it is possible to reduce the color of reflected light at a low incident angle and also reduce variance in the color depending on the incident angle of reflected light.

Further, where a specular reflection light in relation to incident light at any angle in the incident angle ranging from 5 to 45° is within the range of $C^*=[(a^*)^2+(b^*)^2]^{1/2} \leq 12$ in the color space, it is possible to reduce coloration of reflected light from reddish purple to bluish purple which was a problem found in a conventional antireflection film-provided polarizing plate and further reduce variance in color depending on the incident angle of reflected light.

It is also possible that color of the reflected light and variance in the color depending on the incident angle can be sufficiently reduced by maintaining the value within $C^*=[(a^*)^2+(b^*)^2]^{1/2} \leq 10$. Where a polarizing plate to which the antireflection film is fixed is used in a liquid crystal display device, color developed by a slight reflection of bright external light such as light from a fluorescent lamp in a room is neutralized over a wider incident angle and hardly feels uneasy.

To be more specific, the value of $a^* \geq 0$ will not develop a cyanogen-related color, whereas the value of $b^* \leq 0$ will not develop a yellowish color, which is therefore preferable. Further, where the value is $a^* \geq 0$ and $b^* \leq 0$ and also $C^*=[(a^*)^2+(b^*)^2]^{1/2}<12$, magenta-like color is not excessively developed, and therefore it is preferable.

A spectrophotometer V-550 equipped with an adaptor ARV-474 [made by JASCO Corporation] is used to determine the specular reflectivity and color. To be specific, the specular reflectivity at emergence angle-θ and at incident angle θ (θ=5 to 45° and at 5 degree interval) in the wave-length region 380 to 780 nm is measured and the mean reflectivity ratio is calculated at the wave-length region 450 to 650 nm to evaluate the antireflection performance. Further, L* value, a* value and b* value of CIE1976 L*a*b* color space representing the color of the specular reflection light in relation to incident light at individual incident angles for CIE standard light source $D_{65}$ are calculated by referring to the determined reflection spectrum, based on which the color of reflected light may be evaluated.

Further, as explained above, the color of reflected light may be substantially reduced, which contributes to a great reduction in color variance in reflected light due to irregular thickness of the antireflection film. Namely, the irregular thickness is tolerated to a larger extent, thereby leading to effective production and further reduction in the production cost.

The quantitative result may be indicated by variance in color of the specular reflection light in relation to the incident light at an incident angle of 5° of CIE standard light source $D_{65}$ in a wave length from 380 nm to 780 nm at any two sites 10 cm apart from the TD direction (direction normal to the machine direction of the transparent protective film) and MD direction (machine direction of the transparent protective film). In this instance, ΔEa*b* value of CIE1976 L*a*b*color space is preferably less than 2 and more preferably less than 1.5, at which no irregularity can be macroscopically detected any longer.

In the invention, the expression that a*b* value or C* value at any incident angle of 5 to 45° is within the above-described range means that a* value, b* value or C* value calculated from the specular reflection light spectrum in relation to the incident light from 5 to 45° at an interval of 5° is in the above-described range.

It is preferred that the high-refractive index layer is a cured film with a refractive index of 1.55 to 2.50 to which curing compounds containing fine particles of inorganic compounds having a high refractive index (hereinafter, they may also be referred to as inorganic fine particles) and matrix binders are applied. The refractive index is preferably 1.65 to 2.40 and more preferably 1.70 to 2.20.

The high-refractive index layer is preferably provided on the surface with a state of fine unevenness which will not cause any optical effect, and the arithmetic mean roughness (Ra) of the surface irregularity of the high-refractive index layer based on JIS B-0601-1994 is preferably 0.001 to 0.03 μm, more preferably 0.001 to 0.015 μm, particularly preferably a range of 0.001 to 0.010 μm, and the ten-point mean roughness (Rz) is preferably 0.001 to 0.06 μm, more preferably a range of 0.002 to 0.05 μm and particularly preferably 0.002 to 0.025 μm, the maximum height (Ry) is preferably 0.09 μm or less, more preferably 0.05 μm or less and particularly preferably 0.04 μm or less. Further, in the above state of fine unevenness which will not cause any optical effect, it is preferred that the ratio (Ra/Rz) of arithmetic mean roughness (Ra) to ten-point mean roughness (Rz) is 0.15 or more and the mean distance of the surface irregularity (Sm) of the high-refractive index layer based on JIS B-0601-1994 is 0.01 to 1 μm. In this instance, the relationship between Ra and Rz represents the uniformity of the surface unevenness. It is more preferable that the (Ra/Rz) ratio is above 0.17 and the mean distance (Sm) is 0.01 to 0.8 μm. Where the value is within the above range, the condition of the layer to be coated on the high-refractive index layer is free from any irregularities or streaks and preferable, under which the adhesiveness between the layers may be improved. The layer may be evaluated for surface configuration by using an atomic force microscope (AFM).

Where a high-refractive index layer is made into a high refractive index cured film with a refractive index of 1.55 to 2.50 wherein inorganic fine particles with high refractive index are dispersed in a matrix binder, the fine particles are used at a certain percentage on the basis of the refractive index of the fine particles in view of the fact that the matrix binder is from 1.4 to 1.5 in the refractive index. To be specific, the percentage is preferably 40 to 80% by weight in relation to a total weight of the cured film and more preferably 45 to 75% by weight, In order to increase the strength of the high-refractive index layer by designing to contain inorganic fine particles at a higher percentage and also attain a greater adhesiveness with an upper layer to be formed, as described below, it is preferable that inorganic fine particles by way of ultra fine particle diameters and uniform in the particle size are used, are uniformly dispersed in the high-refractive index layer and the above-described state of unevenness is provided on the surface of the layer. If the configuration and distribution of surface unevenness on an entire surface of the high-refractive index layer are restricted to a certain range, an upper layer may be provided on an entire surface with a sufficient anchoring effect, even when the upper layer is continuously fed to a long film, thereby preferably eliminating irregularities from the upper layer and maintaining a good adhesiveness. In addition, even after prolonged storage, the layer will not undergo any change in adhesiveness which is also preferable.

In the invention, the adhesiveness between the cured film of the high-refractive index layer and the upper layer (low-refractive index layer) on the high-refractive index layer is preferably 50 mg or less in abrasion wear determined by the Taber abrasion test based on JIS K-6902 and more preferably 40 mg or less. To be specific, the abrasion wear determined by the Taber abrasion test refers to that obtained after a test piece is rotated 500 times under a load of 1 kg. The antireflection film is able to maintain a sufficient scratch resistance within the above range, and which is preferable.

In the antireflection film including the high-refractive index layer on which the surface configuration is formed, it is preferable that the number of brightness defects for which the diameter is highly visible as dust particles is 50 μm or more, with 20 pieces or less per square meter.

[Compositions for Forming High-Refractive Index Layer]
(Inorganic Fine Particles with High Refractive Index)

In the invention, inorganic fine particles having a high refractive index contained in the high-refractive index layer are preferably 1.80 to 2.80 in the refractive index, more preferably 1.90 to 2.80. These are preferably 3 to 150 nm in mean diameter of primary particles and more preferably 3 to 100 nm and particularly preferably 5 to 80 nm. It is preferable that the refractive index of the layer is effectively increased in a case where the refractive index of inorganic fine particles is 1.80 or more, and problems such as coloration of the particles do not occur in a case where the refractive index is 2.80 or less. In addition, it is preferable that problems such as deteriorated transparency of the layer do not occur in a case where the inorganic fine particles of the mean diameter of primary particles is 150 nm or less, so that the haze value of the formed high-refractive index layer is increased, and further preferable is a case where the inorganic fine particles are 3 nm or more, so that the high refractive index is maintained.

Preferable inorganic fine particles having high refractive index include, for example, particles primarily consisting of oxides, complex oxides or sulfides such as Ti, Zr, Ta, In, Nd, Sn, Sb, Zn, La, W, Ce, Nb, V, Sm, and Y. In this instance, the expression "primarily consisting of" refers to particles-constituting a compound which is contained at the largest percentage (% by weight). More preferable inorganic fine particles usable in the invention include particles primarily consisting of oxides or complex oxides containing at least one type of metal elements selected from Ti, Zr, Ta, In, and Sn.

The inorganic fine particles may contain various elements in the particles (hereinafter, these elements may be referred to as contained elements). Contained elements include, for example, Li, Si, Al, B, Ba, Co, Fe, Hg, Ag, Pt, An, Cr, Bi, P and S. In order to increase the electric conductivity of particles, tin oxide and indium oxide are preferably allowed to contain elements such as Sb, Nb, P, B, In, V and halogen, and particularly preferably allowed to have an antimony oxide at about 5 to 20% by weight.

Particularly preferable inorganic fine particles of the invention are inorganic fine particles (hereinafter, they may be referred to as "specific oxides") primarily consisting of titanium dixode containing at least one element selected from Co, Zr or Al as contained elements. A particularly preferable contained element is Co. The total content of Co, Al or Zr is preferably 0.05 to 30% by weight in relation to Ti, more preferably 0.1 to 10% by weight, further more preferably 0.2 to 7% by weight, particularly preferably 0.3 to 5% by weight and most preferably 0.5 to 3% by weight. Contained elements of Co, Al and Zr are present inside or on inorganic fine particles primarily consisting of titanium dioxide. They are more preferably present inside inorganic fine particles primarily consisting of titanium dioxide and most preferably present both inside and on the inorganic fine particles. Of these contained elements, metal elements may be present as an oxide.

Further, other preferable inorganic fine particles include particles of complex oxides with at least one metal element (hereinafter, they may be abbreviated as "Met") selected from titanium and metal elements with a refractive index of 1.95 or more wherein complex oxides are inorganic fine particles (they may be referred to as "specific complex oxides") consisting of at least one doped type of metal ions selected from Co ion, Zr ion and Al ion. In this instance, preferable metal elements in which the oxide is 1.95 or more in the refractive index include Ta, Zr, In, Nd, Sb, Sn and Bi. Ta, Zr, Sn and Bi are particularly preferable. Metal ions to be doped with complex oxides should be contained preferably in a quantity not exceeding 25% by weight in relation to a total metal quantity [Ti+Met] constituting the complex oxides in view of maintaining the refractive index. Metal ions are contained more preferably 0.05 to 10% by weight, further more preferably 0.1 to 5% by weight and most preferably 0.3 to 3% by weight.

The doped metal ion may be present as a metal ion or as any form of metal ions and can be present appropriately on the surface or inside of the complex oxides, and preferably both on and inside the complex oxides.

It is preferred that the inorganic fine particles have a crystalline structure. It is also preferable that the crystalline structure primarily consists of rutile, rutile/anatase mixed crystal and anatase and more preferably that it primarily consists of rutile. Such a structure is preferable because inorganic fine particles of the specific oxides or specific complex oxides have a refractive index of 1.90 to 2.80. The refractive index is preferably 2.10 to 2.80 and more preferably of 2.20 to 2.80. The structure is also preferable because it is able to suppress the photo catalytic activity of titanium dioxide, thereby remarkably improving weather resistance of the high-refractive index layer of the invention as well as both upper and lower layers contacting the high-refractive index layer.

The above specific metal elements and metal ions may be doped by publicly known conventional methods. For example, they can be doped by those described in JP-A-5-330825, JP-A-11-263620, Japanese Translation of International Application (Kohyo) No. H11-512336, EP-A No. 0335773 or by ion implantation methods [for example, "Ion beam application technology" complied by Gonda S., Ishikawa J. and Kamijo E., CMC Ltd., published in 1989; Aoki Y., "Hyomenkagaku," Vol. 18 (5), pp. 262, 1998; Yasuho S., et al., and "Hyomenkagaku," Vol. 20 (2), pp. 60, 1999].

The inorganic fine particles may be subjected to surface treatment. The surface treatment is to improve the surface quality of the particles by using inorganic compounds and/or organic compounds, as a result, wetting performance of the surface of the inorganic fine particles can be adjusted, and improved levigation in an organic solvent, dispersibility and stable dispersion in compounds for forming the high-refractive index layer. Inorganic compounds which effect physical adsorption to the particle surface include, for example, silicon-containing inorganic compounds (such as $SiO_2$), aluminum-containing inorganic compounds [such as $Al_2O_3$ and $Al(OH)_3$], cobalt-containing inorganic compounds (such as $CoO_2$, $Co_2O_3$ and $Co_3O_4$), zirconium-containing inorganic compounds [such as $ZrO_2$ and $Zr(OH)_4$] and iron-containing inorganic compound (such as $Fe_2O_3$).

Organic compounds usable for surface treatment include surface modifiers such as inorganic fillers consisting of publicly known metal oxides, inorganic pigments and others. They are described, for example, in the 1$^{st}$ Chapter of "Stable dispersion of pigments and technology of surface treatment/evaluation" (published by the Technical Information Institute Co., Ltd. in 2001) and others.

To be specific, the organic compounds include organic compounds and coupling compounds having polar radicals compatible with the surface of inorganic fine particles. Polar radicals compatible with the surface of inorganic fine particles include the carboxy group, phosphono group, hydroxy group, mercapto group, cyclic acid anhydride group and amino group. Preferable compounds are those containing at least one type of these radicals in molecules, for example, long-chain aliphatic carboxylic acids (such as stearic acid, lauric acid, oleic acid, linolic acid, linolenic acid), polyol compounds (such as pentaerythritol triacrylate, dipentaerythritol pentaacrylate, ECH (epichlorpyridone), modified glycerol triacrylate), phosphono group-containing compounds (such as EO (ethylene oxide), modified triacrylate phosphate) and alkanolamines (such as ethylenediamine EO additive (5 mole)).

Coupling compounds include publicly known conventional organic metal compounds, such as a silane coupling agent, titanate coupling agent and aluminate coupling agent. The silane coupling agent is most preferable. To be specific, these are the compounds described in paragraph Nos. 0011 to 0015 of JP-A-2002-9908 and JP-A-2001-310423.

These compounds used for surface treatment may be used in combination of two or more types of them.

It is also preferable that the inorganic fine particles with a core/shell structure are formed with other inorganic compounds based on the core of these inorganic fine particles. Preferable shells are oxides consisting of at least one element selected from Al, Si and Zr, for example, those described in JP-A-2001-166104.

The inorganic fine particles are not particularly restricted in shape, and are preferable in rice grain, sphere, cube, spindle shape or amorphous shape. The inorganic fine particles may be used solely or in combination of two or more types of them.
(Dispersant)

It is preferred that dispersants are added in order to use the inorganic fine particles as stable ultra fine particles as prescribed in advance. Preferable dispersants include low-molecular compounds or high-molecular compounds having a polar radical compatible with the surface of the inorganic fine particles.

The polar radicals include the hydroxy group, mercapto group, carboxyl group, sulfo group, phosphono group, oxyphosphono group, —P(=O)($R_1$)(OR) group, —O—P(=O)($R_1$)(OH) group, amide group (—CONH$R_2$, —SO$_2$NH$R_2$), cyclic acid anhydride-containing group, amino group and quaternary ammonium group.

In this instance, $R_1$ represents the hydrocarbon group having a carbon number 1 to 18 (for example, methyl group, ethyl group, propyl group, butyl group, hexyl group, octyl group, decyl group, dodecyl group, octadecyl group, chloroethyl group, methoxy ethyl group, cyanoethyl group, benzyl group, methylbenzyl group, phenethyl group and cyclohexyl group). $R_2$ represents a hydrogen atom or the same content with $R_1$.

In the above-described polar radical, a group having a dissociated proton may be its salt. Further, the above-described amino group and quaternary ammonium group may be any of the primary amino group, secondary amino group or tertiary amino group. The tertiary amino group and quaternary ammonium group are more preferable. It is preferred that a group that combines with a nitrogen atom of a secondary amino group, tertiary amino group or quaternary ammonium group is an aliphatic group (the same with the above-described $R_1$ or $R_2$ group in the content) having a carbon atom number 1 to 12. Further, the tertiary amino group may be a ring-forming amino group containing a nitrogen atom (for example, a piperidine ring, morpholine ring, piperazine ring and pyridine ring), and the quaternary ammonium group may be quaternary ammonium of these cyclic amino groups. Particularly preferable is an alkyl group having a carbon atom number 1 to 6.

Counter ions of the quaternary ammonium group are preferably halide ion, $PF_6$ ion, $SbF_6$ ion, $BF_4$ ion, $B(R_3)4$ ion ($R_3$ represents hydrocarbon group, and, for example, a butyl group, phenyl group, tolyl group, naphthyl group and butylphenyl group) and sulfonic acid ion.

Polar radicals of the dispersants are preferably anionic groups whose pKa is 7 or less and salts of their dissociated groups. Carboxyl group, sulfo group, phosphono group; oxyphosphono group or salts of their dissociated groups are particularly preferable.

It is preferred that dispersants also contain crosslinking or polymerizing functional groups. Crosslinking or polymerizing functional groups include an unsaturated ethylene group capable of undergoing addition reaction and polymerization reaction by a radical [for example, a (meth)acryloyl group, allyl group, styryl group, vinyloxy group, carbonyl group and vinyloxy group], cation polymerizing group (for example, an epoxy group, thioepoxy group, oxcetanyl group, vinyloxy group, spiro ortho ester group) and polycondensation reactive group (hydrolytic silyl group, N-methylol group). Preferable are an unsaturated ethylene group, epoxy group and hydrolytic silyl group.

To be specific, these are compounds described in paragraph Nos. [0013] to [0015] in the specification of JP-A-2001-310423.

Dispersants usable in the invention are preferably high-molecular dispersants and particularly preferably high-molecular dispersants containing an anionic group and crosslinking or polymerizing functional groups. The high-molecular dispersants are not particularly restricted for weight-average molecular weight (Mw). Preferable Mw is above $1 \times 10^3$ on the basis of polystyrene conversion by GPC (gel permeation chromatography), a more preferable Mw is from $2 \times 10^3$ to $1 \times 10^6$, a still more preferable Mw is $5 \times 10^3$ to $1 \times 10^5$ and a particularly preferable Mw is from $8 \times 10^3$ to $8 \times 10^4$ The dispersants having Mw within these ranges are preferable because inorganic fine particles may be easily dispersed to provide a stable dispersion free of aggregates or sediments. The examples are those described in paragraph Nos. [0024] to [0041] in the specification of JP-A-11-153703.
(Dispersing Media)

Dispersing media used for treating the inorganic fine particles by wet dispersion may be appropriately selected from water or organic solvents. Preferable are liquids having a boiling point of 50° C. or more preferable are organic solvents having a boiling point from 60 to 180° C.

Dispersing media are used preferably at 5 to 50% by weight in relation to a total quantity of forming the high-refractive index layer containing inorganic fine particles and dispersants, and more preferably at 10 to 30% by weight. Within these ranges, dispersion proceeds smoothly to provide an obtained dispersed substance having a viscosity that allows for better workability.

The dispersing media include alcohols, ketones, esters, amides, ethers, ethers/esters, hydrocarbons and halogenated hydrocarbons. To be specific, these include alcohols (for example, methanol, ethanol, propanol, butanol, benzyl alcohol, ethylene glycol, propylene glycol and ethylene glycol monoacetate), ketones (for example, methyl ethyl ketone, methyl isobutyl ketone, cyclohexanone and methylcyclohexanone), esters (for example, methyl acetate, ethyl acetate, propyl acetate, butyl acetate, ethyl formate, propyl formate, butyl formate and ethyl lactate), aliphatic hydrocarbons (for example, hexane and cyclohexane), halogenated hydrocarbons (for example, methyl chloroform), aromatic hydrocarbons (for example, benzene, toluene and xylene), amides (for example, dimethylformamide, dimethyl acetamide and n-methylpyrrolidone), ethers (for example, dioxane, tetrahydrofuran, ethylene glycol dimethyl ether and propylene glycol dimethyl ether), ether alcohol (for example, 1-methoxy-2-propanol, ethyl cellosolve and methyl carbinol). They may be used solely or in combination with two or more types of them. Preferable dispersing media include toluene, xylene, methyl ethyl ketone, methyl isobutyl ketone, cyclohexanone and butanol. Coating solvents primarily consisting of ketone solvents (for example, methyl ethyl ketone, methyl isobutyl ketone and cyclohexanone) are also preferably used. Ketone solvents are contained preferably at 10% by weight or more in relation to all solvents contained in compounds for forming the high-refractive index layer, more preferably at 30% by weight or more and further more preferably at 60% by weight or more.

(Ultra-Levigation of Inorganic Fine Particles)

Where compounds for forming the curing high-refractive index layer usable in the invention are made into an ultra-fine particle dispersion of inorganic compounds with a mean particle size of 100 nm or less, the compounds are rendered more stable in liquid, and the high-refractive index layer which is a cured film formed by these curing compounds is available in such a fashion that inorganic fine particles are uniformly dispersed in the matrix of the cured film in a state of ultra fine particles to provide a transparent high-refractive index layer uniform in the optical characteristics. Ultra-fine particles present in the matrix of the cured film are preferably 3 to 100 nm in mean particle size, more preferably 5 to 100 nm and most preferably 10 to 80 nm. It is also preferable that larger particles with a mean particle size of 500 nm or more are not contained, and it is particularly preferable that larger particles with a size of 300 nm or more are not contained. Under these conditions, the above-described specific uneven state is given to the surface of the cured film, which is preferably.

Dispersion of the above-described high refractive inorganic fine particles in a state of ultra-fine particles and free of large particles with the above-described ranged particle size may be attained by wet dispersion method on addition of the dispersants, together with media whose mean particle size of under 0.8 mm.

Wet dispersing machines include publicly known conventional devices such as sand grinder mill (for example, beads mill with pin), dyno mill, high-speed impeller mill, pebble mill, roller mill, atorita and colloid mill. Sand grinder mill, dyno mill and high-speed impeller are in particular preferable in dispersing inorganic fine particles of the invention into a state of ultra fine particles.

Media to be used together with the above-described dispersing machine are preferably 0.8 mm or less in mean particle size. Use of media with the above-described mean particle size makes it possible to obtain inorganic fine particles with a diameter below 100 nm and also provide ultra fine particles uniform in particle size. The media are more preferably 0.5 mm or less in mean particle size and further more preferably 0.05 to 0.3 mm. Preferable media used for wet dispersion are beads, more particularly, zirconia beads, glass beads, ceramic beads and steal beads. Particularly preferable are zirconia beads with a diameter from 0.05 to 0.2 mm in view of decay durability such that they are broken less frequently in dispersion (more durable) and ultra-levigation.

Dispersing temperatures at the dispersion process are preferably 20 to 60° C. and more preferably 25 to 45° C. Dispersed particles do not agglomerate again or produce sediment on dispersion into a state of ultra fine particles at these temperature ranges, which is preferable in the invention. This finding is considered due to the fact that a dispersant is appropriately adsorbed to inorganic compounds and the dispersion is not rendered unstable due to desorption of particles of the dispersant at normal temperatures. Where the dispersion process is carried out at these temperature ranges, it is possible to provide a high refractive index film which is not affected by transparency, uniform in refractive index, greater in strength and excellent in adhesiveness with an adjacent layer.

A preliminary dispersion treatment may be carried out before the above-described wet dispersion process. Dispersing machines usable in the preliminary dispersion treatment may include a ball mill, triple roil mill, kneader and extruder.

It is also preferable that filtering media are provided to effect micro-filtration during the separation process from beads for removing large agglomerates in a dispersion in such a way that dispersed particles in the dispersion can be made satisfactory in mean particle size and also in the mono-dispersing property of the particle size at the above-described ranges. Filtering media for micro-filtration are preferably 25 µm or less in particle size of filtering particles. The filtering media for micro-filtration are not particularly restricted as to types, as long as they meet the above-described performance, and include, for example, filament, felt and mesh types. The filtering media for micro-filtration of the dispersion are not particularly restricted for materials, as long as they meet the above-described performance and do not affect the compounds for forming the high-refractive index layer, and include, for example, stainless steel, polyethylene, polypropylene and nylon.

(Matrix of High-Refractive Index Layer)

It is preferable that the high-refractive index layer contains high refractive inorganic fine particles and a matrix.

According to a preferable embodiment of the invention, the matrix of a high-refractive index layer is formed by coating and then curing compounds for forming the high-refractive index layer containing at least either (A) an organic binder or (B) an organic metal compound containing a hydrolytic functional group and a partial condensate of the organic metal compound.

(A) Organic Binders

Organic binders include binders formed by (a) publicly known conventional thermoplastic resins, (b) combination of publicly known conventional reactive curing resins with curing agents or (c) combination of binder precursors (multi-functional curing monomers and multi-functional oligomers to be described later) with polymerization initiators.

It is preferable that a compound for forming a high-refractive index layer is prepared by a dispersing solution containing organic binders of the above (a), (b) or (d), high refractive inorganic fine particles and dispersants. The compound is coated on a transparent protective film to form a film, which is then cured according to the compound for forming the binder concerned to provide the high-refractive index layer. The curing method is appropriately selected depending on the type of the binder compound. For example, at least either heating or exposure to light is given to curing compounds (such as multi-functional monomers and multi-functional oligomers) to effect cross-linkage or polymerization. Among other things, preferable is a process in which the above (c) combination is used to cause exposure to, light, thereby subjecting the curing compound to cross-linkage or polymerization to provide a cured binder.

It is also preferable that a dispersant contained in the dispersing solution of high refractive inorganic fine particles is subjected to cross-linkage or polymerization simultaneously with or after coating of the compound for forming the high-refractive index layer.

Thus the prepared binder in the cured film is available in a form where, for example, multi-functional curing monomers (precursors for the dispersant and the binder) and multi-functional oligomers are cross-linked or polymerized and an anionic group of the dispersant is incorporated into the binder. Further, since in the binder of the cured film, the anionic group is provided with a function to maintain the inorganic fine particles dispersed, the cross-linked or polymerized structure imparts a film-forming capacity to the binder, thereby improving the physical strength, drug resistance and weather resistance of the cured film containing the high refractive inorganic fine particles.

The above (a) thermoplastic resins include polystyrene resin, polyester resin, cellulose resin, polyether resin, vinyl chloride resin, vinyl acetate resin, vinyl chloride/vinyl oxide copolymer resin, polyacrylate resin, polymethacrylate resin, polyolefin resin, urethane resin, silicone resin and imide resin.

It is also preferable that thermosetting resins and/or ionizing radiation curing resins are used as the above (b) reactive curing resins. Thermosetting resins include phenol resin, urea resin, diallylphthalate resin, melamine resin, guanamine resin, unsaturated polyester resin, polyurethane resin, epoxy resin, aminoalkyd resin, melamine urea co-condensed resin, silicon resin and polysiloxane resin. Ionizing radiation curing resins include resins having functional groups such as radical polymerization unsaturated groups[(meth)acryloyloxy group, vinyloxy group, styryl group and vinyl group] and/or cation polymerizing groups (epoxy group, thioepoxy group, vinyloxy group, oxcetanyl group) and, for example, relatively low-molecular weight polyester resin, polyether resin, (meth)acrylate resin, epoxy resin, urethane resin, alkyd resin, spiroacetal resin, polybutadiene resin and polythiol-polyene resin.

To these reactive curing resins added are, when necessary, publicly known conventional compounds, such as crosslinking agents (such as an epoxide compound, polyisocyanate compound, polyol compound, polyamine compound, melamine compound), polymerization initiators (UV light initiators such as an azobis compound, organic peroxide compound, organic halogen compound, onium salt compound, ketone compound), curing agents, polymerization accelerators (such as organic metal compound, acid compound, basic compound). To be specific, the conventional compounds are those described in "Crosslinking agent handbook" compiled by Yamashita S. and Kaneko T (Taiseisha Co., Ltd., 1981).

Hereinafter, an explanation will be made mainly for a preferable method for forming a cured binder, namely, a method in which the above (c) combination is used to give cross-linkage or polymerization to curing compounds through exposure to light, thereby providing a cured binder.

Functional groups of photo curing multi-functional monomers and multi-functional oligomers may be either radical polymerization or cation polymerization groups.

Radical polymerization functional groups include an unsaturated ethylene group such as a (meth)acryloyl group, vinyloxy group, styryl group and allyl group. The (meth)acryloyl group is preferable. It is preferred to have a multi-functional monomer containing two or more radical polymerization groups in the molecule.

Radical polymerization multi-functional monomers are preferably selected from compounds having at least 2 terminal ethylene unsaturated bonds. Preferable compounds are those having 2 to 6 terminal ethylene unsaturated bonds in the molecule. Such compounds are well known in the field of polymer materials and may be used without any restriction in the invention. These compounds may be available in a chemical form of, for example, a monomer, prepolymer (bipolymer, tripolymer and oligomer), their mixture and copolymer.

Radical polymerization monomers include unsaturated carboxylic acids (for example, an acryic acid, methacrylic acid, itaconic acid, crotonic acid, isocrotonic acid, maleic acid) and their esters and amides, and preferably include esters of unsaturated carboxylic acids with aliphatic multivalent alcohol compounds, unsaturated carboxylic acids, and aniides such as aliphatic multivalent amine compounds.

Also preferably usable are addition reaction products of mono-functional or multi-functional isocyanates and epoxides with unsaturated carboxylic acid esters having nucleophilic substituents such as a hydroxyl group, amino group and mercapto group and amides or dehydrated condensation reaction products with multi-functional carboxylic acids. Further, also preferably usable are reaction products of unsaturated carboxylic acid esters having electrophilic substituents such as an isocyanate group and epoxy group or amides with mono-functional or multi-functional alcohols, amines and thiols. As other examples, also usable are compounds in which unsaturated phosphonic acid, styrene or others are used in place of the above-described unsaturated carboxylic acids.

Aliphatic multivalent alcohol compounds include alkane diol, alkane triol, cyclohexane diol, cyclohexane triol, inositol, cyclohexane dimethanol, pentaerythritol, sorbitol, dipentaerythritol, tripentaerythritol, glycerine and diglycerin. Also included are polymerized ester compounds (monoester or polyester) of their aliphatic multivalent alcohol compounds with unsaturated carboxylic acids, for example, the compounds described in paragraph Nos. [0026] to [0027], JP-A-2001-139663.

Other polymerized esters preferably used in the invention are, for example, vinylmethacrylate, allylmethacrylate, allylacrylate, aliphatic alcohol esters described in Japanese Published Examined Patent Application No. S46-27926 and Japanese Published Examined Patent Application No. S51-47334 and JP-A-57-196231, those having an aromatic skeleton described in JP-A-2-226149 and those having amino groups described in JP-A-1-165613.

In addition, polymerizing amides consisting of aliphatic multivalent amine compounds and unsaturated carboxylic acids include, for example, methylenebis (meth)acrylamide, 1,6-hexamethylenebis(meth)acrylamide, diethylenetriaminetris (meth)acrylamide, xylenebis (meth)acrylamide and those having a cyclohexylene structure described in Japanese Published Examined Patent Application No. S54-21726.

Additionally usable are vinyl urethane compounds containing two or more polymerizing vinyl groups in one molecule (Japanese Published Examined Patent Application No. S4841708, etc.), urethane acrylates (Japanese Published Examined Patent Application No. H2-16765, etc.), urethane compounds having ethylene oxide skeleton (Japanese Published Examined Patent Application No. S62-39418, etc.), polyesteracrylates (Japanese Published Examined Patent Application No. S52-30490, etc.) and those photo curing monomers and oligomers described in the Journal of the Adhesion Society of Japan, Vol. 20: No. 7, 300-308 (1984).

These radical polymerization multi-functional monomers may be used in combination of two or more types of them.

Next, an explanation will be made for cation polymerization group-containing compounds usable for forming a binder of the high-refractive index layer (hereinafter referred to as "cation polymerization compounds" or "cation polymerization organic compounds").

Any compound which will cause polymerization and/or cross-linkage on exposure to an activated energy ray in the presence of an activated energy ray-sensitive cation polymerization initiator can be used as a cation polymerization compound of the invention. The example includes an epoxy compound, cyclic thioether compound, cyclic ether compound, spiroortho ester compound, vinyl hydrocarbon compound and vinyl ether compound. One or two or more types of the above-described cation polymerization compounds may be used in the invention.

Cation polymerization group-containing compounds are preferably 2 to 10 in the number of cation polymerization groups contained in one molecule, and particularly preferably 2 to 5. The compounds are 3,000 or less in molecular weight, preferably in a range of 200 to 2,000 and particularly preferably in a range of 400 to 1,500. A molecular weight maintained at the lower limit or more would not cause any inconvenience such as problematic volatilization in the film-forming process, while the molecular weight maintained at the upper limit or less would not cause inconvenience such as poor compatibility with compounds of a high-refractive index layer. Therefore, the molecular weight range is preferable.

The epoxy compounds include aliphatic epoxy compounds and aromatic epoxy compounds.

Aliphatic epoxy compounds include, for example, aliphatic multivalent alcohol or polyglycigyl ether of the alkylene oxide addition product, aliphatic long-chain multi-basic acid of polyglycigyl ester, glycigyl acrylate and homopolymer or copolymer of glycigyl methacrylate. In addition to the epoxy compounds, also usable in the invention are aliphatic higher alcohol of monoglycigyl ether, higher fatty acid of glycigyl ester, epoxidated soybean oil, epoxy stearic acid butylepoxy octyl stearate, epoxidated flaxseed oil and epoxidated polybutadiene. In addition, alicyclic epoxy compounds include multivalent alcohols of polyglycigyl ether having at least one alicyclic ring and compounds containing cyclohexane oxide or cyclopentene oxide which are obtained through epoxidation of compounds containing an unsaturated alicyclic ring (for example, cyclohexane, cyclopentene, dicycloctane or tricyclodecene) by using an appropriate oxidizing reagent such as hydrogen peroxide or hyperacid product.

In addition, aromatic epoxy compounds include monovalent or multivalent phenol containing at least one aromatic nucleus, monomer of the alkylene oxide addition product and polyglycigyl ether. These epoxy compounds include, for example, compounds described in paragraph Nos. [0084] to [0086] in JP-A-11-242101 and those described in paragraph Nos. [0044] to [0046] in JP-A-10-158385.

Of these epoxy compounds, aromatic epoxide and alicyclic epoxide are preferable and alicyclic epoxide is particularly preferable, when fast-curing property is taken into account. In the invention, the above-described epoxy compounds may be used solely or in combination with two or more types of them.

Cyclic thioether compounds include compounds in which the above-described epoxy ring is formed into a thioepoxy ring.

Compounds which contain an oxcetanyl group as cyclic ether include, for example, those described in paragraph Nos. [0024] to [0025] in JP-A-2000-239309. It is preferred that these compounds are used in combination with epoxy group-containing compounds.

Spiroortho ester compounds include, for example, those described in JP-T-2000-506908.

Vinyl hydrocarbon compounds include styrene compounds, vinyl group-substituted alicyclic hydrocarbon compounds (vinylcyclohexane, vinylbicyclo heptene), compounds described as a radical polymerization monomer, propenyl compounds described in (Journal of Polymer Science: Part A: Polymer Chemistry, Vol. 32, 2895 (1994)), alkoxyallene compounds described in (Journal of Polymer Science: Part A: Polymer Chemistry, Vol. 33, 2493 (1995)), vinyl compounds described in (Journal of Polymer Science: Part A: Polymer Chemistry, Vol. 34, 1015(1996) and also described in JP-A-2002-29162) and isopropenyl compounds described in (Journal of Polymer Science: Part A: Polymer Chemistry, Vol. 34, 2051(1996)). They may be used in combination of two or more types of them.

Further, the multi-functional compounds preferably contain at least in the molecule those selected from at least one type of radical polymerization groups and cation polymerization groups. The examples include compounds described in paragraph Nos. [0031] to [0052] in JP-A-8-277320 and in [0015] in JP-A-2000-191737. Compounds usable in the invention shall not be restricted to them.

The above-described radical polymerization compounds and the cation polymerization compounds are preferably contained of 90:10 to 20:80 based on the weight ratio of a radical polymerization compound to cation polymerization compound and more preferably 80:20 to 30:70.

Next, an explanation will be made in detail for polymerization initiators used in combination with binder precursors with regard to the combination described in the above-described (C).

The polymerization initiators include thermal polymerization initiators and photo polymerization initiators.

It is preferable that the polymerization initiators are compounds which will produce radicals or acids on exposure to light and/or heat. The photo polymerization initiators are preferably below 400 nm in maximum absorption wavelength. The initiators can be handled under incandescent light by converting the wavelength to the ultraviolet region. It is also possible to use compounds having the maximum absorption wavelength in the near-infrared ray region.

First, an explanation will be made in detail for radical producing compounds.

Radical producing compounds preferably used in the invention are compounds that will produce radicals on exposure to light and/or heat as well as start and facilitate polymerization of compounds having polymerizing unsaturated groups. Publicly known polymerization initiators and compounds having small bond dissociation energy can be appropriately selected and used in the invention. Further, radical-producing compounds may be used solely or in combination with two or more types of them.

The radical producing compounds include, for example, thermal radical polymerization initiators such as publicly known conventional organic peroxide compounds and azo polymerization initiators as well as photo radical polymerization initiators such as organic peroxide compounds (JP-A-2001-139663, etc.), amine compounds (JP-A-44-20189), metallocene compounds (JP-A-5-83588, JP-A-1-304453, etc.), hexaarylbiimidazole compounds (U.S. Pat. No. 3,479, 185, etc.), disulfone compounds (JP-A-5-239015, JP-A-61-166544, etc.), organic halogenated compounds, carbonyl compounds and organic boric acid compounds.

The above-described organic halogenated compounds include, for example, compounds described in "Bull Chem. Soc. Japan" by Wakabayashi et al., 42, 2924 (1969), U.S. Pat. No. 3,905,815, JP-A-5-27830, M. P. Hutt, "Journal of Heterocyclic Chemistry" 1 (No3), (1970). Particularly preferable are trihalomethyl group-substituted oxazole compounds: S-triazine compounds. More preferable are s-triazine derivatives in which at least one of mono-, di- or tri-halogen substituted methyl group bonds with a s-triazine ring.

The above-described carbonyl compounds include compounds described on pages 60-62, "Latest UV curing technology" published by the Technical Information Institute Co., Ltd., in 1991, in paragraph Nos. [0015] to [0016] in JP-A-8-134404 and in paragraph Nos. [0029] to [0031] in JP-A-11-217518, and for example, benzoin compounds such as acetophenones, hydroxy acetophenones, benzophenones, thioxanes, benzoinethyl ethers and benzoin isobutyl ethers, ethyl benzoate derivatives such as p-dimethylamino ethyl benzoate, p-diethylamino ethyl benzoate, benzyldimethyl ketal and acyl phosphone oxide.

The above-described organic borate compounds include those described in Japanese Patent No. 2764769, JP-A-2002-116539 and Kunz, Martin, "Rad Tech'98. Proceeding Apr. 19-22, 1998, Chicago." They are, for example, compounds described in paragraph Nos. [0022] to [0027] in JP-A-2002-116539. Further, other organic borate compounds include boron transition metal coordinate complexes described in JP-A-6-348011, JP-A-7-128785, JP-A-7-140589, JP-A-7-306527 and JP-A-7-292014.

These radical-producing compounds may be added solely or in combination of two or more types of them. They may be added from 0.1 to 30% by weight in relation to a total quantity of radical polymerization monomers, preferably 0.5 to 25% by weight and particularly preferably 1 to 20% by weight. Within the above-described range, compounds of the high-refractive index layer are stable with the lapse of time and able to provide a higher polymerization.

Next, an explanation will be made in detail for photo acid generators that can be used as photo polymerization initiators.

Acid generators include publicly known compounds and their mixtures such as photo initiators of photo cation polymerization, photo color removers and photo alterants of coloring matters or publicly known acid generators used in micro resist technology, etc. In addition, acid generators include organic halogenated compounds, disulfone compounds, onium compounds, of which organic halogen compounds, disulfone compounds are specifically compounds similar to those generating radicals.

Onium compounds include diazonium salt, ammonium salt iminium salt, phosphonium salt, iodonium salt, sulfonium salt, arsonium salt and selenonium salt. To be specific, they are compounds described in paragraph Nos. [0058] to [0059] in JP-A-2002-29162.

As for acid generators, onium salt is preferably used in the invention. Among other things, diazonium salt, iodonium salt, sulfonium salt and iminium salt are preferably used in terms of optical sensitivity on starting photo polymerization and stability of raw materials of the compounds.

Onium salts preferably used in the invention are, for example, amylated sulfonium salts described in paragraph [0035] in JP-A-9-268205, diaryl iodonium salt and triaryl sulfonium salt described in paragraph Nos. [0010] to [0011] in JP-A-2000-71366, sulfonium salt of thiobenzoic acid S-phenyl ester described in paragraph No. [0017] in JP-A-2001-288205 and onium salt described in paragraph Nos. [0030] to [0033] in JP-A-2001-133696.

Other examples of acid generators include compounds such as organic metal/organic halogenated products, photo acid generators having an o-nitrobenzl-type protective group and compounds (iminosulfonate, etc.) which undergo photolysis to produce sulfonic acid described on paragraph Nos. [0059] to [0062] in JP-A-2002-29162.

These acid generators may be used solely or in combination with two or more types of them. These acid generators may be added from 0.1 to 20% by weight in relation to a total weight of all cation polymerization monomers (100 by weight), preferably 0.5 to 15% by weight and particularly preferably 1 to 10% by weight. The above-described range of addition is preferable in view of stability of compounds of high refractive index and better performance of polymerization reaction.

It is preferable that compounds of a high-refractive index layer used in the invention contain radical polymerization initiators in the range 0.5 to 10% by weight or cation polymerization initiators in the range 1 to 10% by weight in relation to a total weight of radical polymerization compounds and cation polymerization compounds. It is more preferable that they contain the radical polymerization initiators in the range 1 to 5% by weight or the cation polymerization initiators in the range 2 to 6% by weight.

Where ultraviolet radiation is conducted to effect polymerization, compounds for forming the high-refractive index layer of the invention may be used in combination with publicly known conventional ultraviolet spectral sensitizers and chemical sensitizers. These sensitizers include Michiler's ketone, amino acids (glycine, etc.) and organic amines (butyl amine, dibutyl amine, etc.).

Where polymerization reaction is carried out on exposure to a near-infrared ray, it is preferable to use in combination with near-infrared ray spectral sensitizers. The near-infrared ray spectral sensitizers to be used in combination may include any light-absorbing substance having the absorption band at least at a part of the wavelength range of 700 nm or more. Preferable are compounds having the molecular absorption constant of 10,000 or more and more preferable are those having absorption in a region from 750 to 1400 nm and a molecular absorption constant of 20,000 or more. Most preferable are optically transparent compounds having an absorption bottom in the visible light wavelength range of 420 nm to 700 nm.

The near-infrared ray spectral sensitizers may include various pigments and dyes known as near-infrared ray absorption pigments and near-infrared ray absorption dyes. Of these products, it is preferred to use publicly known conventional near-infrared ray absorbing agents. Usable for this purpose are commercially available dyes and publicly known dyes described in literature [for example, "Near-infrared ray absorbing coloring matters," Chemical Industry, May 1986, 45-51; "Development of functional coloring matters and market trend in the 1990s," Chapter 2, sections 2 and 3 (1990), CMC; "Special functional coloring matters" complied by Ikemori and Hashiratani, 1986, published by CMC] J. FABIAN, Chem. Rev., Vol. 92, 1197-1226, 1992], catalog published by the Nihon Kanko Shikiso Kenkyujo in 1995 and catalogue of laser coloring matters published in 1989 by Exciton Inc. and the patents.

(B) Hydrolytic Functional Group-containing Organic Metal Compounds and partial condensates of these Organic Metal Compounds.

It is also preferable that hydrolyzable functional group-containing organic metal compounds are used to provide a film cured after film formation through sol-gel reaction as a matrix of the high-refractive index layer used in the invention.

Organic metal compounds include compounds consisting of Si, Ti, Zr, Al and others. Hydrolyzable functional groups include an alkoxy group, alkoxycarbonyl group, halogen atom and hydroxy group. Alkoxy groups such as a methoxy group, ethoxy group, propoxy group, butoxy group are particularly preferable. Preferable organic metal compounds include organosilane compounds expressed by the following formula (A0) and their partial hydrolysates (partial condensates). Further, it is well known that the organosilane expressed by formula (A0) is easily hydrolyzed to cause dehydration and subsequent condensation.

$$(R^a)_\alpha Si(X_1)_{4-\alpha} \qquad \text{Formula (A0)}$$

In formula (A0), $R^a$ represents substituted or an unsubstituted aliphatic group having a carbon number of 1 to 30 or aryl group having a carbon number of 6 to 14. $X_1$ represents a halogen atom (choline atom, bromine atom, etc.), OH group, $OR^b$ group and $OCOR^b$ group. In the formula, $R^b$ represents a substituted or unsubstituted alkyl group. α represents an integral number of 0 to 3, preferably 0, 1 or 2 and particularly preferably 1. However, where α° is 0, X represents an $OR^b$ group or $OCOR^b$ group.

In formula (A0), aliphatic groups of $R^a$ are preferably those having a carbon number of 1 to 18, for example, (methyl group, ethyl group, propyl group, butyl group, pentyl group, hexyl group, octyl group, decyl group, dodecyl group, hexadecyl group, octadecyl group, benzyl group, phenethyl group, cyclohexyl group, cyclohexylmethyl group, hexenyl group, decenyl group and dodecenyl group). More preferable are those having a carbon number of 1 to 12 and particularly preferable are those having a carbon number of 1 to 8. Aryl groups of $R^a$ are a phenyl group, naphthyl group and anthranil group, of which the phenyl group is preferable.

No particular restriction is placed on substituents usable in the invention, and preferable are a halogen group (such as fluorine, chlorine and bromine), hydroxy group, mercapto group, carboxyl group, epoxy group, alkyl group (such as methyl, ethyl, i-propyl, propyl and t-butyl), aryl group (such as phenyl and naphthyl), aromatic heterocycle group (such as furril, pyrazolyl and pyridyl), alkoxy group (such as methoxy, ethoxy, i-propoxy and hexyloxy), aryl oxy (such as phenoxy), alkylthio group (such as methylthio and ethylthio), arylthio group (such as phenylthio), alkenyl group (such as vinyl and 1-propenyl), alkoxysilyl group (such as trimethoxysilyl and triethoxysilyl), acyloxy group (such as acetoxy and (meth) acryloyl), alkoxycarbonyl group (such as methoxycarbonyl and ethoxy carbonyl), aryl oxycarbonyl group (such as phenoxycarbonyl), carbamoyl group (such as carbamoyl, N-methylcarbamoyl, N,N-dimethylcarbamoyl and N-methyl-N-octylcarbamoyl) and acylamino group (such as acetylamino, benzoyl amino, acrylamino and methacrylamino).

Of these substituents, more preferable are a hydroxy group, mercapto group, carboxyl group, epoxy group, alkyl group, alkoxysilyl group, acyloxy group and acylamino group, and particularly preferable are an epoxy group, polymerizing acyloxy group ((meth)acryloyl) and polymerizing acylamino group (acrylamino and methaacrylamino). Further, these substituents may be substituted.

As described previously, $R^b$ represents substituted or unsubstituted alkyl, but substituents of the alkyl group are similarly explained with $R^a$.

The compounds expressed by formula (A0) are contained preferably of 10 to 80% by weight in relation to a total solid content of the high-refractive index layer, more preferably 20 to 70% by weight and particularly preferably 30 to 50% by weight.

The compounds expressed by formula (A0) are, for example, those compounds described in paragraph Nos. [0054] to [0056] in JP-A-2001-166104.

In the high-refractive index layer, organic binders are preferably those having a silanol group. The binders having a silanol group are preferable because the silanol group will further improve the physical strength, drug resistance and weather resistance of the high-refractive index layer. The silanol group can be introduced into the binders, for example, by blending organosilane compounds expressed by formula (A0) having crosslinking or polymerizing functional groups with coating compounds, together with binder precursors (curing multi-functional monomers and multi-functional oligomers), polymerization initiators and dispersants contained in a dispersing solution of high refractive inorganic fine particles, as binder-forming compounds of constituting coating compounds of the high-refractive index layer, coating the coating compounds on a transparent protective film, then subjecting the dispersants, multi-functional monomers, multi-functional oligomers and organosilane compounds expressed by formula (A0) to cross-linkage or polymerization.

It is preferable that hydrolysis and condensation reaction for curing the organic metal compounds are conducted in the presence of catalysts. The catalysts include inorganic acids such as hydrochloric acid, sulfuric acid and nitric acid; organic acids such as oxalic acid, acetic acid, formic acid, trifluoroacetic acid, methane sulfonic acid and toluenesulfonic acid; inorganic bases such as sodium hydroxide, potassium hydroxide and ammonia; organic bases such as triethylamine and pyridine; metal alkoxides such as triisopropoxy aluminium, tetrabutoxy zirconium and tetrabutoxy titanate; and metal chelate compounds such as β-diketone and β-ketoester. To be specific, they are those compounds described in paragraph Nos. [0071] to [0083] in JP-A-2000-275403.

The compound ratio of these catalysis compounds is in the range 0.01 to 50% by weight in relation to the organic metal compound, preferably 0.1 to 50% by weight and more preferably 0.5 to 10% by weight. The reaction conditions should be appropriately controlled depending on the reactivity of the organic metal compounds.

In the high-refractive index layer, it is preferred that the matrix has a specific polar radical. The specific polar radical includes an anionic group, amino group and quaternary ammonium group. To be specific, these anionic group, amino group and quaternary ammonium group are similar to those used in the dispersants.

The matrix of the high-refractive index layer having specific polar radicals is obtained, for example, by blending a dispersing solution containing high refractive inorganic fine particles and dispersants with coating compounds of the high-refractive index layer, blending a combination of binder precursors containing specific polar radicals (curing multi-functional monomers and multi-functional oligomers having specific polar radicals) with polymerization initiators as cured film-forming compounds and further blending at least any of organosilane compounds expressed by formula (A0) having specific polar radicals and also having a crosslinking or polymerizing functional group, and blending, if desired, mono-functional monomers having specific polar radicals and crosslinking or polymerizing functional groups, coating the coating compounds on a transparent protective film, thereby subjecting the above-described dispersants, mono-functional monomers, multi-functional monomers, multi-functional oligomers and/or organosilane compounds expressed by formula (A0) to cross-linkage or polymerization.

Mono-functional monomers having specific polar radicals are able to help inorganic fine particles disperse in the coating compounds and are therefore preferable. Further, after coating, the mono-functional monomers are allowed to have cross-linkage or polymerization with dispersants, multi-functional monomers and multi-functional oligomers to give a binder, by which inorganic fine particles are preferably and uniformly dispersed in a high-refractive index layer to provide a high-refractive index layer excellent in physical strength, drug resistance and weather resistance.

Mono-functional monomers having an amino group or quaternary ammonium group are preferably used in the range 0.5 to 50% by weight in relation to the dispersants and more preferably 1 to 30% by weight. If the binder can be formed by cross linkage or polymerization simultaneously with or after coating of the high-refractive index layer, mono-functional monomers are allowed to function effectively before coating of the high-refractive index layer.

Further, the matrix of the high-refractive index layer of the invention corresponds to the organic binder (B), including those cured and formed from organic polymers containing publicly known conventional crosslinking or polymerizing functional groups. It is preferred that the matrix has a structure in which polymers after formation of the high-refractive index layer are further cross-linked or polymerized. The polymers include, for example, polyolefin (made of saturated hydrocarbon), polyether, polyurea, polyurethane, polyester, polyamine, polyamide and melamine resin. Among others, polyolefin, polyether and polyurea are preferable, and polyolefin and polyether are more preferable. Organic polymers before curing are preferably $1\times10^3$ to $1\times10^6$ in weight-average molecular weight and more preferably $3\times10^3$ to $1\times10^5$.

It is preferred that organic polymers before cure are copolymers with repeating units having specific polar radicals similar in description and also repeating units having a cross-linked or polymerized structure. The repeating units having an anionic group in the polymers are preferably 0.5 to 99% by weight in relation to total repeating units, more preferably 3 to 95% by weight and most preferably 6 to 90% by weight. The repeating units may have two or more different or similar anionic groups.

Where silanol group-containing repeating units are included, the ratio is preferably 2 to 98 mol %, more preferably 4 to 96 mol % and most preferably 6 to 94 mol %. Where amino group-containing or quaternary ammonium group-containing repeating units are included, the ratio is preferably 0.1 to 50% by weight and more preferably 0.5 to 30% by weight.

Similar effects can be obtained, where a silanol group, amino group and quaternary ammonium group are contained in the repeating units having an anionic group or those having a cross-linked or polymerized structure.

Repeating units having a cross-linked or polymerized structure in the polymers are preferably 1 to 90% by weight, more preferably 5 to 80% by weight and most preferably 8 to 60% by weight.

The matrix made of cross-linked or polymerized binders is preferably formed by coating compounds for forming the high-refractive index layer on a transparent protective film and effecting cross linkage or polymerization simultaneously with or after the coating.

(Other Compounds of High-refractive Index Layer)

The high-refractive index layer used in the invention may have any other compound depending on the application and purpose. For example, where a low-refractive index layer is provided on the high-refractive index layer, it is preferable that the refractive index of the high-refractive index layer is higher than that of the transparent protective film. Since the high-refractive index layer contains halogenated elements other than an aromatic ring or fluorine (for example, Br, I and Cl) and atoms such as S, N and P, a higher refractive index is imparted to the organic compounds. Thus, binders obtained by subjecting curing compounds having these elements or atoms to cross linkage or polymerization may also be preferably used.

In addition to the compounds (inorganic fine particles, polymerization initiators and sensitizers), the high-refractive index layer may have resins, surface active agents, antistatic agents, coupling agents, thickeners, color protection agents, coloring agents (pigments and dyes), antifoaming agents, leveling agents, flame retardants, ultraviolet-ray absorbing agents, infrared-ray absorbing agents, adhesiveness imparting agents, polymerization preventing agents, antioxidants, surface modifiers and electric conductive metal fine particles.

[Formation of High-Refractive Index Layer]

It is preferable that the high-refractive index layer is formed on the transparent protective film to be explained later directly or through another layer by coating a solution of the above-mentioned compounds of the high-refractive index layer. A coating solution for the high-refractive index layer usable in the invention is prepared by mixing and diluting inorganic fine particle dispersion, matrix binder solution and additives used, when necessary, with coating dispersion media.

It is preferable that the coating solution is filtered before coating. In this filtration, preferably used is a filter with the smallest possible pore size as long as the compounds of the coating solution are not removed. The filter to be used in the filtration is preferably 0.1 to 100 μm in absolute filtration accuracy and more preferably 0.1 to 25 μm. It is also preferably 0.1 to 10 mm in thickness and more preferably 0.2 to 2 mm. In this instance, the filtration pressure is preferably 15 kgf/cm$^2$ or less, more preferably 10 kgf/cm$^2$ or less and particularly preferably 2 kgf/cm$^2$ or less. No particular restriction is placed on filter members as long as they will not affect the coating solution. To be specific, they include filter members similar to those used for filtering wet dispersions of the inorganic compounds. It is also preferable that the filtered coating solution is subjected to ultrasonic dispersion immediately before coating to effectively remove foams and maintain a better dispersion.

The high-refractive index layer of the invention is prepared by coating the above-mentioned compounds for forming the high-refractive index layer on the transparent protective film to be described later by publicly known film-forming methods such as dip coating, air-knife coating, curain coating, roller coating, wire bar coating, gravure coating, micro-gravure coating and extrusion coating, and subjecting the resultant to drying and exposure to light and/or heat. Exposure to light is preferable because of a faster cure. Heat treatment provided at a latter part of the light curing process is further preferable.

Any light in the ultraviolet-ray region or in the near-infrared ray region may be used as a light source for radiation, and the light source of the ultraviolet ray includes a mercury-vapor lamp (any of super-high pressure, high pressure, medium pressure or low pressure lamp), chemical lamp, carbon arc lamp, metal halide lamp, xenon lamp and sunlight. It is acceptable to convert any available laser source with a wavelength range of 350 to 420 nm to a multi-beam source for radiation. Further, the near-infrared light source includes a halogen lamp, xenon lamp or high-pressure sodium lamp. It is also acceptable to convert any available laser source with the wavelength from 750 to 1400 nm to a multi-beam source for radiation. Where the near-infrared light source is used, it may be used in combination with an ultraviolet light source, or radiation may be provided from the plane of the transparent protective film plane side opposite the coated plane side of the high-refractive index layer. This treatment allows film curing to proceed smoothly in the vicinity of the surface in a direction of the coated layer thickness, thereby providing a uniformly cured film state.

Photo radical polymerization by radiation can be conducted in an air or inert gas. In this instance, it is preferable to conduct the polymerization by decreasing an induction phase of polymerizing radical polymerizing monomers or in an atmosphere in which oxygen concentration is maintained at the lowest possible extent for sufficiently increasing the polymerization rate. An ultraviolet ray to be made incident is preferably 0.1 to 100 mW/cm² in intensity and also preferably 100 to 1000 mJ/cm² in radiation quantity on the coated film surface. It is also preferable that the coated film is provided with temperature distribution as uniformly as possible in the radiation process. A difference in the temperature distribution is preferably controlled within ±3° C. and more preferably within ±1.5° C. The above-described range is preferable because the polymerization will proceed uniformly on the surface of the coated film and in a direction of the film thickness.

The high-refractive index layer is preferably H or more in hardness of the pencil hardness test according to JIS K-5400, more preferably 2H or more and most preferably 3H or more. A Taber test is conducted according to JIS K-5400 by using test pieces on which the high-refractive index layer is coated before and after the test. The test pieces which wear to the least possible extent are preferable in scratch resistance of the high-refractive index layer. The high-refractive index layer is more preferable as haze is lowered. To be specific, the haze is preferably 5% or less, more preferably 3% or less and particularly preferably 1% or less.

The high-refractive index layer is preferably 30 to 500 nm in thickness and more preferably in a range from 50 to 300 nm. Where the high-refractive index layer is also used as a hard-coat layer, it is preferably 0.5 to 10 μm in thickness, more preferably 1 to 7 μm and particularly preferably 2 to 5 μm.

(Medium Refractive Layer)

As explained above, in the case of the antireflection film at least consisting of three layers, the high-refractive index layer is preferably of a laminated structure consisting of two layers mutually different in the refractive index. Namely, it is preferable that lamination is made in the order of the transparent protective film, the lower-refractive index layer (medium refractive layer) of two high-refractive index layers, the higher-refractive index layer (high-refractive index layer) of two high-refractive index layers and the low-refractive index layer (outermost layer). The medium refractive layer has an intermediate refractive index between the transparent protective film and the high-refractive index layer. Thus, the refractive index is relative depending on individual refractive layers. The medium refractive layer is prepared by applying compounds for forming the medium refractive layer similarly as with the high-refractive index layer.

Materials for making the medium refractive layer of the invention may include any publicly known conventional materials and are in preference to those used in making the high refractive thin layer. The refractive index can be easily adjusted, depending on the type and quantity of inorganic fine particles, and a layer with a thickness of 30 to 500 nm is formed similarly as described in the high-refractive index layer. The layer is more preferably 50 to 300 nm in thickness.

(Hard-Coat Layer)

A hard-coat layer can be provided on the surface of a transparent protective film for imparting the physical strength to an antireflection film. It is particularly preferable to provide a layer between the transparent protective film and the high-refractive index layer.

The hard-coat layer is preferably formed by cross-linkage or polymerization of photo-curing and/or thermo-setting compounds. The layer can be formed, for example, by coating on a transparent protective film the compounds with organic metal compounds containing polyester (meth)acrylate, polyurethane (meth)acrylate, multi-functional monomers, multi-functional oligomers or a hydrolytic functional group and subjecting the resultant curing compound to cross-linkage or polymerization.

Preferable curing functional groups are photo polymerizing functional groups, and preferable hydrolytic functional group-containing organic metal compounds are organic alkoxysilyl compounds. Examples include those similar in content to matrix binders having a high-refractive index layer.

The hard-coat layer contains inorganic fine particles with a mean particle size of primary particles of 300 nm or less preferably, from 10 to 150 nm, more preferably 20 to 100 nm. In this instance, mean particle size is weight mean particle size. Maintaining the primary particles 200 nm or less in mean particle size is able to provide a hard-coat layer without affecting the transparency. The inorganic fine particles are able to raise the hardness of the hard-coat layer and also maintain curing and condensation of the coated layer. In addition, these particles are also added for controlling the refractive index of the hard-coat layer. To be specific, compounds for the configuration of the hard-coat layer include those described in JP-A-2002-144913, JP-A-2000-9908 and WO0/46617. In the hard-coat layer, the inorganic fine particles are contained preferably in a range from 10 to 90% by weight in relation to a total weight of the hard-coat layer and more preferably 15 to 80% by weight.

As explained above, the high-refractive index layer is also used as a hard-coat layer. Where the high-refractive index layer is used as a hard-coat layer, it is preferable that the hard-coat layer is formed by finely dispersing the inorganic fine particles and incorporating them into a layer similarly as with preparing the high-refractive index layer. The thickness hard-coat layer can be appropriately adjusted depending on the application. To be specific, the hard-coat layer is preferably 0.2 to 10 μm in thickness, more preferably 0.5 to 7 μm and particularly preferably 0.7 to 5 μm.

The hard-coat layer is preferably H or more in hardness of the pencil hardness test according to JIS K-5400, more preferably 2H or more and most preferably 3H or more. A better scratch resistance is confirmed for the hard-coat layer where a Taber test is conducted according to JIS X-5400 for test pieces of the layer, showing a smaller wear before and after the test.

(Low-Refractive Index Layer)

The low-refractive index layer of the invention is preferably in a range of 1.31 to 1.48 in the refractive index, in view of imparting antireflection properties.

It is preferable that the low-refractive index layer of the invention is provided as an outer-most layer having scratch resistance and stain resistance. The low-refractive index layer is a layer with a refractive index of 1.17 to 1.37 wherein at least one type of hollow-structured inorganic fine particles having a mean particle size between 30% and 100% in relation to thickness of the low-refractive index layer is contained. Use of such inorganic fine particles in the low-refractive index layer makes it possible to reduce an increasing refractive index of the layer and attain a low refractive index and high film strength at the same time without restriction of prolonged heat curing or saponification for providing a polarizing sheet.

[Raw Materials for Forming Cured Film of Low-Refractive Index Layer]

It is also preferable that cured-film forming raw materials in which publicly known conventional silicone and/or fluorine-containing compounds are incorporated are appropriately used in the above-described low-refractive index layer, in order to provide a low refractive index, and effectively impart slip properties to the surface and greatly improve scratch resistance. It is more preferable that fluorine-containing compounds are added to the raw materials. It is particularly preferable that the low-refractive index layer of the invention is formed primarily with heat-curing and/or light ray or radioactive ray (for example, ionizing radiation)-curing fluorine and cross-linkage containing compounds, and constituted with fluorine-containing cured polymers.

For the above purpose, it is preferable that the low-refractive index layer of the invention is a cured film formed by coating the curing compounds for forming the low-refractive index layer which contain respectively at least one type of organosilane hydrolysates expressed by formula (A3) shown below produced in the presence of the above-described inorganic fine particles and acid catalysts and/or their partial condensates and fluorine-containing polymers with a curing reactive group and subjecting the resultant to a curing process.

$$(R^c)_m Si(X)_{4-m}$$ Formula (A3)

(Wherein $R^c$ represents a substituted or unsubstituted alkyl group or substituted or unsubstituted aryl group, X represents hydroxy group or hydrolyzable group. And β represents an integral number from 1 to 3.)

It is more preferable that the compounds for forming the low-refractive index layer also have multi-functional polymerizing compounds containing at least two or more of polymerizing groups selected from radical polymerizing groups and/or cation polymerizing groups as well as polymerization initiators. Hereinafter, an explanation will be made for the curing compounds for forming the low-refractive index layer.

[Compositions for Forming Low-Refractive Index Layer]
(Hollow Structured-Inorganic Fine Particles)

The above-described low-refractive index layer is characterized in that it uses hollow inorganic fine particles (hereinafter also referred to as hollow particles) in order to further reduce an increasing refractive index of the layer. The hollow particles are 1.17 to 1.37 in the refractive index and preferably 1.17 to 1.35. In this instance, the refractive index represents the refractive index in terms of whole particles and should not be interpreted to represent the refractive index of an outer shell solely constituting the hollow particles. In an attempt to increase a void ratio for further reducing the refractive index of the hollow particles, the outer shell will become thin and result in reduced strength of particles. It is therefore necessary to maintain the refractive index of the hollow particles 1.17 or more in view of scratch resistance.

The refractive index of these hollow particles can be determined by using an Abbe refractometer [Atago Co., Ltd.].

Where $r_i$ represents radius of the void of the inorganic fine particles and $r_o$ represents radius of the outer shell of the particles, void ratio w of the hollow particles (%) is calculated according to the following formula (V):

$$w=(4\pi r_i^3/3)/(4\pi r_o^3/3)\times 100$$

Hollow particles are preferably 10 to 60% in void ratio, more preferably 20 to 60% and most preferably 30 to 60%.

The hollow inorganic fine particles are preferably between 30% and 100% in mean particle size in relation to thickness of the low-refractive index layer, more preferably between 35% and 80% and still more preferably between 40% and 60%. Namely, where the low-refractive index layer is 100 nm in thickness, the hollow particles can be given with a particle size between 30 nm and 100 nm, preferably between 35 nm and 80 nm and more preferably between 40 nm and 60 nm. Where the mean particle size falls under the above-described range, a sufficient strength is imparted to the film which is therefore preferable.

Inorganic fine particles usable for the low-refractive index layer include silicon dioxide (silica)-containing fluorine particles and particles such as magnesium fluoride, calcium fluoride and barium fluoride particles. Particularly preferable are silicon dioxide (silica) particles.

The inorganic fine particles are preferably in rice grain, sphere, cube, spindle shape, short-fiber shape, ring shape or amorphous shape.
(Small-Size Inorganic Fine Particles)

It is also preferable that at least one type of inorganic fine particles with a mean particle size of less than 25% in relation to thickness of the low-refractive index layer (hereinafter referred to as small-size inorganic fine particles) is used in combination with the large-size inorganic fine particles (hereinafter inorganic fine particles essentially needed in the invention are also referred to as large-size inorganic fine particles). The small-size inorganic fine particles are preferable because of the absence of a hollow structure.

Since the small-size inorganic fine particles are able to interpose between the large-size inorganic fine particles, they are effectively imparted as a holding-back agent of the large-size inorganic fine particles and therefore preferable. They are also cost-effective.

The small-size inorganic fine particles are preferably between 1 nm and 20 nm in mean particle size when the low-refractive index layer is 100 nm in thickness, more preferably between 5 nm and 15 nm and particularly preferably between 10 nm and 15 nm.

The small-size inorganic fine particles are preferably used from 5 to 100 parts by weight in relation to 100 parts by weight of the large-size inorganic fine particles (hollow particles) and more preferably 10 to 80 parts by weight.

Specific compounds include those used in the hollow particles, and silicon oxide is particularly preferable.
(Dispersion of Inorganic Fine Particles)

The above-described hollow inorganic fine particles and the small-size inorganic fine particles may be subjected to physical surface treatments such as plasma radiation and corona discharge treatment or chemical surface treatment by surface active agents or coupling agents to attain a stable dispersion in the dispersing solution or curing compound solution for forming the low-refractive index layer or increasing affinity or bonding with binder compounds. It is particularly preferable to use coupling agents. Preferable coupling agents include the alkoxymetal compound (such as titanium coupling agent, silane coupling agent). Particularly preferable is treatment with a silane coupling agent.

The above-described coupling agents are used as a surface treatment agent for inorganic fine particles of the low-refractive index layer to provide a preliminary surface treatment prior to preparation of the curing compound solution. In this instance, it is preferable that the coupling agents are additionally given as an additive on preparation of the coating solution and incorporated into the layer.

It is also preferable that the inorganic fine particles are dispersed in advance into media prior to the surface treatment in order for load reduction of the surface treatment.

The above-described inorganic fine particles are blended preferably in range from 5 to 90 parts by weight in relation to 100 parts by weight of all compounds of the above-described low-refractive index layer in view of attaining a better transparency and a higher strength of the film, and more preferably 20 to 60 parts by weight. Further, where the hollow particles are blended with other particles, the hollow particles in all particles are preferably 5 to 95 parts by weight, more preferably 10 to 90 parts by weight, and particularly preferably 30 to 80 parts by weight.
(Fluorine-Containing Polymer)

As explained above, it is preferable that the low-refractive index layer of the invention is formed primarily with heat-curing and/or light ray or radioactive ray (for example, ionizing radiation)-curing and cross-linkage containing fluorine compounds, and constituted with fluorine-containing cured polymers.

The fluorine-containing polymers include those described in the antireflection film described in the embodiments from 1 to 4 of the invention, and are preferably used for the purpose.

Preferable embodiments of fluorine-containing polymers are those compounds expressed by formula (8):

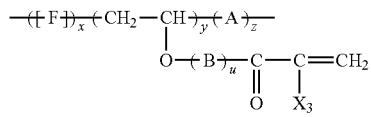

In the formula (8), the compound [F] represents the following compound (pf 1), compound (pf 2) or compound (pf 3).

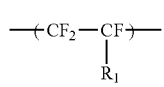

In the compound (pf 1), $R_f$ represents an F atom or perfluoro alkyl group with the carbon number of 1 to 3.

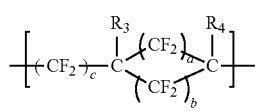

In the compound (pf 2), $R_3$ and $R_4$ may be mutually different or the same, representing respectively a fluorine atom and $-C_jF_{2j+1}$ group, in which j represents an integral number of 1 to 4 (j represents preferably 1 or 2). a represents an integral number of 0 or 1 and b, an integral number of 2 to 5. C represent 0 or 1. Where a and/or c are 0, they respectively represents a monobond.

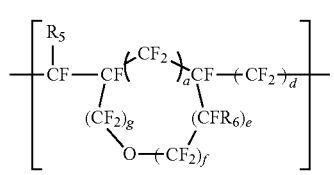

In the compound (pf 3), $R_5$ and $R_6$ represents respectively a fluorine atom and $-CF_3$ group. a represent 0 or 1, as with above-described compound (pf 2). d represents an integral number of 0 or 1, e represents 0 or an integral number of 1 through 4, f represents 0 or 1, and g represents 0 or an integral number of 1 through 5. Where d, e, f and/or g are 0, they represent a monobond. Further, (e+f+g) is an integral number ranging from 1 to 6.

In formula (8), B represents a coupling group with a carbon number of 1 to 10, more preferably 1 to 6 and particularly preferably 2 to 4, which may be of a straight chained structure, branched structure or ring structure. Further, B may have hetero atoms selected from O, N or S. Preferable examples of the coupling group B include *—(CH$_2$)$_2$—O—**, *—(CH$_2$)$_2$—O—NH—**, *—(CH$_2$)$_4$—O—**, *—(CH$_2$)$_6$—O—**, *—(CH$_2$)$_2$—O—(CH$_2$)$_2$—O—**, *—CONH—(CH$_2$)$_3$—O—**, *—CH$_2$CH(OH)CH$_2$—O—** and *—CH$_2$CH$_2$OCONH(CH$_2$)$_3$—O—** (in which an * represents a coupling site on a polymer principal chain and ** represents coupling site on a (meth)acryloyl group). u represents 0 or 1.

In formula (8), $X_3$ represents a hydrogen atom or methyl group. A hydrogen atom is preferable in view of curing reaction.

Further, in formula (8), A represents a repeating unit induced from any given vinyl monomer. No particular restriction is placed on A as long as it is a compound constituting monomers capable of conducting copolymerization with monomers corresponding to compound [F], and may be freely selected in view of factors such as adhesiveness to a lower layer, Tg of polymer (contributing to film hardness), solubility with solvents, transparency, slip properties, dust prevention and stain resistance. Further, A may be constituted with a single or plural vinyl monomers.

Preferable examples of A include vinyl ethers such as methylvinyl ether, ethyl vinyl ether, t-butylvinyl ether, cyclohexylvinyl ether, isopropyl vinyl ether, hydroxy ethyl vinyl ether, hydroxy butylvinyl ether, glycygyl vinyl ether, allyl vinyl ether; vinyl esters such as vinyl acetate, vinyl propionate and vinyl butyrate; (meth)acrylates such as methyl (meth)acrylate, ethyl (meth)acrylate, hydroxy ethyl(meth) acrylate, glycygyl meth acrylate, allyl(meth)acrylate, (meth)acryloyloxypropyltrimethoxy silane; styrene derivatives such as styrene and p-hydroxy methylstyrene; unsaturated carboxylic acids such as crotonic acid, maleic acid and itaconic acid and their derivatives. More preferable are vinyl ether derivatives and vinyl ester derivatives, and particularly preferable are vinyl ether derivatives.

x, y and z represent mol % of the respective compounds, or representing values satisfying 30≦x≦60, 5≦y≦70 and 0≦z≦65. A preferable case is 35≦x≦55, 30≦y≦60 and 0≦z≦20, and a particularly preferable case is 40≦x≦55 and 40≦y≦55 and 0≦z≦10, however, on the condition that x+y+z=100.

Particularly preferable are those wherein [F] compound represents a (pf1) compound in formula (8). Examples are compounds described in paragraph Nos. [0043] to [0047] in JP-A-2004-45462.

(Organosilane Compound)

The organosilane expressed by formula (A3) is the same in meaning with the organosilane expressed by formula (A).

Detailed examples are also described below.

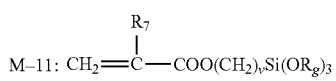

$R_7$: hydrogen atom or methyl group
$R_g$: methyl group or ethyl group
v: an integer of from 2 to 4

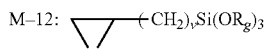

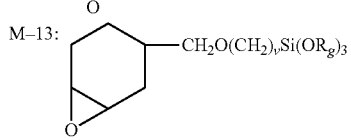

-continued

M-14: $(X_5)_{\overline{2}}$-Si(OCH$_3$)$_2$

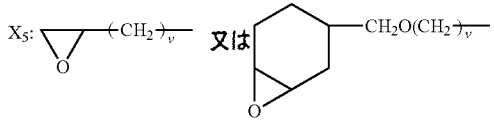

(Multi-Functional Polymerizing Compound)

As explained above, the curing compound for forming a low-refractive index layer may additionally have multi-functional polymerizing compounds.

Multi-functional polymerizing compounds may contain two or more of polymerizing groups either in the form of a radical polymerizing functional group and/or cation polymerizing functional group. Radical polymerizing functional groups include unsaturated ethylene groups such as a (meth) acryloyl group, vinyloxy group, styryl group and allyl group, and (meth)acryloyl group is preferable. It is preferable that the curing compound contain multi-functional monomers in which 2 or more radical polymerizing groups are contained.

Radical polymerizing group-containing radical polymerizing multi-functional monomers are preferably selected from compounds having at least two terminal ethylene unsaturated bonds. Preferable are compounds having 2 to 6 terminal ethylene unsaturated bonds in the molecule. These compounds are well known in the industry of polymer raw materials. The compounds can be used without any restriction in the invention. They may be available in a chemical form, for example, monomers, prepolymeis (dimmer, trimer) and oligomers, or in a mixture and copolymers.

Cation polymerizing compounds used in the invention may include any compound which will produce polymerization and/or cross-linkage on radiation of an activated energy beam in the presence of activated energy-beam sensitive cation polymerizing initiators. As typical examples, there is an epoxy compound, cyclic thioether compound, cyclic ether compound, spiroorthoester compound, vinyl hydrocarbon compound and vinyl ether compound. One or two or more types of the cation polymerizing organic compounds can be used in the invention. Preferable are cation polymerizing group-containing compounds having 2 to 10 cation polymerizing groups in one molecule, and particularly preferable are those having 2 to 5 groups in one molecule. These radical polymerizing compounds and cation polymerizing compounds are, to be specific, those similar to multi-functional monomers and oligomers described in the case of the high-refractive index layer.

It is preferable that the above-described radical polymerizing compound and the cation polymerizing compound is contained from 90:10 to 20:80 on the basis of the weight ratio of radical polymerizing compound to cation polymerizing compound. A more preferable ratio is from 80:20 to 30:70. It is also preferable that the multi-functional polymerizing compounds which contain radical polymerizing compounds and cation polymerizing compounds are blended from 0.1 to 20 parts by weight in relation to 100 parts by weight of the fluorine-containing polymer.

(Other Additives)

It is preferable that, besides the above-mentioned described compounds, the low-refractive index layer of the invention may have stain proofing agents and smoothing agents (publicly known silicone compounds or fluorine compounds), whenever necessary, for imparting stain resistance, water resistance, drug resistance and slip properties. These additives are preferably added in a range from 0.01 to 20% by weight in relation to all curing compounds for forming the low-refractive index layer, more preferably 0.05 to 10% by weight and particularly preferably 0.1 to 5% by weight.

Preferable silicone compounds include but are not limited to the following; "X-22-174 DX," "X-22-2426," "X-22-164b," "X22-164C," "X-22-170DX," "X-22-176D" and "X-22-1821" [trade name: Shin-Etsu Chemical Co., Ltd.]; "FM-0725," "FM-7725," "DMS-U22," "RMS-033," "RMS-083" and "UMS-182®" [trade name: Chisso Corporation].

Preferable fluorine compounds are those containing fluoroalkyl groups. The fluoroalkyl groups are preferably those with a carbon number of 1 to 20 and more preferably those with a carbon number of 1 to 10. They may be of a straight chained structure [for example, —CF$_2$CF$_3$, —CH$_2$(CF$_2$)$_4$H, —CH$_2$(CF$_2$)$_8$CF$_3$ and —CH$_2$CH$_2$(CF$_2$)$_4$H], of a branched structure [for example, —CH(CF$_3$)$_2$, —CH$_2$CF(CF$_3$)$_2$, —CH(CH$_3$)CF$_2$CF$_3$, —CH(CH$_3$)(CF$_2$)$_5$CF$_2$H] or of an alicyclic structure (preferably 5 ring or 6 ring, for example, perfluorocyclohexyl group, perfluorocyclopentyl group or alkyl group substituted by these groups), or may have ether bond (for example, —CH$_2$OCH$_2$CF$_2$CF$_3$, —CH$_2$CH$_2$OCH$_2$C$_4$F$_8$H, —CH$_2$CH$_2$OCH$_2$CH$_2$C$_8$F$_{17}$ and —CH$_2$CH$_2$OCF$_2$CF$_2$OCF$_2$CF$_2$H). A plural number of fluoroalkyl groups may be contained in the same molecule.

It is preferable that fluorine compounds also have substituents contributing to compatibility with a film of the low-refractive index layer. The substituents may be the same or different. They are preferably available in a plural number. To be specific, preferable substituents include an acryloyl group, methacryloyl group, vinyl group, aryl group, cinnamoyl group, epoxy group, oxcetanyl group, hydroxy group, polyoxyalkylene group, carboxyl group and amino group.

Fluorine compounds may be polymers or oligomers with compounds which do not contain a fluorine atom, with no particular restriction on molecular weight. No particular restriction is placed on content of a fluorine atom in fluorine compounds. The content is preferably 20% by weight or more, particularly preferably 30 to 70% by weight and most preferably 40 to 70% by weight. Preferable fluorine compounds include but are not limited to "R-2020," "M-2020," "R-3833" and "M-3833" [trade name: Daikin Industries Ltd.]; "MEGAFACK F-171®," "MEGAFACK F-172®", "MEGAFACK F-179A®" or "Defensa MCF-300" [trade name; Dainippon Ink and Chemicals Inc.].

For the purpose of imparting dust controlling and antistatic properties, publicly known cation surface active agents, or dust controlling agents and antistatic agents (polyoxyalkylene compounds) may be added, whenever necessary. In these dust controlling agents and antistatic agents, the structure units may be incorporated as some of the functions into the silicone compounds or fluorine compounds. These agents are added preferably in a range from 0.01 to 20% by weight in relation to total solids of the curing compound, more preferably 0.05 to 10% by weight and particularly preferably 0.1 to 5% by weight. To be specific, preferable compounds include but are not limited to "MEGAFACK F-150®" [trade name: Dainippon Ink and Chemicals Inc.] and "SH-3748" [trade name: Toray Dow Corning].

The low-refractive index layer may also contain a micro-void. Examples are described in JP-A-9-222502, JP-A-9-288201 and JP-A-11-6902.

Antireflection films previously described in the embodiments 1 to 4 of the invention may be preferably used as these additives.

In addition, preferable properties of the low-refractive index layer are as previously explained in the antireflection films of the embodiments 1 to 4 in the invention.

[Antiglare Function (Antiglare)]

An antireflection film may have an antiglare function for scattering external light. An antiglare function is obtained by forming unevenness on the surface of the antireflection film. Where the antireflection film is provided with an antiglare function, the antireflection film is preferably 3 to 50% in haze and more preferably 5 to 40% and most preferably 7 to 20%.

Antiglare is related to the mean surface roughness (Ra). The surface unevenness is expressed by the mean surface roughness (Ra) calculated on the basis of the surface area of 1 mm² randomly collected from an area of 100 cm². The mean surface roughness is preferably 0.01 to 0.4 µm, more preferably 0.03 to 0.3 µm, further more preferably 0.05 to 0.25 µm, and particularly preferably 0.07 to 0.2 µm.

The mean surface roughness (Ra) was determined in accordance with JIS B-0601-1994.

The antireflection film of the invention can be determined for a configuration of the surface unevenness by using an atomic force microscope (AFM).

Methods for providing unevenness on the surface of the antireflection film may include any method as long as it is able to sufficiently maintain the configuration of the surface. For example, the method includes that in which fine particles are used in a low-refractive index layer to provide unevenness on the film surface (e.g., JP-A-2000-271878), that in which relatively-large particles (0.05 to 5 µm in particle size) are added in a small quantity (0.1 to 50% by weight) to a lower layer (high-refractive index layer, medium refractive layer or hard-coat layer) of the low-refractive index layer to form a surface unevenness film, thereby providing a low-refractive index layer, with the configuration maintained thereon (e.g., JP-A-2000-281410 and JP-A-2000-95893), that in which after a low-refractive index layer is formed by coating, an uneven configuration is transferred thereon by physical means, for example, an embossing process (e.g., JP-A-63-278839, JP-A-11-183710 and JP-A-2000-275401), release coated paper transferring method (e.g., patent registration No. 3332534) and particle spray transferring method (e.g., JP-A-6-87632).

Where an antiglare layer is provided by incorporating particles into any layer of the antireflection film, particles to be used for the antiglare layer are preferably in a range from 0.2 to 10 µm in mean particle size. In this instance, the mean particle size is weight mean particle size of secondary particles (primary particles in case of no aggregation of particles). Antiglare layer particles include inorganic fine particles and organic particles. To be specific, inorganic fine particles include particles such as silicon dioxide, titanium dioxide, zirconium oxide, aluminum oxide, tin oxide, ITO, zinc oxide, calcium carbonate, barium sulfate, talc, kaolin and calcium sulfate. Silicon dioxide and aluminum oxide are preferable.

Preferable organic particles are resin particles. To be specific, resin particles include particles prepared by using silicone resin, melamine resin, benzoguanamine resin, polymethylmethacrylate resin, polystyrene resin, and polyfluorinated vinyliden resin. Preferable are particles prepared by using melamine resin, benzoguanamine resin, polymethylmethacrylate resin and polystyrene resin. Particularly preferable are particles prepared by using polymethylmethacrylate resin, benzoguanamine resin and polystyrene resin.

Resin particles are preferable as antiglare layer particles used for providing unevenness on an antiglare layer. The particles are preferably 0.5 to 7.0 µm in mean particle size, more preferably 1.0 to 5.01 µm and particularly preferably 1.5 to 4.0 µm. In addition, the particles are preferably 1.35 to 1.80 in the refractive index, more preferably 1.40 to 1.75 and further more preferably 1.45 to 1.75. The particles are more preferable as they are narrower in particle distribution. S value indicating distribution of particle size is expressed by formula (VI) as shown below, which is preferably 2 or less, more preferably 1.0 or less and particularly preferably 0.7 or less.

$$S=(D_{0.9}-D_{0.1})/D_{0.5}\quad\quad\text{Formula (VI):}$$

$D_{0.1}$: particle size corresponding to 10% of integrated value based on volumetric particle size $D_{0.5}$: particle size corresponding to 50% of integrated value based on volumetric particle size $D_{0.9}$: particle size corresponding to 90% of integrated value based on volumetric particle size Further, translucent particles are preferable as antiglare layer particles. Although no particular restriction is placed on the refractive index, they are preferably similar in refractive index to the antiglare layer (within 0.005 in terms of refractive index difference) or different by more than 0.02. Contrast on fixing the antireflection film to an image displaying plane is improved by making the refractive index of the particles similar to that of the antiglare layer. In addition, visibility (irregular reflection-related troubles and viewing angle characteristics) that may be found when the antireflection film is fixed on a liquid crystal displaying plane is improved by making a difference in refractive index between the particles and the antiglare layer.

When a difference in the refractive index is made between the particles and the antiglare layer, such a difference is preferably 0.02 to 0.5, more preferably 0.03 to 0.4 and particularly preferably 0.05 to 0.3.

Two or more types of different translucent particles may be used in combination as translucent particles. Where two or more types of translucent particles are used, a difference in refractive index between translucent particles with the highest refractive index and those with the lowest refractive index is preferably 0.02 or more to 0.10 or less and particularly preferably 0.03 or more to 0.07 or less in order to attain effective control of the refractive index due to a mixture of plural types of particles. It is also possible that larger-particle size translucent particles are used to impart antiglare and smaller-particle size translucent particles are used to impart other optical characteristics. For example, where an antireflection film-coated transparent protective film is attached to a highly fine display (133 ppi or over), the film must be free of an optical performance defect called irregular reflection. Irregular reflection is due to an increase or a decrease in pixels by unevenness (contributed to antiglare) present on a film surface and a subsequent failure in uniform brightness and greatly improved by combined use of translucent particles smaller in particle size than translucent particles contributing to antiglare and also different in refractive index from translucent resins which are a matrix binder.

Antiglare layer particles are preferably used from 3 to 75% by weight in relation to a quantity of the antiglare imparting layer.

Antiglare imparting particles can be incorporated into any layer constructed on the antireflection film, which is preferably a hard-coat layer, a low-refractive index layer or a high-refractive index layer and particularly preferably a hard-coat layer or a high-refractive index layer. The articles may be added to plural layers.

(Light-Diffusing Layer)

The antireflection film of the invention may be made of an antireflection layer laminated sequentially at least with (1) a light-diffusing layer higher in the refractive index than the transparent protective film and corresponding to the high-refractive index layer of the invention and (2) a low-refractive index layer lower in the refractive index than the transparent protective film on the transparent protective film.

The light-diffusing layer is prepared by dispersing into a translucent resin at least one type of translucent particles having a mean particle size of 0.5 to 5 μm, or a high-refractive index layer which is from 0.02 to 0.2 in a difference of the refractive index between the translucent particles and the translucent resin, free of surface unevenness and in which the translucent particles are contained from 3 to 30% by weight on a total solids basis into the light-diffusing layer. More particularly, translucent particles to be dispersed into the high-refractive index layer are not greater in film thickness than the high-refractive index layer and scattered inside the layer to give a low reflection.

The light-diffusing layer is ordinarily from 0.5 μm to 50 μm in thickness, preferably 1 μm to 20 μm and more preferably 2 μm to 10 μm. The translucent resin is preferably 1.5 to 2.00 in the refractive index, more preferably 1.51 to 1.90, further more preferably 1.51 to 1.85 and particularly preferably 1.51 to 1.80. Further, the translucent resin was determined for the refractive index, with translucent particles excluded.

A difference in the refractive index between the translucent particles and the translucent resin is ordinarily from 0.02 to 0.20 and particularly preferably 0.04 to 0.10. Where the difference is maintained at 0.20 or less, there will be no defects such as whitening of film. The difference 0.02 or more will provide an excellent light diffusion effect, which is therefore preferable. A quantity of the translucent particles added to the translucent resin is also important, as with the refractive index. In order to maintain transparency of the film and attain an excellent light diffusion effect, the translucent particles are preferably contained from 3 to 30% by weight in relation to total solids basis of the light-diffusing layer and more preferably 5 to 20% by weight.

Where the above-described translucent particles are added, translucent particles tend to produce sedimentation in the translucent resin. Thus, inorganic fillers such as silica may be added to prevent such sedimentation. Further, inorganic fillers are more effective in preventing sedimentation of the translucent particles as the fillers increase in volume, but may affect transparency of the light-diffusing layer. Thus, inorganic fillers with a particle size of 0.5 μm or less are preferably added at less than 0.1% by weight in relation to translucent resin to such an extent that will not affect transparency of the light-diffusing layer.

In addition, the antireflection film having the light scattering layer of the invention is preferably 2.5% or less in mean reflectivity ratio at a wavelength range of 380 nm to 680 nm and also preferable at 10 to 40% in haze. It is more preferably 1.8% or less in mean reflectivity ratio and at 10 to 35% in haze.

Optical characteristics of the antireflection film can be specified to the above-described range, thereby providing an increased visibility free of a whitened image plane or blurred image display, sufficiently preventing a reduction in contrast or variation in hue due to a change in the viewing angle and also realizing a better quality of image display free of reflection of external light or irregular reflection of image plane and excellent in antireflection properties.

According to the detailed description for translucent particles, matrix and other additives used in the light scattering layer of the invention, the same may be described for the above-described high-refractive index layer and the antiglare layer.

[Other Layers]
[Transparent Antistatic Layer]

In the invention, a transparent antistatic layer containing electric conductive materials can be provided between the transparent protective film and the above-described light-diffusing layer, which is preferable because of the effect of preventing static charge on the antireflection film surface. Where a polarizing plate on observation side to be fixed to a liquid crystal display device based on the IPS mode or VA mode is protected from the external surface energy it is preferable to provide an electric conductive layer as a transparent antistatic layer.

A transparent antistatic layer can be formed by a publicly known conventional method, for example, that in which a coating solution for electric conductive antistatic layer containing electric conductive fine particles and reactive cured resins is coated, that in which an electric conductive polymer cured film is formed and that in which transparent film-forming metals or metal oxides are used to give an electric conductive film by evaporation or spattering. The transparent antistatic layer can be formed directly on a transparent protective film or through a primer layer which strengthens attachment with the transparent protective film.

It is also possible that the transparent antistatic layer is used as a part of the antireflection film. In this instance, when used at a layer closer to the outer-most surface, even a thin layer is able to provide a sufficient antistatic effect. No particular restriction is placed on coating methods, and the most appropriate coating method may be selected from publicly known methods such as roll coating, gravure coating, bar coating and extrusion coating and used depending on characteristics of the coating solution for the antistatic layer and coating quantity.

The transparent antistatic layer can be prepared by appropriately adjusting publicly known conventional antistatic layers. Transparent antistatic layers include, for example, those described in "Status of prospect of transparent electric conductive films" complied by the Research Department, Toray Research Center Inc., "New development of transparent electric conductive films" complied by Yutaka Toyoda, published by Toray Research Center Inc., in 1997 and literature published by CMC in 1999.

Further, the transparent antistatic layer is preferably 0.01 to 10 μm and more preferably 0.05 to 5 μm.

The transparent antistatic layer is preferably below $2 \times 10^{12} \Omega/\square$ in surface resistance, more preferably $10^5$ to $10^{12} \Omega/\square$ and further more preferably $10^5$ to $10^8 \Omega/\square$. The transparent antistatic layer can be determined for the surface resistance by a four-point probe method.

It is preferable that the transparent antistatic layer is practically transparent. To be specific, the transparent antistatic layer is preferably 10% or less in haze, more preferably 3, % or less and most preferably 1% or less. It is also preferably 50% or more in light transmittance at a wavelength range of 550 nm, more preferably 60% or more, still more preferably 65% or more and most preferably 70% or more.

It is also preferable that the transparent antistatic layer is excellent in surface strength. To be specific, the transparent antistatic layer is preferably the above-described H in hardness of the pencil hardness test of a load of 1 kg (provisions of JIS K-5400), more preferably 2H or more and most preferably 3H or more.

The transparent antistatic layer is preferably a cured resin layer which contains electric conductive inorganic fine particles.

(Electric Conductive Inorganic Fine Particles for Transparent Antistatic Layer)

The above-described electric conductive inorganic fine particles are preferably 10 to 400 m$^2$/g in specific surface area and more preferably 30 to 150 m$^2$/g.

Electric conductive inorganic fine particles include, for example, inorganic compounds described in Chapters 3 and 4, "Status and prospect of transparent electric conductive films" compiled by Technical Information Institute Co., Ltd. and "Development and application of electric conductive fillers" (published by Technical Information Institute Co., Ltd. in 1997). To be specific, preferable examples are formed by using metal oxides or nitrides. Metal oxides or nitrides include, for example, tin oxide, indium oxide, zinc oxide and titanium nitride. Tin oxide and indium oxide are particularly preferable.

Electric conductive inorganic fine particles may include other elements, in addition to principal constituents of these metallic oxides or nitrides. The principal constituent is referred to as the greatest constituent (% by weight) among constituents constituting the particles. Other elements include, for example, Ti, Zr, Sn, Sb, Cu, Fe, Mn, Pb, Cd, As, Cr, Hg, Zn, Al, Mg, Si, P, S, B, Nb, In, V and a halogen atom. It is preferable to add Sb, P, B, Nb, In, V or halogen atom for raising the electric conductivity of tin oxide and indium oxide. Particularly preferable are Sb-containing tin oxide (ATO) and Sn-containing indium oxide (ITO). The content of Sb in ATO is preferably 3 to 20% by weight. The content of Sn in ITO is preferably 5 to 20% by weight.

Electric conductive inorganic fine particles of the transparent antistatic layer are preferably 1 to 150 nm in mean particle size of primary particles and more preferably 3 to 100 nm. Electric conductive inorganic fine particles of the transparent antistatic layer to be formed are ordinarily from 1 to 200 nm in mean particle size and more preferably 10 to 80 nm. Electric conductive inorganic fine particles are expressed for the mean particle size in terms of converting the weight of particles to weight and can be determined by a light scattering method or electron microscopic picture.

Electric conductive inorganic fine particles may be surface-treated. Surface treatment is carried out by using inorganic compounds or organic compounds. Inorganic compounds used for surface treatment include alumina and silica. Treatment with silica is particularly preferable. Organic compounds usable in surface treatment include polyol, alkanol amine, stearic acid, a silane coupling agent and titanate coupling agent. A silane coupling agent is most preferable. Two or more types of compounds may be used in combination to carry out surface treatment.

The electric conductive inorganic fine particles are preferably in rice grain, sphere, cube, spindle shape or amorphous shape. Two or more types of the electric conductive inorganic fine particles may be combined and used in an antistatic layer.

The content of the electric conductive inorganic fine particles in the transparent antistatic layer are preferably 20 to 90% by weight, more preferably 25 to 85% by weight and further more preferably 30 to 80% by weight.

(Binders of Transparent Antistatic Layer)

A cross-linked polymer, namely, a cured resin may be used as a binder in the transparent antistatic layer. The cross-linked polymer preferably has an anionic group. It is preferable that the polymer having a cross-linked anionic group is that in which principal chains of the polymer having an anionic group is of a cross-linked structure. An anionic group has functions to maintain the electric conductive inorganic fine particles dispersed. The cross-linked structure has functions to impart a film-forming ability to the polymer, thereby strengthening the transparent antistatic layer.

Principal chains of the polymer include polyolefin (saturated hydrocarbon), polyether, polyurea, polyurethane, polyester, polyamine, polyamide and melamine resin. Preferable are principal chains of polyolefin, polyether, polyurea, polyolefin and polyether. Most preferable are principal chains of polyolefin.

Principal chains of polyolefin are made of saturated hydrocarbons and prepared, for example, by addition polymerization of unsaturated polymerizing groups. Principal chains of polyether are of repeating units bonded through an ether bond (—O—) and can be prepared, for example, by ring-opening polymerization of epoxy groups. Principal chains of polyurea are of repeating units bonded through a urea bond (—NH—CO—NH—) and prepared, for example, by condensation polymerization of an isocyanate group with an amino group. Principal chains of polyurethane are of repeating units bonded through a urethane bond (—NH—CO—O—) and prepared by, for example, by condensation polymerization of an isocyanate group with a hydroxy group (including N-methylol group). Principal chains of polyester are of repeating units bonded through ester bond (—CO—O—) and prepared, for example, by condensation polymerization of a carboxyl group (including acid halide group) with a hydroxy group (including N-methylol group). Principal chains of polyamine are of repeating units bonded through an imino bond (—NH—) and prepared, for example, by ring-opening polymerization of an ethyleneimine group. Principal chains of polyamide are of repeating units bonded through an amide bond (—NH—CO—) and prepared, for example, by reaction of an isocyanate group with a carboxyl group (including acid halide group). Principal chains of melamine resin are of a cross-linked structure by themselves and prepared, for example, by condensation polymerization of a triazine group (e.g., melamine) with aldehyde (e.g., formaldehyde).

An anionic group may be allowed to directly bond with principal chains of a polymer or allowed to bond with principal chains through a coupling group. An anionic group preferably bonds with principal chains as side chains through a coupling group.

Preferable examples of the anionic group include a carboxylic acid group (carboxyl group), sulfonic acid group (sulfo group) and phosphoric acid group (sulfono group). A sulfonic acid group and phosphoric acid group are preferable.

An anionic group may be available in salt. Cations forming an anionic group are preferably alkakine metal ions. Further, protons of an anionic group may be dissociated.

Coupling groups bonding with anionic groups and principal chains of a polymer are preferably divalent groups selected from —CO—, —O—, allkylene group, arylene group and their combinations.

A cross-liked structure is that for effecting a chemical bond with 2 or more principal chains (preferably covalent bond), and preferable is a covalent bond with 3 or more principal chains. The cross-linked structure is preferably a divalent or more groups selected from —CO—, —O—, —S—, nitrogen atom, phosphorous atom, aliphatic residue, aromatic residue and their combinations.

The cross-linked polymer having an anionic group is preferably a copolymer consisting of an anionic group-containing repeating units and cross-linked structure-containing repeating units. The content of repeating units having an anionic group in the copolymer is preferably 2 to 96% by weight, more preferably 4 to 94% by weight and most preferably 6 to 92% by weight. The repeating units may have two or more types of anionic groups. The content of repeating units having a cross-linked structure in the copolymer is preferably 4 to 98% by weight, more preferably 6 to 96% by weight and most preferably 8 to 94% by weight.

Repeating units of a cross-inked polymer having an anionic group may have both an anionic group and cross-linked structure. Repeating units (repeating units free of anionic group or cross-linked structure) may also be contained.

Other preferable repeating units are repeating units having an amino group or quaternary ammonium group and repeating units having a benzene ring. An amino group and quaternary ammonium group are preferable, because they have functions to maintain inorganic fine particles dispersed as with the anionic group. Further, an amino group, quaternary ammonium group and benzene ring are able to provide the same effect, even when they are contained in repeating units having an anionic group or repeating units having a cross-linked structure.

Repeating units having an amino group or quaternary ammonium group can be obtained by allowing an amino group and quaternary ammonium group to directly bond with principal chains of polymer or allowing them to bond with the principal chains through a coupling group. An amino group and quaternary ammonium group is preferably allowed to bond with the principal chains through the coupling group as side chains. An amino group and quaternary ammonium group are preferably secondary amino groups, tertiary amino group or quaternary ammonium group, and more preferably tertiary amino group or quaternary ammonium group. A group bonding with a nitrogen atom of a secondary amino group, tertiary amino group or quaternary ammonium group is preferably an allyl group and more preferably an alkyl group with a carbon atom number 1 to 12. A counter ion of a quaternary ammonium group is preferably halide ion. A coupling group which allows an amino group or quaternary ammonium group to bond with principal chains of a polymer is preferably a divalent group selected from —CO—, —NH—, —O—, an alkylene group, arylene group or their combinations. Where an anionic group-containing cross-linked polymer has an amino group- or quaternary ammonium group-containing repeating units, the content is preferably 0.06 to 32% by weight, more preferably 0.08 to 30% by weight and most preferably 0.1 to 28% by weight.

Reactive organic silicide compounds (1) to (3) described in JP-A-2003-39586 can be used in combination with these binders. Reactive organic silicide compounds are used in a range of 10 to 100% in relation to the combined quantity of the binder and the reactive organic silicide compound concerned.

A laminated antireflection film may be also provided with a moisture-proof layer, an antistatic layer (electric conductive layer), a primer layer, an undercoating layer, a protective layer, a sealed layer or a slip layer. The sealed layer is provided for blocking electromagnetic waves or infrared rays.

<Transparent Protective Film>

As explained previously, an antireflection film is coated on a transparent protective film of the polarizing plate of the invention. Transparent protective films include for example, cellulose esters (such as triacetyl cellulose, diacetyl cellulose, propionyl cellulose, butyryl cellulose, acetylpropionyl cellulose and cellulose nitrate), polyamide, polycarbonate, polyester (for example, polyethylene terephthalate, polyethylene naphthalate, poly-1,4-cyclohexanedimethylane terephthalate, polyethylene-1,2-diphenoxy ethane-4,4'-dicarboxylate, polybutylene terephthalate), polystyrenes (such as syndiotactic polystyrene), polyolefins (such as polypropylene, polyethylene, polymethylpentene, polycycloalkane), polysulfone, polyethersulfone, polyalylate, polyether imide, polymethyl methacrylate and polyether ketone. Triacetyl cellulose, polycarbonate, polyethylene terephthalate and polyethylene naphthalate are preferable.

The transparent protective film is preferably 80% or more in light transmittance and more preferably 86% or more. The transparent protective film is preferably 2.0% or less in haze and more preferably 1.0% or less. Further, the transparent protective film is preferably 1.4 to 1.7 in refractive index.

The antireflection film-attached polarizing plate of the invention is preferably prepared by coating the above-mentioned antireflection film on the above-described transparent protective film and attaching with the polarizing sheet to be explained later on a plane opposite side to the transparent protective film by an adhesive agent. This process is able to make a whole film thickness of the polarizing plate thinner and also reduce the weight of the image display device to which the polarizing plate is fixed.

Important factors in providing a preferable transparent protective film used in the polarizing plate are a well-balanced hydrophobic property/hydrophilic property of the film, adhesiveness of the polarizing sheet with a vinyl alcohol film and uniform optical characteristics of overall film surface, and cellulose acylate films are in particular preferable. Further, cellulose fatty ester (cellulose acylate) films and those containing cellulose acylate, plasticizers and fine particles are also particularly preferable.

[Cellulose Acylate Film]

Preferable cellulose acylate films are those described as antireflection films of embodiments 1 to 4 in the invention.

Further, preferable plasticizers of cellulose acylate films are plasticizers in which an octanol/water partition coefficient (log P value) is either 0 or 10. Where the log P value of the compound concerned is 10 or less, compatibility with cellulose acylate is excellent and defects such as whitened film or powder spraying will not take place. Where the log P value is above 0, cellulose acylate film will not become excessively hydrophilic and problems such as deteriorated water resistance of the film will take place less frequently. Therefore, use of the compound within the above-described range is preferable. As a log P value, 1 or 8, is preferable and 2 or 7 is particularly preferable.

The octanol/water partition coefficient (log P value) can be calculated by a shake flask method according to JIS Z7260-107 (2000). Further, the octanol/water partition coefficient (log P value) is used to make an estimation by computational chemistry or an empirical method in place of actual measurement. The calculation is made preferably by Crippen's fragmentation method [J. Chem. Inf. Comput. Sci., Vol. 27, pp. 21 (1987), Viswanadhan's fragmentation method [J. Chem. Inf. Comput. Sci., Vol. 29, pp. 163 (1989)] or Broto's fragmentation method [Eur. J. Med. Chem.-Chim. Theor., Vol. 19, pp. 71 (1984)]. Of these methods, Crippen's fragmentation method is preferable. Crippen's fragmentation is preferably used to judge whether or not the compound is in the range of the invention when the log P value of a certain compound is different depending on the determination method or calculation method.

<Polarizing Plate>

[Transparent Protective Film]

The polarizing plate of the invention has a transparent protective film on both sides of the polarizing sheet. No particular restriction is placed on types of the transparent protective film, and the following can be used for this purpose: cellulose esters such as cellulose acetate, cellulose acetate butylate and cellulose propionate, or polycarbonate, polyolefin, polystyrene, polyester and others. Commercially available products include, for example, "Fuji Tack" made by Fuji Photo Film Co., Ltd., triacetyl cellulose film by Konica Corporation, "Zeonor" by Zeon Corporation and "Arton" by Japan Synthetic Rubber Co., Ltd. Other products include non-birefringent optical resin materials described in JP-A-8-110402 and JP-A-11-293116.

The transparent protective film of the polarizing plate must be provided with physical properties such as transparency, proper moisture permeability, low birefringence and proper rigidity, and is preferably 5 to 500 μM in thickness in view of handling and endurance, more preferably 20 to 200 μm and particularly preferably 20 to 100 μm. The foregoing cellulose acylate film is most preferable as the transparent protective film of the invention.

[Polarizing Sheet]

The polarizing sheet of the invention is preferably made of polyvinyl alcohol (PVA) and dichromatic molecules. Also usable is a polyvinylene polarizing sheet prepared by dehydrating and dechlorinating PVA and polyvinyl chloride to provide a polyene structure which is then subjected to orientation, as described in JP-A-11-248937.

PVA is a polymer raw material made by saponification of polyvinyl acetate and may contain compounds capable of effecting copolymerization with vinyl acetates, for example, unsaturated carboxylic acid, unsaturated sulfonic acid, olefin and vinyl ether. Also usable is a modified PVA which contains an acetoacetyl group, sulfonic acid group, carboxyl group and oxyalkylene group.

No particular restriction is placed on the saponification degree of PVA, with a preferable degree of 80 to 100 mol % and a particularly preferable degree of 90 to 100 mol % in view of solubility and others. No particular restriction is placed on the polymerization degree of PVA, with a preferable degree of 1,000 to 10,000 and a particularly preferable degree of 1,500 to 5,000.

PVA is preferably 55% or more in syndiotacticity, with improved endurance taken into account, as described in Japanese Patent No. 2978219, and also preferably 45 to 52.5%, as described in Japanese Patent No. 3317494.

It is preferable that PVA is prepared into a film, to which dichromatic molecules are introduced to provide a polarizing sheet. In general, PVA film is preferably prepared by casting a bulk solution in which PVA resin is dissolved in water or organic solvents to form a film. Polyvinyl alcohol resin is ordinarily contained in the bulk solution at concentrations of 5 to 20% by weight, and the bulk solution is cast to produce PVA film with thickness of 10 to 200 μm. PVA film can be produced by referring to the methods described in Japanese Patent No. 3342516, JP-A-09-328593, JP-A-13-302817 and JP-A-14-144401.

No particular restriction is placed on the crystallization degree of PVA film. Usable are a PVA film with a mean crystallization degree (Xc) of 50 to 75% by weight, as described in Japanese Patent No. 3251073 and that with a mean crystallization degree of 38% or less for reducing the variation in in-plane hue, as described in JP-A-14-236214.

PVA film is more preferable as it is smaller in birefringence (Δn). Preferable is PVA film with birefringence of $1.0 \times 10^{-3}$ or less, as described in Japanese Patent No. 3342516. However, as described in JP-A-14-228835, PVA film may be provided with birefringence between 0.02 and 0.01 to attain a higher polarization, while avoiding a possible cut during the stretching process of the PVA film, or as described in JP-A-14-060505, $(n_x+n_y)/2-n_z$ may be established to be between 0.0003 and 0.01. In this instance, $n_x$ represents the refractive index in a machine direction of the film, $n_y$ represents the refractive index in a width direction of the film and $n_z$ represents the refractive index in a thickness direction of the film.

PVA film is preferably 0 nm to 100 nm in retardation Re (in-plane) and more preferably 0 nm to 50 nm. Further, PVA film is preferably 0 nm to 500 nm in Rth (thickness direction of the film) and more preferably 0 nm to 300 nm.

In the polarizing plate of the invention, preferably usable are a PVA film with a 1,2-glycol bonding amount of 1.5 mol % or less as described in Japanese Patent No. 3021494, that where the optical dust particles of 5 μm or more are 500 pieces or less per 100 cm² as described in JP-A-13-316492, that with marks derived from hot-water cutting temperature at 1.5° C. or less in the TD direction of the film as described in JP-A-14-030163, or that prepared by using a solution in which multivalent alcohol (tri-valent to hexa-valent) such as glycerine is added in 1 to 100 parts by weight or by using a solution in which plasticizers described in JP-A-06-289225 are added in 15% by weight or more.

No particular restriction is placed on the thickness of PVA film before stretching. The film is preferably 1 μm to 1 mm in thickness in view of stable film retention and uniform stretching of the film, and more preferably 20 to 200 μm. As described in JP-A-14-236212, thin PVA film may also be usable which has 10 N or less stress produced when the film is stretched by 4 to 6 times in water.

Higher iodine ions ($I_3^-$ or $I_5^-$) and dichromatic dyes are preferably usable as dichromatic molecules. Higher iodine ions are in particular preferably used in the invention. As described in "Application of polarizing plate" compiled by Nagata R. (published by CMC) and "Kogyozairyo," Vol. 28, No. 7, pp. 39-45, higher iodine ion can be produced in a state adsorbed and oriented to PVA by immersing PVA in a solution in which iodine is dissolved in potassium iodide solution and/or in a boric acid solution.

Where dichromatic dyes are used as dichromatic molecules, preferable are azo coloring matters and particularly preferable are bisazo and trisazo coloring matters. Since water-soluble dichromatic dyes are preferable, hydrophilic substituents such as a sulfonic acid group, amino group and hydroxy group are introduced into dichromatic molecules. They are preferably used as free acids, alkali metal salts, ammonium salts, or amine salts.

These dichromatic dyes include, benzidine dyes such as C. I. Direct Red 37, Congo Red (C. I. Direct Red 28), C. I. Direct Violet 12, C. I. Direct Blue 90, C. I. Direct Blue 22, C. I. Direct Blue 1, C. I. Direct Blue 151, C. I. Direct Green 1; difenyl urea dyes such as C. I. Direct Yellow 44, C. I. Direct Red 23, C. I. Direct Red 79; stilbene dyes such as C. I. Direct Yellow 12; dinaphthyl amine dyes such as C. I. Direct Red 31; J-acid such as C. I. Direct Red 81, C. I. Direct Violet 9 and C. I. Direct Blue 78.

Other dichromatic dyes include the following: C. I. Direct Yellow 8, C. I. Direct Yellow 28, C. I. Direct Yellow 86, C. I. Direct Yellow 87, C. I. Direct Yellow 142, C. I. Direct Orange 26, C. I. Direct Orange 39, C. I. Direct Orange 72, C. I. Direct Orange 106, C. I. Direct Orange 107, C. I. Direct Red 2, C. I. Direct Red 39, C. I. Direct Red 83, C. I. Direct Red 89, C. I. Direct Red 240, C. I. Direct Red 242, C. I. Direct Red 247, C. I. Direct Violet 48, C. I. Direct Violet 51, C. I. Direct Violet 98, C. I. Direct Blue 15, C. I. Direct Blue 67, C. I. Direct Blue 71, C. I. Direct Blue 98, C. I. Direct Blue 168, C. I. Direct Blue 202, C. I., Direct Blue 236, C. I. Direct Blue 249, C. I. Direct Blue 270, C. I. Direct Green 59, C. I. Direct Green 85, C. I. Direct Brown 44, C. I. Direct Brown 106, C. I. Direct Brown 195, C. I. Direct Brown 210, C. I. Direct Brown 223, C. I. Direct Brown 224, C. I. Direct Black 1, C. I. Direct Black 17, C. I. Direct Black 19, C. I. Direct Black 54. Also preferable are dichromatic dyes described in JP-A-62-70802, JP-A-1-161202, JP-A-1-172906, JP-A-1-172907, JP-A-1-183602, JP-A-1-248105, JP-A-1-265205 and JP-A-7-261024. These dichromatic dyes may be used in combination of two or more types of them to produce dichromatic molecules having various hues. Where dichromatic dyes are used, an absorption thickness 4 μm or more may be used in the invention, as described in JP-A-14-082222.

An excessively small content of the dichromatic molecules in the film will result in a low polarization degree and an excessively great content will reduce the transmittance. Thus, the content is usually adjusted to the range of 0.01% by weight to 5% by weight in relation to polyvinyl alcohol polymers constituting the film matrix.

The polarizing sheet is preferably 5 μm to 40 μm in thickness, more preferably 10 μm to 30 μm and particularly preferably 10 to 22 μm. Even where the polarizing sheet is made thin, namely from 5 to 22 μm, it is preferable that the polarizing sheet is from 0.001% to 0.3% in transmittance of 700 nm on crossed nicols and also from 0.001% to 0.3% in transmittance at 410 nm. The upper limit of transmittance at 700 nm on crossed nicols is preferably 0.3% or less and more preferably 0.2%. The upper limit of transmittance at 410 nm is preferably 0.3% or less, more preferably 0.08% or less and further more preferably 0.05% or less. Thus, a light leak defect (picture-frame defect) of a peripheral part of an image display device as a result of a temporal change-related shrinkage of the polarizing sheet can be improved to obtain a neutral grey color free of bluish color, thereby attaining a preferable image-display quality.

It has been found that, where the polarizing sheet is made thin, namely, 5 to 22 μm, the transmittance at the wavelength range of 700 nm and 410 nm on crossed nicols is effectively reduced by adding to the polarizing sheet the dichromatic dyes showing absorption at the corresponding wavelength range as a hue adjusting agent, besides dichromatic materials such as iodine and by adding hardeners such as boric acid on addition of dichromatic materials such as iodine. It is also effective that the above-described substances are added in combination.

The above-described hue adjusting agents may be used in combination of 2 or more types of them. When coloring matters to be added have absorption at a wavelength range of 410 nm or 700 nm, they will satisfy the purpose of the invention. It is preferable that these coloring matters have a principal absorption at wavelength range of 380 nm to 500 nm or of 600 nm to 720 nm. A content of such coloring matters may be decided arbitrarily depending on the absorbance and dichroic ratio of the coloring matters to be used. No particular restriction is placed on either case, as long as the transmittance at 700 nm on crossed nicols is 0.3% or less and the transmittance at 410 nm is 0.3% or less.

The above-described hue adjusting agent may be added to the polarizing sheet by any method including immersion, coating or spraying, of which immersion is preferable. The agent may be added either before or after stretching, and preferably added before stretching in view of improvement in polarization properties. The agent may be added independently, or added either during the dyeing process to be described later or during the hardener adding process or both.

The thickness ratio of the polarizing sheet to the transparent protective film to be described later is preferably in the range of $0.01 \leq A$ (thickness of polarizing sheet)/B (thickness of transparent protective film)$\leq 0.16$, as described in JP-A-14-174727.

The foregoing transparent protective film is usually supplied in a roll form and preferably bonded together on a continuous basis so as to correspond to a long polarizing sheet in the machine direction. In this instance, the orientation axis (slow phase axis) of the protective film may face in any direction, and, it is preferable that the orientation axis is parallel to the machine direction for easier handling.

In addition, no particular restriction is placed on the angle between the slow phase axis (orientation axis) of the protective film and absorption axis (stretching axis) of the polarizing sheet, and the angle may be arbitrarily established, depending on the purpose of the resultant polarizing plate. The long polarizing plate used in the invention is not parallel to the absorption axis in a machine direction. Thus, where the protective film parallel to the orientation axis in a machine direction is attached continuously to the long polarizing plate, a polarizing plate is obtained in which the absorption axis of the polarizing sheet is not parallel to the orientation axis of the protective film. The polarizing plate attached in such a way that the absorption axis of the polarizing sheet is not parallel to the orientation axis of the protective film is effective in obtaining an excellent dimensional stability. This feature is preferably developed when the plate is used particularly in a liquid crystal display device. The dimensional stability is effectively developed in particular when the gradient angle between the slow phase axis of the protective film and the absorption axis of the polarizing sheet is between 10 and 90° and preferably between 20 and 70°.

[Swelling Control of Polymer Film for Polarizing Plate and Method for Adding Dichromatic Substances and Hardeners]

The polarizing plate of the invention can be prepared through the following processes: swelling, dyeing, curing, stretching, drying, attachment of transparent protective film and drying after attachment. The above-described dyeing, curing and stretching processes may be arbitrarily changed in the order or several processes combined together and carried out at the same time. The polarizing plate of the invention can be preferably prepared by conducting in particular the above-described swelling, dyeing and drying processes as follows.

(A) Where the polymer film for the polarizing plate is PVA film in the above-described swelling process, the film is immersed in advance into water to accelerate dyeing of iodine, a dichromatic substance. In this instance, the temperature is maintained between 30 and 50° C. and preferably between 35 and 45° C.

(B) In the dyeing process, iodine, a dichromatic, is used to dye the polymer film of the polarizing plate. In this instance, boric acid (hardener) is added to iodine in the range 1 to 30 times in weight ratio.

(C) The stretched polarizing sheet is dried in the drying process. In this instance, the temperature is maintained 80° C. or less and preferably 70° C. or less. The above-described processes will be explained later.

(Method for Making Polarizing Sheet Thin)

The polarizing sheet may be made thin by a conventional stretching method such as that in which the stretching ratio is raised or that in which a thinner PVA film is used. An ordinarily used PVA film is 751 μm in thickness, for example, "VF-P" or "VF-PS" made by Kuraray Co., Ltd. In this instance, when the polarizing sheet is subjected to vertical uniaxial stretching in a machine direction to stretch 8 times or more, the resulting film is 20μ or less in thickness. When the polarizing sheet is stretched 4 times or more by a horizontal uniaxial stretching process based on a tentering system, the resulting film is 20 μm or less in thickness. Further, when a PVA film is made thin, or 50 μm or less in thickness and stretched 6 times or more by a uniaxial stretching process, the resulting polarizing sheet is 20 μm or less in thickness.

A stretching method is also employable in the invention in which a polymer film for the polarizing sheet is subjected to uniaxial stretching in a transfer direction, or after being subjected to uniaxial stretching, the film is stretched in a transverse direction, in addition to the above-described uniaxial stretching process. This method is commonly called biaxial stretching. The method is ordinarily performed by simultaneous biaxial stretching method based on a tentering system or that based on the tubular process. In this method, a 75 µm-thick PVA film is stretched 4 times or more in the machine direction and 1.5 times or more in a transverse direction to give a polarizing sheet with a thickness of 20 µm or less.

A stretching method preferably used in the invention is the oblique stretching method described in JP-A-2002-86554. In this method, PVA film with a thickness of 125 µm or less is stretched more than 4 times to provide a polarizing sheet with a thickness of 20 µm or less.

In the invention, the polarizing sheet is more preferable as it is thinner in thickness in view of light leak-related defects (frame defect) and reduction in the weight of polarizing plate members. However, an excessively thin film will result in problems such as film cut during the stretching process, poor handling of the film immersed in dyeing solution or curing solution and cracking of the stretched film during the drying process. Thus, in the invention, the polarizing sheet is preferably 5 µm to 22 µm in thickness and more preferably 8 µm to 20 µm.

[Explanation on Individual Processes]

Hereinafter, an explanation will be made for individual processes for preparing the polarizing plate of the invention.

(Swelling Process)

Swelling process is preferably conducted by using only water. However, as described in JP-A-10-153709, polarizing sheet materials may be swollen by using boric acid solution to control the swelling degree of the polarizing sheet materials in order to attain stable optical characteristics and avoid creases on the polarizing sheet materials in the production line.

In addition, the swelling process can be arbitrarily established for the temperature and time and preferably at temperatures of 10 to 50° C. and for 5 seconds or longer. Where no dichromatic coloring matters are used, the conditions are, as explained previously, at temperatures of 30 to 50° C., preferably 35 to 45° C. and for 5 seconds up to 600 seconds and more preferably for 15 seconds up to 300 seconds.

(Dyeing Process)

The dyeing process can be carried out in accordance with that described in JP-A-2002-86554. The dyeing method can be carried out by any method, in addition to immersion, for example, by coating or spraying iodine or dye solution. No particular restriction is placed on dichromatic substances to be used for dyeing, and iodine is preferable in obtaining a high-contrast polarizing plate. It is preferred that the dyeing process is conducted in a liquid phase.

Where iodine is used, the dyeing process is performed by immersing PVA film into an iodine-potassium iodide solution. It is preferable that content of iodine is 0.05 to 20 g/L, content of potassium iodide is 3 to 200 g/L and the weight ratio of iodine to potassium iodide is 1 to 2000. It is also preferable that dyeing time is 10 to 1200 seconds and solution temperature is 10 to 60° C. It is more preferable that content of iodine is 0.5 to 2 g/L, content of potassium iodide is 30 to 120 g/L and weight ratio of iodine to potassium iodide is 30 to 120, dyeing time is 30 to 600 seconds and solution temperature is 20 to 50° C.

As explained previously, it is also effective that boron compounds such as boric acid and borax are added as a hardener to simultaneously carry out the dyeing process to be explained later and the curing process. Where boric acid is used, boric acid is preferably added to iodine at a weight ratio from 1 to 30. Further, in this process, addition of dichromatic coloring matters is also preferable, with the preferable quantity of 0.001 to 1 g/L. A constant content of the addition in an aqueous solution is important in maintaining the polarization performance. It is therefore preferable that iodine, potassium iodide, boric acid and dichromatic coloring matters are added to conduct the production on a continuous basis. Such addition may be performed in a solution or in a solid form. On addition of the solution, the solution maintained at high concentrations may be added in a small quantity whenever necessary.

(Curing Process)

In the curing process, it is preferable that crosslinking agents are incorporated by immersion or application of a crosslinking agent solution. The curing process may be carried out in separate plural steps, as described in JP-A-11-52130.

Crosslinking agents include those described in U.S. Reissue Pat. No. 232897 (re-published patent). As described in Japanese Patent No. 3357109, multivalent aldehyde may be used as a crosslinking agent to improve dimensional stability, and boric acids are most preferable.

Where boric acid is used as a crosslinking agent to be used in the curing process, metal ion may be added to a boric acid/potassium iodide solution. Zinc chloride is preferable as a metal ion, but zinc salts such as zinc halide, zinc sulfate and zinc acetate may be used in place of zinc chloride, as described in JP-A-2000-35512.

It is preferable that boric acid/potassium iodide solution is prepared by adding zinc chloride to immerse PVA film, thereby conducting the curing process. It is preferable that the content of boric acid is 1 to 100 g/L, content of potassium iodide is 1 to 120 g/L, content of zinc chloride is 0.01 to 10 g/L, curing time is 10 to 1200 seconds and solution temperature is 10 to 60° C. It is more preferable that content of boric acid is 10 to 80 g/L, content of potassium iodide is 5 to 100 g/L, content of zinc chloride is 0.02 to 8 g/L, curing time is 30 to 600 seconds and solution temperature is 20 to 50° C. As explained previously, it is also effective to add dichromatic coloring matters to carry out the dyeing process at the same time with this process, the details of which have already been explained.

(Stretching Process)

As explained previously, the stretching is adjusted so as to give a polarizing sheet of 22 µm or less after the stretching, and then uniaxial stretching method is employed as described in U.S. Pat. No. 2,454,515. In the invention, the oblique stretching method based on a tentering system is preferable as described in JP-A-2002-86554.

Hereinafter, an explanation will be made for the oblique stretching method used in the invention.

FIG. 7 shows a typical example of polymer film to be subjected to oblique stretching as a rough plain view. The oblique stretching method used in the invention includes the process in which raw film shown with (a) is introduced in the direction shown with arrow (i), the process in which stretching is performed in a width direction shown with (b), and the process in which the stretched film shown with (c) is fed to a next process, namely in the direction shown with (ii). When the "stretching process" is referred hereinafter, the process includes all these processes of (a) to (c), indicating the whole process for conducting the oblique stretching method employed in the invention.

The film is fed continuously from the direction of (i) and retained for the first time at the B1 point by the holding units on the left side when viewed from the upstream side. At this time, the other end of the film is not yet retained and no tensile force is developed in a width direction. To be more specific, the B1 point does not correspond to a point of starting a substantial retention (hereinafter referred to as "substantial retention starting point"). The substantial retention starting point is defined by the point at which both ends of the film are retained for the first time according to the method of the invention. The substantial retention starting point is indicated by two points, namely, the retention starting point A1 at a further downstream side, A1, and the point C1 at which a line drawn approximately vertically from A1 to the film on introduction side 21 crosses with the locus 23 of the holding units on the opposite side. Where the holding units on both ends moves at a substantially similar speed on the basis of this point, A1 moves from A2, A3 ... An for every unit time, while C1 moves from C2, C3 . . . Cn in a similar way. More particularly, a line connecting the points of An and Cn through which the basic holding units pass at the same time is provided as a direction of stretching at the time concerned.

In the oblique stretching method, as shown in FIG. 7, An moves more slowly step by step than Cn to slant the stretching from a moving direction to the ground. A substantial retention releasing point (hereinafter referred to as "substantial retention releasing point") is defined by two points, namely, point Cx released from the holding units further upstream and point Ay at which a line drawn approximately vertically at the center of the film 22 fed from Cx to the subsequent process crosses with the locus 24 of the holding units on the opposite side. The stretching angle of the final film will be decided by a ratio of the travel difference Ay−Ax (or |L1−L2|) between the right and left holding units at the end point of the substantial stretching process (substantial retention releasing point) to the distance of the substantial retention releasing point W (distance between Cx and Ay). In order words, tilt angle θ formed between the stretching direction and the moving direction to a subsequent process is an angle to satisfy the following formula (III-a).

$$\tan \theta = W/|L1-L2| \qquad \text{Formula (III-a)}$$

The end of the film shown at the upper side in FIG. 7 is retained up to 28 after the point Ay. However, since another end is not retained, a new width-directed stretching is not developed, and therefore 28 is not a substantial retention releasing point.

As explained above, in the oblique stretching method, substantial retention starting-points at the both ends of the film are not simple biting points into the right and left holding units. To be more strictly described, the two substantial retention starting points are defined as points at which a line connecting either the right or left retaining point with another retaining point is approximately orthogonal to the center line of the film to be introduced into the process for retaining the film and also defined as points positioned most upstream. In a similar way, in the invention, two substantial retention releasing points are points at which a line connecting either the right or the left retaining point with another retaining point is approximately orthogonal to the center line of the film to be fed into the subsequent process and also defined as two points positioned most downstream. In this instance, "approximately orthogonal" means that a line connecting the center line of the film with the right or the left substantial retention starting point or with the right or the left substantial retention releasing point is 90±0.5°.

Where a stretching machine based on a tentering system is used to give a difference between the right and the left traveling process, there are often cases where a great gap develops between biting points into the holding units and the substantial retention starting points due to mechanical restrictions such as rail length and also a great gap develops between the points releasing from the holding units and the substantial retention releasing points. Where the traveling process between the above-described defined substantial retention starting points and substantial retention releasing points satisfy the relationship of the following formula (III) and a difference in the transferring speed of the holding units in a machine direction is less than 1%, the purpose of the invention will be satisfied. A difference in the transfer speed is preferably less than 0.5% and most preferably less than 0.05%. In this instance, the speed refers to a length of the locus made by the right and left holding units moving forward per minute. In ordinary stretching machines such as that based on a tentering system, there occurs a variation in speed on less than the second time scale depending on the rotation of the chain wheel teeth driving chains and cycles of a driving motor, often resulting in several percentage variations in speed, which will not correspond to the difference in the speed described in the invention.

$$|L2-L1|>0.4W \qquad \text{Formula (III)}$$

Further, on stretching a polymer film for the polarizing sheet, it is preferable that the polymer film is stretched while the volatile content rate is maintained at 5% by volume and then the content rate is reduced with the film allowed to shrink. This treatment is able to prevent creases or torsion of the film. The volatile content rate used in the invention refers to a cubic content of volatile compounds contained per unit cubic content of the film and is a value obtained by dividing the cubic content of the volatile compounds by the cubic content of the film.

A method for incorporating the volatile compounds includes:

(1) that in which the volatile compounds are cast on a film to incorporate solvents and water, (2) that in which, prior to stretching, the volatile compounds are immersed into solvent and water and the resultant is coated and sprayed, or (3) that in which during the stretching process, solvent and water are coated.

Since hydrophilic polymer films such as polyvinyl alcohol contain water in a hot and humid atmosphere, moisture control and subsequent stretching are conducted at a hot and humid atmosphere or stretching is conducted at a hot and humid atmosphere, thereby incorporating the volatile compounds. In addition to these methods, any other methods may be employed for this purpose, as long as they are able to maintain volatile compounds of polymer film at 5% by volume or more.

A preferable volatile content rate varies depending on the type of polymer film. The volatile content rate may be raised to the highest possible extent, as long as polymer film can be supported. Polyvinyl alcohol is preferably 10 to 100% by volume in volatile content rate. Cellulose acylate is preferably 10 to 200% by volume.

(Drying Process)

Drying conditions are conducted according to the method described in JP-A-2002-86554. As explained above, the drying process is conduced at 80° C. or less and preferably at 70° C. or less. A preferable drying time is 30 seconds to 60 minutes.

(Transparent Protective Film-Attaching Process)

The polarizing sheet of the invention is provided as a polarizing plate both planes of which are attached with a transparent protective film. Two transparent protective films may be the same or different. It is preferable that an adhesive solution is supplied before the transparent protective films are attached to the polarizing sheet to effect such attachment by using a pair of rollers. The adhesive solution layer after drying is preferably 0.001 to 5 μm in thickness and more preferably 0.005 to 3 μm.

Further, in order to remove the record groove-like unevenness resulting from the stretched polarizing sheet, it is desirable to adjust moisture content of the polarizing sheet on attachment as described in JP-A-2001-296426 and JP-A-2002-86554. In the invention, it is desirable to maintain a moisture content of 0.1 to 30% by weight.

No particular restriction is placed on adhesive agents for attaching the polarizing sheet with the transparent protective film. Preferable adhesive agents are PVA resins (including modified PVA into which an acetoacetyl group, sulfonic acid group, carboxyl group, oxyalkylene group and others are introduced) and boron compound solution. PVA resins are more preferable.

(Drying Process After Attachment)

The drying process after attachment is conducted under conditions described in JP-A-2002-86554, and preferably at temperatures of 30° C. to 100° C. and for 30 seconds to 60 minutes.

The polarizing plate prepared by the above processes preferably contains the following elements in the polarizing sheet, namely, iodine of 0.1 to 3.0 g/m$^2$, boron of 0.1 to 5.0 g/m$^2$, potassium of 0.1 to 2.0 g/m$^2$ and zinc of 0.001 to 2.0 g/m$^2$. It is particularly preferable to maintain the transmittance at 42.5% or more, for which a lower content of iodine is preferred. Preferable iodine content is 0.1 to 1.0 g/m$^2$.

Further, in order to improve the dimensional stability of the polarizing plate, organic titanium compounds and/or organic zirconium compounds may be added during any of the dyeing, stretching or curing processes, thereby incorporating at least one type of compounds selected from organic titanium compounds and organic zirconium compounds, as described in Japanese Patent No. 3323255.

[Characteristics of Polarizing Plate]
(Transmittance and Polarization Degree)

The polarizing plate of the invention is preferably 42.5% to 49.5% in transmittance and more preferably 42.8% to 49.0%. Further, the polarizing plate is preferably 36% to 42% in parallel transmittance and from 0.001% to 0.05% in crossed transmittance. The above types of transmittance are defined by the following formula (VII) on the basis of JIS Z-8701.

$$T = K \int S(\lambda) y(\lambda) \tau(\lambda) d\lambda$$

In this instance, K, S($\lambda$), y($\lambda$) and $\tau(\lambda)$ represent the following:

$$K = \frac{100}{\int S(\lambda) y(\lambda) d\lambda}$$

S($\lambda$): spectral distribution of standard light used for indicating color
y($\lambda$): color-matching function of XYZ system
$\tau(\lambda)$: spectral transmittance
$\lambda$: determined wavelength [nm]

The polarizing plate of the invention is preferably 99.900% to 99.999% in polarization degree as defined by the following formula (VIII) and more preferably 99.940% to 99.995%.

$$\text{Polarization degree } (\%) = 100 \times \sqrt{\frac{\text{Parallel Transmittance} - \text{Cross Transmittance}}{\text{Parallel Transmittance} + \text{Cross Transmittance}}}$$

In addition, the dichroic ratio (Rd) defined by the following numerical formula (IX) is preferably 48 to 1215, and more preferably 53 to 525.

$$\text{Dichroic ratio } (Rd) = \frac{\log\left[\frac{\text{single plate transmittance}}{100}\left(1 - \frac{\text{polarization degree}}{100}\right)\right]}{\log\left[\frac{\text{single plate transmittance}}{100}\left(1 + \frac{\text{polarization degree}}{100}\right)\right]}$$

Regarding the parallel transmittance at a wavelength range of 440 to 670 nm in the polarizing plate of the invention, a difference AT between the maximum value ($T_{max}$) and the minimum value ($T_{min}$) of the parallel transmittance T is 6% or less, preferably 4% or less, and more preferably 2% or less. Further, transmittance ratio $R_{T1}$ (parallel transmittance at 490 nm/parallel transmittance at 550 nm) and transmittance ratio $R_{T2}$ (parallel transmittance at 610 nm/parallel transmittance at 550 nm) showing the light transmission characteristics are both in the range of 1.00±0.02, preferably in the range of 1±0.01. These characteristics are preferable in reflective-type and semi-transmissive reflective-type liquid crystal display devices.

Regarding optical characteristics where the polarizing plate is arrayed on crossed nicols, the ratio of absorption peak at the wavelength range of 550 to 650 nm ($Ap_1$) to an absorption peak at a wavelength range of 450 to 520 nm ($Ap_2$) is preferably 1.5 or less, more preferably 1.4 or less, and particularly preferably 1.2 or less. Black indication is intensified due to reduced leak light by arraying the plate on crossed nicols, or neutral hue can be obtained, which is preferable in the invention.

It is further preferable that parallel transmittance $Tp_{440}$ and crossed transmittance $Tc_{440}$ at a wavelength range of 440 nm, parallel transmittance $Tp_{550}$ and crossed transmittance $Tc_{550}$ at 550 nm as well as parallel transmittance $Tp_{610}$ and crossed transmittance $Tc_{610}$ at 610 nm meet at the same time in the following formula of (X) to (XIII).

$$0.85 \leq Tp_{440}/Tp_{550} \leq 1.10 \quad (X)$$

$$0.90 \leq Tp_{610}/Tp_{550} \leq 1.10 \quad (XI)$$

$$1.0 \leq Tc_{440}/Tc_{550} \leq 8.0 \quad (XII)$$

$$0.08 \leq Tc_{610}/Tc_{550} \leq 1.10 \quad (XIII)$$

The variation in line peaks of backlight (at three wavelengths of 440 nm, 550 nm and 610 nm) and also in the crossed transmittance can be reduced by maintaining the transmittance within the above ranges to provide reflective-type and semi-transparent reflective-type liquid crystal display devices with an excellent display image free of difficulty in reproducing clear color.

It is also preferable that the standard deviation of the parallel transmittance for every 10 nm at a wavelength of 420 to 700 nm is adjusted to be 3 or less and the minimum value of (parallel transmittance/crossed transmittance) for every 100 nm at a wavelength range of 420 to 700 nm is adjusted to be 300 or more. Such adjustment makes it possible to realize a well-contrasted display image in liquid crystal display devices, thereby effectively making neutral the color indication on a white image display.

(Hue)

Hue developed on the polarizing plate of the invention is preferably evaluated by a brightness index of L* in an L*a*b* display color system recommended for use as CIE equivalent perceptual space and by a chromaticness index of a* and b*. L*, a* and b* are defined by formula (XIV) in which the X, Y and Z are used.

$$L^* = 116(Y/Y_0)^{\frac{1}{3}} - 16$$
$$a^* = 500\left[(X/X_0)^{\frac{1}{3}} - (Y/Y_0)^{\frac{1}{3}}\right]$$
$$b^* = 200\left[(Y/Y_0)^{\frac{1}{3}} - (Z/Z_0)^{\frac{1}{3}}\right]$$

In this instance, $X_o$, $Y_o$ and $Z_o$ represent three stimulating values of light source. In the case of standard light C, $X_o=98.072$, $Y_o=100$, and $Z_=118.225$, and in the case of standard light $D_{65}$, $X_o=95.045$, $Y_o$, 100, and $Z_{o=}108.892$.

In a single polarizing plate, a* is preferably in the range −2.5 to 0.2 and more preferably −2.0 to 0, whereas b* is preferably in the range 1.5 to 5 and more preferably 2 to 4.5. In two polarizing plates, a* of the parallel transmitted light is preferably in the range −4.0 to 0 and more preferably −3.5 to −0.5. In two polarizing plates, b* of the parallel transmitted light is preferably in the range 2.0 to 8 and more preferably 2.5 to 7. In two polarizing plates, a* of crossed transmitted light is preferably in the range −0.5 to 2 and more preferably 0 to 1.0. In two polarizing plates, b* of crossed transmitted light is preferably in the range −2.0 to 2 and more preferably −1.5 to 0.5.

Hue may be evaluated by chromaticity coordinate (x, y) calculated by the X, Y and Z. In the two polarizing plates, it is preferable that chromaticity ($x_p$ and $y_p$) of parallel transmitted light and chromaticity ($x_c$ and $c_y$) of crossed transmitted light may be adjusted, for example, to the range described in JP-A-14-214436, JP-A-13-166136 and JP-A-14-169024, or the relationship of hue with absorbance may be adjusted to the range described in JP-A-13-311827.

(Viewing Angle Characteristics)

It is preferable that the transmittance ratio and xy chromaticity difference between the radiation of vertical light and the radiation at an incident angle of 40° with the normal line in the direction of 45° in relation to the polarizing axis when the polarizing plate is arranged on crossed nicols and light is radiated at a wavelength of 550 nm are adjusted to the range described in JP-A-13-166135 and JP-A-13-166137. The vertical direction light transmittance ($T_0$) of a polarizing plate lamination in which crossed nicols are arranged and the ratio of light transmittance ($T_{60}$) in the direction of 60° from the normal line of the lamination to the vertical direction light transmittance ($T_{60}/T_0$) is preferably adjusted to 10000 or less, as described in JP-A-10-068817. Where natural light is radiated at any given angle up to the elevation angle of 80° from the normal line to the polarizing plate, the transmittance difference between transmitted light at a wavelength range of 20 nm or less in the transmission spectrum range of 520 to 640 nm may be preferably adjusted to 6% or less, as described in JP-A-14-139625. The brightness difference in transmitted light at any site 1 cm apart on the film is also preferably adjusted to 30% or less, as described in JP-A-08-248201.

(Orientation)

In general, a higher orientation of PVA is able to provide a better polarization performance. The orientation is preferably in the range of 0.2 to 1.0 in terms of order parameter value calculated by various means such as polarization raman scattering and polarization FT-IR. It is also preferable that, as described in JP-A-59-133509, a difference between the orientation coefficient of a polymer segment at a non-crystalline region of the polarizing sheet and the orientation coefficient of occupying molecules (0.75 or more) is adjusted to be at least 0.15, as described in JP-A-04-204907, the orientation coefficient of the non-crystalline region of the polarizing sheet is adjusted to be 0.65 to 0.85, or the orientation coefficient of a higher iodine ion such as $I_3^-$ and $I_5^-$ is adjusted to be 0.8 to 1.0 in order parameter value.

<Antireflection Function-Equipped Polarizing Plate>

The polarizing plate of the invention is a polarizing plate with an antireflection function prepared by coating the above-described antireflection film on the other plane of a transparent protective film of the polarizing plate made of the above-described polarizing sheet and the transparent protective films.

The antireflection film-provided polarizing plate is prepared by the following methods of (1) to (3).

(1) The plane opposite side of the antireflection film of the transparent protective film laminated antireflection film is attached to the plane of the polarizing sheet of the polarizing plate formed by attaching the transparent protective film to the polarizing sheet by using an adhesive agent.

(2) The plane opposite side of the antireflection film of the transparent protective film laminated antireflection film is made hydrophilic on the surface by saponification or others, and then the polarizing sheet is attached to the thus treated film surface by using an adhesive agent.

(3) The antireflection film is coated on the transparent protective film of the polarizing plate formed by attaching the transparent protective film to the polarizing sheet.

Since the polarizing plate can be made thinner, the method (2) or (3) is a preferable embodiment. Further, it is preferable in the method (2) that the transparent protective film on which the antireflection film is coated is continuously attached.

[Characteristics of Polarizing Plate with an Antireflection Function]

[Optical Characteristics and Weather Resistance]

(Reflectivity Ratio)

The polarizing plate with an antireflection function according to the invention is preferably 2.5% or less in mean value of the specular reflectivity (namely, mean reflectivity ratio) in a wavelength range of 450 nm to 650 nm at an incident angle of 5°, more preferably 1.8% or less and further more preferably 1.4% or less.

The specular reflectivity at the above-described incident angle of 5° is the light intensity ratio of the light reflected at −5° with the normal line direction to the light radiated at +5° in the normal line of a sample, indicating the degree of reflected image coming from mirror reflection on the back. Where used as an antireflection film with an antiglare function, the light radiated at the angle of −5° in the normal line direction is weaker by an extent of the scattering light coming from the surface unevenness provided for imparting antiglare function. Therefore, the specular reflectivity can be used to determine contributions reflecting both the antiglare function and the antireflection function.

Where in the polarizing plate with an antireflection function, the mean value of the specular reflectivity in the wavelength range of 450 nm to 650 nm at an incident angle of 5° is 2.5% or less, reflected image on the back is not a concern or defects such as reduced visibility are not found on application to the surface film of a display device. Therefore the polarizing plate may be preferably used in the invention.

In addition, where the antireflection film of the invention is laminated with a multi-layered antireflection film, mean value of the specular reflectivity (namely, mean reflectivity ratio) in the wavelength range of 450 nm to 650 nm at an incident angle of 5° is 0.5% or less, preferably 0.4% or less and more preferably 0.3% or less, thereby preventing to a sufficient level reduced visibility resulting from the reflection of external light on the surface of a display device.

Variance in mean reflectivity ratio of the polarizing plate of the invention before and after light stability tests is preferably 0.4% or less in a wavelength range of 380 to 680 nm and more preferably 0.2% or less. Where the ratio is in the above range, no practical problems will take place.

(Color and In-Plane Change Rate)

It is preferable that the polarizing plate with an antireflection function has color of specular reflection light in relation to incident light of 5° coming from CIE standard light source $D_{65}$ in the wavelength of 380 nm to 780 nm, namely, L*, a* and b* values in color space of CIE1976L*a*b* are in the respective ranges of $3 \leq L^* \leq 20$, $0 \leq a^* \leq 7$ and $-10 \leq b^* \leq 0$. Where the values are in the above-described ranges, color of reflected light from reddish purple to bluish purple is reduced, which has been a problem not solved by conventional polarizing plates. Further, where the values are in the range of $3 \leq L^* \leq 10$, $0 \leq a^* \leq 5$ and $-7 \leq b^* \leq 0$, the color of reflected light is markedly reduced and color slightly reflecting external light of bright light like an indoor fluorescent lamp is made neutral and is not a concern on application of the polarizing plate to a liquid crystal display device. To be more specific, the range of $a^* \leq 7$ will not make the color of red too vivid and the range of $a^* \geq 0$ will not make the color of cyan too vivid, which are therefore preferable. In addition, the range of $b^* \geq -10$ will not make the color of blue too vivid and the range of $b^* \leq 0$ will not make the color of yellow too vivid, which are all preferable.

In the invention, it is preferable that the above-described respective values of L*, a* and b* are constant on a whole surface of a display image. Further, an in-plane change rate in the respective values is preferably 20% or less and more preferably 8% or less. Where the above value and the rate are in these ranges, provided is a display image which is free of color variance and excellent in visibility.

A spectrophotometer V-550 equipped with an adaptor ARV-474 [made by JASCO Corporation] is used to determine the specular reflectivity and color. To be specific, the specular reflectivity at an incident angle of 5° and emergence angle of 5° in the wavelength range of 380 to 780 nm is determined and the mean reflectivity ratio in a wavelength range of 450 to 650 nm is calculated to evaluate the antireflection function. Further, the thus determined reflection spectrum is used to calculate L* value, a* value and b* value in the color space of CIE1976L*a*b* representing the color of specular reflection light in relation to incident light of 5° coming from CIE standard light source $D_{65}$, by which the color of reflected light can be evaluated.

Variation in the color of reflected light is greatly reduced by appropriately adjusting constituents constituting the polarizing plate of the invention through the following treatments, namely, the color of the transparent protective film in itself and the variation in the color are maintained within the above-described range, uneven configuration is provided on a uniformed surface, with the reduced irregularity of the film thickness, to form the antireflection film, and the color of the polarizing sheet is made more neutral.

In addition, color uniformity of reflected light is determined by referring to the reflection spectrum of reflected light at 380 nm to 680 nm. The respective mean values of a* and b* are determined on a chromaticity diagram of L*a*b*, and a difference (ΔA) between the maximum value and the minimum value of individual values * is divided by the mean value and multiplied by 100 to give a change rate of color. The change rate is preferably 30% or less, more preferably 20% or less and most preferably 8% or less.

The polarizing plate with an antireflection function according to the invention is preferably 15 or less in change in color ΔE before and after weather resistance tests, more preferably 10 or less and most preferably 5 or less.

Where the value is within the above range, it is possible to attain low reflection and reduced color of reflected light at the same time. Therefore, color slightly reflecting external light of bright light like an indoor fluorescent lamp is made neutral, by which a display image is preferably improved for quality, for example, on application to the outermost surface of an image display device.

The antireflection function provided-polarizing plate of the invention has features that the optical characteristics and mechanical properties of the antireflection film (tearing strength, scratching strength and adhesiveness) are maintained to an extent that any problems will not take place after weather resistance tests. In particular, the plate also has features that the change in the above-described characteristics after the weather resistance tests is maintained to an extent that problems will not take place.

The weather resistance tests of the invention refer to those conducted in accordance with JIS K-5600-7-7: 1999 by using a Sunshine Weather Meter ["S-80" made by Suga Test Instruments Co., Ltd.], 50% RH and treatment time for 150 hours).

(Endurance of Light Transmittance and Polarization Degree in Relation to Temperature and/or Humidity)

The polarizing plate with an antireflection function according to the invention is preferably 3% or less in a change rate of light transmittance and polarization degree on the basis of the absolute value before and after the polarizing plate is allowed to stand for 500 hours in an atmosphere of 60° C. and 90% RH. Further, the polarizing plate is particularly preferably 2% or less in a change rate of light transmittance, 1.0% or less and preferably 0.1% or less in a change rate of polarization degree on the basis of the absolute value. These conditions can be realized by the polarizing sheet made of a stretched film of hydrophilic polymers containing dichromtatic substances at more than 0.6% by weight and the cellulose acylate film excellent in moisture resistance and preferably usable in the invention. As described in JP-A-07-077608, the polarizing plate is preferably 95% or more in polarization degree after being allowed to stand for 500 hours at 80° C. and 90% RH. Further, the plate is preferably 38% or more in transmittance.

In addition, the polarizing plate is preferably 3% or less in the change rate of light transmittance and polarization degree on the basis of the absolute value before and after the polarizing plate is allowed to stand for 500 hours at 80° C. and in a dry atmosphere. Further, the polarizing plate is particularly preferably 2% or less in the change rate of light transmittance, 1.0% or less and preferably 0.1% or less in the change rate of polarization degree on the basis of the absolute value.

[Dimensional Change Rate]

The antireflection function provided-polarizing plate of the invention is preferably within ±0.6% both in dimensional change rate of the polarizing plate in a direction of the absorption axis and in dimensional change rate in a direction of the polarizing axis, when allowed to stand for 120 hours at 70° C. in an heating atmosphere.

Regarding the dimensional behavior on heating the polarizing plate, since change of the polarizing plate in a direction of the absorption axis and in a direction of the polarizing axis is less anisotropic, shrinkage of the polarizing plate makes uniform the load applied to the in-plane of plastic cells, thereby solving flexure of irregular-shaped panels which has been a problem on assembly of a liquid crystal display device.

It is more preferable that the dimensional change rate $D_A$ of the polarizing plate in a direction of the absorption axis and the dimensional change rate $D_B$ in a direction of the polarizing axis satisfy the following relationship.

$$-0.05<(\text{dimensional change rate } D_A-\text{dimensional change rate } D_B)<+0.05$$

The relationship can be satisfy by controlling the stretching process of the polarizing sheet and adjusting the moisture content of the polarizing sheet on attachment to the transparent protective film (moisture content of the polarizing sheet is ordinarily less than 20% by weight in relation to a whole weight of the polarizing sheet and preferably 13 to 17% by weight, although depending on the thickness of the polarizing sheet).

[Other Resistance Properties]

The polarizing plate is preferably 0.5% or less in shrinkage percentage when allowed to stand for 2 hours at 80° C., as described in JP-A-06-167611. It is also preferable that the polarizing plate is adjusted for the change in spectral intensity ratio at 105 cm$^{-1}$ and 157 cm$^{-1}$ by raman spectrosocopy after being allowed to stand for 200 hours at an atmosphere of 80° C. and 90% RH to the range described in JP-A-08-094834 and JP-A-09-197127.

<Other Functional Layers>

The polarizing plate with an antireflection function according to the invention is preferably used as a complex polarizing plate which has functional layers such as viewing angle-widening film for an LCD, λ/4 plate for application to a reflective-type LCD and others on the transparent protective film opposite side to the transparent protective film having an antireflection film of the polarizing sheet.

[Optical Compensation Film]

It is preferable that the polarizing plate on the observation side according to the invention is provided with an optical compensation film on the plane opposite side to the polarizing plate having an antireflection film. Such a structure makes it possible to widen the viewing angle of the display image on a liquid crystal display device. An optical compensation function may be imparted by laminating an optical compensation film on the transparent protective film opposite side to the polarizing plate on which the antireflection film is fixed, by giving the function of the optical compensation film to the transparent protective film in itself, or by coating a layer having an optical compensation function on the transparent protective film.

Optical compensation films include a birefringent film in which a polymer film is treated by uniaxial or bi-axial stretching process and a liquid crystal orientation film having an optical anisotropic layer made of liquid crystal materials showing birefringence on a transparent film. No particular restriction is placed on the thickness of optical compensation films, with an ordinary thickness of 5 to 100 μm. Of these optical compensation films, preferable is the liquid crystal orientation film having an optical anisotropic layer on a transparent film.

Raw materials of polymer films constituting the birefringent film include, for example, polyvinyl alcohol, polyvinyl butyral, polymethylvinyl ether, polyhydroxy ethylacrylate, hydroxyethyl cellulose, hydroxylpropyl cellulose, methyl cellulose, polycarbonate, polyalylate, polysulfone, polyethylene terephthalate, polyethylene naphthalate, polyether sulfone, polyphenylene sulfide, polyphenylene oxide, polyallyl sulfone, polymethyl methacrylate, polyamide, polyimide, polyolefin, polyvinyl chloride, cellulose polymers, norbornene resins or their binary and ternary copolymers, graft copolymers and blended substances. These polymer raw materials are oriented products (stretched film) by stretching, etc.

[Liquid Crystal Orientation Film]

The foregoing optical anisotropic layer is preferably designed in such a way to compensate liquid crystal compound molecules in liquid crystal cells on a black indication of a liquid crystal display device. Orientation status of the liquid crystal compound molecules in liquid crystal cells on black indication varies depending on a mode of a liquid crystal display device. The orientation status of liquid crystal compound molecules in liquid crystal cells has been described in IDW' 00 FMC7-2, pp. 411-414.

(Liquid Crystal Compounds)

Liquid crystal compounds used in an optical anisotropic layer may be rod-like liquid crystal or discotic liquid crystal, including polymer liquid crystal, low-molecular-weight liquid crystals, and even cross-linked low-molecular-weight liquid crystals which do not exhibit liquid crystalline properties any more. Discotic liquid crystal is most preferable.

Preferable rod-like liquid crystals are those described in JP-A-2000-304932.

Discotic liquid crystals include benzene derivatives described in a report by C. Destrades et. al and Mol. Cryst. Vol. 71, pp. 111 (1981); Truxenon derivative described in a report by C. Destrades et. al., Mol. Cryst., Vol. 122, pp. 141 (1985) and Physics lett, A, Vol. 78, pp. 82 (1990); cyclohexane derivatives described in a report by B. Kohne et. al., Angew. Chem., Vol. 96, pp. 70 (1984); azacrine and phenylacetylene macrocycle described in a report by J. M. Lehn, et. al., J. Chem. Commun., pp. 1794 (1985), report by J. Zhang et. al., J. Am. Chem. Soc., vol 116, pp. 2655 (1994).

In general, the above-described discotic liquid crystal is structured to have the parent nuclei at the center of molecules, with straight-chain alkyl group, alkoxy group and substituted benzoyloxy, etc., being substituted in a radial fashion as straight-chain groups, showing liquid crystalline properties. Discotic liquid crystal may not be restricted to that described above, if molecules by themselves have a negative uniaxial orientation and are able to provide a certain orientation. Further, the expression of the invention, "formed from disk-like compounds" means that final products are not necessarily the compound but, they include, for example, low-molecular-weight discotic liquid crystals having groups reactive to heat, light or others, which are consequently subjected to polymerization or cross-linkage by heat, light and others to give polymers and loose liquid crystalline properties. Preferable examples of the above-described discotic liquid crystal are those described in JP-A-8-50206.

In general, the above-described optical anisotropic layer is prepared by coating on an orientation film a solution in which discofic compounds and others (for example, plasticizers, surface active agents and polymers) are dissolved in solvents, the resultant is dried, heated up to discotic nematic-phase forming temperatures and then cooled, with the orientation status maintained (discotic nematic phase). Alternatively, the optical anisotropic layer is prepared by coating on an orientation film a solution in which discotic compounds and others (additionally, for example, polymerizing monomers photo polymerization initiators) are dissolved in solvents, the resultant is dried, heated up to the discotic nematic phase forming temperatures, polymerized (exposure to UV light, etc.) and cooled.

The optical anisotropic layer is preferably 0.1 to 10 μm in thickness, more preferably 0.5 to 5 μm and most preferably 0.7 to 5 μn. However, the layer may be made thick (3 or 10

μm) depending on modes of liquid crystal cells for the purpose of obtaining a higher optical anisotropy.

Optical compensation layers include publicly known layers, and in view of widening the viewing angle, preferable are those having an optical anisotropic layer made of compounds having discotic structure units and the angle formed between the discotic compounds and the transparent support which varies depending on the distance from the transparent support as described in JP-A-2001-100042.

The angle preferably increases with an increasing distance from the plane side of the transparent support on the optical anisotropic layer.

Where an optical compensation layer is used as a protective film for a polarizing sheet, it is preferable that the surface to be attached to the polarizing sheet is treated with saponification, which is conducted according to the previously described procedures.

Also preferable are an embodiment in which an optical anisotropic layer further contains cellulose ester, that in which an orientation layer is provided between an optical arnisotropic layer and a transparent support and that in which the transparent support of the optical compensation layer having the optical anisotropic layer has optically negative uniaxial orientation and beam axis in normal line direction of the plane of the transparent support and further meets the conditions of the following numerical formula.

$$20<\{(nx+ny)/2-nz\}\times d<400$$

In the above-described numerical formula, nx represents a refractive index of an in-plane of the layer concerned in the direction of the slow phase axis (direction of maximizing the refractive index); ny, a refractive index of an in-plane of the layer in the direction of advancing toward the axis (direction of minimizing the refractive index); nz, a refractive index in the direction of the thickness; and d, thickness of the optical compensation layer.

(Orientation Film)

An orientation film is ordinarily used because of the function to control the orientation direction of liquid crystal compound molecules. Such liquid crystal compounds that are fixed for the orientation status after orientation are also able to function as an orientation film. Therefore, the orientation film is not always an essential element in the invention. For example, only an optical anisotropic layer on the orientation film, the orientation status of which is fixed, can be transferred on a transparent protective film of the polarizing sheet, thereby providing the polarizing plate of the invention.

The orientation film can be provided by subjecting organic compounds (preferably a polymer) to rubbing treatment, subjecting inorganic compounds to oblique evaporation, forming a layer having micro-groups, or accumulating organic compounds (for example, ω-tricosanic acid, dioctadecylmethyl ammonium chloride and methyl stearate) by Langmuir's blow jet process (LB film). There is also known an orientation film which produces the orientation function when subjected to a magnetic field or exposed to light.

The orientation film is preferably formed by subjecting polymers to rubbing treatment. Polymers to be used for forming the orientation film are according to the principles of molecular structure capable of orientation of liquid crystal molecules.

In the invention, it is preferable that side chains having a crosslinking functional group (for example, double bond) are allowed to bond with principal chains or crosslinking functional groups having the function to orient liquid crystal molecules are introduced into side chains, in addition to the function to orient liquid crystal molecules.

Polymers capable of effecting cross-linkage by themselves or those cross-linked by crosslinking agents may be used as polymers usable as an orientation film. These polymers may be also used in combination of two or more types of them.

Examples of polymers usable as an orientation film include methacrylate copolymers, styrene copolymers, polyolefin, polyvinyl alcohol and modified polyvinyl alcohol, poly(N-methylolacrylamide), polyester, polyimide, vinyl acetate copolymer, carboxyl methyl cellulose and polycarbonate described in paragraph No. [0022], JP-A-8-338913. Polyvinyl alcohol and modified polyvinyl alcohol are most preferable. Orientation film-forming compounds such as modified polyvinyl alcohol compounds and crosslinking agents are, for example, those described in JP-A-2000-155216 and JP-A-200262426.

The orientation film may be ordinarily formed by coating the above-described polymers (orientation film-forming materials) on a support, which is then subjected to heating, drying (cross-linkage) and also to rubbing treatment. Cross-linkage may be performed at any time after coating on the support, as explained previously.

The orientation film may be preferably coated by spin coating, dip coating, curtain coating, extrusion coating, rod coating, or roll coating method. The rod coating method is particularly preferable.

The orientation film is formed directly on the transparent protective film (a support) or formed after an undercoating layer is provided on the transparent protective film. Where the orientation film is directly formed on the support, the film is made hydrophilic on the surface. The transparent protective film of the polarizing plate is preferably used as the support.

The undercoating layer may be formed by coating an undercoating layer alone or a single layer of resin such as gelatin which contains both a hydrophobic property group and hydrophilic group (single layer method) as described in JP-A-7-333433, or by providing a layer thoroughly adhesive with a polymer film as the first layer (hereinafter referred as first undercoating layer) on which a hydrophilic resin layer such as gelatin thoroughly adhesive with the orientation film as the second layer (hereinafter referred to as second undercoating layer) is coated (double layer method) as described in JP-A-11-248940.

The orientation film can be obtained by giving rubbing treatment to the surface after cross-linkage of the polymer, as explained above. Then, the orientation film is allowed to function, thereby orienting liquid crystal molecules of the optical anisotropic layer provided on the orientation film. Thereafter, the orientation film polymer is allowed to react with multi-functional monomers contained in the optical anisotropic layer, or crosslinking agents are used to perform cross-linkage with the orientation film polymer, depending on the necessity.

The orientation film is preferably in the range 0.1 to 10 μm in thickness.

[Support on which Optical Anisotropic Layer Made of Liquid Crystal Compounds is Coated]

No particular restriction is placed on the support on which an optical anisotropic layer is coated, as long as it is a plastic film with a high transmittance. Cellulose acylate which is a transparent protective film of the polarizing plate is preferable. To be specific, it is preferable that the orientation film (not an essential film as described before) and the optical anisotropic layer are directly formed on the transparent protective film of the polarizing plate.

Since the support on which the optical anisotropic layer is coated plays an optically important role by itself, the support is preferably adjusted for Re retardation value from 0 to 200 nm and for Rth retardation values from 0 to 400 nm.

It is preferable that cellulose acylate film of the support has compounds absorbing ultraviolet rays in which the wavelength (λ max) giving the maximum absorption to the ultraviolet absorption spectrum of the solution is in a wavelength shorter than 400 nm, as a retardation adjusting agent. These compounds include ultraviolet ray absorbing compounds such as phenyl salicylic acid, 2-hydroxy benzofenone, benzotriazole and triphenyl phosphate. Preferable are aromatic compounds having at least two aromatic rings (those described in JP-A-2000-111914), triphenylene compound (those described in JP-A-2000-275434), rod-like compounds (those described in JP-A-2002-363343, JP-A-2003-35821), disk-like compounds (compounds having 1,3,5-triazine skeleton and porphyrin skeleton in the molecules (those described in JP-A-2001-166144). These compounds are preferably free of practical absorption at a visible light region.

The support film is preferably 0 or 0.002 in the birefringent index (Δn: nx−ny). Further, the film is preferably 0 or 0.04 in the birefringent index {(nx+ny)/2−nz} in the thickness direction.

The retardation value (Re) is calculated according to formula (XV):

$$\text{retardation value } (Re) = (nx - ny) \times d$$

Wherein nx represents the in-plane refractive index (in-plane maximum refractive index) of the retardation plate in the direction of the slow phase axis and ny represents the in-plane refractive index of the retardation plate in the direction vertical to the slow phase axis.

The retardation value (Rth) is calculated according to formula (XVI):

$$\text{retardation value } (Rth) = \{(nx+ny)/2 - nz\} \times d$$

Wherein nx represents the refractive index of the slow phase axis direction in film plane (direction of maximizing the refractive index); ny, the refractive index film of advancing toward the axis direction (direction of minimizing the refractive index); nz, the refractive index in the direction of film thickness, and d, film thickness in units of nm.

The cellulose acylate film used as an optical compensation film is preferably 20 to 200 μm in thickness and more preferably 30 to 120 μm.

Where the optical compensation film is used as a protective film of the polarizing sheet, namely, where the film is attached to the polarizing sheet after an optical anisotropic layer is provided on the transparent protective film, the surface to be attached to the polarizing sheet is preferably subjected to saponification according to the procedures described previously.

The polarizing plate on the observation side is a laminated film consisting of antireflection film/transparent protective film/polarizing sheet/transparent protective film, or a laminated film consisting of antireflection film/transparent protective film/polarizing sheet/optical compensation film (transparent protective film/(orientation film)/optical anisotropic layer), thereby making the plate thinner and lighter as well as reducing the cost. The antireflection film is also used as an upper transparent protective film of the polarizing plate, and the support on which the optical anisotropic layer is coated is also used as a lower transparent protective film, thereby providing a thinner and lighter polarizing plate excellent in physical strength, weather resistance and visibility, in addition to the antireflection function.

In this instance, the polarizing plate and the optical compensation film are the same in content with those described in the polarizing plate (upper polarizing plate) on the observation side.

<Image Display Device>

The image display device of the invention comprises the polarizing plate with an antireflection function according to the invention which is arrayed on an image displaying plane. Thus, the polarizing plate with an antireflection function according to the invention is applicable to image display devices such as a liquid crystal display device (LCD) and organic EL display. The image display device of the invention is preferably applicable to transmissive type, reflective-type and semi-transmissive liquid crystal display devices based on any mode of TN, STN, IPS, VA and OCB. An additional explanation will be made as follows:

The liquid crystal display devices may include any publicly known conventional ones. They are, for example, those described in "Comprehensive technology of reflective-type color LCD," Uchida, T., [CMC, 1999], "New development of flat panel displays," [Research Department, Toray Research Center Inc., 1996], "Present status and prospect of liquid crystal-related market" (lower and upper volumes) [Fuji Chimera Research Institute, Inc., 2003] and others.

To be specific, they are preferably applicable to transmissive type, reflective-type and semi-transmissive type liquid crystal display devices based on modes of twisted nematic (TN), super-twisted nematic (STN), vertical alignment (VA), in-plane switching (IPS), and optically compensated bend cell (OCB).

Further, the polarizing plate of the invention is preferable because it is able to provide a well-contrasted and wider viewing angle and prevent change in hue and reflection of external light, when installed on a liquid crystal display device with the display image size 17 inches or more.

[Liquid Crystal Display Device Based on TN Mode]

Liquid crystal cell based on TN mode is most commonly used as a color TFT liquid crystal display device, and described in a significant amount of literature. Orientation in the liquid crystal cell based on the TN mode on black indication is in a condition where rod-like liquid crystal molecules are raised at the center of the cell and laid in the vicinity of the cell substrate.

[Liquid Crystal Display Device Based on OCB Mode]

The liquid crystal cell based on the OCB mode is a liquid crystal cell based on bend orientation mode in which rod-like liquid crystal molecules are oriented in a substantially opposite direction (symmetrical) between the upper and lower part of the liquid crystal cell. The liquid crystal display device using the liquid crystal cell based on bend orientation mode has been disclosed in the specification of U.S. Pat. No. 4,583,825 or U.S. Pat. No. 5,410,422. Since the device is oriented symmetrically between the upper and lower parts of the liquid crystal cell, the liquid crystal cell based on bend orientation mode is provided with self optical compensation. Therefore, this liquid crystal mode is also called OCB (optical compensation bend) liquid crystal mode.

As with the liquid crystal cell based on the TN mode, orientation in the liquid crystal cell based on the TN mode is also in a state where rod-like liquid crystal molecules are raised at the center of the cell and laid in the vicinity of the cell substrate.

[Liquid Crystal Display Device Based on VA Mode]

In the liquid crystal cell based on the VA mode, rod-like liquid crystal molecules are substantially in a vertical orientation when no voltage is applied.

The liquid crystal cell based on VA mode includes (1) liquid crystal cell based on the VA mode in a narrow sense in which rod-like liquid crystal molecules are oriented in a substantially vertical direction when no voltage is applied and in a substantially horizontal direction when voltage is applied (described in JP-A-2-176625), (2) liquid crystal cell (MVA mode) in which the VA mode is multi-domained for widening the viewing angle [SID97 described in Digest of Tech. Papers (preliminary reports), 28, 845, (1997)], (3) liquid crystal cell (n-ASM mode) in which rod-like liquid crystal molecules are oriented in a substantially vertical direction when no voltage is applied and subjected to twisted multi-domain orientation when voltage is applied (described in the preliminary report on the discussion of the Japan Liquid Crystal Society, 58-59 (1998)), and (4) liquid crystal cell based on Survival mode (published in the LCD International 98).

[Liquid Crystal Display Device Based on EPS Mode]

The liquid crystal cell based on the IPS mode is a mode in which liquid crystal molecules are rotated always in the horizontal plane in relation to the substrate and oriented in such a way to exhibit some angles in the machine direction of the electrode when no electric field is applied. Application of the electric field will allow liquid crystal molecules to face toward the electric field. Light transmittance can be changed by arraying the polarizing plate holding the liquid crystal cell at a predetermined angle. Liquid crystal molecules usable in the invention are nematic liquid crystals having a positive dielectric anisotropy $\Delta \in$. The liquid crystal layer (gap) is in the range of more than 2.8 μm to less than 4.5 μm in thickness. Where retardation $\Delta n \cdot d$ is in the range of more than 0.25 μm to less than 0.32 μm, provided is transmittance property substantially free of long-wave dependence within a visible light range. A proper combination of polarizing plates makes it possible to attain the maximum transmittance when the liquid crystal molecules are turned 45° from the rubbing direction to the electric field direction. Further, the liquid crystal layer is controlled for thickness (gap) by using polymer beads. Of course, glass beads, fibers and column-like resin spacers may be used to provide a similar gap. No particular restriction is placed on liquid crystal molecules as long as they are nematic liquid crystals. A higher dielectric anisotropy $\Delta \in$ is able to further reduce the drive voltage, whereas a smaller refractive index dielectric anisotropy $\Delta n$ is able to further increase thickness of the liquid crystal layer (gap), by which liquid crystal-sealing time can be reduced and variation in the gap can be made smaller.

[Other Liquid Crystal Modes]

Liquid crystal display devices based on the ECB mode or STN mode can be provided with the polarizing plate of the invention, according to a similar idea described in the above.

Further, the polarizing plate can be used in combination with the λ/4 plate as a polarizing plate of a reflective-type liquid crystal or a surface protective plate of an organic EL display to reduce reflected light coming from the surface and inside.

Hereinafter, an additional explanation will be made for the liquid crystal display element usable in the image display device of the invention.

The liquid crystal display element of the invention is provided with a polarizing plate arrayed respectively on the upper and lower sides of the liquid crystal cell formed by two cell substrates, the polarizing plate is provided with a polarizing sheet and a protective film arrayed respectively on the upper and lower sides of the polarizing sheet and the lower side of the polarizing plate is provided with a brightness-improving film.

The liquid crystal display element of the invention comprises the transparent support on which the upper protective film of the upper polarizing plate is provided and the antireflection film having the low-refractive index layer forming the upper-most layer (outermost layer) of the protective film and having a lower refractive index than that of the transparent support, wherein the low-refractive index layer contains at least one type of specific inorganic fine particles.

(Liquid Crystal Cell)

Cell substrates for forming the liquid crystal cell may include glass plates and plastic plates ordinarily used for this purpose, and those having a thickness of 0.5 mm or less are preferable in view of making the liquid crystal display element thinner.

In this instance, no particular restriction is placed on plastic plates, as long as they are sufficient in transparency and mechanical strength. Any publicly known conventional plastic plates are usable for this purpose. Resins for forming plastic plates include thermoplastic resins such as polycarbonate, polyalylate, polyether sulfone, polyester, polysulfone, polymethyl methacrylate, polyether imide and polyamide, epoxy resins, and thermosetting resins such as unsaturated polyester, polydiallylphthalate, polyisobonyl methacrylate. These resins may be used as one or two or more types of them, and also used as copolymers or mixtures with other compounds.

"Characteristics of Antireflection Film"

The antireflection film with the previously-described configurations can also be preferably used.

(Optical Characteristics)

The antireflection film is preferably 2.5% or less in mean value of specular reflectivity (namely, mean reflectivity ratio) in a wavelength from 450 nm to 650 nm at an incident angle of 5°, more preferably 1.8% or less and further more preferably 1.4% or less.

The specular reflectivity at the above-described incident angle of 5° is the light intensity ratio of the light reflected at −5° with the normal line direction to the light radiated at +5° in the normal line of a sample, indicating the degree of reflected image coming from mirror reflection on the back. Where used as an antireflection film with antiglare function, the light radiated at an angle of −5° in the normal line direction is weaker by an extent of the scattering light coming from the surface irregularity provided for imparting an antiglare function. Therefore, the specular reflectivity can be used to determine contributions reflecting both the antiglare function and the antireflection function.

When the mean value of the specular reflectivity in the wavelength range of 450 nm to 650 nm at an incident angle of 5° in the antireflection film exceeds 2.5%, reflected image on the back causes concern and defects such as reduced visibility are found on application of the polarizing plate to the surface film of a display device. Therefore, such antireflection polarizing is not preferable.

Regarding the color of specular reflection light in relation to the incident light of 5° coming from a CIE standard light source D65 at a wavelength from 380 nm to 780 nm, where L*, a* and b* values in color space of CIE1976L*a*b* are in the respective ranges of $3 \leq L^* \leq 20$, $-7 \leq a^* \leq 7$ and $-10 \leq b^* \leq 10$, the color of reflected light from reddish purple to bluish purple can be reduced, which has been a problem not solved by conventional multi-layered antireflection films, and where the values are in a range of $3 \leq L^* \leq 10$, $0 \leq a^* \leq 5$ and $-7 \leq b^* \leq 0$, the color of reflected light can be markedly reduced and color slightly reflecting external light of bright light like an indoor fluorescent lamp is made neutral and does not cause concern on application to a liquid crystal display device. To be specific, the range of a*>7 will make the color of red too vivid and the range of a*<7 will make the color of cyan too vivid, which are not preferable. In addition, the range of b*<−7 will make the color of blue too vivid and the range of b*>0 will make the color of yellow too vivid, which are not preferable, either.

In the invention, it is preferable that the above-described respective values of L*, a* and b* are constant on a whole surface of a display image, and it is particularly preferable that an in-plane change rate of the values is less than 15%. The in-plane change rate means the percentage of the value obtained by subtracting individual minimum values from the maximum values on the plane in relation to the absolute value of the maximum value. It is more preferable that the in-plane change rate is 10% or less. Where the above-described values and rate are within these ranges, a display image becomes free of variation in antireflection performance and excellent in visibility.

A spectrophotometer V-550 (made by JASCO Corporation equipped with an adaptor ARV-474 is used to measure the specular reflectivity and color. To be specific, the specular reflectivity of output angle of 5° at an incident angle of 5° in the wavelength range of 380 to 780 nm is measured and the mean reflectivity ratio in the wavelength range of 450 to 650 nm is calculated to evaluate the antireflection function. Further, the thus determined reflection spectrum is used to calculate L* value, a* value and b* value in color space of CIE1976L*a*b* representing the color of specular reflection light in relation to incident light of 5° coming from the CIE standard light source D65 by which the color of reflected light can be evaluated.

Variation in the color of reflected light resulting from irregular thickness of the antireflection film can be greatly reduced by controlling the variance in thickness of the transparent support (to be specific, within ±3.5) and also by reducing an irregular thickness of individual coated layers on the antireflection film to form an antireflection film.

Color of reflected light is made further neutral and excellent weather resistance is provided.

The color of reflected light can be determined by referring to the reflection spectrum of the reflected light at 380 nm to 680 nm. The distance ΔE from the center on a chromaticity diagram of L*a*b* is preferably 15 or less, more preferably 10 or less and most preferably 5 or less.

The above-described antireflection film is preferably 15 or less which is ΔE change in color before and after weather resistance tests, more preferably 10 or less and most preferably 5 or less.

Further, where the reflected light has such color, it is preferable that the mean reflectivity ratio of the antireflection film at a wavelength range of 380 to 680 nm before and after light stability tests is changed at 0.5% or less.

Where the value is within the above-described range, it is possible to attain low reflection and reduced color of the reflected light at the same time. Therefore, color slightly reflecting external light of bright light like an indoor fluorescent lamp is made neutral, by which a display image is preferably improved for quality, for example, on application to the outermost surface of an image display device.

The above-described antireflection film has features that the optical characteristics and mechanical properties of the film are maintained within an extent that no problems problematic place after weather resistance tests. In particular, the film also has features that the change in the above-described characteristics after the weather resistance tests are maintained within an extent.

The weather resistance tests refer to those conducted in accordance with JIS K-5600-7-7:1999 by using the Sunshine Weather Meter (S-80" made by Suga Test Instruments Co., Ltd.), 50% RH and treatment time for 150 hours.

The antireflection film having the neutral color of reflected light and a low reflectivity ratio can be obtained by optimizing the refractive index of the low-refractive index layer and that of the high-refractive index layer.

<Formation of Upper Polarizing Plate>

The above-described upper polarizing plate is preferably formed by attaching a polarizing sheet to the plane of the transparent support side of the antireflection film thereon (on the observation side). A lower protective film of the upper polarizing plate is the transparent support, preferably the cellulose acylate film, and more preferably an attachment of the transparent support with the cellulose acylate film. In general, the polarizing sheet consists primarily of polyvinyl alcohol. It is preferable that the surface of transparent support is made hydrophilic by surface treatment with the same procedures as described previously in order to improve adhesion properties with the polarizing sheet. A transparent support as a lower protective film of the upper polarizing plate can be made hydrophilic by the same procedures.

Thus the constituted polarizing plate can be used to provide an anti-reflective function-provided polarizing plate excellent in physical strength and weather resistance, thereby reducing the cost and making a display device thinner.

[Optical Compensation Film]

It is also preferable that the polarizing plate on the observation side of the invention has an optical compensation film similar to that described previously on the support opposite side to the polarizing plate on which an antireflection film is fixed, thereby making it possible to widen the viewing angle of the display image on a liquid crystal display device.

[Lower Polarizing Plate]

The lower polarizing plate (polarizing plate on the backlight side) of the liquid crystal cell of the invention is provided with a brightness-improving film on a protective film (transparent support) opposite side to the plane adjacent to a liquid crystal cell (backlight/lower side). A more preferable embodiment is that an optical compensation film is provided on the protective film adjacent to the liquid crystal cell, namely, an embodiment of optical compensation film/polarizing plate/brightness-improving film.

Here, the polarizing plate and the optical compensation film are the same as those described in the above-described polarizing plate (upper polarizing plate) on the observation side.

(Brightness-Improving Film)

No particular restriction is placed on the brightness-improving film used in the invention, as long as it will separate natural light into transmitted light and reflected light. For example, the film may include that which will separate natural light into transmitted light (as linearly polarized light) and reflected light which can be utilized again as circularly polarized light and that which will transmit linear polarization light of a certain polarization axis but reflects other light.

Where a backlight is used to pass the polarizing sheet from the back of the liquid crystal cell to be made incident, without using the brightness-improving film, light having polarization direction not in agreement with the polarization axis of the polarizing sheet is mostly absorbed by the polarizing sheet and does not pass through the polarizing sheet. Namely, about 50% of the light is absorbed by the polarizing sheet, depending on the characteristics of the polarizing sheet used, and, as the result, light to be used in producing a liquid crystal image or other is decreased to result in a darker image. The brightness-improving film is able to effectively utilize light such as a backlight to display the image of a liquid crystal display device and make the image plane brighter, because light having a polarization direction that may be absorbed by the polarizing sheet is allowed to once reflect on the brightness-improving film without being made incident on the polarizing sheet, the light is then reversed through a reflection layer or others provided on the back, thereby allowing the light to radiate again on a brightness-improving plate, the process of which is repeated, thereby, the light reflected and reversed between the brightness-improving film and the brightness-improving plate is converted to that having the polarization direction passable through the polarizing sheet, and such polarized light is transmitted and supplied to the polarizing sheet.

The brightness-improving film includes that which transmits linearly polarized light of a certain polarization axis but reflects other light such as a multi-layered thin film of a dielectric substance and multi-layered lamination of a thin film with different refractive index anisotropy or that which will reflect either clock-wise or counterclock-wise circularly polarized light such as a cholesteric liquid crystal layer, in particular, oriented film of cholesteric liquid crystal polymer and film in which the oriented liquid crystal layer is supported on a film substrate.

The foregoing brightness-improving film which transmits linearly polarized light of a certain polarization axis allows the transmitted light to be made incident on the polarizing plate, with the polarization axis kept in uniform, thereby reducing absorption loss resulting from the polarizing plate and attaining an effective transmission. The brightness-improving film which will transmit circularly polarized light such as a cholesteric liquid crystal layer also allows the light to be made incident on the polarizing sheet, as it is. However, in view of reducing the absorption loss, it is preferable to conduct such incidence on a polarizing plate after the transmitted circularly polarized light is converted into linearly polarized light through the retardation plate. Thus, the λ/4 plate is used as a retardation plate to effectively convert circularly polarized light to linearly polarized light. As for examples, refer to those described in JP-A-2003-227933.

Brightness-improving films such as multi-layered thin film of a dielectric substance and multi-layered lamination of a thin film with different refractive index anisotropy are commercially available from 3M Ltd. (D-BEF), or oriented film of cholesteric liquid crystal layer (in particular, cholesteric liquid crystal polymer) and film in which the oriented liquid crystal layer is supported on a film substrate are available from Nittodenko Co., Ltd. ("PCF") and from Merck Inc. ("Transmax").

As explained above, since the liquid crystal display element of the invention has the upper polarizing plate on the liquid crystal cell and the lower polarizing plate below the liquid crystal cell, it is excellent in physical strength and weather resistance, provided with an antireflection function, clear, excellent in visibility, thinner, lighter and also lower in cost.

(Display Device)

The liquid crystal display device can be assembled according to conventional procedures. That is, in general, a liquid crystal display device is made of liquid crystal cells, optical films and other parts such as a lighting system when needed in an appropriate combination with a driving circuit. No particular restriction is placed on the display device of the invention as long as the liquid crystal display element of the invention is used.

In assembly of the liquid crystal display device, for example, parts such as prism array, lens array sheet, light diffusion plate, light guiding plate and backlight can be appropriately arrayed at a suitable site in one or two or more layers.

EXAMPLES

The invention will be explained in detail by referring to the following examples. However, it shall be construed that the invention is not limited to these examples. Parts and percentages are based on weight, unless otherwise specified.

Example A

Synthesis of Perfluoroolefin Copolymer (1)

Perfluoroolefin Copolymer (1)

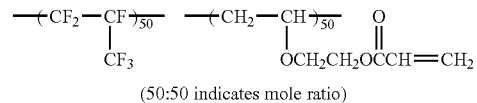

(50:50 indicates mole ratio)

Ethyl acetate, 40 mL; hydroxyethyl binylether, 14.7 g; and dilauroyl peroxide, 0.55 g, were fed into a 100 mL-capacity stainless steel autoclave equipped with an agitator, and any air remaining in the system was expelled and replaced with nitrogen gas. Further, hexafluoropropylene (HFP), 25 g, was fed into the autoclave, and the temperature was elevated up to 65° C. The pressure was 0.53 MPa when the temperature in the autoclave reached 65° C. The temperature was maintained to continue the reaction for 8 hours, and heating was discontinued at the time the pressure went down to 0.31 Mpa, and then cooled. When the temperature inside the autoclave was lowered to room temperature, unreacted monomers were expelled to collect the reaction liquid by opening the autoclave. Thus the obtained reaction liquid was fed into an excessive quantity of hexane, and solvents were removed by decantation to collect a deposited polymer. Further, the polymer was dissolved in a small quantity of ethyl acetate to effect hexane precipitation twice, thereby completely removing remaining monomers. After drying, the polymer, 28 g, was obtained. Then, the polymer, 20 g, was dissolved in N,N-dimethyl acetamide, 100 ml, to which acryic acid chloride, 11.4 g, was dropped, with ice used for cooling, and the reaction liquid was agitated for 10 hours at room temperature. Ethyl acetate was added to the reaction liquid, washed with water and concentrated after extraction of organic layers. Thus the obtained polymer was precipitated with hexane to yield 19 g of perfluoroolefin copolymer (1). The polymer was 1.421 in the refractive index.

(Preparation of Sol Solution a)

Methyl ethyl ketone, 120 parts, acryloyloxypropyl trimethoxy silane (KBM-5103 made by Shin-Etsu Chemical Co., Ltd.), 100 parts, diisopropoxy aluminum ethyl acetoacetate (trade name: Kerope EP-12, made by Hope Chemical Co., Ltd.), 3 parts, were added to a reaction vessel equipped with an agitator and a reflux condenser, and mixed. Then, ion-exchanged water, 30 parts, was added and the resultant was allowed to react at 60° C. for 4 hours, and cooled down to room temperature to obtain a sol solution a. The weight-average molecular weight was 1600, and of compounds higher than oligomer compounds, the compounds with molecular weight from 1000 to 20000 were 100%. Gas chromatography revealed that acryloyloxypropyltrimethoxy silane of the raw materials did not remain at all.

| (Preparation of coating solution A for hard-coat layer) | |
| --- | --- |
| PET-30 | 50.0 parts by weight |
| Irgacure 184 | 2.0 parts by weight |
| SX-350 (30%) | 1.7 parts by weight |
| Crossed acryl/styrene particles (30%) | 13.3 parts by weight |
| FP-132 | 0.75 parts by weight |
| KBM-5103 | 10.0 parts by weight |
| Toluene | 38.5 parts by weight |

| (Preparation of coating solution B for hard-coat layer) | |
| --- | --- |
| Desolite Z7404 (Zirconia fine particles-containing hard-coat compound solution, made by JSR) | 100 parts by weight |
| DPHA ® (UV cure resin: Nippon Kayaku Co., Ltd.) | 31 parts by weight |
| KBM-5103 | 10 parts by weight |
| KE-P150 (1.5 μm silica particles: Nippon Shokubai Co., Ltd.) | 8.9 parts by weight |
| MXS-300 (3 μm cross-linked PMMA particles: Soken Chemical & Engineering Co., Ltd.) | 3.4 parts by weight |
| MEK (methyl ethyl ketone) | 29 parts by weight |
| MIBX (methyl isobutyl ketone) | 13 parts by weight |

(Preparation of Coating Solution C for Hard-Coat Layer)

Poly (glycygyl methacrylate) of weight-average molecular weight 15000, 270.0 parts by weight, methyl ethyl ketone, 730.0 parts by weight, cyclohexanone 500.0 parts by weight and photo polymerization initiator (Irgacure 184, Ciba Specialty Chemicals) 50.0 parts by weight were added to trimethylolpropane triacrylate (TWPTA, Nippon Kayaku Co., Ltd.), 750.0 parts by weight, and mixed.

The above-described coating solutions A and B were filtered through a polypropylene filter with a pore size of 30 μm, and the solution C was filtered through a polypropylene filter with a pore size of 0.4 μm to prepare the respective coating solutions for hard-coat layers.

(Preparation of Titanium Dioxide Fine Particles Dispersing Solution)

Titanium dioxide fine particles (MPT-129C, Ishihara Sangyo Kaisha Ltd. $TiO_2:Co_3O_4:Al_2O_3:ZrO_2=90.5:3.0:4.0:0.5$ weight ratio) which contained cobalt and received surface-treatment with aluminum hydroxide and zirconium hydoxide was used as titanium dioxide fine particles.

The following dispersant 41.1 parts by weight and cyclohexanone 701.8 parts by weight were added to the above-described particles 257.1 parts by weight, and the resultant was dispersed by using a dyno mill to prepare titanium dioxide dispersing solution with a weight mean pore size of 70 nm.

Dispersant

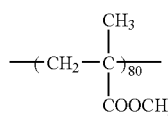
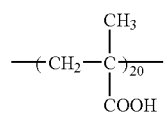

(Preparation of Coating Solution A for Medium Refractive Layer)

A mixture of dipentaerythritol pentaacrylate and dipentaerythritol hexaacrylate (DPHA®), 68.0 parts by weight; photo polymerization initiator (Irgacure 907, Ciba Specialty Chemicals), 3.6 parts by weight; photo sensitizer (Kayacure-DETX, Nippon Kayaku Co., Ltd.), 1.2 parts by weight; methyl ethyl ketone, 279.6 parts by weight and cyclohexanone, 1049.0 parts by weight were added to the above-described titanium dioxide dispersing solution, 99.1 parts by weight and agitated. After a sufficient agitation, the resultant was filtered through a polypropylene filter with a pore size of 0.4 μm.

(Preparation of Coating Solution A for High-Refractive Index Layer)

A mixture of dipentaerythritol penta acrylate and dipentaerythritol hexaacrylate (DPHA®, Nippon Kayaku Co., Ltd.), 40.0 parts by weight; photo polymerization initiator (Irgacure 907, Ciba Specialty Chemicals), 3.3 parts by weight; photo sensitizer (Kayacure-DETX, Nippon Kayaku Co., Ltd.), 1.1 parts by weight; methyl ethyl ketone, 526.2 parts by weight; and cyclohexanone, 459.6 parts by weight, were added to the above-described titanium dioxidedispersing solution A, 469.8 parts by weight, and agitated. The resultant was filtered through a polypropylene filter with a pore size of 0.4 μm.

| (Preparation of coating solution A for low-refractive index layer) | |
| --- | --- |
| DPHA ® | 4.0 parts by weight |
| Hollow silica (18.2%) | 40.0 parts by weight |
| Irgacure 907 | 0.2 parts by weight |
| Sol solution a | 6.2 parts by weight |
| MEK | 299.6 parts by weight |

| (Preparation of coating solution B for low-refractive index layer) | |
| --- | --- |
| DPHA ® | 3.3 parts by weight |
| Hollow silica (18.2%) | 40.0 parts by weight |
| RMS-033 | 0.7 parts by weight |
| Irgacure 907 | 0.2 parts by weight |
| Sol solution a | 6.2 parts by weight |
| MEK | 299.6 parts by weight |

| (Preparation of coating solution C for low-refractive index layer) | |
| --- | --- |
| JTAI13 (6%) | 13.0 parts by weight |
| MEK-ST-L | 1.3 parts by weight |
| Sal solution a | 0.6 parts by weight |
| MEK | 5.0 parts by weight |
| Cyclohexanone | 0.6 parts by weight |

| (Preparation of coating solution D for low-refractive index layer) | |
| --- | --- |
| JN7228A (6%) | 13.0 parts by weight |
| MEK-ST-L | 1.3 parts by weight |
| Sol solution a | 0.6 parts by weight |
| MEK | 5.0 parts by weight |
| Cyclohexanone | 0.6 parts by weight |

| (Preparation for coating solution E for low-refractive index layer) | |
|---|---|
| JN7228A (6%) | 100.0 parts by weight |
| MEK-ST | 4.3 parts by weight |
| MEK-ST-L | 5.1 parts by weight |
| Sol solution a | 2.2 parts by weight |
| MEK | 15.0 parts by weight |
| Cyclohexanone | 3.6 parts by weight |

| (Preparation of coating solution F for low-refractive index layer) | |
|---|---|
| Exemplified compound; P-1 | 14.0 parts by weight |
| X-22-164C | 0.42 parts by weight |
| Irgacure 907 | 0.7 parts by weight |
| MIBK | 84.7 parts by weight |

(Preparation of Coating Solution G for Low-Refractive Index Layer)

Tetramethoxy silane, 30 parts by weight, and methanol, 240 parts by weight, were put into a 4-neck reaction flask and agitated, with solution temperature maintained at 30° C., to which a solution prepared by adding nitric acid, 2 parts by weight, to water, 6 parts by weight, was added, the resultant was agitated at 30° C. for 5 hours to obtain alcohol solution (solution A) of siloxane oligomer. The siloxane oligomer was subjected to GPC, finding that the relative molecular weight was 950 on conversion to ethylene glycol/polyethylene oxide.

In separate procedures, methanol, 300 parts by weight, was added to a four-neck reaction flask and then oxalic acid, 30 parts by weight, was mixed with agitation. Thus the prepared solution was heated while refluxing, to which tetramethoxy silane, 30 parts by weight, and tridecafluorooctyl trimethoxy silane, 8 parts by weight, were added. The resultant was heated for 5 hours while refluxing, and cooled to obtain a fluorine compound solution (solution B) having a fluoroalkyl structure and polysiloxane structure.

Solution A, 30 parts by weight, and solution B, 100 parts by weight, were mixed and diluted with butyl acetate so that the dry-solid based concentration in a coating mixture solution was 1% by weight to obtain coating solution G for low-refractive index layer.

(Preparation of Coating Solution H for a Low-Refractive Index Layer)

Solution A and solution B were prepared similarly as with coating solution G for a low-refractive index layer, and polydimethyl siloxane DMS-H21 with a hydrogen terminal group (made by Gelest), 1 weight part, and hollow silica particles (18.2%) to be described later, 80 parts by weight, were added to solution A, 30 parts by weight, and solution B, 100 parts by weight, and mixed. The resultant was diluted with butyl acetate so that the dry-solid based concentration in a coating mixture solution was 1% by weight to obtain coating solution H for a low-refractive index layer.

The above-described solution was agitated and then filtered through a polypropylene filter with pore size of 1 µm to prepare the coating solution for low-refractive index layer.

The following are other compounds (those omitted for detailed explanation in the text) used in the invention.

PET-30: mixture of pentaerythritol triacrylate with pentaerythritol tetraacrylate (made by Nippon Kayaku Co., Ltd.)

Irgacure 184: polymerization initiator (made by Ciba Specialty Chemicals)

SX-350: cross-linked polystyrene particles with a mean particle size of 3.51 µm (refractive index. 1.60, made by Soken Chemical & Engineering Co., Ltd., 30% toluene dispersing solution, to be used after dispersion at 10000 rpm for 20 minutes by Polytron dispersing equipment)

Cross acryl/styrene particles: mean particle size of 3.5 µm (refractive index 1.55, made by Soken Chemical & Engineering Co., Ltd., 30% toluene dispersing solution)

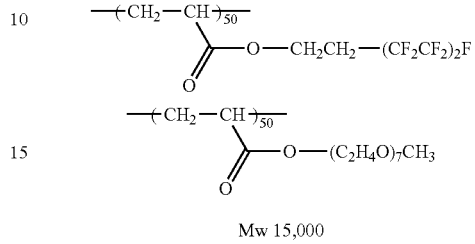

FP-132

Mw 15,000

KBM-5103: silane coupling agent (made by Shin-Etsu Chemical Co., Ltd.)

JN7228A: thermal crosslinking fluorine-containing polymer (refractive index, 1.42; dry solid based concentration, 6%; made by JSR), trade name: Opstar JN-7228A JTA 113: thermal crosslinking fluorine-containing polymer (refractive index, 1.44; dry solid based concentration, 6%; made by JSR), trade name: Opstar JTA-113

P-1: perfluoroolefin copolymer (1)

DPHA®: mixture of dipentaerythritol pentaacrylate with dipentaerythritol hexaacrylate (Nippon Kayaku Co., Ltd.)

MEK-ST-L: silica sol (silica, MEK-ST with different particle size; mean particle size, 45 nm; dry solid based concentration, 30%; made by Nissan Chemical Industries Ltd.)

Hollow silica: KBM-5103 surface-modified hollow silica sol (CS-60 (trade name) made by Catalysts & Chemicals Industries Co., Ltd.; refractive index, 1.31; mean particle size, 60 nm; shell thickness, 10 nm; void ratio, 58%; dry solid based concentration, 20%, was surface-treated with KBM-5103 to give 30% parts by weight in silica content in relation to the surface treatment; dry solid based concentration, 18.2%)

KF96-1000CS: straight silicone (Shin-Etsu Chemical Co., Ltd.)

X22-164C: reactive silicone (Shin-Etsu Chemical Co., Ltd.)

RMS-033: reactive silicone (Gelest)

R-2020: fluoroalkyl acrylate monomer (Daikin Industries Ltd.)

R-3833: fluoroalkyl acrylate monomer (Daikin Industries Ltd.)

FMS-121: fluoroalkyl silicone (Gelest)

Irgacure 907: photo polymerization initiator (Ciba Specialty Chemicals)

Example A-1

(1-1): Coating of Hard-Coat Layer A and Hard-coat Layer C

Triacetyl cellulose film (ITD80U made by Fuji Photo Film Co., Ltd.) was wound out as a support in a roll form, on which the above-described coating solution for the hard-coat layer was directly coated by using a microgravure roll of 50 mm in diameter having the gravure pattern of 180 lines per inch and 40 µm in depth and a doctor blade at a transfer speed of 30 m/minute, dried at 60° C. for 150 seconds, then, an air-cooled metal halide lamp (made by Eye Graphics Co., Ltd.) (160 W/cm) was used to radiate ultraviolet rays at an ilbrightness of 400 mW/cm$^2$, with radiation of 250 mJ/cm$^2$ for hard-coat layer A and 300 mJ/cm$^2$ for the hard-coat layer C, under nitrogen purge so as to give oxygen concentration 1.0% or less by volume, thereby curing the coated layer to form a hard-coat layer, which was then wound up. After curing, the number of rotations of the gravure roll was adjusted so that the hard-coat layer A was given a thickness of 6 μm and the hard-coat layer C was given a thickness of 8 μm.

(1-2): Coating of Hard-Coat Layer B

Triacetyl cellulose film (TD80U made by Fuji Photo Film Co., Ltd.) was wound out as a support in a roll form, on which the above-described coating solution for the hard-coat layer was directly coated by using a microgravure roll of 50 mm in diameter having the gravure pattern of 135 lines per inch and 60 μm in depth and a doctor blade at a transfer speed of 10 m/minute, dried at 60° C. for 150 seconds, then, an air-cooled metal halide lamp (made by Eye Graphics Co., Ltd.) (160 W/cm) was used to radiate ultraviolet rays at an ilbrightness of 400 mW/cm$^2$, with radiation of 250 mJ/cm$^2$, under nitrogen purge so as to give oxygen concentration 1.0% or less by volume, thereby curing the coated layer to form a hard-coat layer, which was then wound up. After curing, the number of rotations of the gravure roll was adjusted so that the hard-coat layer was given a thickness of 3.6 μm.

(2) Coating of Medium Refractive Layer A

Triacetyl cellulose film (TD80U made by Fuji Photo Film Co., Ltd.) in which coating was given up to the hard-coat layer was wound out again, on which the coating solution for the medium refractive layer was coated by using a microgravure roll of 50 mm in diameter having the gravure pattern of 180 lines per inch and 401 μm in depth and a doctor blade. The drying process was conducted at 90° C. for 30 seconds and an air-cooled metal halide lamp (made by Eye Graphics Co., Ltd.) (180 W/cm) was used to radiate ultraviolet rays at ilbrightness of 400 mW/cm$^2$, with radiation of 400 mJ/cm$^2$, under nitrogen purge so as to give an oxygen concentration of 1.0% or less by volume. The number of rotations of gravure roll was adjusted so as to give 67 nm in thickness after coating, thereby providing the medium refractive layer, which was then wound up. The medium refractive layer after curing was 1.630 in the refractive index.

(3) Coating of High-Refractive Index Layer A

Triacetyl cellulose film (TD80UF made by Fuji Photo Film Co., Ltd.) in which coating was given up to the medium refractive layer was wound out again, on which the coating solution for the high-refractive index layer was coated by using a microgravure roll of 50 mm in diameter having the gravure pattern of 180 lines per inch and 40 μm in depth and a doctor blade. The drying process was conducted at 90° C. for 30 seconds and an air-cooled metal halide lamp (made by Eye Graphics Co., Ltd.) (240 W/cm) was used to radiate ultraviolet rays at an ilbrightness of 600 mW/cm$^2$, with radiation of 400 mJ/cm$^2$, under nitrogen purge so as to give an oxygen concentration of 1.0% or less by volume. The number of rotations of gravure roll was adjusted so as to give 107 nm in thickness after coating, thereby providing the high-refractive index layer, which was then wound up. The high-refractive index layer after curing was 1.905 in the refractive index.

(4-1) Coating of Low-Refractive Index Layer
[Coating and Curing Process A]

Triacetyl cellulose film in which coating was given up to the hard-coat layer or the high-refractive index layer was wound out again, on which the coating solution for the above-described low-refractive index layer was coated by using a microgravure roll of 50 mm in diameter having the gravure pattern of 180 lines per inch and 40 μm in depth and a doctor blade, at a transfer speed of 15 m/minute, and a preliminary drying was conducted at 120° C. for 150 seconds and a secondary drying was conducted at 140° C. for 8 minutes. Then, an air-cooled metal halide lamp (made by Eye Graphics Co., Ltd.) (240 W/cm) was used to radiate ultraviolet rays at an ilbrightness of 400 mW/cm$^2$, with radiation of 900 mJ/cm$^2$, under nitrogen purge so as to give an oxygen concentration of 0.1% or less by volume. The number of rotations of the gravure roll was adjusted so as to give 100 nm in thickness, thereby providing the low-refractive index layer, which was then wound up.

(4-2) Coating of Low-Refractive Index Layer

Coating and Curing Process B

Coating of the low-refractive index layer was conducted similarly as in [coating and curing process A] excluding that the secondary drying was not performed.

(4-3) Coating of Low-Refractive Index Layer

Coating and Curing Process C

A wire bar was used to coat the coating solution for the low-refractive index layer prepared above so as to give thickness of about 100 nm after curing, and the resultant was subjected to heat curing at 90° C. for 1 hour to form an antireflection layer.

(4-4) Coating of Low-Refractive Index Layer

Coating and Curing Process D

Triacetyl cellulose film in which coating was given up to the hard-coat layer was wound out again, on which the coating solution for the above-described low-refractive index layer was coated by a die coating method at a transfer speed of 25 m/minute. After the resultant was dried at 120° C. for 150 seconds and then at 140° C. for 8 minutes. An air-cooled metal halide lamp (made by Eye Graphics Co., Ltd.) (240 W/cm) was used to radiate ultraviolet rays at an ilbrightness of 400 mW/cm$^2$, with radiation of 900 mJ/cm$^2$, under nitrogen purge so as to give an oxygen concentration of 0.1% or less by volume. The number of rotations of gravure roll was adjusted so as to give 100 nm in thickness, thereby providing the low-refractive index layer, which was then wound up.

(Preparation of Antireflection Film Samples)

As shown in Tables 1 to 3, antireflection film samples were prepared according to the above-described method.

TABLE 1

| Sample No. | Coating solution | Changes from original coating solution | Low-refractive index layer Hollow silica particles | Surface free energy lowering compound/binder | Coating and curing method | Hard-coat layer | Remarks |
|---|---|---|---|---|---|---|---|
| 001 | C | None | Absent | Present | A | A | Comparative Example |
| 002 | A | None | Present | Absent | B | A | Comparative Example |
| 003 | B | None | Present | Present | B | A | Present Invention |
| 004 | B | Change from RMS-033 to X22-164C on equal weight basis | Present | Present | B | A | Present Invention |
| 005 | B | Change from RMS-033 to KF96-1000CS on equal weight basis | Present | Present | B | A | Present Invention |
| 006 | B | Change from RMS-033 to FMS121 on equal weight basis | Present | Present | B | A | Present Invention |
| 007 | B | RMS-033 = 0.35 parts by weight, DPHA® = 3.65 parts by weight | Present | Present | B | A | Present Invention |
| 008 | A | R-2020 = 1.0 parts by weight added, DPHA® = 3.0 parts by weight | Present | Present | B | A | Present Invention |
| 009 | A | R-3833 = 1.6 parts by weight added, DPHA® = 2.4 parts by weight | Present | Present | B | A | Present Invention |
| 010 | B | PHA = 5.8 parts by weight, sol solution a excluded, MEK = 295.9 parts by weight | Present | Present | B | A | Present Invention |
| 011 | B | R-2020 = 0.83 parts by weight added, DPHA® = 2.47 parts by weight | Present | Present | B | A | Present Invention |
| 012 | B | None | Present | Present | D | A | Present Invention |
| 013 | D | None | Absent | Present | A | A | Comparative Example |

TABLE 2

| Sample No. | Coating solution | Changes from original coating solution | Low-refractive index layer Hollow silica particles | Surface free energy lowering compound/binder | Coating and curing method | Hard-coat layer | Remarks |
|---|---|---|---|---|---|---|---|
| 101 | G | None | Absent | Absent | C | A | Comparative Example |
| 102 | H | None | Present | Present | C | A | Present Invention |
| 103 | A | DPHA® = 0 parts by weight, JTA113 (6%) = 66.7 parts by weight, MEK = 236.9 parts by weight | Present | Present | A | A | Present Invention |
| 104 | A | DPHA® = 0 parts by weight, exemplified compound; P-1 = 4.0 parts by weight | Present | Present | B | A | Present Invention |
| 105 | A | DPHA® = 0.8 parts by weight, exemplified compound; P-1 = 3.2 parts by weight | Present | Present | B | A | Present Invention |
| 106 | B | DPHA® = 0.7 parts by weight, exemplified compound; P-1 = 2.6 parts by weight | Present | Present | B | A | Present Invention |
| 107 | B | DPHA® = 0.7 parts by weight, exemplified compound; P-20 = 2.6 parts by weight | Present | Present | B | A | Present Invention |
| 108 | B | DPHA® = 0.7 parts by weight, exemplified compound; P-3 = 2.6 parts by weight | Present | Present | B | A | Present Invention |
| 109 | B | DPHA® = 0.7 parts by weight, exemplified compound; P-1 = 2.6 parts by weight | Present | Present | D | A | Present Invention |

TABLE 3

| Sample No. | Coating solution | Low-refractive index layer Hollow silica particles | Surface free energy lowering compound/binder | Coating and curing method | High-refractive index layer | Medium Refractive layer | Hard-coat layer | Remarks |
|---|---|---|---|---|---|---|---|---|
| 201 | E | Absent | Present | A | Absent | Absent | B | Comparative Example |
| 202 | B | Present | Present | B | Absent | Absent | B | Present Invention |
| 203 | Similar to that for preparing the sample 011 | Present | Present | B | Absent | Absent | B | Present Invention |

TABLE 3-continued

| | | Low-refractive index layer | | | | | | |
|---|---|---|---|---|---|---|---|---|
| Sample No. | Coating solution | Hollow silica particles | Surface free energy lowering compound/binder | Coating and curing method | High-refractive index layer | Medium Refractive layer | Hard-coat layer | Remarks |
| 204 | Similar to that for preparing the sample 106 | Present | Present | B | Absent | Absent | B | Present Invention |
| 205 | F | Absent | Present | B | A | A | C | Comparative Example |
| 206 | B | Present | Present | B | A | A | C | Present Invention |
| 207 | Similar to that for preparing the sample 011 | Present | Present | B | A | A | C | Present Invention |
| 208 | Similar to that for preparing the sample 106 | Present | Present | B | A | A | C | Present Invention |

(Saponification of Antireflection Film)

After the film was formed, the following treatments were given to the samples excluding the samples 101 and 102.

Sodium hydroxide solution, 1.5 mol/l, was prepared and maintained at 55° C. Diluted sulphuric acid solution, 0.01 mol/l, was prepared and maintained at 35° C. The prepared antireflection film was immersed into the above-described the sodium hydroxide for 2 minutes and then immersed into water to completely wash away sodium hydroxide solution. After being immersed into the above-described diluted sulphuric acid solution for one minute, the film samples were immersed into water to completely wash away the diluted sulphuric acid solution. Finally, the samples were dried completely at 120° C.

(Evaluation of Antireflection Film)

The film samples obtained after the saponification were evaluated for the following items, however, the samples 101 and 102 were saponification-free samples and evaluated for the following items.

(1) Mean Reflectivity Ratio

A spectrophotometer (made by JASCO) was used to determine the spectral reflectivity ratio at an incident angle of 50° in a wavelength range of 380 to 780 nm. The result was used to calculate the mean reflectivity ratio in a wavelength range of 450 to 650 nm.

(2) Evaluation of Steel Wool Scratch Resistance

A rubbing tester was used to perform rubbing tests under the following conditions.

Conditions: 25° C., 60% RH

Material to be rubbed: steel wool (Gerede No. 0000 made by Nihon Steel Wool Co., Ltd.) was wrapped around the rubbing tip of the tester coming into contact with samples (1 cm×1 cm) and fixed with a band.

Moving distance (one way): 13 cm

Rubbing speed: 13 cm/second

Load: 500 g/cm$^2$

Tip contacting area: 1 cm×1 cm

Rubbing times: 10 reciprocating movements

Oil-based black ink was applied on the back of the rubbed material, and observed macroscopically under reflected light to evaluate the rubbed part on the basis of the following criteria.

AA: no scratch was found at all after very careful observation

A: slight and subtle scratch was found after very careful observation

AB: slight scratch was found

B: moderate scratch was found

BC to C: scratch was found at one glance (3) Evaluation of Adhesiveness

A utility knife was used to cut 11 vertical lines and 11 horizontal lines on the surface of the antireflection film having the low-refractive index layer, thereby making a total of 100 squares. Polyester adhesive tape (No. 31B) made by Nitto Denko Co., Ltd. was pressed to conduct adhesive tests at the same spots 3 times repeatedly. Whether the tape was peeled or not was macroscopically observed to make the following 4-stage evaluation.

AA: of the 100 squares, no peeling was found at all

A: of the 100 squares, less than two squares were peeled

B: of the 100 squares, 3 to 10 squares were peeled

C: of the 100 squares, more than 10 squares were peeled (4) Rubber Eraser Friction Resistance The antireflection film was fixed on the surface of a glass plate with an adhesive, a rubber eraser hollowed with an 8 mm in diameter and 4 mm in thickness (trade name: MONO, made by Tombo Pencil Co., Ltd.) was used as a head of a friction tester, namely, the rubber eraser was pressed vertically from above on the surface of the antireflection film under a load of 500 g/cm$^2$, then, subjected to 200 time-reciprocating friction movements at a stroke length of 3.5 cm and at friction speed of 1.8 cm/s at 25° C. and 60RH %. Thereafter, the rubber eraser was removed and friction parts of samples were macroscopically confirmed. The test was repeated 3 times, and the results were averaged to make the following 4-stage evaluation.

A: scratch was hardly found

B: slight scratch was found

C: clear scratch was found

CC: scratch was found on a whole surface (5) Felt Pen Wiping Performance

The antireflection film was fixed on the surface of a glass plate with an adhesive, and a circle of 5 mm in diameter was drawn 3 times with a tip of a felt pen (black ink, trade name: "Makky Gokuboso" made by ZEBRA at 25° C. and 60 RH %. After 5 seconds, a cloth (trade name: "Vencot," made by Asahi Chemical Industry Co., Ltd.) folded 10 times was used to wipe the circle 20 times in a reciprocate fashion with such a load that a bundle of Vencot was bent. The above-described procedures of drawing the circle and wiping it were repeated under the same conditions until the circle drawn with the felt pen could no longer be erased after being wiped to count how many times the circle was successfully wiped. The above-described test was repeated 4 times and the results were averaged to make the following 4-stage evaluation.

A: the circle was wiped more than 10 times

B: the circle was wiped several times to less than 10 times

C: the circle was wiped only once

CC: the circle was not wiped at any time (6) Evaluation of Surface Segregation of Silicone (Si Atom) and Fluoroalkyl (F Atom)

ESCA-3400 (made by Shimadzu Corp.) was used to determine the intensity ratio of the photoelectron spectrum, Si2p/C1s (=Si(a)) to F1s/C1s(=F(a)) of Si2p, F1s and C1s on the outer-most surface of individual, antireflection films under the conditions (degree of vacuum, $1 \times 10^{-5}$ Pa; X ray source, target Mg; voltage, 12 kV; current, 20 mA) and the intensity ratio of photoelectron spectrum, Si2p/C1s(=Si(b)) to F1s/C1s (=F(a)) at the lower layer 80% downward from the surface of the low-refractive index layer ground down to $1/5 (\pm 5\%)$ of the thickness by using an ion etching equipment attached to the ESCA-3400 (ion gun; voltage, 2 kV; current, 20 mA), from which variation in the intensity ratio, Si(a)/Si(b) and F(a)/F(b), before and after etching was determined. Then, the following 3-stage evaluation was made on the basis of the individual variations in Si2p/C1s ratio and F1s/C1s ratio before and after etching (variation in the intensity ratio of the photoelectron spectrum at the outer-most surface of the low-refractive index layer/intensity ratio of the photoelectron spectrum at the lower layer 80% downward from the surface of the low-refractive index layer). The above-described determination was made at 3 sites at least 2 cm apart from each other on the same film.

AA: intensity ratio after etching was increased more than 5 times at more than 1 site A: intensity ratio after etching was increased less than 5 times and more than 3 times at more than 1 site B: intensity ratio after etching was increased less than 3 to more than 1.5 times at more than 1 site -: intensity ratio after etching was increased less than 1.5 times F1s and C1s were determined for intensity at the peak of the respective photoelectron spectra. Si2p was determined for intensity at the peak derived from silicone (Si atom of polydimethylsiloxane) around 105 eV of binding energy, which was used for calculating the above-described intensity ratio and made distinct from the Si atom derived from inorganic silica particles. Preliminary tests were performed to gradually grind the surface of the low-refractive index layer under different etching conditions, thereby evaluating the etching conditions for reaching the under layer of the hard-coat layer or the high-refractive index layer to such an extent 80% downward from the surface. The above-described determination was made after preliminary studies.

TABLE 4

| Sample No. | Mean specular reflectivity (%) | Mean integral reflection factor (%) | Surface free energy: $\gamma s^v$ (mN/m) | Rubber eraser friction resistance | Felt pen wiping performance | Steel wool scratch resistance | Adhesiveness of crosscut | ESCA intensity ratio between upper and lower parts | | Remarks |
|---|---|---|---|---|---|---|---|---|---|---|
| | | | | | | | | Si/C | F/C | |
| 001 | 2.0 | 2.9 | 22 | B | B | B | A | A | A | Comparative Example |
| 002 | 1.6 | 2.6 | 44 | A | C | A | C | — | — | Comparative Example |
| 003 | 1.6 | 2.6 | 21 | A | AA | AA | AA | AA | — | Present Invention |
| 004 | 1.6 | 2.6 | 22 | A | A | AA | AA | AA | — | Present Invention |
| 005 | 1.6 | 2.6 | 23 | A | B | A | AA | AA | — | Present Invention |
| 006 | 1.6 | 2.6 | 23 | A | A | A | A | AA | AA | Present Invention |
| 007 | 1.6 | 2.6 | 23 | A | A | AA | AA | AA | A | Present Invention |
| 008 | 1.4 | 2.4 | 27 | A | B | A | A | — | AA | Present Invention |
| 009 | 1.4 | 2.4 | 30 | A | B | A | A | — | AA | Present Invention |
| 010 | 1.7 | 2.7 | 22 | B | A | B | B | AA | — | Present Invention |
| 011 | 1.4 | 2.4 | 19 | A | AA | AA | AA | AA | AA | Present Invention |
| 012 | 1.6 | 2.6 | 21 | A | A | AA | AA | AA | — | Present Invention |
| 013 | 1.8 | 2.8 | 21 | CC | AA | B | B | A | A | Comparative Example |

TABLE 5

| Sample No. | Mean specular reflectivity (%) | Mean integral reflection factor (%) | Surface free energy: $\gamma s^v$ (mN/m) | Rubber eraser friction resistance | Felt pen wiping performance | Steel wool scratch resistance | Adhesiveness of crosscut | ESCA intensity ratio between upper and lower parts | | Remarks |
|---|---|---|---|---|---|---|---|---|---|---|
| | | | | | | | | Si/C | F/C | |
| 101 | 1.7 | 2.7 | 43 | C | C | CC | A | A | — | Comparative Example |
| 102 | 1.5 | 2.5 | 25 | B | A | B | AA | AA | — | Present Invention |
| 103 | 1.3 | 2.3 | 22 | B | AA | B | A | A | A | Present Invention |

TABLE 5-continued

| Sample No. | Mean specular reflectivity (%) | Mean integral reflection factor (%) | Surface free energy: $\gamma s^v$ (mN/m) | Rubber eraser friction resistance | Felt pen wiping performance | Steel wool scratch resistance | Adhesiveness of crosscut | ESCA intensity ratio between upper and lower parts Si/C | F/C | Remarks |
|---|---|---|---|---|---|---|---|---|---|---|
| 104 | 1.4 | 2.4 | 25 | B | B | A | A | — | A | Present Invention |
| 105 | 1.5 | 2.5 | 30 | A | B | A | A | — | A | Present Invention |
| 106 | 1.5 | 2.5 | 22 | B | AA | AA | AA | AA | A | Present Invention |
| 107 | 1.5 | 2.5 | 23 | B | A | A | AA | AA | A | Present Invention |
| 108 | 1.5 | 2.5 | 22 | B | A | A | AA | AA | A | Present Invention |
| 109 | 1.5 | 2.5 | 22 | A | A | AA | AA | AA | A | Present Invention |

TABLE 6

| Sample No. | Mean specular reflectivity (%) | Mean integral reflection factor (%) | Surface free energy: $\gamma s^v$ (mN/m) | Rubber eraser friction resistance | Felt pen wiping performance | Steel wool scratch resistance | Adhesiveness of crosscut | ESCA intensity ratio between upper and lower parts Si/C | F/C | Remarks |
|---|---|---|---|---|---|---|---|---|---|---|
| 201 | 1.4 | 1.9 | 21 | CC | A | C | A | A | A | Comparative Example |
| 202 | 1.3 | 1.8 | 21 | A | A | A | AA | AA | — | Present Invention |
| 203 | 1.3 | 1.8 | 19 | A | A | A | AA | AA | AA | Present Invention |
| 204 | 1.4 | 2.4 | 22 | B | B | A | AA | AA | A | Present Invention |
| 205 | 0.5 | 0.5 | 23 | CC | C | B | C | A | A | Comparative Example |
| 206 | 0.4 | 0.4 | 21 | A | A | A | AA | AA | — | Present Invention |
| 207 | 0.4 | 0.4 | 20 | A | A | A | AA | A | AA | Present Invention |
| 208 | 0.4 | 0.4 | 22 | B | B | A | AA | AA | A | Present Invention |

The results obtained from Tables 4 to 6 have clearly demonstrated the following.

The antireflection film of the invention has satisfied all the reflectivity ratio, scratch resistance, felt pen wiping performance and adhesiveness to a satisfactory extent, and improved in every respect as an antireflection film. All the samples of the invention attained low reflection, as compared with Sample 001. Samples 003, 008 and 011 prepared by adding silicone and fluoroalkyl compound to Sample 002 improved in felt pen wiping performance. Further, Samples 103 and 106 to which silicone and fluorine are used in combination exhibited a better felt pen wiping performance.

Example A-2

Then, the sample film of the invention described in example 1 was attached to the polarizing plate to prepare a polarizing plate with an antireflection function. Where the polarizing plate was used to prepare a liquid crystal display device in which the antireflection layer was arrayed on the outer-most surface, the device was provided with a smaller reflection of external light, less conspicuous of reflected image and excellent visibility. The device met all the requirements of stain resistance, dust resistance and film strength which are problems in practical use.

Example A-3

Eighty μm-thick triacetyl cellulose film (TAC-TD80U, Fuji Photo Film Co., Ltd.) which was immersed into NaOH solution (1.5 mol/l and 55° C.) for 2 minutes, neutralized and washed with water and the triacetyl cellulose film on which the sample of the invention prepared in example 1 was coated were attached to both planes of the polarizing sheet prepared by stretching, after iodine was allowed to adsorb on polyvinyl alcohol, the resultant was then given protection treatment to prepare a polarizing plate. Thus the prepared polarizing plate was used so that the antireflection film side was arrayed on the outer-most surface in place of the polarizing plate on the observation side used in a liquid crystal display device of a notebook computer equipped with a transmissive-type TN liquid crystal display device (polarization-separating film having a polarization-separating layer (D-BEF made by Sumitomo 3M) was interposed between a backlight and liquid crystal cell). The above-described display device was provided with an extremely small reflection of the background and a quite excellent display quality.

Example A-4

The sample of the invention described in example 1 was attached to the protective film on the liquid crystal cell side of the polarizing plate on the observation side of the transmissive-type TN liquid crystal cell and also to the protective film on the liquid crystal cell of the polarizing plate on the backlight, which were used in the viewing angle widening film (wide-view film SA 12B, made by Fuji Photo Film Co., Ltd.). The above-described constituted liquid crystal display device was provided with an excellent contrast in a bright room, a very wide viewing angle at every respect, quite excellent visibility and a high display quality.

Example A-5

The sample of the invention described in example 1 was attached with an adhesive to the glass plate of an organic EL display device. Such a constituted display device was provided with a lower reflection of the glass surface, a higher visibility and satisfactory stain resistance against finger prints or dust.

Example A-6

The sample of the invention described in example 1 was used to prepare a polarizing plate only one plane of which was provided an antireflection film, and the γ/4 plate was attached with the plane opposite side to the plane of the antireflection film-provided polarizing plate, which was attached to the glass plate on an organic EL display device so that the antireflection film was arrayed on the outer-most surface. Such a constituted display device was provided with quite high visibility, with surface reflection and reflection coming inside the surface glass being blocked.

Example B

Synthesis of Perfluoroolefin Copolymer (1)

Perfluoroolefin Copolymer (1)

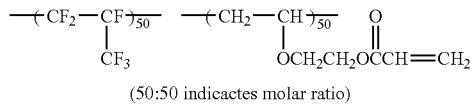

(50:50 indicactes molar ratio)

In a stainless steel autoclave of a capacity of 100 ml equipped with an agitator, 40 ml of ethyl acetate, 14.7 g of hydroxyethyl vinyl ether and 0.55 g of dilauryol peroxide were charged, and the interior of the system was evacuated and replaced with nitrogen gas. Then 25 g of hexafluoropropylene were introduced into the autoclave, which was then heated to 65° C. The autoclave showed a pressure of 0.53 MPa (5.4 kg/cm$^2$) when the internal temperature reached 65° C. The reaction was continued for 8 hours while maintaining this temperature, then the heating was terminated when the pressure reached 0.31 MPa (3.2 kg/cm$^2$) and the system was let to cool by standing. When the internal temperature was lowered to the room temperature, the unreacted monomer was expelled and the reaction liquid was taken out by opening the autoclave. The obtained reaction liquid was poured into hexane of a large excess, and a precipitated polymer was obtained by decanting the solvent. The polymer was then dissolved in a small amount of ethyl acetate and re-precipitated twice from hexane to completely eliminate the residual monomer. 28 g of polymer were obtained after drying. Thereafter, 10 g of the polymer were dissolved in 100 ml of N,N-dimethylformamide, then 11.4 g of acrylic chloride were dropwise added under cooling with ice and the mixture was agitated for 10 hours at the room temperature. The reaction liquid was added with ethyl acetate, washed with water and the organic layer was extracted and concentrated. Obtained polymer was re-precipitated from hexane to obtain 19 g a perfluoroolefin copolymer (1). The obtained polymer had a refractive index of 1.421.

(Preparation of Organosilane Sol Liquid)

In a reactor equipped with an agitator and a reflux condenser, 120 parts of methyl ethyl ketone, 100 parts of acryloyloxypropyl trimethoxysilane (KBM-5103, manufactured by Shin-Etsu Chemical Co.) and 3 parts of diisopropoxyaluminumethyl acetacetate were charged and mixed, and 30 parts of ion-exchanged water were added. The mixture was reacted for 4 hours at 60° C., and was cooled to the room temperature to obtain an organosilane sol liquid. It showed a weight-averaged molecular weight of 1,600, and, among oligomer components and larger components, a component having a molecular weight within a range of 1,000 to 20,000 represented 100%. Also a gas chromatography analysis indicated that the acryloyloxypropyl trimethoxysilane employed as the raw material did not remain at all.

(Preparation of Coating Liquid A for Light Scattering Layer)

50 g of a mixture of pentaerythritol triacrylate and pentaerythritol tetraacrylate (PET-30, manufactured by Nippon Kayaku Co.) were diluted with 38.5 g of toluene. Also 2 g of a polymerization initiator (Irgacure 184, manufactured by Ciba Specialty Chemicals Co.) were added and mixed under agitation. A film obtained by coating and ultraviolet setting of this solution showed a refractive index of 1.51.

To this solution, there were added 1.7 g of a 30% toluene dispersion obtained by dispersing crosslinked polystyrene particles of an average particle size of 3.5 μm (refractive index: 1.61, SX-350, manufactured by Soken Chemical & Engineering Co.) for 20 minutes at 10,000 rpm in a Polytron disperser, and 13.3 g of a 30% toluene dispersion of crosslinked acryl-styrene particles of an average particle size of 3.5 μm (refractive index: 1.55, manufactured by Soken Chemical & Engineering Co.), and finally 0.75 g of a fluorinated surface modifying agent (FP-13), and 10 g of a silane coupling agent (KBM-5103, manufactured by Shin-Etsu Chemical Co.) to obtain a mixed liquid (completed liquid).

The mixed liquid was filtered with a polypropylene filter of a pore size of 30 μm to obtain a coating liquid A for the light scattering layer.

(Preparation of Coating Liquid B for Light Scattering Layer)

285 g of a commercial UV settable hard coat liquid containing zirconia (Desolite Z7404, manufactured by JSR Corp., solid content: ca. 61%, ZrO$_2$ content in solid: ca. 70%, polymerizable monomer containing polymerization initiator) and 85 g of a mixture of pentaerythritol pentaacrylate and pentaerythritol hexaacrylate (DPHA®, manufactured by Nippon Kayaku Co.) were mixed, and diluted with 60 g of methyl isobutyl ketone and 17 g of methyl ethyl ketone. Further, 28 g of a silane coupling agent (KBM-5103, manufactured by Shin-Etsu Chemical Co.) were mixed under agitation. A film obtained by coating and ultraviolet setting of this solution showed a refractive index of 1.61.

To this solution, there were added 35 g of a dispersion obtained by dispersing intensive-classified crosslinked PMMA particles of an average particle size of 3.0 μm (refractive index: 1.49, MXS-300, manufactured by Soken Chemical & Engineering Co.) as a 30% methyl isobutyl ketone dispersion for 20 minutes at 10,000 rpm with a Polytron disperser, then 90 g of a dispersion obtained by dispersing silica particles of an average particle size of 1.5 μm (refractive index: 1.46, Seahoster KE-P150, manufactured by Nippon Shokubai Co.) as a 30% methyl ethyl ketone dispersion for 30 minutes at 10,000 rpm with a Polytron disperser, and finally 0.12 g of a fluorinated surface modifier (P-12) under agitation to obtain a mixed liquid (completed liquid).

The mixed liquid was filtered with a polypropylene filter of a pore size of 30 μm to obtain a coating liquid B for the light scattering layer.

P-2

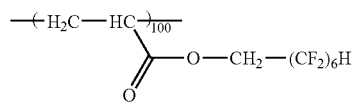

(Preparation of coating liquid for hard-coat layer)

| | |
|---|---|
| Viscote 290(manufactured by Osaka Organic Chemical Industry Ltd.) | 300 parts by weight |
| Viscote 190(manufactured by Osaka Organic Chemical Industry Ltd.) | 300 parts by weight |
| methyl ethyl ketone | 360 parts by weight |
| cyclohexanone | 40 parts by weight |
| Irgacure 907(manufactured by Nippon Ciba-Geigy Ltd.) | 18 parts by weight |

A mixture of above components was agitated and filtered through a polypropylene filter of a pore size of 0.4 μm.

(Preparation of Coating Liquid for Antistatic Layer)

To 100 g of a commercial ATO-dispersed hard coat agent (manufactured by Nippon Pelnox Ltd., solid: 45%, trade name: Peltron C-4456-S7), 30 g of cyclohexanone, 10 g of methyl ethyl ketone and 1.5 g of a silane coupling agent 3-acryloyloxypropyl trimethoxysilane (manufactured by Shin-Etsu Chemical Co., trade name: KBM-5103) were added, and the mixture was agitated and filtered with a polypropylene filter of a pore size of 10 μm to obtain a coating liquid for an antistatic layer.

(Preparation of Coating Liquid for Conductive Hard-Coat Layer)

In a commercial zirconia ultrafine particle-dispersed hard coat agent (manufactured by JSR Corp, solid: 50%, refractive index in hardened state: 1.69, trade name: Z-7401), conductive particles (spherical powder of benzoguanamine-melanine-formaldehyde condensate plated with gold and nickel, manufactured by Nippon Chemical Industrial Co., trade name: Brite 20GNR4.6-EH) were dispersed in an amount of 0.1 weight %, and the dispersion was filtered with a polypropylene filter of a pore size of 10 μm to obtain a coating liquid for a conductive hard-coat layer.

| (Preparation of titanium dioxide dispersion liquid) | |
|---|---|
| MPT-129C (manufactured by Ishihara Sangyo Co., $TiO_2:Co_3O_4:Al_2O_3:ZrO_2 = 90.5:3.0:4.0:0.5$ in weight ratio) | 257.1 g |
| following dispersant | 38.6 g |
| cyclohexanone | 704.3 g |

A mixture of above components was dispersed with a Dyno mill to a weight-averaged diameter of 70 nm.

Dispersant:

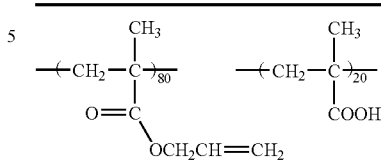

Mw = 40000

(Preparation of coating liquid for middle-refractive index layer)

| | |
|---|---|
| foregoing titanium dioxide dispersion | 88.9 g |
| DPHA (manufactured by Nippon Kayaku Co.) | 58.4 g |
| Irgacure 907 (manufactured by Chiba Specialty Chemicals Co.) | 3.1 g |
| Kayacure DETX (manufactured by Nippon Kayaku Co.) | 1.1 g |
| methyl ethyl ketone | 482.4 g |
| cyclohexanone | 1869.8 g |

A mixture of above components was agitated and filtered with a polypropylene filter of a pore size of 0.4 μm.

| (Preparation of coating liquid for high-refractive index layer) | |
|---|---|
| foregoing titanium dioxide dispersion | 586.8 g |
| DPHA ® (manufactured by Nippon Kayaku Co.) | 47.9 g |
| Irgacure 907 (manufactured by Chiba Specialty Chemicals Co.) | 4.0 g |
| Kayacure DETX (manufactured by Nippon Kayaku Co.) | 1.3 g |
| methyl ethyl ketone | 455.8 g |
| cyclohexanone | 1427.8 g |

A mixture of above components was agitated and filtered with a polypropylene filter of a pore size of 0.4 μm.

(Preparation of Hollow Silica Dispersion)

In 500 parts of hollow silica particle sol (isopropyl alcohol silica sol CS60-IPA, manufactured by Catalysts & Chemicals Ind. Co., average particle size: 60 nm, shell thickness: 10 nm, silica concentration: 20%, refractive index of silica particles: 1.31), 30 parts of a silane coupling agent 3-acryloyloxypropyl trimethoxysilane (manufactured by Shin-Etsu Chemical Co., trade name: KBM-5103), and 1.5 parts of diisopropoxyaluminum ethylacetate were mixed, and then 9 parts of ion-exchanged water were added. After a reaction for 8 hours at 60° C., the mixture was cooled to the room temperature, and 1.8 parts of acetylacetone were added to obtain a hollow silica dispersion. The obtained hollow silica dispersion showed a solid concentration of 18 weight % and a refractive index of 1.31 after solvent evaporation.

| (Preparation of coating liquid A for low-refractive index layer) | |
|---|---|
| DPHA (mixture of 5-functional and 6-functional acrylates) | 1.4 g |
| pefluoroolefin copolymer (1) (containing acrylate in side chain) | 5.6 g |
| hollow silica dispersion | 20.0 g |
| silicone compound (RMS-033, manufactured by Chisso Corp.) | 0.7 g |
| Irgacure 907 | 0.2 g |
| organosilane sol liquid | 6.2 g |
| methyl ethyl ketone | 315.9 g |

A film obtained by coating, drying and curing the above coating liquid showed a refractive index of 1.43.

| Preparation of coating liquid B for low-refractive index layer | |
|---|---|
| DPHA (mixture of 5-functional and 6-functional acrylates) | 3.6 g |
| hollow silica dispersion | 20.0 g |
| RMS-033 | 0.7 g |
| Irgacure 907 | 0.2 g |
| organosilane sol liquid | 8.0 g |
| methyl ethyl ketone | 276.0 g |

A film obtained by coating, drying and curing the above coating liquid showed a refractive index of 1.41.

| (Preparation of coating liquid C for low-refractive index layer) | |
|---|---|
| pentaerythritol triacrylate | 90.0 g |
| hollow silica dispersion | 20.0 g |
| octafluoropentyl methacrylate | 10.0 g |

A film obtained by coating, drying and curing the above coating liquid showed a refractive index of 1.48.

Example B-1

(1) Coating of Light Scattering Layer

A triacetyl cellulose film of a thickness of 80 μm (TAC-TD80U, manufactured by Fuji Photo Film Co., Ltd.) in a roll form was unwound and coated with the coating liquid A for the light scattering layer, utilizing a microgravure roll of a diameter of 50 mm having a gravure pattern of lines of 180 line/inch and a depth of 40 μm and a doctor blade, under conditions of a gravure roll revolution of 30 rpm and a transporting speed of 30 m/min, then dried for 150 seconds at 60° C., and irradiated with an ultraviolet light of an illumination intensity of 100 mW/cm$^2$ and an illumination amount of 60 mJ/cm$^2$ utilizing an air-cooled metal halide lamp of 160 W/cm (manufactured by Eyegraphics Co.) in an atmosphere of an oxygen concentration of 0.005 vol. % under nitrogen purging to harden the coated layer, thereby obtaining a light scattering layer of a refractive index of 1.51 and a thickness of 6 μm. The film was thereafter wound again.

(2) Coating of Low-Refractive Index Layer

The triacetyl cellulose film coated with the light scattering layer was unwound again and coated with the coating liquid A for the low-refractive index layer, utilizing a microgravure roll of a diameter of 50 mm having a gravure pattern of lines of 180 line/inch and a depth of 40 μm and a doctor blade, under conditions of a gravure roll revolution of 30 rpm and a transporting speed of 15 m/min, then dried for 150 seconds at 90° C., and irradiated with an ultraviolet light of an illumination intensity of 400 mW/cm$^2$ and an illumination amount of 900 mJ/cm$^2$ utilizing an air-cooled metal halide lamp of 240 W/cm (manufactured by Eyegraphics Co.) in an atmosphere of an oxygen concentration of 0.1 vol. % under nitrogen purging to harden the coated layer, thereby obtaining a low-refractive index layer of a refractive index of 1.43 and a thickness of 100 nm. The film was thereafter wound again.

(3) Saponification of Antireflection Film

After the film formation, the aforementioned film was subjected to a following treatment.

A 1.5 mol/L aqueous solution of sodium hydroxide was prepared and maintained at 55° C. Also a 0.005 mol/L dilute aqueous solution of sulfuric acid was prepared and maintained at 35° C. The prepared antireflection film was immersed in the aqueous sodium hydroxide solution for 2 minutes.

Then it was immersed in water to sufficiently wash off the aqueous sodium hydroxide solution. Then it was immersed in the dilute aqueous sulfuric acid solution for 1 minute, and was immersed in water to sufficiently wash off the dilute aqueous sulfuric acid solution. Finally, the sample was sufficiently dried at 120° C.

In this manner there was prepared a saponified antireflection film, which is represented as Example B-1, Sample 1.

(Evaluation of Antireflection Film)

The obtained film was evaluated for following items. Results are shown in Table 1.

(1) Average Reflectivity

A spectral reflectivity at an incident angle of 5° was measured within a wavelength range of 380-780 nm with a spectrophotometer (manufactured by Jasco Corp.). As the result there was utilized an integrating sphere average reflectivity in a wavelength range of 450-650 nm.

(2) Evaluation for Steel Wool Scratch Resistance

A rubbing test was conducted with a rubbing tester under following conditions:

evaluating environmental condition: 25° C., 80% RH;
rubbing material: Steel wool (grade No. 0000, manufactured by Nippon Steel Wool Co.) was wound and immovably fixed with a band on a rubbing end (1 cm×1 cm) of the tester, coming into contact with the sample;
moving distance (one way): 13 cm, rubbing speed: 13 cm/sec, load: 0.049 MPa (500 g/cm$^2$), front end contact area: 1 cm×1 cm, number of rubbings: 10 reciprocating cycles.

Oily black ink was coated on a rear side of the sample after rubbing, and scratches in the rubbed portion were visually observed in a reflected light and evaluated in following criteria:

AA: no scratches observable at all even in a very careful observation;
A: weak scratches slightly observable in a very careful observation;
AB: weak scratches observable;
B: scratches of medium level observable;
BC-C: scratches readily observable.

(3) Evaluation for Cotton Pad Rubbing Resistance

A rubbing test was conducted by fixing a cotton pad on the rubbing end of the rubbing tester, fixing a sample with clips in upper and lower portions thereof in a smooth plate, immersing the sample and the cotton pad in water of 25° C. and executing rubbing cycles of variable numbers under a load of 500 g on the cotton pad at a room temperature of 25° C. The rubbing conditions were as follows:

rubbing distance (one way): 1 cm, rubbing speed: about 2 cycles per second.

The sample after rubbing was observed, and the rubbing resistance was evaluated by a number of cycles causing a film peeling as follows:

C: film peeling in 0-10 reciprocating cycles;
BC: film peeling in 10-30 reciprocating cycles;
B: film peeling in 30-50 reciprocating cycles;
AB: film peeling in 50-100 reciprocating cycles;
A: film peeling in 100-150 reciprocating cycles;
AA: no film peeling in 150 reciprocating cycles.

(4) Evaluation for Rubber Eraser Rubbing Resistance

A rubbing test was conducted by fixing a rubber eraser (MONO, manufactured by Tombow Pencil Co.) on the rubbing end of the rubbing tester, fixing a sample with clips in upper and lower portions thereof in a smooth plate, and executing rubbing cycles of variable numbers under a load of 250 g on the rubber eraser (planar pressure: 0.049 MPa (500 g/cm$^2$)) at a room temperature of 25° C. The rubbing conditions were as follows:

rubbing distance (one way): 1 cm, rubbing speed: about 1 cycle per second.

The sample after rubbing was observed, and the rubbing resistance was evaluated by a number of cycles causing a film peeling as follows:

C: film peeling in 0-10 reciprocating cycles;
BC: film peeling in 10-30 reciprocating cycles;
B: film peeling in 30-50 reciprocating cycles;
AB: film peeling in 50-100 reciprocating cycles;
A: film peeling in 100-150 reciprocating cycles;
AA: no film peeling in 200 reciprocating cycles.

(5) Evaluation for Stain Resistance

A circle of a diameter of 5 mm was drawn with a ZEBRA Macky marker (black) on the surface of the antireflection film, and a stain resistance was evaluated by a number of drawings at which the stain could not be wiped off with a tissue paper after 3 seconds. The stain resistance was evaluated as follows:

C: not wiped off in 0-2 times of drawing;
B: not wiped off in 3-10 times of drawing;
A: not wiped off in 11-15 times of drawing;
AA: wiped off after 15 times of drawings.

Example B-1

Samples 2-4, 5, 6 (Present Invention) and Samples 5, 8, 9 (Comparative Examples)

Samples were prepared and evaluated in the same manner as the Example B-1, Sample 1, except that the coating liquid for the light scattering layer in the Example B-1, Sample 1 was replaced by the coating liquid (B) for the light scattering layer, or the coating liquid for the low-refractive index layer was replaced by the coating liquid (B) or (C) for the low-refractive index layer as shown in Table 7, or the atmospheric oxygen concentration at the curing after the solvent evaporation was changed as shown in Table 8. Results are shown in Table 7.

The light scattering layer in case of employing the coating liquid B for the light scattering layer had a thickness, after drying, of 3.4 μm. Also only in a sample 9, a saponification was executed as in Example 1 after the formation of the light scattering layer, and a low-refractive index layer was formed thereafter.

Results in Table 7 indicate followings.

In the antireflection film of the invention, when the hardenable composition having the polyermizable functional group is polymerized by radicals generated by the UV irradiation in the curing of the low-refractive index layer, the atmosphere with an oxygen concentration of 15 vol. % or less suppresses inhibition of polymerization by oxygen, thereby providing a low-refractive index layer with satisfactory scratch resistance represented by the rubbing tests with steel wool, cotton pad and rubber eraser.

Also the refractive index of the low-refractive index layer can be maintained low by the use of inorganic particles having an average particle size within a range of 30 to 150% of the thickness of the low-refractive index layer, also having a hollow structure with a refractive index of 1.17-1.40.

Thus, the invention can provide an antireflection film having excellent antireflection characteristics and a high scratch resistance.

In the Example B-1, Samples 1-7, the diluting solvent in the coating liquid A for the light scattering layer was changed from toluene to a composition of toluene/cyclohexanone=85/15 or toluene/cyclohexanone=70/30 whereby the interfacial adhesion of transparent substrate/light scattering layer was increased and the scratch resistance was improved with an increase in the proportion of cyclohexanone.

Example B-2

(1) Coating of Hard-Coat Layer/3-Layered antireflection Layers and Saponification On a triacetyl cellulose film of a thickness of 80 μm (TD-80UF, manufactured by Fuji Photo Film Co.), the aforementioned coating liquid for the hard-coat layer was coated, subjected to solvent evaporation and hardened by UV irradiation as described in Table 8 to obtain a hard-coat layer (HC), on which a middle-refractive index layer (Mn), a high-refractive index layer (Hn) and a low-refractive index layer (Ln) were prepared in succession in this order with the coating liquid for the middle-refractive index layer, the coating liquid for the high-refractive index layer and the coating liquid A for the low-refractive index layer. Thus there was obtained a film bearing a hard-coat layer/3-layered antireflection layers, which was saponified as in Example B-1 to obtain Example B-2, Sample 1.

TABLE 7

| Sample in Example B-1 | light scattering layer coating liquid | low refractive index layer coating liquid | oxygen concentration in curing atmosphere (vol. %) | reflectivity (%) | scractch resistance steel wool | cotton pad | rubber eraser | stain resistance |
|---|---|---|---|---|---|---|---|---|
| Sample 1 (invention) | A | A | 0.05 | 2.0 | AA | AA | AA | AA |
| Sample 2 (invention) | A | A | 0.1 | 2.0 | AA | AA | AA | AA |
| Sample 3 (invention) | A | A | 2.0 | 2.0 | A | AA | A | AA |
| Sample 4 (invention) | A | A | 10.0 | 2.0 | B | AA | B | AA |
| Sample 5 (invention) | A | A | 20.5 | 2.0 | C | C | C | AA |
| Sample 6 (invention) | A | B | 0.05 | 1.9 | AA | AA | AA | A |
| Sample 7 (invention) | B | A | 0.05 | 1.5 | A | A | A | AA |
| Sample 8 (comp. ex.) | B | A | 20.5 | 1.5 | C | C | C | AA |
| Sample 9 (comp. ex.) | A | C | 20.5 | 1.5 | C | C | C | C |

TABLE 8

| Layer | System | Drying air temp. (° C.) | UV irradiation (mJ/cm²) | O₂ concentration (vol. %) | Dry film thickness (nm) | Refractive index |
|---|---|---|---|---|---|---|
| HC | MG | 60 | 160 | 0.1 | 8000 | 1.51 |
| Mn | MG | 110 | 300 | 0.1 | 65 | 1.63 |
| Hn | MG | 110 | 500 | 0.1 | 105 | 1.90 |
| Ln | MG | 90 | 900 | 0.05 | 84 | 1.44 |

MG indicates a microgravure coating system same as in Example B-1.

Also Example B-2, Samples 2-4 (invention), and 5 (comparative example) were prepared in the same manner as in Example B-2, Sample 1 except that the atmospheric oxygen concentration at the curing of the low-refractive index layer was changed as shown in Table 9.

TABLE 9

| Sample in Example B-2 | low refractive index layer coating liquid | oxygen concentraion in curing atmosphere (vol. %) | reflectivity (%) | scratch resistance | | |
|---|---|---|---|---|---|---|
| | | | | steel wool | cotton pad | rubber eraser |
| Sample 1 (invention) | A | 0.05 | 0.4 | AA | AA | AA |
| Sample 2 (invention) | A | 0.1 | 0.4 | AA | AA | AA |
| Sample 3 (invention) | B | 0.05 | 0.3 | A | AA | A |
| Sample 4 (invention) | B | 0.1 | 0.3 | A | AA | A |
| Sample 5 (comp. ex.) | A | 18.0 | 0.4 | C | C | C |

Results in Table 9 indicate, also in a 3-layered antireflection film, as in Example B-1, the atmosphere with an oxygen concentration of 15 vol. % or less suppresses allows to obtain a low-refractive index layer with satisfactory scratch resistance and the use of the inorganic particles of a hollow structure with a refractive index of 1.17-1.40 allow to maintain the low-refractive index layer at a low refractive index, whereby an antireflection film a low reflectivity can be obtained.

Example B-3

(1) Preparation of Antistatic Hard Coat Film

A prepared coating liquid for antistatic layer was coated on a triacetyl cellulose film (manufactured by Fuji Photo Film Co., trade name: TD-80U, thickness: 80 μm), dried for 1 minute at 70° C., and hardened by an ultraviolet irradiation (100 mJ/cm²) to obtain an antistatic film of a thickness of about 0.2 μm. Then, on the antistatic layer, a prepared coating liquid for the conductive hard-coat layer was coated and dried for 1 minute at 70° C., and hardened by an ultraviolet irradiation (120 mJ/cm²) under nitrogen purging to obtain an antistatic hard coat film of a thickness of about 5 μm. Performance is shown in Table 10.

TABLE 10

| Transmittance | Surface resistance |
|---|---|
| 92% | $5 \times 10^7 - 5 \times 10^8$ |

On the antistatic hard coat film, a low-refractive index layer was subsequently formed in the same manner as in Example B-1 to obtain an antistatic antireflection film having an aforementioned antistatic property, and a reflectivity of 2.2%, and excellent in scratch resistance and visibility.

Example B-4

A PVA film was immersed in an aqueous solution containing iodine at 2.0 g/l and potassium iodide at 4.0 g/l for 240 seconds at 25° C., then in an aqueous solution containing boric acid at 10 g/l for 60 seconds at 25° C., introduced into a tenter machine of a form described in JP-A No. 2002-86554, FIG. 2, and extended to 5.3 times, whereupon the tenter was bent with respect to the extending direction as shown in FIG. 2 of the aforementioned patent reference, and the width was thereafter maintained constant. The film was detached from the tenter after drying in an atmosphere of 80° C. Tenter clips at left and right had a difference in transporting speed less than 0.05%, and a center line of the introduced film and a center line of the film advanced to a next step formed an angle of 46°. There were maintained conditions of |L1−L2| of 0.7 m and W of 0.7 m, so that |L1−L2|=W. A substantial extending direction Ax-Cx at the exit of the tenter was inclined by 45° with respect to the center line 22 of the film advanced to the next step. At the exit of the tenter, wrinkles or a film deformations were not observed.

It was then adhered to a Fujitac film (cellulose triacetate, retardation: 3.0 nm, manufactured by Fuji Photo Film Co.) subjected to a saponification, utilizing a 3% aqueous solution of PVA (PVA-117H, manufactured by Kuraray Co.) as an adhesive, and dried at 80° C. to obtain a polarizing plate of an effective width of 650 mm. The obtained polarizing plate had an absorbing axis inclined by 45° to the machine direction. The polarizing plate had, at 550 nm, a transmittance of 43.7% and a polarization degree of 99.97%. It was cut into a size of 310×233 mm as shown in FIG. 2, thereby providing a polarizing plate having an absorbing axis inclined by 45° to the sides, with an area yield of 91.5%.

Then the film of Example 1, Sample 1 or Example 2, Sample 1 (both subjected to saponification process) was adhered with the polarizing plate to obtain an antiglare and antireflection polarizing plate. A liquid crystal display device, prepared utilizing the polarizing plate with The antireflection layer at the outermost layer, showed an excellent contrast because of absence of reflection of the external light and an excellent visibility as a reflected light was not conspicuous due to the antiglare property. In particular, the film of Example B-1, Sample 1 provided an excellent display apparatus excellent in contrast, due to a low reflectivity.

Example B-5

A polarizing plate was prepared by adhering triacetyl cellulose film of a thickness of 80 μm (TD-80U, manufactured by Fuji Photo Film Co.), immersed in a 1.5 mol/L NaOH aqueous solution for 2 minutes at 55° C., then neutralized and rinsed with water, and a saponified triacetyl cellulose film of Example B-1, Sample 1 or Example B-2, Sample 1 on both sides of a known polarizing plate prepared by iodine adsorption and extending of polyvinyl alcohol. The polarizing plate thus prepared was used, in such a manner that the antireflection film constitutes the outermost surface, in a place for a polarizing plate at the observing side, in a notebook personal computer, of a transmission TN liquid crystal display device (having a polarized light separating film D-BEF having a polarized light selecting layer, manufactured by Sumitomo-3M Co., between a backlight and a liquid crystal cell), whereby a display apparatus of a very high display quality was obtained with very little reflection of the external scene.

Example B-6

A viewing angle widening film (Wide View Film SA 12B, manufactured by Fuji Photo Film Co.) having an optical compensation layer, in which a disc face of a discotic structural unit is inclined to the surface of a transparent substrate and an angle between the disc face of the discotic structural unit and the surface of the transparent substrate varies with a depth in an optical anisotropic layer, was used as a protective film, at the side of the liquid crystal cell, for a polarizing plate at the observing side of a transmission TN liquid crystal cell on which the film of Example B-1, Sample 1 or Example B-1, Sample 7, and as a protective film, at the side of the liquid crystal cell, of the polarizing plate at the backlight side. As a result, there was obtained a liquid crystal display device showing a high contrast in a lighted room, a very wide viewing angle in upper, lower and lateral directions, an extremely excellent visibility and a high display quality. Also the film of Example B-1, Sample 7 (utilizing antiglare hard coat liquid B) showed a light scattering intensity ratio of 0.06% at an exit angle 30° with respect to that at 0°, and such light scattering property contributed to increase, in particular, the viewing angle in the lower direction and to improve the yellowish tone in lateral observing directions, thereby providing a very satisfactory liquid crystal display device. In contrast, the film of Example 2, Sample 1 (clear 3-layered antireflection film) showed a light scattering intensity ratio of substantially 0% at an exit angle 30° with respect to that at 0°, and did not show at all the effects of increasing the lower viewing angle and improving the yellowish tone.

Example B-7

A polarizing plate having an antireflection film was prepared with a film of Example B-2, Sample 1, and, with a λ/4 plate adhered on a side opposite to the antireflection film, was adhered on an outermost surface at a display side of an organic EL display apparatus. As a result, there was obtained a display of an extremely high visibility, by reductions of a surface reflection and a reflection from the interior of a surfacial glass.

Example C

Spectral Characteristics of Ultraviolet Absorbing Monomer

Spectral characteristics of ultraviolet absorbing monomers employed in following examples and comparative examples are shown in Table 11.

TABLE 11

| Compound | $\epsilon$(380 nm) | $\epsilon$(380 nm)/$\epsilon$(400 nm) |
|---|---|---|
| comparison UV-1 | 750 | 50 or higher |
| comparison UV-1 | 3,300 | 16 |
| UVM-1 | 6,700 | 50 or higher |
| UVM-2 | 7,800 | 50 or higher |
| UVM-5 | 10,500 | 40 |
| UVM-7 | 11,300 | 50 |
| UVM-11 | 7,000 | 50 or higher |
| UVM-20 | 8,500 | 15 |

In Table 11, $\in$(380 nm) indicates a molar absorption coefficient at 380 nm, and $\in$(380 nm)/$\in$(400 nm) indicates a ratio of a molar absorption coefficient at 380 nm to a molar absorption coefficient at 400 nm.

The spectral absorption was measured in methylene chloride solvent.

Structures of a comparison compound UV-1 and a comparison compound UV-2 are shown in the following.

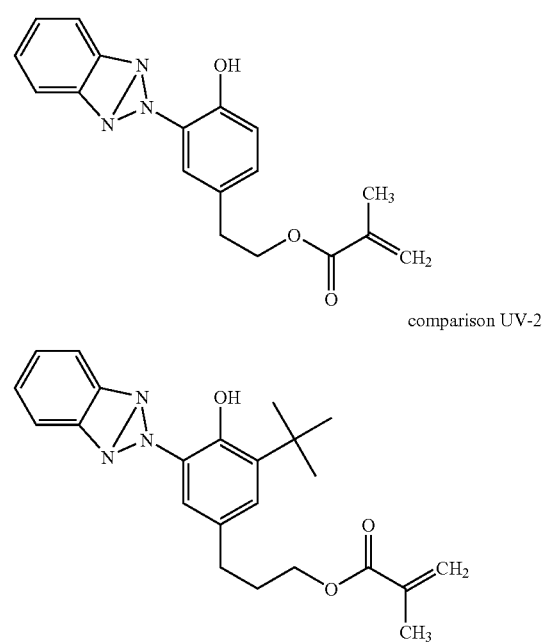

Example C-1

Preparation of Substrate

Example C1-1

Preparation of Cellulose Acylate Solution (A-1)

A mixture of following composition was dissolved by agitation to obtain a cellulose acylate solution (A-1).

| (Composition of cellulose acylate solution (A-1)) | |
|---|---|
| cellulose triacetate of substitution degree of 2.85 (6-position substitution degree: 0.90) | 89.3 parts by weight |
| plasticizer (polyhydric alcohol ester example compound No. 8) | 18.2 parts by weight |
| following UV absorber: UV-1 | 5.7 parts by weight |
| methylene chloride | 300 part by weight |
| methanol | 54.0 parts by weight |
| 1-butanol | 11.0 parts by weight |

UV-absorber: UV-1 is a copolymer of the foregoing ultraviolet absorbing monomer UVM-1 and MMA (weight-averaged molecular weight: 12,000, UV absorbing monomer content: 55 weight %).

(Preparation of Dope)

479 parts by weight of the cellulose acylate solution was sufficiently agitated, and let to stand for 3 hours at the room temperature (25° C.), and an obtained gel-like solution was cooled for 6 hours at −70° C. and heated and agitated at 50° C. to obtain a completely dissolved dope.

The obtained dope was filtered, at 50° C., with a filter paper of an absolute filtering precision of 0.01 mm (#63, manufactured by Toyo Filter Paper Co.), and further subjected to filtration and bubble elimination with a filter paper of an absolute filtering precision of 0.0025 mm (FH025, manufactured by Pall Inc.) to obtain a dope.

(Solution Casting Process)

After the aforementioned preparation of the cellulose acylate solution, the dope obtained therefrom was cast with a band casting machine for a process of preparing a cellulose acylate film from the cellulose acylate solution.

There was employed a metal substrate (casting band) of stainless steel with a width of 2 m and a length of 56 m (area 112 m$^2$). The metal substrate had an arithmetic average roughness (Ra) of 0.006 μm, a maximum height (Ry) of 0.06 μm and a ten-point averaged roughness (Rz) of 0.009 μm. The arithmetic average roughness (Ra), the maximum height (Ry) and the ten-point averaged roughness (Rz) were measured according to JIS B0601.

The cast dope was dried with an air speed of 0.5 m/s or less for 1 second immediately after casting, and was thereafter dried with an air speed of 15 m/s. The drying air had a temperature of 50° C.

A film peeled off from the casting band had a residual solvent amount of 230 weight % and a temperature of −6° C. An average drying speed in a period from the casting to the peeling was 744%/min, and the dope had a gelling temperature of about 10° C. at the time of peeling.

The film was dried for 1 minute after the film surface temperature on the metal substrate reached 40° C., and then peeled off, and the temperature of the drying air was shifted to 120° C. In this state, the film had a temperature distribution in the transversal direction of 5° C. or less, the drying air had an average speed of 5 m/s, a heat transmission coefficient had an average of 25 kcal/m$^2$·Hr·° C., and the film had a distribution of these within 5% in the transversal direction. In a drying zone, a film portion supported by tenter pins is shielded from the drying hot air by an air shield.

Then a process of extending the cellulose acylate film was conducted. The film, in a film state having a residual solvent amount of 15 weight %, was extended at 130° C. in a transversal direction by a tenter with an extending factor of 25%, then maintained at the extended width for 30 seconds at 50° C., then released from clips of the tenter and wound in a roll. Solvent evaporating from the peeling to the winding corresponded to 97 weight % of the initially employed solvent. The dried film was further dried with a drying air of 145° C. in a drying step under transportation by rollers, then subjected to an adjustment of temperature and humidity and wound with a residual solvent amount of 0.35 weight % and a moisture content of 0.8 weight % thereby obtaining a cellulose acylate film (CA1-1) (length 3500 m, width 1300 mm, thickness 80 μm) as the transparent substrate of Example C1-1.

Thus produced cellulose acylate film (CA1-1) had a variation of thickness of ±2.4%, and a curl value of −4.5/m in the transversal direction.

Comparative Examples C1-1-C1-4

Comparative Example C1-1

A cellulose acylate film of a thickness of 80 μm (CAR1-1) was prepared in the same manner as in Example C1-1 except for employing a drying air of an average air speed of 24 m/s and a temperature of 60° C. at the film casting and changing the casting conditions so as to obtain physical properties shown in Table 12.

Comparative Example C1-2

A cellulose acylate film of a thickness of 79 μm (CAR1-2), shown in Table 12, was prepared in the same manner as in Example C1-1 except for eliminating the plasticizer (polyhydric alcohol ester example compound No. 8) and increasing cellulose acetate by a corresponding amount.

Comparative Example C1-3

A cellulose acylate film of a thickness of 80 μm (CAR1-3), shown in Table 12, was prepared in the same manner as in Example C1-1 except for eliminating the UV absorber (UV-1) and increasing cellulose acetate by a corresponding amount.

Comparative Example C1-4

A cellulose acylate film of a thickness of 80 μm (CAR1-4), shown in Table 12, was prepared in the same manner as in Example C1-1 except for eliminating dipropyleneglycol dibenzoate and increasing triphenyl phosphate by a corresponding amount.

TABLE 12

| | film No. | Thickness μm | thickness variation range (%) | curl | Ra μm | Rz μm | Ra/Rz | Sm μm | Ry μm | haze % | tear strength (g) | optical defect | humidity permeability (g/m²/24 h) | exuding property (%) |
|---|---|---|---|---|---|---|---|---|---|---|---|---|---|---|
| Ex. C1-1 | CA1-1 | 80 | ±2.4 | -4.5 | 0.006 | 0.018 | 0.333 | 0.150 | 0.072 | 0.25 | 12 | 0.4 | 175 | 0.9 |
| Comp. Ex. C1-1 | CAR1-1 | 80 | ±5.5 | -7.3 | (not measurable due to insufficient planarity) | | | | | | 8 | 1.1 | 197 | 1.2 |
| Comp. Ex. C1-2 | CAR1-2 | 79 | ±3.8 | -9.3 | 0.008 | 0.030 | 0.267 | 0.180 | 0.180 | 0.31 | 15 | 1.4 | 285 | 2.3 |
| Comp. Ex. C1-3 | CAR1-3 | 80 | ±3.6 | -6.6 | 0.008 | 0.028 | 0.286 | 0.123 | 0.123 | 0.30 | 13 | 1.5 | 295 | 2.4 |
| Comp. Ex. C1-3 | CAE1-4 | 79 | ±3.2 | -4.3 | 0.007 | 0.033 | 0.212 | 0.235 | 0.147 | 0.30 | 11 | 1.1 | 305 | 2.6 |

(Surface Irregularities of Film)

Surface irregularities on the surface, at the side of the band, of the cellulose acylate film samples CA1-1 and CAR1-1-CAR1-4 were measured, and results are shown in Table 12. Table 12 also shows results of evaluations on following optical characteristics and mechanical properties.

(Optical Characteristics of Film)

(1) Haze

A haze was measured with a haze meter (model 1001DP, manufactured by Nippon Denshoku Kogyo Co.). Measurement was made on 5 points on each film sample and an average value was calculated.

(Evaluation of Mechanical Properties)

(2) Curl

A curl value was measured according to a measuring method defined by American National Standard Institute (ANSI/ASCPH 1.29-1985, Method-A). A polymer film is cut into a size of 35 mm in the transversal direction and 2 mm in the machine direction, and set on a curl plate. A curl value is read after a humidity conditioning in an environment of 25° C., 65% RH for 1 hour. Similarly, a polymer film is cut into a size of 2 mm in the transversal direction and 35 mm in the machine direction, and set on a curl plate. A curl value is read after a humidity conditioning in an environment of 25° C., 65% RH for 1 hour. Measurement was conducted in transversal direction and machine direction, and a larger value was taken as the curl value. The curl value is represented by a reciprocal of a radius of curvature (m).

(3) Tear Strength

A sample was prepared by cutting a film into a size of a width of 65 mm and a length of 50 mm, then subjected to a humidity conditioning in a room of a temperature of 30° C. and a relative humidity of 85%, and subjected to a measurement of a load (g) required for tearing, with a light load tear strength tester manufactured by Tokyo Seiki Mfg. Co. and according to the standard of ISO6383/2-1983.

(Other Film Properties)

(4) Optical Defect

Two polarizing plates were positioned in a cross Nichol position, and a sample having a width of 1300 mm and a length of 5 m was positioned therebetween and defects in brightness were counted in a visual observation. A number of bright spots having a size of 100 μm or larger was counted and represented as a number-per 1 meter.

(5) Humidity Permeability

Measurement was conducted according to a method defined in JIS Z0208 (measured at 25° C., 90% RH).

(6) Exuding Property

A film sample, cut into a size of 10×10 cm, was subjected to a weight measurement after standing for 1 day at 23° C. and 55% RH, and was let to stand for 2 weeks at 80° C. and 90% RH. This sample, after standing for 1 day at 23° C. and 55% ORH, was again subjected to a weight measurement, and a retentive property was calculated by a following formula:

Exuding property={(sample weight before processing−sample weight after processing)/sample weight before processing}×100(%)

<Preparation of Antireflection Film>

Example C1a

Preparation of Antireflection Film (KH-01)

Preparation of Coating Liquid for Light-diffusing Layer 50 parts by weight of an ultraviolet settable resin (Kayarad PET-30, refractive index 1.51, manufactured by Nippon Kayaku Co.) as the translucent resin constituting the light-diffusing layer, 2 parts by weight of a curing initiator (Irgacure 184, manufactured by Ciba-Geigy Inc.), 5 parts by weight of acryl-styrene beads (manufactured by Soken Chemical and Engineering Co., particle size: 3.5 μm, refractive index: 1.55) as the first translucent particles, 5.2 parts by weight of styrene beads (manufactured by Soken Chemical and Engineering Co., particle size: 3.5 μm, refractive index: 1.60) as the second translucent particles, 10 parts by weight of a silane coupling agent KBM-5103 (manufactured by Shin-Etsu Chemical Co.) and 0.03 parts by weight of the following fluorinated polymer (f1) were mixed with 50 parts by weight of toluene to obtain a coating liquid.

Coating of Light-Diffusing Layer

The aforementioned cellulose acylate film CA1-1 was unwound from a roll and coated with the coating liquid for the light-diffusing layer so as to obtain a dry film thickness of 6.0 μm, and, after solvent evaporation, irradiated with an ultraviolet light of an illumination intensity of 400 mW/cm² and an illumination amount of 300 mJ/cm² utilizing an air-cooled metal halide lamp of 160 W/cm (manufactured by Eyegraphics Co.) to harden the coated layer, thereby obtaining a film bearing a light-diffusing layer (KHF-01).

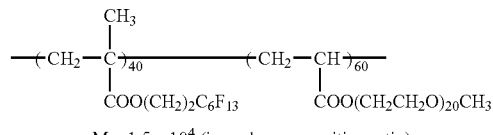

fluorinated polymer (f1)

Mw 1.5 x 10⁴ (in molar composition ratio)

(Preparation of Low-Refractive Index Layer)

Preparation of Coating Liquid (LL-1) for Low-Refractive Index Layer

A fluorine-containing polymer (FP-1) of following structure was dissolved at a concentration of 3 weight % in methyl ethyl ketone, and hollow silica (CS-60-IPA, average particle size: 60 nm, shell layer thickness: 10 nm, refractive index: 1.31, a 20 weight % dispersion in isopropanol, manufactured by Catalysts & Chemicals Ind. Co.) in an amount of 30 weight % by the solid of the hollow silica with respect to the solid of the fluorine-containing polymer, a terminal methacrylate group-containing silicone resin X-22-164C (manufactured by Shin-Etsu Chemical Co.) in an amount of 3 weight % with respect to the solid, and a photoradical generating agent Irgacure 907 (manufactured by Ciba-Geigy Inc.) in an amount of 5 weight % with respect to the solid were added to obtain a coating liquid LL-1 for the low-refractive index layer.

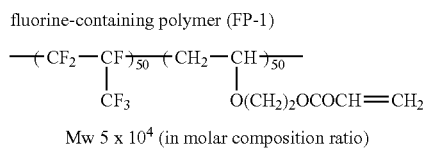

fluorine-containing polymer (FP-1)

Mw 5 × 10$^4$ (in molar composition ratio)

Mw 5×10$^4$ (in Molar Composition Ratio)

Coating of Low-Refractive Index Layer

The coating liquid LL-1 for the low-refractive index layer was coated with a gravure coater on the light-diffusing layer (HKF-01). After drying for 2 minutes at 80° C., it was irradiated with an ultraviolet light of an illumination intensity of 300 mW/cm$^2$ and an illumination amount of 250 mJ/cm$^2$ utilizing an air-cooled metal halide lamp of 160 W/cm (manufactured by Eyegraphics Co.) in an atmosphere of an oxygen concentration of 1.0 vol. % or less under nitrogen purging to obtain a low-refractive index layer (refractive index: 1.43, film thickness: 86 nm). In this manner there was produced an antireflection film (HK-01) of the invention.

Example C-1b

Preparation of Antireflection Film

HK-02

A substrate and a light-diffusing layer were prepared in the same manner as in Example C1a. More specifically, a light-diffusing layer (HKF-01) was coated on the cellulose acylate film CA1-1 of Example C1.

(Preparation of Low-refractive Index Layer)

Preparation of Coating Liquid (LL-2) for Low-Refractive Index Layer 100 g of trifluoropropyl trimethoxysilane, 200 g of tridecafluorooctyl trimethoxysilane, 1700 g of tetraethoxysilane, 200 g of isobutanol, and 6 g of aluminum acetylacetonate were charged in a flask and agitated. Then 500 g of a 0.25 mol/l aqueous solution of acetic acid were dropwise added, and, after the dropwise addition was completed, mixture was agitated for 3 hours at the room temperature. Then 600 g of diacetone alcohol were added. Then 600 g of hollow silica (CS60-IPA, 20 weight %) same as in the coating liquid LL-1 for the low-refractive index layer were added, and the mixture was agitated and filtered through a polypropylene filter of a pore size of 1 μm to obtain a coating liquid (LL-2) for the low-refractive index layer.

Coating of Low-Refractive Index Layer

The coating liquid LL-2 for the low-refractive index layer, added with isophorone diisocyanate in an amount of 1 weight % with respect to the solid of the coating liquid (LL-2) after evaporation of the volatile organic solvent therein, immediately before coating, was coated with an extrusion coater on a triacetyl cellulose film coated with the aforementioned antiglare hard-coat layer. After drying for 2 minutes at 80° C. and curing for 20 minutes at 120° C., it was irradiated with an ultraviolet light of an illumination intensity of 400 mW/cm$^2$ and an illumination amount of 200 mJ/cm$^2$ utilizing an air-cooled metal halide lamp of 240 W/cm (manufactured by Eyegraphics Co.) under nitrogen purging to obtain a low-refractive index layer of a thickness of 100 nm). In this manner an antireflection film (HK-02) was produced.

Example C1c

Preparation of Antireflection Film

HK-03

A substrate and a light-diffusing layer were prepared in the same manner as in Example C1a. More specifically, a light-diffusing layer (HKF-01) was coated on the cellulose acylate film CA1-1 of Example C1.

(Preparation of Low-refractive Index Layer)

Preparation of Coating Liquid (LL-3) for Low-Refractive Index Layer

A coating liquid LL-3 for low-refractive index layer was prepared in the same manner as the coating liquid LL-2 for low-refractive index layer except that, in a last step, 30 g of a silicone leveling agent (linear dimethylsilicone-EO block copolymer (trade name: L-9000 (CS100), manufactured by Nippon Unicar Co.) was added.

Coating of Low-Refractive Index Layer

An antireflection film HK-03 was prepared by the same steps of coating, drying, heating and ultraviolet irradiation as in the antireflection film HK-02 except that the coating liquid LL-2 for the low-refractive index layer was replaced by the coating liquid LL-3 for the low-refractive index layer.

Comparative Example C1-5-Comparative Example C1-10

In comparison with the antireflection film (HK-01) of Example C1a, following comparative samples were prepared with different configurations:

(1) a sample same as Example C1a except for employing a cellulose acylate substrate CAR1-1 (film being numbered as HFR1);
(2) a sample same as Example C1a except for employing a cellulose acylate substrate CAR1-2 (HFR2);
(3) a sample same as Example C1a except for employing a cellulose acylate substrate CAR1-3 (HFR3);
(4) a sample same as Example C1a except for employing a cellulose acylate substrate CAR1-4 (HFR4);
(5) a sample formed by preparing a coating liquid (LR-1) for a low-refractive index layer by eliminating the hollow silica therein and by increasing the fluorine-containing polymer by a corresponding weight and by coating the liquid in the same manner as in Example C1a (HFR5); and
(6) a sample formed by preparing a coating liquid (LR-2) for a low-refractive index layer by replacing the hollow silica therein with non-hollow (ordinary) silica particles (a grade different in particle size from MEK-ST, particle size: 45 μm, manufactured by Nissan Chemical Industries Ltd.) of an equal weight and by coating the liquid in the same manner as in Example C1a (HFR6).

(Evaluation of Antireflection Film)

The obtained films were subjected to evaluations of following items, and results are shown in Table 13.

(1) Antireflection Property

A mirror surface reflectivity was obtained by measuring a mirror surface reflectivity at an incident angle of 5° and an exit angle of −5° in a wavelength range of 450-650 nm by a spectrophotometer V-550 (manufactured by Jasco Corp.) mounted with an adaptor ARV-47, and by calculating an average reflectivity. A smaller value is preferable.

(2) Antiglare Property

A fluorescent lamp (6500 cd/m²) exposed without a louver was reflected on a prepared antireflection film, and a level of blurring of the reflected image was evaluated by following criteria:

AA: contour of fluorescent lamp completely unrecognizable;
A: contour of fluorescent lamp slightly recognizable;
B: fluorescent lamp being blurred but contour recognizable;
C: fluorescent lamp scarcely blurred.

(3) Evaluation of Adhesive Property

An antireflection film was subjected to a humidity conditioning for 2 hours under conditions of a temperature of 25° C. and a humidity of 60% RH. Then, on a surface of the antireflection film at the side of the light-diffusing layer, eleven notches were made with a cutter knife in longitudinal and lateral directions to form 100 squares, then an adhesion test with a polyester adhesive tape (No. 31B, manufactured by Nitto Denko Co.) was repeated three times in a same position and a peeling level was visually inspected and evaluated in following four levels:

AA: no peeling observed in all 100 squares;
A: peeling observed in 2 or less among 100 squares;
B: peeling observed in 3 to 10 among 100 squares;
C: peeling observed in more than 10 among 100 squares.

(4) Evaluation of Steel Wool Scratch Resistance

On the antireflection film before and after the exposure, scratches after moving #0000 steel wool in 10 reciprocating cycles under a load of 500 g/cm² were observed visually and evaluated in following three levels:

A: no scratches at all;
B: scratches being formed by not easily visible;
C: evident scratches.

(5) Antidust Property (Dust Deposition Resistance)

A film to be measured was adhered on a glass plate, then subjected to a charge elimination, and rubbed with Toresee (manufactured by Toray Inc.) in 10 reciprocating cycles. Then fine powder of foamed styrol as pseudo dust was sprinkled on the entire film, then the film was made to stand vertically and the mode of dropping of the pseudo dusts was observed and evaluated in following four levels:

AA: pseudo dusts dropping almost entirely;
A: pseudo dusts dropping by 80% or more;
B: pseudo dusts dropping by 50% or more;
C: pseudo dusts remaining on the film surface by 50% or more.

(5) Hue Uniformity

A mirror surface reflectivity at an incident angle of 5° and an exit angle of −5° in a wavelength range of 450-650 nm was measured by a spectrophotometer V-550 (manufactured by Jasco Corp.) mounted with an adaptor ARV-474, then the reflective spectrum measured in the wavelength range of 450-650 nm was used to calculate L*, a* and b* values of a CIE1976 L*a*b* color space representing the hue of a normal reflected light for a 5° incident angle of a CIE standard light source D65, and the hue of the reflected light was evaluated by the a* and b* values.

The measurement was conducted at 3 points in the machine direction of a roll (a front end portion, a central portion and an end portion of a coated roll) and 3 points in the transversal direction in each of such 3 points, namely in 9 points in total.

In each film, the a* values and b* values were respectively averaged to obtain center values. A difference (ΔA) of a maximum value and a minimum value of each of the a* values or b* values was divided by the center value and multiplied by 100 to obtain a hue change rate. The change rate was evaluated in following four levels. A larger one of the change rates for the a* values and the b* values was used for evaluation:

AA: 0-8%;
A: 8-20%;
B: 20-30%;
C: 30% or higher.

(7) Weather Resistance (Hue Change)

A weather resistance test was conducted with a sunshine weather meter (S-80, manufactured by Suga Shiken-ki Co., humidity: 50%) for an exposure time of 200 hours.

On a sample before and after the weather resistance test, a reflection spectrum for an incident light of an inclination angle of 5° was measured in the same manner as in the measurement of the mirror surface reflectivity, then a hue of the reflected light was calculated in a CIE chromaticity chart within a wavelength range of 380-780 nm, and a hue change between before and after the weather resistance test was determined. On the chromaticity chart, a distance ΔE from a center point to a hue point of each sample is determined, and a difference in ΔE between before and after the weather resistance test was evaluated in following four levels:

AA: ΔE being 8 or less;
A: ΔE being 8-15;
B: ΔE being 15-25;
C: ΔE being 25 or more.

TABLE 13

| Sample No. | Antireflection film No. | Cellulose acylate substrate | Low-refractive index layer | Mirror surface reflectivitye (%) | Antiglare property | Adhesion property | Steel wool scratch resistance | Antidust property | Hue uniformity | Weather resisance (hue Change) |
|---|---|---|---|---|---|---|---|---|---|---|
| Ex. C1a | HK-01 | CA1-1 | LL-1 | 1.72 | B | AA | A | A | AA | AA |
| Ex. C1b | HK-02 | CA1-1 | LL-2 | 1.76 | B | AA | A | B | AA | AA |
| Ex. C1c | HK-03 | CA1-1 | LL-3 | 1.70 | B | AA | A | A | A | AA |
| Comp. Ex. C1-5 | HFR1 | CAR1-1 | LL-1 | 1.72 | B | A | A | B | B | A |
| Comp. Ex. C1-6 | HFR2 | CAR1-2 | LL-1 | 1.73 | B | B | A | B | B | B |
| Comp. Ex. C1-7 | HFR3 | CAR1-3 | LL-1 | 1.69 | B | A | A | B | B | B |
| Comp. Ex. C1-8 | HFR4 | CAR1-4 | LL-1 | 1.77 | B | C | A | B | B | B |
| Comp. Ex. C1-9 | HFR5 | CA1-1 | LR-1 | 2.03 | B | AA | C | A | A | A |
| Comp. Ex. C1-10 | HFR6 | CA1-1 | LR-1 | 2.15 | B | AA | A | B | A | A |

Comparative Examples C1-5 to C1-8 utilizing substrates for comparison were inferior in the adhesion property, the dust preventing property and the weather resistance of the coated film, and was lower in the hue uniformity.

Also Comparative Example C1-9 not containing the hollow silica particles in the low-refractive index layer and Comparative Example C1-10 in which the hollow silica particles were replaced by non-hollow silica particles (ordinary silica particles) were inferior in the antireflection property.

Also the antireflection film of Example C1a was clearer in the transmission image than in Comparative Example C1-7 and was satisfactory in a transmission image property.

As explained in the foregoing, the antireflection film of the invention, being particularly excellent in the antireflection property, was improved in the insufficient adhesion resulting therefrom, and was satisfactory in scratch resistance, light fastness, transmission imaging property and other characteristics mentioned in the foregoing.

Example C-2

Preparation of Antireflection Film

Example C-2a

Preparation of Antireflection Film (HK-11)

(Preparation of Hard-Coat Layer)
Following composition was charged in a mixing tank and agitated to obtain a coating liquid for the hard-coat layer.
750.0 parts by weight of trimethylolpropane triacrylate (TMPTA, manufactured by Nippon Kayaku Co.), 270.0 parts by weight of poly(glycidyl methacrylate) of a weight-averaged molecular weight of 15,000, 730.0 parts by weight of methyl ethyl ketone, 500.0 parts by weight of cyclohexanone and 50.0 parts by weight of a photopolymerization initiator (Irgacure 184, manufactured by Nippon Ciba-Geigy Ltd.) were added, agitated and filtered by a polypropylene filter of a pore size of 0.4 μm to obtain a coating liquid for a hard-coat layer.
A cellulose acylate film (CA 1-1) prepared in Example C-1 was unwound and coated with the coating liquid for the hard-coat layer, utilizing a gravure coater. After drying at 100° C., it was irradiated with an ultraviolet light of an illumination intensity of 400 mW/cm$^2$ and an illumination amount of 300 mJ/cm$^2$ utilizing an air-cooled metal halide lamp of 160 W/cm (manufactured by Eyegraphics Co.) in an atmosphere of an oxygen concentration of 1.0 vol. % or less under nitrogen purging to harden the coated layer, thereby obtaining a film with a hard-coat layer (HKH-01) of a thickness of 8 μm.
(Preparation of High-Refractive Index Layer)
Preparation of Titanium Dioxide Particle Dispersion for High-Refractive Index Layer
As the titanium dioxide particles, there were employed titanium dioxide particles containing cobalt and subjected to a surface treatment with aluminum hydroxide and zirconium hydroxide (MPT-129C, manufactured by Ishihara Sangyo Co., TiO$_2$:Co$_3$O$_4$:Al$_2$O$_3$:ZrO$_2$=90.5:3.0:4.0:0.5 in weight ratio).
To 257.1 parts by weight of these particles, 41.1 parts by weight of a following dispersant, and 701.8 parts by weight of cyclohexanone were added and dispersed in a Dyno mill to obtain a titanium dioxide dispersion with a weight-averaged particle size of 70 nm.

dispersant

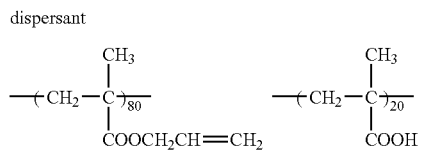

Preparation of High-Refractive Index Layer-1
To 99.1 parts by weight of the aforementioned titanium dioxide dispersion, 68.0 parts by weight of a mixture of dipentaerythritol pentaacrylate and dipentaerythritol hexaacrylate (DPHA®, manufactured by Nippon Kayaku Co.), 3.6 parts by weight of a photopolymerization initiator (Irgacure 907), 1.2 parts by weight of a photosensitizer (Kayacure DETX, manufactured by Nippon Kayaku Co.), 279.6 parts by weight of methyl ethyl ketone and 1049.0 parts by weight of cyclohexanone were added and agitated. After sufficient agitation, the mixture was filtered by a polypropylene filter of a pore size of 0.4 μm to obtain a coating liquid for a high-refractive index layer-1.
The coating liquid for the high-refractive index layer-1 was coated with a gravure coater on the hard-coat layer (HKH-01). After drying for 30 seconds at 90° C., it was irradiated with an ultraviolet light of an illumination intensity of 400 mW/cm$^2$ and an illumination amount of 400 mJ/cm$^2$ utilizing an air-cooled metal halide lamp of 180 W/cm (manufactured by Eyegraphics Co.) under nitrogen purging to obtain an atmosphere with an oxygen concentration of 1.0 vol. % or less to harden the coated layer. In this manner there was produced a film with a high-refractive index layer (HKM-01).
After the curing, the high-refractive index layer-1 had a refractive index of 1.630 and a thickness of 67 nm.
Preparation of a High-Refractive Index Layer-2
To 469.8 parts by weight of the aforementioned titanium dioxide dispersion, 40.0 parts by weight of a mixture of dipentaerythritol pentaacrylate and dipentaerythritol hexaacrylate (DPHA®, manufactured by Nippon Kayaku Co.), 3.3 parts by weight of a photopolymerization initiator (Irgacure 907, manufactured by Nippon Ciba-Geigy Ltd.), 1.1 parts by weight of a photosensitizer (Kayacure DETX, manufactured by Nippon Kayaku Co.), 526.2 parts by weight of methyl ethyl ketone and 459.6 parts by weight of cyclohexanone were added and agitated. Then the mixture was filtered by a polypropylene filter of a pore size of 0.4 μm to obtain a coating liquid for a high-refractive index layer-2.
The coating liquid for the high-refractive index layer-1 was coated with a gravure coater on the high-refractive index layer (HKM-01) to obtain a film having a high-refractive index layer (HKK-01). There were employed drying conditions of 30 seconds at 90° C. for the high-refractive index layer, and ultraviolet curing condition of an illumination intensity of 600 mW/cm$^2$ and an illumination amount of 400 mJ/cm$^2$ utilizing an air-cooled metal halide lamp of 240 W/cm (manufactured by Eyegraphics Co.) under nitrogen purging to obtain an atmosphere with an oxygen concentration of 1.0 vol. % or less.
After the curing, the high-refractive index layer-2 had a refractive index of 1.905 and a thickness of 107 nm.
(Preparation of Antireflection Film (HK-11))
The coating liquid LL-1 for the low-refractive index layer same as in Example C-1a was coated with a gravure coater on the high-refractive index layer (HKk-01), under same process conditions to obtain an antireflection film (HK-11).

Example C-2b

Preparation of Antireflection Film

HK-12

A substrate, a hard-coat layer, a high-refractive index layer–1, and a high-refractive index layer-2 were prepared in the same manner, in conditions of liquid preparation, coating, and drying, as the hard-coat layer (HKH-01), the high-refractive index layer-1 (HKM-01) and the high-refractive index layer-2 (HKK-01) in the foregoing Example C-2a.
(Preparation of Low-refractive Index Layer)
The coating liquid LL-2 for the low-refractive index layer in Example C-1b was employed in same coating and drying conditions as in Example C-1b to obtain an antireflection film (HK-12).

Example C-2c

Preparation of Antireflection Film

HK-13

A substrate, a hard-coat layer, a high-refractive index layer-1, and a high-refractive index layer-2 were prepared in the same manner, in conditions of liquid preparation, coating, and drying, as the hard-coat layer (HKH-01), the high-refractive index layer-1 (HKM-01) and the high-refractive index layer-2 (HKK-01) in the foregoing Example C-2a.
(Preparation of Low-Refractive Index Layer)

The coating liquid LL-3 for the low-refractive index layer in Example C-1c was employed in same coating and drying conditions as in Example C-1c to obtain an antireflection film (HK-13).

Comparative Example C2-1-Comparative Example C2-6

In comparison with the antireflection film (HK-11) of Example C-2a, following comparative samples were prepared with different configurations (same in substrates as Comparative Examples C1-5-C1-10 but difference in the configuration of the antireflection layer):
(1) a sample same as Example C-2a except for employing a cellulose acylate substrate CAR1-1 (film being numbered as HFR11);
(2) a sample same as Example C-2a except for employing a cellulose acylate substrate CAR1-2 (HFR12);
(3) a sample same as Example C-2a except for employing a cellulose acylate substrate CAR1-3 (HFR13);
(4) a sample same as Example C-2a except for employing a cellulose acylate substrate CAR1-4 (HFR14);
(5) a sample formed by preparing a coating liquid (LR-1) for a low-refractive index layer by eliminating the hollow silica therein and by increasing the fluorine-containing polymer by a corresponding weight and by coating the liquid in the same manner as in Example C-2a (HFR15); and
(6) a sample formed by preparing a coating liquid (LR-2) for a low-refractive index layer by replacing the hollow silica therein with non-hollow (ordinary) silica particles (a grade different in particle size from MEK-ST, particle size: 45 μm, manufactured by Nissan Chemical Industries Ltd.) of an equal weight and by coating the liquid in the same manner as in Example C-2a (HFR16).
(Evaluation of Antireflection Film)

The obtained films were evaluated in the same manner as in Example C-1 for items other than the antiglare property, and results are shown in Table 14.

As a result of evaluation, the antireflection films of Examples C-2a to C-2c of the invention showed a satisfactory antireflection property, and was also satisfactory in the adhesion property, the steel wool scratch resistance, the antidust property and the hue uniformity of the coated film. Furthermore, the performances were not deteriorated even after the weather resistance test.

Comparative Examples C1-5 to C1-8 utilizing substrates for comparison were inferior in the adhesion property and the weather resistance of the coated film, and was lower in the hue uniformity.

Also Comparative Example C2-5 not containing the hollow silica particles in the low-refractive index layer and Comparative Example C2-6 in which the hollow silica particles were replaced by non-hollow silica particles (ordinary silica particles) were inferior in the antireflection property.

As explained in the foregoing, also the antireflection film of Example C-2, being particularly excellent in the antireflection property, was improved in the insufficient adhesion associated therewith, and was satisfactory in scratch resistance, light fastness, transmission imaging property and other characteristics mentioned in the foregoing.

The following antireflection films of Examples C-1 and C-2 were subjected to measurements of a surface free energy and a dynamic friction coefficient. The surface free energy was calculated from a contact angle of water and methylene iodide. The dynamic friction coefficient was measured with a Heidon dynamic friction meter, utilizing a stainless steel ball of a diameter of 5 mm and under a load of 100 g, on a sample conditioned at 25° C. and 60% RH.

TABLE 15

| Sample No. | Surface free energy (mN/m) | Dynamic friction coefficient |
| --- | --- | --- |
| Example C-1a | 22.3 | 0.09 |
| Example C-2a | 23.5 | 0.08 |
| Comp. Ex. C1-5 | 27.6 | 0.24 |
| Comp. Ex. C2-1 | 28.0 | 0.21 |

Example C-3

Preparation of Substrate

Cellulose acylate films CA2-1 to CA2-6 were prepared in the same manner as the cellulose acylate film CA1-1 in Example C-1, except that the aliphatic ester plasticizer and the UV absorber were changed as shown in Table 16. Also comparative films CAR2-1 to CAR2-3 were prepared by changing the producing conditions and the composition. Compositions and producing conditions of these films are shown in Table 16.

TABLE 14

| Sample No. | Antireflection film No. | Cellulose acylate substrate | Low-refractive index layer | Antireflection property | Adhesion property | Steel wool scratch resisance | Antidust property | Hue uniformity | Weather resistance (hue change) |
| --- | --- | --- | --- | --- | --- | --- | --- | --- | --- |
| Ex. C-2a | HK-11 | CA1-1 | LL-1 | 0.33 | AA | A | A | AA | AA |
| Ex. C-2b | HK-12 | CA1-1 | LL-2 | 0.36 | AA | A | B | AA | AA |
| Ex. C-2c | HK-13 | CA1-1 | LL-3 | 0.38 | AA | A | A | AA | AA |
| Comp. Ex. C2-1 | HFR11 | CAR1-1 | LL-1 | 0.30 | A | A | B | B | A |
| Comp. Ex. C2-2 | HFR12 | CAR1-2 | LL-1 | 0.33 | B | A | B | A | B |
| Comp. Ex. C2-3 | HFR13 | CAR1-3 | LL-1 | 0.39 | A | A | B | A | B |
| Comp. Ex. C2-4 | HFR14 | CAR1-4 | LL-1 | 0.37 | C | A | B | A | B |
| Comp. Ex. C2-5 | HFR15 | CA1-1 | LR-1 | 0.77 | AA | C | A | AA | A |
| Comp. Ex. C2-6 | HFR16 | CA1-1 | LR-1 | 0.64 | AA | A | B | AA | A |

TABLE 16

| Sample No. | Film No. | Thick-ness (μm) | Polyhydric alcohol ester No. | UV absorber | Drying air speed after 1 sec from casting | Drying air temp. (° C.) |
|---|---|---|---|---|---|---|
| Ex. C3-1 | CA2-1 | 80 | 4 | UV-2 | 15 | 50 |
| Ex. C3-2 | CA2-2 | 80 | 7 | UV-2 | 15 | 50 |
| Ex. C3-3 | CA2-3 | 79 | 16 | UV-2 | 15 | 50 |
| Ex. C3-4 | CA2-4 | 80 | 34 | UV-2 | 15 | 50 |
| Ex. C3-5 | CA2-5 | 80 | 8 | UV-2 | 15 | 50 |
| Ex. C3-6 | CA2-6 | 81 | 4 | UV-3 | 15 | 50 |
| Ex. C3-7 | CA2-7 | 80 | 4 | UV-4 | 15 | 50 |
| Comp. Ex. C3-1 | CAR2-1 | 79 | 4 | UV-2 | 24 | 60 |
| Comp. Ex. C3-2 | CAR2-2 | 80 | none | UV-2 | 15 | 50 |
| Comp. Ex. C3-3 | CAR2-3 | 80 | 4 | none | 15 | 50 |

The UV absorbers in Table 16 are as follows.

UV-2: A copolymer of the aforementioned ultraviolet absorbing monomer UVM-1 and HPMA (weight-averaged molecular weight: 8,300, UV absorbing monomer content: 32 weight %);

UV-3: A copolymer of the aforementioned ultraviolet absorbing monomer UVM-2 and MMA (weight-averaged molecular weight: 12,000, UV absorbing monomer content: 54 weight %);

UV4: A copolymer of the aforementioned ultraviolet absorbing monomer UVM-5 and MMA (weight-averaged molecular weight: 8,400, UV absorbing monomer content: 50 weight %).

Evaluations same as in Example C-1 were conducted on the obtained cellulose acylate film. Results are shown in Tables 17 and 18.

TABLE 17

| sample No. | film No. | thickness variation range (%) | curl | Ra μm | Rz μm | Ra/Rz | Sm μm | RY μm | haze % | tear strength (g) | optical defect |
|---|---|---|---|---|---|---|---|---|---|---|---|
| Ex. C3-1 | CA2-1 | ±2.4 | −4.5 | 0.008 | 0.018 | 0.44 | 0.153 | 0.024 | 0.27 | 17 | 0.5 |
| Ex. C3-2 | CA2-2 | ±2.5 | −5.1 | 0.007 | 0.019 | 0.37 | 0.155 | 0.022 | 0.24 | 18 | 0.4 |
| Ex. C3-3 | CA2-3 | ±2.4 | −4.3 | 0.008 | 0.017 | 0.47 | 0.161 | 0.025 | 0.24 | 15 | 0.4 |
| Ex. C3-4 | CA2-4 | ±2.6 | −4.6 | 0.009 | 0.018 | 0.50 | 0.157 | 0.022 | 0.23 | 17 | 0.6 |
| Ex. C3-5 | CA2-5 | ±2.2 | −4.3 | 0.006 | 0.016 | 0.38 | 0.160 | 0.023 | 0.25 | 19 | 0.4 |
| Ex. C3-6 | CA2-6 | ±2.4 | −4.8 | 0.008 | 0.028 | 0.29 | 0.247 | 0.125 | 0.46 | 18 | 0.4 |
| Ex. C3-7 | CA2-7 | ±2.3 | −5.3 | 0.009 | 0.027 | 0.33 | 0.256 | 0.124 | 0.57 | 17 | 0.6 |
| Comp. Ex. C3-1 | CAR2-1 | ±5.1 | −9.6 | (not measurable because of insufficient planarality) | | | | | | | |
| Comp. Ex. C3-2 | CAR2-2 | ±3.9 | −7.6 | 0.009 | 0.033 | 0.27 | 0.245 | 0.175 | 0.30 | 16 | 1.6 |
| Comp. Ex. C3-3 | CAR2-3 | ±4.2 | −5.3 | 0.008 | 0.031 | 0.26 | 0.248 | 0.182 | 0.27 | 16 | 1.5 |

TABLE 18

| Sample No. | Moisture permeability (g/m²; 24 h) | Exuding property (%) |
|---|---|---|
| Example C3-1 | 165 | 1.4 |
| Example C3-2 | 157 | 0.9 |
| Example C3-3 | 148 | 1.5 |
| Example C3-4 | 160 | 0.8 |
| Example C3-5 | 143 | 1.1 |
| Example C3-6 | 170 | 0.9 |
| Example C3-7 | 145 | 1.1 |
| Comp. Ex. C3-1 | 223 | 2.4 |

TABLE 18-continued

| Sample No. | Moisture permeability (g/m²; 24 h) | Exuding property (%) |
|---|---|---|
| Comp. Ex. C3-2 | 266 | 2.8 |
| Comp. Ex. C3-3 | 248 | 2.6 |

On a cellulose acylate film in Example C-3, there were coated of a light-diffusing layer and a low-refractive index layer in Example C-1 or a hard-coat layer, a high-refractive index layer-1, a high-refractive index layer-2 and a low-refractive index layer in Example C-2. Coated layers are shown in Table 19, and results of evaluations same as in Example C-1 are shown in Table 20.

TABLE 19

| Sample No. | Film No. | Light diffusing layer | Low refractive index layer | Hard-coat layer | High refractive index layer-1 | High refractive index layer-2 | Low refractive index layer |
|---|---|---|---|---|---|---|---|
| Example C3-11 | CA2-1 | Ex. C-1a | Ex. C-1a | none | none | none | none |
| Example C3-12 | CA2-2 | Ex. C-1a | Ex. C-1a | none | none | none | none |
| Example C3-13 | CA2-3 | Ex. C-1a | Ex. C-1a | none | none | none | none |
| Example C3-14 | CA2-4 | Ex. C-1a | Ex. C-1a | none | none | none | none |
| Example C3-15 | CA2-5 | Ex. C-1a | Ex. C-1a | none | none | none | none |
| Example C3-16 | CA2-6 | Ex. C-1a | Ex. C-1a | none | none | none | none |
| Example C3-17 | CA2-7 | Ex. C-1a | Ex. C-1a | none | none | none | none |
| Comp. Ex. C3-11 | CAR2-1 | Ex. C-1a | Ex. C-1a | none | none | none | none |
| Comp. Ex. C3-12 | CAR2-2 | Ex. C-1a | Ex. C-1a | none | none | none | none |
| Comp. Ex. C3-13 | CAR2-3 | Ex. C-1a | Ex. C-1a | none | none | none | none |
| Example C3-18 | CA2-1 | none | none | Ex. C-2a | Ex. C-2a | Ex. C-2a | Ex. C-2a |
| Example C3-19 | CA2-2 | none | none | Ex. C-2a | Ex. C-2a | Ex. C-2a | Ex. C-2a |
| Example C3-20 | CA2-6 | none | none | Ex. C-2a | Ex. C-2a | Ex. C-2a | Ex. C-2a |
| Example C3-21 | CA2-7 | none | none | Ex. C-2a | Ex. C-2a | Ex. C-2a | Ex. C-2a |
| Comp. Ex. C3-14 | CAR2-1 | none | none | Ex. C-2a | Ex. C-2a | Ex. C-2a | Ex. C-2a |
| Comp. Ex. C3-15 | CAR2-2 | none | none | Ex. C-2a | Ex. C-2a | Ex. C-2a | Ex. C-2a |
| Comp. Ex. C3-16 | CAR2-3 | none | none | Ex. C-2a | Ex. C-2a | Ex. C-2a | Ex. C-2a |

TABLE 20

| Sample No. | Antireflection film No. | Antireflection property | Adhesion property | Steel wool scratch resistance | Antidust property | Hue uniformity | Weather resistance (hue change) |
|---|---|---|---|---|---|---|---|
| Example C3-11 | HK-21 | 1.75 | AA | A | A | AA | AA |
| Example C3-12 | HK-22 | 1.70 | AA | A | B | AA | AA |
| Example C3-13 | HK-23 | 1.74 | AA | A | A | AA | AA |
| Example C3-14 | HK-24 | 1.68 | AA | A | A | AA | AA |
| Example C3-15 | HK-25 | 1.79 | AA | A | A | AA | AA |
| Example C3-16 | HK-26 | 1.65 | AA | A | A | AA | AA |
| Example C3-17 | HK-27 | 1.66 | AA | A | A | AA | AA |
| Comp. Ex. C3-11 | HFR21 | 1.67 | A | A | B | B | A |
| Comp. Ex. C3-12 | HFR22 | 1.71 | B | A | B | A | B |
| Comp. Ex. C3-13 | HFR23 | 1.70 | A | A | B | A | B |
| Example C3-18 | HK-28 | 0.33 | AA | A | A | AA | AA |
| Example C3-19 | HK-29 | 0.36 | AA | A | B | AA | AA |
| Example C3-20 | HK-30 | 0.38 | AA | A | A | AA | AA |
| Example C3-21 | HK-31 | 0.38 | AA | A | A | AA | AA |
| Comp. Ex. C3-14 | HFR24 | 0.30 | A | A | B | B | A |
| Comp. Ex. C3-15 | HFR25 | 0.33 | B | A | B | A | B |
| Comp. Ex. C3-16 | HFR26 | 0.39 | A | A | B | A | B |

As shown in this table, the antireflection film of Example C-3, employing the plasticizer and the UV absorber of the invention and the hollow silica in the low-refractive index layer, as in Examples C-1 and C-2, shows a reduction in the variation range of the film thickness and the curling, and is excellent in the adhesion property, the antidust property, the uniformity in hue and the weather resistance.

Also the antiglare property evaluated by the aforementioned method on Examples C3-11 to C3-17 and Comparative Examples C3-11 to C3-13 was a rank B in all the samples.

Example C-4

Preparation of Antireflection Film (Preparation of Conductive Layer)

On a cellulose acylate film shown in Table 21, Peltron C-4456-S7 (trade name of an ATO-dispersed hard coat agent, solid: 45%, manufactured by Pelnox Corp.) was coated, dried and hardened by an ultraviolet irradiation to form a conductive layer (EL-1) of a thickness of 1 μm. The conductive layer had a surface resistivity of about $10^8$ Ω/sq.

The surface resistivity was measured with a resistivity meter MCP-HT260, manufactured by Mitsubishi Chemical Corp., after the sample was let to stand for 1 hour under conditions of 25° C./65% RH.

Also the sample showed a haze of 13.8%, a transmittance of 76%, and surface properties of $R^a$ 0.014, Rz 0.041, and Ry 0.058 (measuring methods being same as explained before).

(Preparation of Light-Diffusing Layer)

A light-diffusing layer was formed in the same manner as the light-diffusing layer in Example C-1a.

(Coating Liquid LL-4 for Low-Refractive Index Layer)

130 parts by weight of a heat crosslinksable fluorine-containing polymer of a refractive index 1.42 (JTA113, solid concentration 6%, manufactured by JSR Corp.), 5 parts by weight of silica sol (silica MEK-ST, average particle size 15 nm, solid content 30%, manufactured by Nissan Chemical Industries Ltd.), 15 parts by weight of hollow silica (CS60-IPA, average particle size: 60 nm, shell thickness: 10 nm, refractive index: 1.31, 20 weight % dispersion in isopropanol, manufactured by Catalysts & Chemicals Ind. Co.), 6 parts by weight of a following sol liquid a, 50 parts by weight of methyl ethyl ketone and 60 parts by weight of cyclohexanone were added and mixed, and filtered by a polypropylene filter of a pore size of 1 μm to obtain a coating liquid LL-4 for a low-refractive index layer.

<Sol Liquid a>

In a reactor equipped with an agitator and a reflux condenser, 120 parts of methyl ethyl ketone, 100 parts of acryloyloxypropyl trimethoxysilane (KBM-5103, manufactured by Shin-Etsu Chemical Co.) and 3 parts of diisopropylaluminum acetate (Chelope, Hope Chemical Co.) were mixed, then 30 parts of ion-exchanged water were added and the mixture was reacted for 4 hours at 60° C. and cooled to the room temperature to obtain a sol liquid. It had a weight-averaged molecular weight of 1,600, and, among components equal to or larger than oligomers, components with a molecular weight of 1,000 to 20,000 represented 100%. Also a gas chromatography analysis indicated that the acryloyloxypropyl trimethoxysilane employed as the raw material did not remain at all.

5.6 parts by weight of a mixture of dipentaerythritol pentaacrylate and dipentaerythritol hexaacrylate (DPHA®, manufactured by Nippon Kayaku Co.), 1.4 parts by weight of the aforementioned fluorine-containing polymer (FP-1), 20.0 parts by weight of hollow silica (CS60-IPA, 20 weight % dispersion in isopropanol, manufactured by Catalysts & Chemicals Ind. Co.), 0.7 parts by weight of RMS-033 (reactive silicone, manufactured by Gelest Inc.), 0.2 parts by weight of a photopolymerization initiator (Irgacure 907, manufactured by Ciba Specialty Chemicals Inc.), 6.2 parts by weight of the sol liquid a (described above) and 315.9 parts by weight of methyl ethyl ketone were added and agitated. After sufficient agitation, the mixture was filtered by a polypropylene filter of a pore size of 1 μm to obtain a coating liquid LL-5 for a low-refractive index layer.

Coating of Low-Refractive Index Layer

Each of the coating liquids LL-4 and LL-5 was coated on the light-diffusing layer was coated by a roll having a gravure pattern of lines of 180 line/inch and a depth of 40 μm and a doctor blade, under conditions of a roll revolution of 30 rpm and a transporting speed of 15 m/min, then dried for 150 seconds at 120° C., further dried for 8 minutes at 140° C. and irradiated with an ultraviolet light of a power of 240 W/cm$^2$ and an illumination amount of 900 mJ/cm$^2$ under nitrogen purging, thereby obtaining a low-refractive index layer of a thickness of 90 nm.

Antireflection films were prepared by combining the aforementioned coating liquids and those of Examples C-1a and C-2a as shown in Table 21.

TABLE 21

| Sample No. | Cellulose acylate film No. | Conductive layer | Light diffusing layer | Low refrac-tive index layer | Hard-coat layer | High refractive index layer-1 | High refractive index layer-2 | Low refractive index layer |
|---|---|---|---|---|---|---|---|---|
| Example C4-11 | CA2-1 | EL-1 | Ex. C-1a | Ex. C-1a (LL-1) | none | none | none | none |
| Example C4-12 | CA2-2 | EL-1 | Ex. C-1a | Ex. C-1a (LL-1) | none | none | none | none |
| Example C4-13 | CA2-6 | EL-1 | Ex. C-1a | Ex. C-1a (LL-1) | none | none | none | none |
| Example C4-14 | CA2-7 | EL-1 | Ex. C-1a | Ex. C-1a (LL-1) | none | none | none | none |
| Example C4-15 | CA2-1 | EL-1 | Ex. C-1a | Ex. C-4, LL-4 | none | none | none | none |
| Example C4-16 | CA2-1 | EL-1 | Ex. C-1a | Ex. C-4, LL-5 | none | none | none | none |
| Comp. Ex. C4-11 | CAR2-1 | EL-1 | Ex. C-1a | Ex. C-1a (LL-1) | none | none | none | none |
| Comp. Ex. C4-12 | CAR2-2 | EL-1 | Ex. C-1a | Ex. C-1a (LL-1) | none | none | none | none |
| Comp. Ex. C4-13 | CAR2-3 | EL-1 | Ex. C-1a | Ex. C-1a (LL-1) | none | none | none | none |
| Example C4-17 | CA2-1 | EL-1 | none | none | Ex. C-2a | Ex. C-2a | Ex. C-2a | Ex. C-2a |
| Example C4-18 | CA2-2 | EL-1 | none | none | Ex. C-2a | Ex. C-2a | Ex. C-2a | Ex. C-2a |
| Example C4-19 | CA2-6 | EL-1 | none | none | Ex. C-2a | Ex. C-2a | Ex. C-2a | Ex. C-2a |
| Example C4-20 | CA2-7 | EL-1 | none | none | Ex. C-2a | Ex. C-2a | Ex. C-2a | Ex. C-2a |
| Comp. Ex. C4-14 | CAR2-1 | EL-1 | none | none | Ex. C-2a | Ex. C-2a | Ex. C-2a | Ex. C-2a |
| Comp. Ex. C4-15 | CAR2-2 | EL-1 | none | none | Ex. C-2a | Ex. C-2a | Ex. C-2a | Ex. C-2a |
| Comp. Ex. C4-16 | CAR2-3 | EL-1 | none | none | Ex. C-2a | Ex. C-2a | Ex. C-2a | Ex. C-2a |

The obtained antireflection films were evaluated in the same manner as in Example C-1. Results are shown in Table 22.

TABLE 22

| Sample No. | Antireflection film No. | Antireflection property | Adhesion property | Steel wool scratch resistance | Antidust property | Hue uniformity | Weather resistance (hue change) |
|---|---|---|---|---|---|---|---|
| Example C4-11 | HK-41 | 1.74 | AA | A | AA | AA | AA |
| Example C4-12 | HK-42 | 1.70 | AA | A | A | AA | AA |
| Example C4-13 | HK-43 | 1.75 | AA | A | AA | AA | AA |
| Example C4-14 | HK-44 | 1.69 | AA | A | AA | AA | AA |
| Example C4-15 | HK-45 | 1.78 | AA | A | AA | AA | AA |
| Example C4-16 | HK-46 | 1.67 | AA | A | AA | AA | AA |
| Comp. Ex. C4-11 | HFR41 | 1.68 | A | A | A | B | A |
| Comp. Ex. C4-12 | HFR42 | 1.66 | B | A | A | A | B |
| Comp. Ex. C4-13 | HFR43 | 1.70 | A | A | A | A | B |
| Example C4-17 | HK-47 | 0.36 | AA | A | AA | AA | AA |
| Example C4-18 | HK-48 | 0.37 | AA | A | A | AA | AA |
| Example C4-19 | HK-49 | 0.39 | AA | A | AA | AA | AA |
| Example C4-20 | HK-50 | 0.38 | AA | A | AA | AA | AA |
| Comp. Ex. C4-14 | HFR44 | 0.42 | A | A | A | B | A |
| Comp. Ex. C4-15 | HFR45 | 0.33 | B | A | A | A | B |
| Comp. Ex. C4-16 | HFR46 | 0.38 | A | A | A | A | B |

Results shown in Table 22 indicate that the antireflection films of Examples C4-11 to C4-20 having a conductive layer are improved in the antidust property, and are similar in other characteristics to those of Examples C1 to C3.

Also the antiglare property evaluated by the aforementioned method on Examples C4-11 to C4-16 and Comparative Examples C4-11 to C4-13 was a rank B in all the samples.

A weather resistance (change in reflectivity) was evaluated in a following method on the antireflection films of Example C-4 shown in Table 23, which also shows the results of evaluation.

Evaluation of Weather Resistance (Reflectivity Change)

A mirror surface reflectivity was measured at an incident angle of 5° and an exit angle of −5° in a wavelength range of 380-780 nm by a spectrophotometer V-550 (manufactured by Jasco Corp.) mounted with an adaptor ARV-474, and a change ($\Delta R$) in the average reflectivity between before and after the weather resistance test was evaluated in following four levels:
AA: $\Delta R$ being 0.1% or less;
A: $\Delta R$ being 0.1-0.2%;
B: $\Delta R$ being 0.2-0.4%;
C: $\Delta R$ being 0.4% or higher.

TABLE 23

| Sample No. | Antireflection film No. | Light fastness (change in reflectivity) |
|---|---|---|
| Example C4-17 | HK-47 | AA |
| Example C4-18 | HK-48 | AA |
| Example C4-19 | HK-49 | A |
| Example C4-20 | HK-50 | A |
| Comp. Ex. C4-14 | HFR44 | B |
| Comp. Ex. C4-15 | HFR45 | B |
| Comp. Ex. C4-16 | HFR46 | B |

Results shown in Table 23 indicate that the antireflection films of Examples C4-17 to C4-20 of the invention have excellent weather resistance.

Example C-5

Preparation of Protective Film for Polarizing Plate

An antireflection film prepared in Example C-1, C-2, C-3 or C-4 was subjected, on a surface of the substrate opposite to The antireflection layer of the invention, to a saponification treatment by coating a saponifying solution, which is an alkaline solution constituted of 57 parts by weight of potassium hydroxide, 120 parts by weight of propylene glycol, 535 parts by weight of isopropyl alcohol and 288 parts by weight of water and maintained at 40° C.

The alkaline solution on the saponified surface of the substrate was sufficiently washed off with water and sufficiently dried at 100° C. In this manner there was prepared an antireflection film serving as a protecting film for a polarizing plate.

A polyvinyl alcohol film of a thickness of 75 μm (manufactured by Kuraray Co.) was immersed in an aqueous solution constituted of 1000 g of water, 7 g of iodine and 105 g of potassium iodide for 5 minutes to execute iodine adsorption. Then the film was monoaxially extended in 4.4 times in the machine direction in a 4 weight % aqueous solution of boric acid, and dried in a tensioned state to obtain a polarizing sheet.

A surface of the polarizing sheet was adhered, utilizing a polyvinyl alcohol-based adhesive, to the saponified surface of the cellulose acylate film of the antireflection film (protective film for polarizing plate). The other surface of the polarizing sheet was adhered, utilizing the same polyvinyl alcohol-based adhesive, to a similarly saponified cellulose acylate film (ID-80UF, manufactured by Fuji Photo Film Co.) to obtain polarizing plates (for observing side) as shown in Table 24.

TABLE 24

| Sample No. (polarizing plate at viewing side) | Antireflection film |
|---|---|
| Examples C5-1–C5-3 | HK-01–03 |
| Examples C5-4–C5-6 | HK-11–13 |
| Examples C5-7–C5-17 | HK-21–31 |
| Examples C5-18–C5-27 | HK-41–50 |

(Evaluation of Image Display Apparatus)

Liquid crystal display devices of transmission type, reflective type and semi-transmission type of IPS, VA and OCB modes equipped with thus prepared polarizing plates of the invention (Examples C5-1-C5-3, C5-4-C5-16, C5-7-C5-17 and C5-18-C5-27 were excellent in antireflection property and showed an extremely excellent visibility.

Example C-6

Preparation of Polarizing Plate

An optical compensation film (Wide View Film A 12B, manufactured by Fuji Photo Film Co.) having an optical compensation layer, in which a disc face of a discotic structural unit is inclined to the surface of a substrate and an angle between the disc face of the discotic structural unit and the surface of the substrate varies with a depth in an optical anisotropic layer, was subjected to a saponification process similar to that in Example C-5, on a surface of the substrate opposite to the optical compensation layer.

A surface of a polarizing sheet prepared in Example C-5 was adhered, utilizing a polyvinyl alcohol-based adhesive, to the saponified surface of a cellulose acylate film of the antireflection film (protective film for polarizing plate) shown in Table 25. The other surface of the polarizing sheet was adhered, utilizing the same polyvinyl alcohol-based adhesive, to a similarly saponified surface of a triacetyl cellulose film of the aforementioned optical compensation film. The antireflection film employed and the prepared polarizing plate are shown in Table 25. A comparative example is also shown.

TABLE 25

| Polarizing plate No. | Antireflection film |
|---|---|
| 6H-1 (invention) | HK-01 |
| 6R-1 (comparative example) | HFR1 |

<Liquid Crystal Display Device>
(TN Mode Liquid Crystal Display Device)

In a 20-inch TN-mode liquid crystal display device (TH-20TA3, manufactured by Matsushita Electric Co.), a polarizing plate at the viewing side was replaced by the aforementioned polarizing plate (6H-1 or 6R-1), which was adhered with an acrylic adhesive at the observing side in such a manner that the optical anisotropic layer was positioned at the side of a liquid crystal cell. Also at a backlight side, a following backlight-side polarizing plate (BHB) was adhered with an adhesive in such a manner that the optical anisotropic layer was positioned at the side of the liquid crystal cell. A transmission axis of the polarizing plate at the observing side and a transmission axis of the polarizing plate at the backlight side were so positioned as to constitute an O-mode.

The backlight-side polarizing plate (BHB) was prepared by preparing a polarizing sheet in the same manner as in Example C-5, then adhering thereto, with a polyvinyl alcohol-based adhesive, a cellulose acylate film (TD80UF) subjected to a saponification process and adhering the aforementioned saponified optical compensation film on the other surface of the polarizing sheet.

(OCB Mode Liquid Crystal Display Device)

On a glass substrate with an ITO electrode, a polyimide film was provided as an orientation film and was subjected to a rubbing process. Two glass substrates thus obtained were opposed in such a manner that rubbing directions became mutually parallel with a cell gap of 6 μm. A liquid crystal compound of Δn of 0.1396 (ZLI1132, manufactured by Merck Inc.) was poured into the cell gap to obtain a bend orientation liquid crystal cell. In a sandwiching relation on the prepared bend orientation cell, an aforementioned polarizing plate (6H-1 or 6R-1) was adhered with an adhesive to the observing side of the cell in such a manner that the optical compensation sheet was positioned at the side of the liquid crystal cell, while at the backlight side, a backlight-side polarizing plate (BHB) was adhered with an adhesive in such a manner that the optical anisotropic layer was positioned at the side of the liquid crystal cell. A transmission axis of the polarizing plate at the observing side and a transmission axis of the polarizing plate at the backlight side were so positioned as to constitute an O-mode.

(VA Mode Liquid Crystal Display Device)

In a 22-inch VA-mode liquid crystal display device (TH22-LH10, manufactured by Matsushita Electric Co.), a polarizing plate at the viewing side was replaced by the aforementioned polarizing plate (6H-1 or 6R-1), which was adhered with an acrylic adhesive at the observing side in such a manner that the optical anisotropic layer was positioned at the side of a liquid crystal cell.

(IPS Mode Liquid Crystal Display Device)

In a 20-inch IPS-mode liquid crystal display device (W20-1c3000, manufactured by Hitachi Ltd.), a polarizing plate at the viewing side was replaced by the aforementioned polarizing plate (6H-1 or 6R-1), which was adhered with an acrylic adhesive at the observing side in such a manner that the optical anisotropic layer was positioned at the side of a liquid crystal cell.

<Image Display Performance of Liquid Crystal Display Device>

Image display performance was evaluated by following items on each of the aforementioned liquid crystal display devices. Results are shown in Table 26.

Each corresponding comparative example was equipped with a polarizing plate, which was not provided, at the outermost surface of the polarizing plate in the observing side, with the antireflection film of the invention.

(Evaluation Method of Image Display Performance)
(1) Evaluation of Unevenness in Displayed Image An image display unevenness in a black display (L1) was visually observed, utilizing a measuring instrument (EZ-Contrast 160D, manufactured by ELDIM Ltd.):
A: Unevenness not generated at all (a level not recognized by any of 10 evaluators);
B: Unevenness generated weakly (a level recognized by 1 to 5 in 10 evaluators);
C: Unevenness generated strongly (a level recognized by 6 or more in 10 evaluators).

(2) Evaluation of Reflection of External Light

Reflection of external light was evaluated, utilizing a fluorescent light, in following four levels in visual observation:
AA: Change of reflection present but not annoying at all;
A: Change of reflection present but scarcely annoying;
B: Change of reflection annoying but permissible;
C: Change of reflection annoying.

(3) Contrast and Viewing Angle

A white display voltage of 2V and a black display voltage of 6 V were applied to a liquid crystal cell of a liquid crystal display device, and a contrast ratio and a viewing angle (an angular range in which a contrast ratio became 10 or higher) in a lateral direction (perpendicular to the rubbing direction of the cell) were investigated with a measuring instrument (EZ-Contrast 160D, manufactured by ELDIM Ltd.):
AA: changes not annoying at all;
A: changes present but scarcely annoying;
B: changes annoying but permissible;
C: changes annoying.

(4) Change in Hue

A level of change in the hue within a viewing angle from front to 60° was visually observed with an instrument same as in the evaluation of "(3) Contrast and viewing angle" and evaluated in following criteria:
AA: change not annoying at all;
A: change present but scarcely annoying;
B: change annoying but permissible;
C: change annoying.

Image quality of the displayed image was evaluated in the aforementioned methods on the display apparatuses of Examples C6-1-C6-4 and Comparative Examples C-6a-C-6d. Results are shown in Table 26.

TABLE 26

| Ex. No. | Polarizing plate No. | Liquid crystal mode | Image unevenness | External light reflection | Hue of black display | Contrast upper/lower direction | Contrast diagonal direction | leak in black display | Viewing angle | Hue change |
|---|---|---|---|---|---|---|---|---|---|---|
| C6-1 | 6H-1 | TN | A | A | A | A | — | — | A | A |
| Comp. Ex. 6a | 6R-1 | TN | A | C | A | B | — | — | C | C |
| C6-2 | 6H-1 | OCB | A | A | A | AA | — | — | AA | A |
| Comp. Ex. 6b | 6R-1 | OCB | A | C | A | A | — | — | AA | B |
| C6-3 | 6H-1 | VA | A | A | A | — | A | — | AA | AA |
| Comp. Ex. 6c | 6R-1 | VA | A | C | A | — | B | — | AA | A |
| C6-4 | 6H-1 | IPS | A | A | A | — | — | A | AA | AA |
| Comp. Ex. 6d | 6R-1 | IPS | A | C | A | — | — | B | AA | AA |

Example C6-1 for a TN-mode display apparatus, in comparison with Comparative Example C6a without the polarizing plate protective film of the invention, not only eliminated the external light reflection but also achieved improvements in the image contrast in upper/lower direction, the viewing angle and the hue change, thereby providing a satisfactory visibility.

Example C6-2 for an OCB-mode display apparatus, in comparison with Comparative Example C6b without the polarizing plate protective film of the invention, not only eliminated the external light reflection but also achieved significant improvements in the image contrast in upper/lower direction and the hue change, thereby providing a satisfactory visibility.

Example C6-3 for a VA-mode display apparatus, in comparison with Comparative Example C6c without the polarizing plate protective film of the invention, not only eliminated the external light reflection but also achieved a contrast in the diagonal direction of a practically acceptable level, and an improvement in the hue change, thereby providing an improved visibility.

Example C6-4 for an IPS-mode display apparatus, in comparison with Comparative Example C6d without the polarizing plate protective film of the invention, not only eliminated the external light reflection but also achieved an improvement in the light leakage at a black image display of a high contrast to a practically acceptable visibility.

As explained above, in the liquid crystal display device equipped with the polarizing plate, having the antireflection film of the invention, an extremely satisfactory visibility of the displayed image was attained.

Example C-7

A part of the antireflection film samples of Examples C-1 to C-4 (HK-01, HK-02, HK-11, HK-23, HK-41 and HK-43) was adhered, by an adhesive, to a front glass plate of an organic EL display apparatus. As a result, a reflection on the glass surface was suppressed, and a display apparatus of a high visibility could be obtained.

Example C-8

Each polarizing plate (6H-1) at the viewing side in Example C-6 was adhered with a λ/4 plate on a side of the polarizing plate opposite to the antireflection film, and adhered to a front glass plate of an organic EL display apparatus. As a result, reflections on the glass surface and from the interior of the glass plate were suppressed, and a display apparatus of an extremely high visibility could be obtained.

Example D

Example D-1 and Comparative Examples D1 and D2

Preparation of Antireflection Film (AF)

[Preparation of Coating Liquid for Hard-Coat Layer]
750.0 parts by weight of trimethylolpropane triacrylate (TNWTA, manufactured by Nippon Kayaku Co.), 270.0 parts by weight of poly(glycidyl methacrylate) of a weight-averaged molecular weight of 3,000, 730.0 parts by weight of methyl ethyl ketone, 500.0 parts by weight of cyclohexanone and 50.0 parts by weight of a photopolymerization initiator (Irgacure 184, manufactured by Nippon Ciba-Geigy Ltd.) were added, agitated and filtered by a polypropylene filter of a pore size of 0.4 μm to obtain a coating liquid for a hard-coat layer.

[Preparation of Titanium Dioxide Particle Dispersion A]
As the titanium dioxide particles, there were employed titanium dioxide particles containing cobalt and subjected to a surface treatment with aluminum hydroxide and zirconium hydroxide (MPT-129C, manufactured by Ishihara Sangyo Co.).

To 257.1 parts by weight of these particles, 38.6 parts by weight of a following dispersant, and 704.3 parts by weight of cyclohexanone were added and dispersed in a Dyno mill to obtain a titanium dioxide dispersion A with a weight-averaged particle size of 70 nm.

dispersant

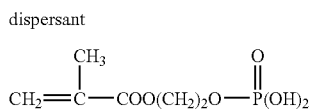

[Preparation of Coating Liquid for Middle-Refractive Index Layer]
88.9 parts by weight of an aforementioned titanium dioxide dispersion, 58.4 parts by weight of a mixture of dipentaerythritol pentaacrylate and dipentaerythritol hexaacrylate (DPHA®), 3.1 parts by weight of Irgacure 907, 1.1 parts by weight of Kayacure DETX (manufactured by Nippon Kayaku Co.), 482.4 parts by weight of methyl ethyl ketone, and 1869.8 parts by weight of cyclohexanone were agitated and filtered with a polypropylene filter of a pore size of 0.4 μm to obtain a coating liquid for a middle-refractive index layer.

[Preparation of Coating Liquid for High-Refractive Index Layer]
586.8 parts by weight of the aforementioned titanium dioxide dispersion, 47.9 parts by weight of DPHA®, 4.0 parts by weight of Irgacure 907, 1.3 parts by weight of Kayacure DETX, 455.8 parts by weight of methyl ethyl ketone, and 1427.8 parts by weight of cyclohexanone were agitated and filtered with a polypropylene filter of a pore size of 0.4 μm to obtain a coating liquid for a high-refractive index layer.

[Preparation of Coating Liquid for Low-Refractive Index Layer]
1.4 parts by weight of DPHA®, 5.6 parts by weight of a fluorine-containing polymer (PF-1) of following structure, 20.0 parts by weight of hollow silica (average particle size: 40 nm, shell thickness: 7 nm, refractive index: 1.31, 18 weight % in isopropanol) as hollow particles, 0.7 parts by weight of reactive silicone "RMS-033" (manufactured by Gelest Inc.), 6.2 parts by weight of following sol liquid a, 0.2 parts by weight of Irgacure 907, and 315.9 parts by weight of methyl ethyl ketone were agitated and filtered by a polypropylene filter of a pore size of 1 μm to obtain a coating liquid for a low-refractive index layer.

fluorine-containing polymer (PF-1)

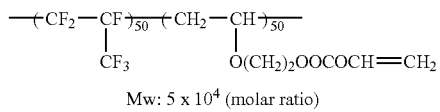

Mw: $5 \times 10^4$ (molar ratio)

[Preparation of Sol Liquid a]
In a reactor equipped with an agitator and a reflux condenser, 120 parts of methyl ethyl ketone, 100 parts of acryloyloxypropyl trimethoxysilane (KBM-5103, manufactured by Shin-Etsu Chemical Co.) and 3 parts of diisopropylaluminum ethyl acetacetate were mixed, then 30 parts of ion-exchanged water were added and the mixture was reacted for 4 hours at 60° C. and cooled to the room temperature to obtain a sol liquid. It had a weight-averaged molecular weight of 1,600, and, among components equal to or larger than oligomers, components with a molecular weight of 1,000 to 20,000 represented 100%. Also a gas chromatography analysis indicated that the acryloyloxypropyl trimethoxysilane employed as the raw material did not remain at all.

[Preparation of Antireflection Film (AF-1)]

On a cellulose triacetate film of a thickness of 80 μm (TAC-TD80U, manufactured by Fuji Photo Film Co., Ltd., refractive index: 1.48), the coating liquid for the hard-coat layer was coated with a gravure coater. After a drying at 100° C., it was irradiated with an ultraviolet light of an illumination intensity of 400 mW/cm² and an illumination amount of 300 mJ/cm² utilizing an air-cooled metal halide lamp of 160 W/cm (manufactured by Eyegraphics Co.) under nitrogen purging so as to obtain an atmosphere with an oxygen concentration of 1.0 vol. % or less to harden the coated layer, thereby obtaining a hard-coat layer of a thickness of 8 μm. On the obtained hard-coat layer, the coating liquid for the middle-refractive index layer, the coating liquid for the high-refractive index layer and the coating liquid for the low-refractive index layer were coated in continuation with a gravure coater having three coating stations.

The drying conditions for the middle-refractive index layer were 2 minutes at 100° C., and the ultraviolet curing conditions were an illumination intensity of 400 mW/cm² and an illumination amount of 400 mJ/cm² utilizing an air-cooled metal halide lamp of 180 W/cm (manufactured by Eyegraphics Co.) under nitrogen purging to obtain an oxygen concentration of 1.0 vol. % or less. The middle-refractive index layer after curing had a refractive index of 1.630 and a thickness of 67 nm.

The drying conditions for the high-refractive index layer were 1 minute at 90° C. and 1 minute at 100° C., and the ultraviolet curing conditions were an illumination intensity of 600 mW/cm² and an illumination amount of 600 mJ/cm² utilizing an air-cooled metal halide lamp of 240 W/cm (manufactured by Eyegraphics Co.) under nitrogen purging to obtain an oxygen concentration of 1.0 vol. % or less. The high-refractive index layer after curing had a refractive index of 1.905 and a thickness of 107 nm.

On the high-refractive index layer, the coating liquid for the low-refractive index layer was coated, utilizing a microgravure roll of a diameter of 50 mm having a gravure pattern of lines of 180 line/inch and a depth of 40 μm and a doctor blade, under conditions of a gravure roll revolution of 30 rpm and a transporting speed of 15 m/min, then dried for 150 seconds at 120° C., further for 8 minutes at 140° C. and irradiated with an ultraviolet light of an illumination intensity of 400 mW/cm² and an illumination amount of 900 mJ/cm² utilizing an air-cooled metal halide lamp of 240 W/cm (manufactured by Eyegraphics Co.) under nitrogen purging to form a low-refractive index layer (AL-1) of a thickness of 100 nm, thereby obtaining an antireflection film.

[Preparation of Comparative Antireflection Film (AFR)]

antireflections films (AFR-1)-(AFR-3) of Comparative Examples D1-1-D1-3 were prepared in the same manner as in Example D-1, except that the hollow particles in the low-refractive index layer in the antireflection film (AF-1) of Example D-1 were changed as shown in Table 27 for obtaining low-refractive index layers (ALR-1)-(ALR-3).

TABLE 27

| | | Low-refractive index layer | | | |
|---|---|---|---|---|---|
| | | Hollow particles | | | layer |
| Antireflection film No. | Layer No. | average particle size/shell thickness | ratio to layer thickness | layer thickness | refractive index |
| AF-1 | AL-1 | 40 nm/7 nm | 40% | 100 nm | 1.43 |
| AFR-1 | ALR-1 | hollow particles absent | — | 100 nm | 1.46 |
| AFR-2 | ALR-2 | 25 nm/4 nm | 25% | 100 nm | 1.43 |
| AFR-3 | ALR-3 | 105 nm/18 nm | 105% | 100 nm | 1.43 |

[Evaluation of Antireflection Film]

The obtained antireflection film was evaluated for following items. Results are shown in Table 28.

(Haze)

A haze was measured with a haze meter (model 1001DP, manufactured by Nippon Denshoku Kogyo Co.). Measurement was made on 5 points on each film sample and an average value was calculated.

(Average Reflectivity)

A spectral reflectivity at an incident angle of 5° and an exit angle of −5° C. was measured within a wavelength range of 380-780 nm with a spectrophotometer V-550 equipped with an adaptor ARV-474 (manufactured by Jasco Corp.), and The antireflection property was evaluated by calculating an average reflectivity of 450-650 nm.

(Surface Energy)

As an index for a surface stain resistance (fingerprint resistance), a surface energy was measured in the aforementioned method after a sample was conditioned for 2 hours at 25° C. and 60% RH.

(Dynamic Friction Coefficient)

A dynamic friction coefficient was used for evaluating a surface lubrication. The dynamic friction coefficient was measured with a dynamic friction meter Heidon-14 (manufactured by Shinto Kagaku Co.), utilizing a stainless steel ball of a diameter of 5 mm and under a load of 100 g and a speed of 60 cm/min, after a sample was conditioned for 2 hours at 25° C. and 60% RH.

(Sharpness)

A sample placed between two polarizing plates in a cross Nichol arrangement was visually observed for an unevenness in the transmitted light:
A: Unevenness not generated at all (a level not recognized by any of 10 evaluators);
B: Unevenness generated weakly (a level recognized by 1 to 5 in 10 evaluators);
C: Unevenness generated strongly (a level recognized by 6 or more in 10 evaluators).

(Hue Uniformity)

A mirror surface reflectivity at an incident angle of 5° and an exit angle of −5° in a wavelength range of 380-780 nm was measured by a spectrophotometer V-550 (manufactured by Jasco Corp.) mounted with an adaptor ARV-474, then the reflective spectrum measured in the wavelength range of 450-650 nm was used to calculate L*, a* and b* values of a CIE1976 L*a*b* color space representing the hue of a normal reflected light for a 5° incident angle of a CIE standard light source D65, for evaluating the hue of the reflected light.

A film of a length of 1 m was taken as a sample, and the measurement was conducted at 3 points at the center and at both ends in the longitudinal and transversal directions of the roll. Samples were taken from a front end portion, a central portion and an end portion of a coated roll. Each value indicates a center value of these measuring points, and a change rate is obtained by dividing a difference of a maximum value and a minimum value with the center value and is represented by %. Evaluation was made in following four levels:
A: change rate 10% or less;
B: change rate exceeding 10% but less than 20%;
C: change rate 21% or higher.

TABLE 28

| Antireflection film No. | Haze/ reflectivity (%/%) | Surface energy (mN/m) | Dynamic friction coefficient | Sharpness | Hue uniformity |
|---|---|---|---|---|---|
| AF-1 | 0.31/0.40 | 25 | 0.12 | A | A |
| AFR-1 | 0.31/0.56 | 25 | 0.12 | B | A |
| AFR-2 | 0.30/0.49 | 25 | 0.12 | C | B |
| AFR-3 | 0.39/0.42 | 26 | 0.21 | C | C |

The antireflection film (AF-1) corresponding to Example D-1 of the invention showed a low reflectivity, and had a film surface with a low surface energy with an excellent water repellency. Also it showed a high image sharpness, a hue close to neutral with satisfactory uniformity. A comparative antireflection film (AFR-1) was inferior in the image sharpness. A comparative antireflection film (AFR-2) was inferior in the image sharpness and the hue. A comparative antireflection film (AFR-3) was insufficient in both the image sharpness and the hue.

[Surface Treatment of Antireflection Film (AF)]

In each of the antireflection films (AF-1) and (AFR-1)-(AFR-3), a cellulose acetate film surface opposite to the antireflection film was passed under an induction heated roll of a temperature of 60° C. to heat the film surface to 40° C., then coated with an alkaline solution (S-1) of a following composition by a rod coater with a coating amount of 12 cc/m², then made to stay for 15 seconds under a steam-type far infrared heater (manufactured by Noritake Co.) heated at 110° C. and further coated with purified water by a similar rod coater with a coating amount of 3 cc/m². The film temperature in this operation was 40° C. Then the film was subjected to a rinsing with water by a fountain coater and a water squeezing with an air knife in three repeated cycles and dried by staying in a drying zone of 70° C. for 5 seconds.

Composition of Alkaline Solution (S-1)

| | |
|---|---|
| potassium hydroxide | 8.55 weight % |
| water | 23.235 weight % |
| isopropanol | 54.20 weight % |
| surfactant K-1: $C_{14}H_{29}O(CH_2CH_2O)_{20}$ | 1.0 weight % |
| propylene glycol | 13.0 weight % |

-continued

| | |
|---|---|
| defoamer Surfinol DF110D (manufactured by Nisshin Chemical Industries) | 0.015 weight % |

An obtained saponified surface of each film had a contact angle with water within a range of 34 to 35°, and a surface energy within a range of 62 to 63 mN/m.

<Preparation of Polarizing Plate with Antireflection Film>
[Polarizing Plate (H-1) of Invention and Polarizing Plate (P-1)]

A PVA film of an average polymerization degree of 2,400 and a thickness of 105 nm was subjected to a preliminary swelling in ion-exchanged water of 40° C. for 60 seconds, then, after water on the surface being scraped off with a stainless steel blade, was immersed in an aqueous solution containing iodine at 0.7 g/L, potassium iodide at 60.0 g/L and boric acid at 5.0 g/L for 55 seconds at 40° C. under a concentration adjustment so as to maintain a constant concentration, then in an aqueous solution containing boric acid at 42.5 g/L and potassium iodide at 30 g/L for 90 seconds at 40° C. under a concentration adjustment so as to maintain a constant concentration, and, after elimination of excessive liquid on both surfaces by scraping with stainless steel blades, introduced into a tenter machine of a form shown in FIG. 7. After 100 m of the film were extended 5 times in an atmosphere of 60° C., 95% RH under a transporting speed of 4 m/min, the tenter was bent with respect to the extending direction as shown in FIG. 7, and the width was thereafter maintained constant. The film was dried in an atmosphere of 70° C. under shrinking and was detached from the tenter to obtain a polarizing sheet (H-1). The polarizing sheet (H-1) had a thickness of 19 μm and a moisture content of 2.5 weight %.

At the stretching operation for preparing the antireflection film, the temperature was maintained in a variation range of 55±0.2° C. and the humidity was maintained in a range of 95±1%. The PVA film had a water content of 32 vol. % prior to the start of extension and 2.5 weight % after drying.

Tenter clips (holding units) at left and right for the PVA film had a difference in transporting speed less than 0.05%, and a center line of the introduced film and a center line of the film advanced to a next step formed an angle of 46°. There were maintained conditions of |L1−L2| of 0.7 m and W of 0.7 m, so that |L1−L2|=W. A substantial extending direction Ax-Cx at the exit of the tenter was inclined by 45° with respect to the center line 22 of the film advanced to the next step. At the exit of the tenter, wrinkles or a film deformations were not observed.

Then, after lateral edges were cut off by 3 cm with cutters, the polarizing sheet was adhered at a surface thereof, utilizing a 3% aqueous solution of PVA (PVA-124H, manufactured by Kuraray Co.) as an adhesive, to a saponified cellulose acylate film surface of the cellulose acylate film coated with the antireflection film (AF-1), opposite to the antireflection film, also adhered at the other surface to a similarly saponified surface of a cellulose acetate film same as that used for forming the antireflection film, and heated for 10 minutes at 70° C. to obtain a polarizing plate (P-1) with an antireflection film of roll form of an effective width of 650 mm and a length of 100 m.

The obtained polarizing plate had an absorbing axis inclined by 45° to the machine direction.

[Comparative Polarizing Sheet (HR-1) and Comparative Polarizing Plate (PR-1)]

A PVA film of an average polymerization degree of 2,400 and a thickness of 132 nm was subjected to a preliminary swelling in ion-exchanged water of 15° C. for 48 seconds, then, after water on the surface being scraped off with a stainless steel blade, was immersed in an aqueous solution containing iodine at 0.9 g/L, and potassium iodide at 60.0 g/L for 55 seconds at 40° C. under a concentration adjustment so as to maintain a constant concentration, then in an aqueous solution containing boric acid at 42.5 g/L and potassium iodide at 30 g/L for 90 seconds at 40° C. under a concentration adjustment so as to maintain a constant concentration, and, after elimination of excessive liquid on both surfaces by scraping with stainless steel blades, introduced into a tenter machine of a form shown in FIG. 1. After 100 m of the film were extended 4.12 times in an atmosphere of 60° C., 95% RH under a transporting speed of 4 m/min, the tenter was bent with respect to the extending direction as shown in FIG. 1, and the width was thereafter maintained constant. The film was dried in an atmosphere of 75° C. under shrinking and was detached from the tenter to obtain a comparative polarizing sheet (HR-1). The polarizing sheet had a thickness of 29 μm and a moisture content of 2.5 weight %. The extending process was conducted in same conditions as in Example D-1.

Then, after lateral edges were cut off by 3 cm with cutters, the polarizing sheet was adhered to a Fujitac film (cellulose triacetate, retardation: 3.0 nm, thickness: 80 μm, manufactured by Fuji Photo Film Co.) subjected to a saponification as described above, utilizing a 3% aqueous solution of PVA (PVA-124H, manufactured by Kuraray Co.) as an adhesive, and heat for 10 minutes at 70° C. to obtain a comparative polarizing plate PR-1 of an effective width of 650 mm and a length of 100 m in a roll form.

The polarizing sheet (H) was subjected to measurements of a transmittance in a single plate and a polarization degree by a Shimadzu self-recording spectrophotometer UV3100.

The polarization degree was determined from a following equation (22), in which H0(%) indicates a transmittance when two polarizing plates are superposed with absorbing axes in a matching state and H1(%) indicates a transmittance when two polarizing plates are superposed with absorbing axes in a mutually orthogonal state, $$\text{polarization degree} = [(H0-H1)/(H0+H1)]^{1/2} \times 100 \quad \text{Equation (22):}$$

The transmittance in single plate and the polarization degree were corrected for visual sensitivity and results are shown in Table 29.

Comparative Examples D2-1-D2-3

Other Comparative Polarizing Plates with Antireflection Film

Comparative polarizing plates with antireflection film (PR-1)-(PR-3) were prepared in the same manner as in Example D-1, except that the antireflection film (AF-1) in the polarizing plate (P-1) with antireflection film of Example D-1 was replaced by any of comparative antireflection films (AFR-1)-(AFR-3). Employed combinations are shown in Table 30.

TABLE 30

|  | Polarizing plate No. | Polarizing sheet No. | Antireflection film No. |
|---|---|---|---|
| Example D-1 | P-1 | H-1 | AF-1 |
| Comp. Ex. D2-1 | PR-1 | H-1 | AFR-1 |
| Comp. Ex. D2-2 | PR-2 | H-1 | AFR-2 |
| Comp. Ex. D2-3 | PR-3 | H-1 | AFR-3 |

[Performance of Polarizing Plate with Antireflection Film]

Each of obtained polarizing plates was evaluated on following performances, and results are shown in Table 31.

(Pencil Hardness Test)

As an index for scratch resistance, a pencil hardness evaluation according to JIS K-5400 was executed. A polarizing plate with antireflection film was conditions for 2 hours at a temperature 25° C. and a humidity of 60% RH, and was tested in 5 spots on the surface of the antireflection film with a 3H testing pencil defined in JIS S-6006 under a load of 1 kg, and results were visually evaluated in following levels:
A: no scratches observed at all spots;
B: 1 or 2 scratches;
C: 3 or more scratches.

(Adhesion Property)

A cellulose acylate film was subjected to a humidity conditioning for 2 hours under conditions of a temperature of 25° C. and a humidity of 60% RH. Then, on a surface of the antireflection film of the cellulose acylate film, eleven notches were made with a cutter knife in longitudinal and lateral directions to form 100 squares, then an adhesion test with a polyester adhesive tape (No. 31B, manufactured by Nitto Denko Co.) was repeated three times in a same position and a peeling level was visually inspected and evaluated in following four levels:
AA: no peeling observed in all 100 squares;
A: peeling observed in 2 or less among 100 squares;
B: peeling observed in 3 to 10 among 100 squares;
C: peeling observed in more than 10 among 100 squares.

(Steel Wool Scratch Resistance)

TABLE 29

| | polarizing sheet preparation step | | | | | polarizing plate proper | | | transmittance at cross Nichol | |
|---|---|---|---|---|---|---|---|---|---|---|
| | polarizing sheet | boric acid in dyeing solution | drying temp. | film thickness (μm) | single plate transmittance (%) | antireflection film No. | polarizing plate No. | polarization degree (%) | 700 nm transmission (%) | 410 nm transmission (%) |
| Ex. D-1 | H-1 | present | 70° C. | 19 | 43.0 | AF-1 | P-1 | 99.97 | 0.08 | 0.07 |
| Comp Ex. D-1 | HR-1 | absent | 75° C. | 29 | 43.4 | Fuji-tac* | PR-1 | 99.9 | 0.34 | 0.31 |

*transparent protective film

On the antireflection film before and after the exposure, scratches after moving #0000 steel wool in 60 reciprocating cycles under a load of 500 g/cm² were observed visually and evaluated in following three levels:
A: no scratches at all;
B: scratches being formed by not easily visible;
C: evident scratches.

(Mirror Surface Reflectivity and Hue Uniformity)

A mirror surface reflectivity at an incident angle of 5° and an exit angle of −5° in a wavelength range of 380-780 nm was measured by a spectrophotometer V-550 (manufactured by Jasco Corp.) mounted with an adaptor ARV-474, then the reflective spectrum measured in the wavelength range of 450-650 nm was used to calculate L*, a* and b* values of a CIE1976 L*a*b* color space representing the hue of a normal reflected light for a 5° incident angle of a CIE standard light source D65, and the hue of the reflected light was evaluated by the a* and b* values.

The measurement was conducted at 3 points in the machine direction of a roll (a front end portion, a central portion and an end portion of a coated roll) and 3 points in the transversal direction in each of such 3 points, namely in 9 points in total.

In each film, the a* values and b* values were respectively averaged to obtain center values. A difference of a maximum value and a minimum value of each of the a* values or b* values was divided by the center value and multiplied by 100 to obtain a hue change rate. The change rate was evaluated in following four levels. A larger one of the change rates for the a* values and the b* values was used for evaluation:

AA: 0-8%;
A: 8-20%;
B: 20-30%;
C: 30% or higher.

(Evaluation of Weather Resistance)

A weather resistance test was conducted with a sunshine weather meter (S-80, manufactured by Suga Shiken-ki Co.) for an exposure time of 200 hours at a humidity of 50%.

On a sample after the weather resistance test, a mirror surface reflectivity and a reflection spectrum for an incident light of an inclination angle of 5° were measured in the same manner as described before, then a hue of the reflected light was calculated in a CIE chromaticity chart within a wavelength range of 380-780 nm, and a comparison was made with the mirror surface reflectivity and the hue before the weather resistance test to determine changes in the mirror surface reflectivity and the hue between before and after the weather resistance test. As to the change in the hue, on the chromaticity chart, a distance ΔE from a center point to a hue point of each sample is determined, and a difference in ΔE between before and after the weather resistance test was evaluated in following four levels:

AA: ΔE being 5 or less;
A: ΔE being 5-10;
B: ΔE being 10-15;
C: ΔE being 15 or more.

(Change Rate On optical Transmittance and Polarization Degree)

A polarizing plate with antireflection film was let to stand for 500 hours in an atmosphere of 60° C. and 90% RH, and changes in the optical transmittance and the polarization degree were determined by a comparison with a sample before standing.

change rate (%)=[(value before standing−value after standing)/value before standing]×100

Level of change was evaluated in following criteria:

|  | change rate in optical transmittance | change rate in polarization degree |
|---|---|---|
| AA: | less than 2% | less than 1% |
| A: | 2% or larger but less than 3% | 1% or larger but less than 3% |
| C: | 3% or more | 3% or more |

(Dimensional Change Rate)

A polarizing plate with antireflection film was cut into a size of 50×50 mm and heated for 120 hours at 70° C. A dimension (La) of the test piece before heating and a dimension (Lb) after heating were measured in the directions of an absorbing axis (MD) and a polarizing axis (TD), and a dimensional change rate (%) was determined according to the following equation:

dimensional change rate=[($La-Lb$)/$Lb$]×100.

TABLE 31

|  | Polarizing plate No. | Pencil hardness | Adhesion | Scratch resistance | Hue uniformity | Weather resistance | Transmittance change rate | Polarization change rate | Dimensional change rate (%) MD direction | Dimensional change rate (%) TD direction |
|---|---|---|---|---|---|---|---|---|---|---|
| Example D-1 | P-1 | A | A | A | A | AA | AA | AA | −0.55 | −0.56 |
| Comp. Ex. D2-1 | PR-1 | A | C | B | A | A | AA | AA | −0.55 | −0.56 |
| Comp. Ex. D2-2 | PR-2 | B | A | C | B | A | AA | AA | −0.56 | −0.55 |
| Comp. Ex. D2-3 | PR-3 | C | C | C | C | B | AA | AA | −0.56 | −0.57 |

The polarizing plate with antireflection film of Example D-1 showed satisfactory performance in mechanical and optical film properties and in durability. Samples of Comparative Examples D2-1-D2-3 were inferior in the mechanical film properties and the antireflection property.

Example D-11

Liquid Crystal Display Device

[Polarizing Plate at Observing Side]

An optical compensation film (Wide View Film A 12B, manufactured by Fuji Photo Film Co.) having an optical compensation layer, in which a disc face of a discotic structural unit is inclined to the surface of a substrate and an angle between the disc face of the discotic structural unit and the surface of the substrate varies with a depth in an optical anisotropic layer, was subjected to a saponification process in conditions similar to those described above, on a surface of the substrate opposite to the optical compensation layer.

A cellulose triacetate film surface of the polarizing plate with antireflection film, opposite to the antireflection film, was similarly subjected to an alkali saponification. The saponified cellulose triacetate film surfaces of the optical compensation film and the polarizing plate with antireflection film were mutually adhered, utilizing a polyvinyl alcohol-based adhesive, thereby preparing a polarizing plate of the observing side (SHB-1).

[Polarizing Plate at Rear Side]

A cellulose triacetate film (Fujitac TAC-TD80U) was employed as protective films on both sides of the aforementioned polarizing sheet (H-1), and was subjected on a side to an alkali saponification treatment as explained before, and the treated surface was adhered with a polyvinyl alcohol-based adhesive to the polarizing sheet (H-1) to obtain a polarizing plate. Then a cellulose triacetate film surface at a side of the polarizing plate and a surface of an optical compensation film (Wide View film A 12B), opposite to an optical compensation layer thereof, were similarly subjected to an alkali saponification treatment. Then the saponified surfaces were mutually adhered with a polyvinyl alcohol-based adhesive to obtain a rear-side polarizing plate (BHB-1).

[TN Mode Liquid Crystal Display Device]

In a 20-inch TN-mode liquid crystal display device (TH-20TA3, manufactured by Matsushita Electric Co.), a polarizing plate at the viewing side was replaced by a viewing-side polarizing plate (SHB-1) of the invention, which was adhered with an acrylic adhesive at the observing side in such a manner that the optical anisotropic layer was positioned at the side of a liquid crystal cell. Also at a backlight side, the backlight-side polarizing plate (BHB-1) was adhered with an adhesive in such a manner that the optical anisotropic layer was positioned at the side of the liquid crystal cell. A transmission axis of the polarizing plate at the observing side and a transmission axis of the polarizing plate at the backlight side were so positioned as to constitute an O-mode.

Comparative Examples D11-1-D11-3

TN-mode liquid crystal display devices were prepared in the same manner as in Example D11, except that the viewing-side polarizing plate (SHB-1), utilizing the polarizing plate with antireflection film (P-1) of the invention, was replaced by viewing-side polarizing plates (SHB-R1)-(SHB-R3) utilizing comparative polarizing plates with antireflection film (PR-1)-(PR-3).

[Image Display Performance of Liquid Crystal Display Device]

Image display performance was evaluated on following items on each of the aforementioned liquid crystal display devices. Results are shown in Table 32.

(Evaluation of Unevenness in Displayed Image)

An image display unevenness in a black display (L1) was visually observed, utilizing a measuring instrument (EZ-Contrast 160D, manufactured by ELDIM Ltd.):

A: Unevenness not generated at all (a level not recognized by any of 10 evaluators);
B: Unevenness generated weakly (a level recognized by 1 to 5 in 10 evaluators);
C: Unevenness generated strongly (a level recognized by 6 or more in 10 evaluators).

(Evaluation of Reflection of External Light)

Reflection of external light was evaluated, utilizing a fluorescent light, in following four levels in visual observation:
AA: Change of reflection present but not annoying at all;
A: Change of reflection present but scarcely annoying;
B: Change of reflection annoying but permissible;
C: Change of reflection annoying.

(Evaluation of Hue of Black Display)

A hue change in a black display (L1) was visually observed, utilizing a measuring instrument (EZ-Contrast 160D, manufactured by ELDIM Ltd.):
AA: Not recognizable at all (a level not recognized by any of 10 evaluators);
A: Slightly recognizable (a level recognized by 1-2 of 10 evaluators);
B: Weakly recognizable (a level recognized by 3-5 of 10 evaluators);
C: Strongly recognizable (a level recognized by 6 or more of 10 evaluators).

(Contrast and Viewing Angle)

A white display voltage of 2V and a black display voltage of 6 V were applied to a liquid crystal cell of a liquid crystal display device, and a contrast ratio and a viewing angle (an angular range in which a contrast ratio became 10 or higher) in a lateral direction (perpendicular to the rubbing direction of the cell) were investigated with a measuring instrument (EZ-Contrast 160D, manufactured by ELDIM Ltd.):
AA: changes not annoying at all;
A: changes present but scarcely annoying;
B: changes annoying but permissible;
C: changes annoying.

(Change in Hue)

A level of change in the hue within a viewing angle from front to 60° was visually observed with an instrument same as in the evaluation of "Contrast and viewing angle" and evaluated in following criteria:
AA: change not annoying at all;
A: change present but scarcely annoying;
B: change annoying but permissible;
C: change annoying.

Image quality of the displayed image was evaluated in the aforementioned methods on the display apparatuses of Examples D11 and Comparative Examples D11-1-D11-3. Results are shown in Table 32.

TABLE 32

| | Viewing-side polarizing plate | Polarizing plate with antireflection film | Image unevenness | External light reflection | Hue of black display | Contrast | Viewing angle | Hue change |
|---|---|---|---|---|---|---|---|---|
| Example D-11 | SHB-1 | P-1 | A | A | A | A | A | A |
| Comp. Ex. D11-1 | SHB-R1 | P-R1 | A | C | A | B | A | A |
| Comp. Ex. D11-2 | SHB-R2 | P-R2 | B | B | A | B | A | B–A |
| Comp. Ex. D11-3 | SHB-R3 | P-R3 | B | C | B | B | B | B |

Example D-11 showed a satisfactory image display without unevenness over the entire displayed image, and displayed a bright image of satisfactory neutrality with little change in hue and tone of black display. Comparative Example D11-1 was inferior in the external light reflection and was insufficient in the contrast. Comparative Examples D11-2 and D11-3 were inferior in the image unevenness, external light reflection, contrast and hue change. Also an unevenness in brightness was generated to result in an insufficient uniformity of the displayed image.

Thus the invention alone was capable of displaying a bright and sharp image.

Examples D-12-D-13

Polarizing plates with antireflection film (P-2)-(P-3) were prepared in the same manner as in Example D-1 except that, in Examples D-1 and D-11, the low-refractive index layer (AL-1) in the antireflection film of the polarizing plate with antireflection film (P-1) was replaced by following low-refractive index layers. Then these polarizing plates (P) were used for preparing viewing-side polarizing plates as in Example D-11, and were equipped in liquid crystal display devices. These combinations are shown in Table 33.

(Low-Refractive Index Layer AL-2)

130 parts by weight of a thermally crosslinkable fluorine-containing polymer of a refractive index 1.42 (JTA113, solid concentration: 6%, manufactured by JSR Corp.), 5 parts by weight of silica sol (MEK-ST, average particle size: 15 nm, solid content: 30%, manufactured by Nissan Chemical Industries Ltd.), 15 parts by weight of hollow silica (CS60-IPA, average particle size: 60 nm, shell thickness: 10 nm, refractive index: 1.31, 20 weight % dispersion in isopropanol, manufactured by Catalysts & Chemicals Ind. Co.), 6 parts by weight of the aforementioned sol liquid a, 50 parts by weight of methyl ethyl ketone and 60 parts by weight of cyclohexanone were added and mixed, and filtered by a polypropylene filter of a pore size of 1 μm to obtain a coating liquid for a low-refractive index layer AL-2. This coating liquid was used in the same coating conditions as in Example D-1 to form a low refractive index hardened film of a thickness of 100 nm, thereby preparing a polarizing plate (P-2) with antireflection film.

The obtained antireflective polarizing plate had a surface with a surface energy of 21 mN/m and a dynamic friction coefficient of 0.12.

(Low-Refractive Index Layer AL-3)

130 parts by weight of a thermally crosslinkable fluorine-containing polymer of a refractive index 1.42 (JN-7228, solid concentration: 6%, manufactured by JSR Corp.), 3.5 parts by weight of DHPMA, 15 parts by weight of silica sol MEK-ST, 15 parts by weight of hollow silica CS60-IPA, 6 parts by weight of the aforementioned sol liquid a, 3 parts by weight of reactive silicone X22-164C, 50 parts by weight of methyl ethyl ketone and 60 parts by weight of cyclohexanone were added and mixed, and filtered by a polypropylene filter of a pore size of 1 μm to obtain a coating liquid for a low-refractive index layer AL-3. This coating liquid was used in the same coating conditions as in Example D-1 to form a low refractive index hardened film of a thickness of 100 nm, thereby preparing a polarizing plate (P-3) with antireflection film.

The obtained antireflective polarizing plate had a surface with a surface energy of 20 mN/m and a dynamic friction coefficient of 0.11.

[Polarizing Plate at Viewing Side]

Polarizing plates of viewing side (SHB2)-(SHB-3) were prepared in the same manner as in Example D-11 except that, in Example D-11, the polarizing plate with antireflection film (P-1) was replaced by the aforementioned polarizing plates with antireflection film (P-2) and (P-3).

[OCB Mode Liquid Crystal Display Device]

On a glass substrate with an ITO electrode, a polyimide film was provided as an orientation film and was subjected to a rubbing process. Two glass substrates thus obtained were opposed in such a manner that rubbing directions became mutually parallel with a cell gap of 6 μm. A liquid crystal compound of $\Delta n$ of 0.1396 (ZLI1132, manufactured by Merck Inc.) was poured into the cell gap to obtain a bend orientation liquid crystal cell. In a sandwiching manner on the prepared bend orientation cell, an aforementioned polarizing plate (SHB-2 or SHB-3) was adhered with an adhesive to the observing side of the cell in such a manner that the optical compensation sheet was positioned at the side of the liquid crystal cell, while, at the backlight side, a backlight-side polarizing plate (BHB-1) was adhered with an adhesive in such a manner that the optical anisotropic layer was positioned at the side of the liquid crystal cell. A transmission axis of the polarizing plate at the observing side and a transmission axis of the polarizing plate at the backlight side were so positioned as to constitute an O-mode.

TABLE 33

| | Low-refractive index layer | Viewing-side polarizing plate | Rear-side polarizing plate |
|---|---|---|---|
| Example D-12 | AL-2 | SHB-2 | BHB-1 |
| Example D-13 | AL-3 | SHB-3 | BHB-1 |

Performances of Examples D-12 and D-13 were evaluated in the same manner as in Example D-11. Both showed satisfactory results comparable to those in Example D-11.

Example D-14

Preparation of Transparent Protective Film (Preparation of Fine Particle Dispersion (RL-1))

A mixture of following composition and zirconia beads of a diameter of 0.2 mm were wet dispersed in a Dyno mill so as to obtain a volume-averaged particles size of 55 nm. Beads were separated from the obtained dispersion with a nylon cloth of 200 mesh to obtain a particle dispersion (RL-1). A particle size distribution measured on the obtained particle dispersion proved that particles of a size of 300 nm or larger represented 0%.

The volume-averaged particle size was measured with a particle size distribution measuring apparatus LA920 (manufactured by Horiba Mfg. Co.).

Composition of Particle Dispersion (RL-1):

| | |
|---|---|
| hydrophobic silica (Aerosil R812, methyl group modified, primary particle size: 7 nm, manufactured by Nippon Aerosil Co.) | 2.00 parts by weight |
| cellulose triacetate (substitution degree: 2.85, 6-position substitution: 0.90) | 2.00 parts by weight |
| following dispersant (DP-1) | 0.25 parts by weight |
| methylene chloride | 78.70 parts by weight |
| methanol | 14.20 parts by weight |
| 1-butanol | 2.86 parts by weight | dispersant (DP-1):

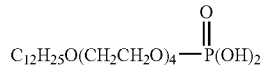

(Preparation of Cellulose Acylate Solution (A-1))

A mixture of following composition was dissolved by agitation to obtain a cellulose acylate solution (A-1).

Composition of Cellulose Acylate Solution (A-1)

| | |
|---|---|
| cellulose triacetate propionate of substitution degree of 2.70 (acetate/propionate = 1/0.4) | 100 parts by weight |
| following plasticizer A (logP 4.18) | 7.1 parts by weight |
| following plasticizer B (logP 1.88) | 3.6 parts by weight |
| following plasticizer C (logP 3.73) | 3.6 parts by weight |
| following UV absorber: UV-1 | 0.5 parts by weight |
| following UV absorber: UV-2 | 0.7 parts by weight |
| methylene chloride | 300 part by weight |
| methanol | 54 parts by weight |
| 1-butanol | 11 parts by weight | plasticizer A

plasticizer B

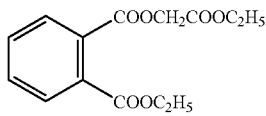

plasticizer C

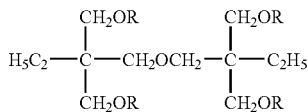

UV-1

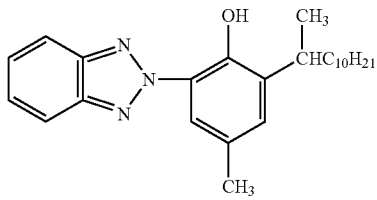

UV-2

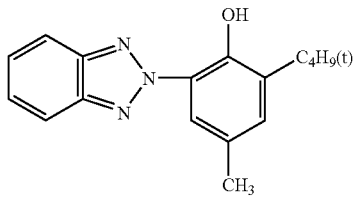

(Preparation of Dope)

In 474 parts by weight of the cellulose acylate solution (A-1), 15.3 parts by weight of the particle dispersion (RL-1) were added under agitation, then the mixture was sufficiently agitated, and let to stand for 3 hours at the room temperature (25° C.), and an obtained inhomogeneous gel-like solution was cooled for 6 hours at −70° C. and heated and agitated at 50° C. to obtain a completely dissolved dope.

The obtained dope was filtered, at 50° C., with a filter paper of an absolute filtering precision of 0.01 mm (#63, manufactured by Toyo Filter Paper Co.), and further subjected to filtration and bubble elimination with a filter paper of an absolute filtering precision of 0.0025 mm (FH025, manufactured by Pall Inc.) to obtain a dope.

(Solution Casting Process)

After the aforementioned preparation of the cellulose acylate solution, the dope obtained therefrom was cast with a band casting machine for a process of preparing a cellulose acylate film from the cellulose acylate solution.

There was employed a metal substrate (casting band) of stainless steel with a width of 2 m and a length of 56 m (area 112 m²). The metal substrate had an arithmetic average roughness (Ra) of 0.006 µm, a maximum height (Ry) of 0.06 µm and a ten-point averaged roughness (Rz) of 0.009 µm. The arithmetic average roughness (Ra), the maximum height (Ry) and the ten-point averaged roughness (Rz) were measured according to JIS B0601.

The cast dope was dried with an air speed of 0.5 m/s or less for 1 second immediately after casting, and was thereafter dried with an air speed of 15 m/s. The drying air had a temperature of 50° C.

A film peeled off from the casting band had a residual solvent amount of 230 weight % and a temperature of −6° C. An average drying speed in a period from the casting to the peeling was 744%/min, and the dope had a gelling temperature of about 10° C. at the time of peeling.

The film was dried for 1 minute after the film surface temperature on the metal substrate reached 40° C., and then peeled off, and the temperature of the drying air was shifted to 120° C. In this state, the film had a temperature distribution in the transversal direction of 5° C. or less, the drying air had an average speed of 5 m/s, a heat transmission coefficient had an average of 25 kcal/m²·Hr·° C., and the film had a distribution of these within 5% in the transversal direction. In a drying zone, a film portion supported by tenter pins is shielded from the drying hot air by an air shield.

Then a process of extending the cellulose acylate film was conducted. The film, in a film state having a residual solvent amount of 15 weight %, was extended at 130° C. in a transversal direction by a tenter with an extending factor of 25%, then maintained at the extended width for 30 seconds at 50° C., then released from clips of the tenter and wound in a roll. Solvent evaporating from the peeling to the winding corresponded to 97 weight % of the initially employed solvent. The dried film was further dried with a drying air of 145° C. in a drying step under transportation by rollers, then subjected to an adjustment of temperature and humidity and wound with a residual solvent amount of 0.32 weight % and a moisture content of 0.8 weight % thereby obtaining a cellulose acylate film (CA-1) (length 3500 m, width 1300 mm, thickness 80 µm, refractive index 1.48). It showed a variation of thickness of ±2.4%, and a curl value of −0.2/m in the transversal direction.

[Surface Irregularities of Film]

Surface irregularities on the surface, at the side of the band, of the obtained cellulose acylate film were measured, and results are shown in Table 34. Table 34 also shows results of evaluations on following optical characteristics and mechanical properties.

[Optical Characteristics of Film]

(Haze)

A haze was measured with a haze meter (model 1001DP, manufactured by Nippon Denshoku Kogyo Co.). Measurement was made on 5 points on each film sample and an average value was calculated.

[Evaluation of Mechanical Properties]

(Curl)

A curl value was measured according to a measuring method defined by American National Standard Institute (ANSI/ASCPH 1.29-1985, Method-A). A polymer film is cut into a size of 35 mm in the transversal direction and 2 mm in the machine direction, and set on a curl plate. A curl value is read after a humidity conditioning in an environment of 25° C., 65% RH for 1 hour. Similarly, a polymer film is cut into a size of 2 mm in the transversal direction and 35 mm in the machine direction, and set on a curl plate. A curl value is read after a humidity conditioning in an environment of 25° C., 65% RH for 1 hour. Measurement was conducted in transversal direction and machine direction, and a larger value was taken as the curl value. The curl value is represented by a reciprocal of a radius of curvature (m).

(Tear Strength)

A sample was prepared by cutting a film into a size of a width of 65 mm and a length of 50 mm, then subjected to a humidity conditioning in a room of a temperature of 30° C. and a relative humidity of 85%, and subjected to a measurement of a load (g) required for tearing, with a light load tear strength tester manufactured by Tokyo Seiki Mfg. Co. and according to the standard of ISO6383/2-1983.

[Film Properties]

(Optical Defect)

A sample was prepared by cutting a film into a size of a width of 1300 mm and a length of 5 m. Two polarizing plates were positioned in a cross Nichol position, and the sample was positioned therebetween and defects in brightness were counted in a visual observation. A number of bright spots having a size of 100 μm or larger was counted and represented as a number per 1 meter.

(Humidity Permeability)

Measurement was conducted according to a method defined in JIS Z0208 in a condition of a temperature 25° C. and a humidity of 90% RH, and the result was converted to a film thickness of 80 μm.

Etsu Chemical Co.) and 0.03 parts by weight of a following fluorine-containing polymer (PF-2) were mixed with 50 parts by weight of toluene to obtain a coating liquid. The aforementioned cellulose acylate film with conductive layer was unwound from a roll and coated with this coating liquid so as to obtain a dry film thickness of 6.0 μm, and, after solvent evaporation, irradiated with an ultraviolet light of an illumination intensity of 400 mW/cm² and an illumination amount of 300 mJ/cm² utilizing an air-cooled metal halide lamp of 160 W/cm (manufactured by Eyegraphics Co.) to harden the coated layer, thereby obtaining an antiglare hard-coat layer (refractive index 1.62).

fluorine-containing polymer (PF-2)

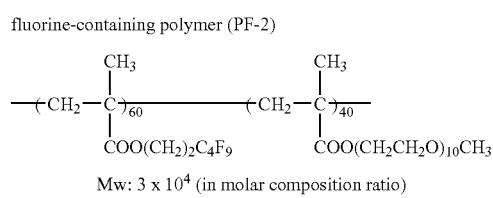

Mw: 3 x 10⁴ (in molar composition ratio)

(Preparation of Antireflection Film (AF-4))

On the antiglare layer, the coating liquid for the low-refractive index layer (AL-1) was coated with a gravure coater. After drying at 80° C., it was irradiated with an ultraviolet light of an illumination intensity of 550 mW/cm² and an illumination amount of 600 mJ/cm² utilizing an air-cooled metal halide lamp of 160 W/cm (manufactured by Eyegraphics Co.) in an atmosphere of an oxygen concentration of 1.0 vol. % or less under nitrogen purging to obtain a low-refractive index layer (refractive index: 1.43, film thickness: 86 nm). In this manner there was produced an antireflection film

TABLE 34

| Film No. | Film thickness (μm) | Thickness variation (%) | Curl | Ra (μm) | Rz (μm) | Haze (%) | Tear strength (g) | Mois-ture permeability* | Optical efect |
|---|---|---|---|---|---|---|---|---|---|
| CA-1 | 80 | ±2.4 | −0.2/m | 0.005 | 0.015 | 0.3 | 12 | 885 | 0.2 | permeability*: converted to 80 μm (unit: g/m² · 24 h)

[Preparation of Antireflection Film (AF-4)]

On the aforementioned cellulose acylate film (CA-1), Pelnox C-4456-S7 (trade name of an ATO-dispersed hard coat agent, solid: 45%, manufactured by Nippon Pelnox Ltd.) was coated, dried and hardened by an ultraviolet irradiation to form a conductive layer of a thickness of 1 μm. The film had a surface resistivity of about 10⁸ Ωg/sq.

The surface resistivity was measured with a resistivity meter MCP-HT260, manufactured by Mitsubishi Chemical Corp., after the sample was let to stand for 1 hour under conditions of 25° C./65% RH.

(Coating Liquid for Antiglare Hard-Coat Layer)

50 parts by weight of a pentaerythritol triacrylate/pentaerythatol tetraacrylate mixture (Peta, manufactured by Nippon Kayaku Co.), 2 parts by weight of a curing initiator (Irgacure 184, manufactured by Ciba-Geigy Inc.), 5 parts by weight of acryl-styrene beads (manufactured by Soken Chemical and Engineering Co., particle size: 3.5 μm, refractive index: 1.55) as the first translucent particles, 5.2 parts by weight of styrene beads (manufactured by Soken Chemical and Engineering Co., particle size: 3.5 μm, refractive index: 1.60) as the second translucent particles, 10 parts by weight of a silane coupling agent KBM-5103 (manufactured by Shin- (AF-4) of the invention. The obtained antireflection film had an average reflectivity of 2.1% and a haze of 43%.

Performances relating to mechanical properties and durability described in Example D-1 were evaluated in the same manner as in Example D-1. Also a sharpness and a hue uniformity in the reflected light were satisfactory as in the antireflection film of Example D-1.

(Surface Treatment)

A 2.0 mol/L aqueous solution of sodium hydroxide was heated to 55° C., and the antireflection film (AF-4) was immersed therein for 2 minutes, then sufficiently rinsed with water and dried, thereby forming a hydrophilic surface on the cellulose acylate film opposite to the antireflection film.

[Optical Compensation Sheet]

The cellulose acylate film (CA-1) was coated, on a surface thereof, with a 1.0 mol/L aqueous solution of potassium hydroxide with a #3 bar, then, after a treatment for 10 seconds at a film surface temperature of 60° C., rinsed with water and dried. The obtained film had a surface showing a contact angle with water of 35° and a surface energy of 66 mN/m.

[Preparation of Orienting Film]

On thus surface treated film, a coating liquid for an orienting film of a following composition was coated by a rod coater with a coating amount of 28 mL/m², and dried for 60 seconds by a drying air of 60° C. and then for 150 seconds by a drying air of 90° C.

Coating Liquid for Orienting Film:

| following denatured polyvinyl alcohol | 20 parts by weight |
| citric acid | 0.05 parts by weight |
| glutaraldehyde | 0.5 parts by weight |
| water | 360 parts by weight |
| methanol | 120 parts by weight |
| denatured polyvinyl alcohol | |

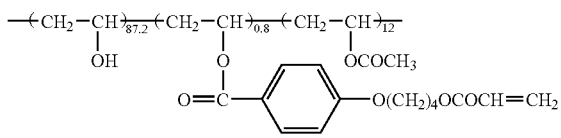

(Rubbing of Orienting Film)

A rubbing process was executed, in an environmental condition of 25° C./45% RH, on the surface of the orienting film in a machine direction of the film and parallel to a transporting direction by a rubbing roll on which a commercially available rubbing cloth was applied.

(Formation of Optical Anisotropic Layer)

On the orienting film, a coating liquid formed by dissolving 41.01 parts by weight of a discotic liquid crystal compound (DA) of a following structure, 4.06 parts by weight of an ethylene oxide-denatured trimethylopropane triacrylate (V#360, manufactured by Osaka Organic Chemical Industries, Ltd.), 0.90 parts by weight of cellulose acetate butyrate (CAB551-0.2, manufactured by Eastman Chemical Ltd.), 0.23 parts by weight of cellulose acetate butyrate (CAB531-1, manufactured by Eastman Chemical Ltd.), 1.35 parts by weight of a photopolymerization initiator (Irgacure 907, manufactured by Ciba-Geigy Ltd.), 0.45 parts by weight of a sensitizer (Kayacure DETX, manufactured by Nippon Kayaku Co.) and 0.40 parts by weight of a fluorinated surfactant (PF-3) of a following structure in 102 parts by weight of methyl ethyl ketone, was coated with a wire bar of #3.4. The discotic liquid crystal compound was oriented by heating for 2 minutes in a constant temperature zone of 130° C., and was then polymerized by a UV irradiation for 1 minute with a high pressure mercury lamp of 120 W/cm in an atmosphere of 60° C. It was then let to cool by standing to the room temperature. In this manner there was prepared an optical anisotropic layer of a thickness of 2.0 μm thereby completing an optical compensation sheet (WV-1).

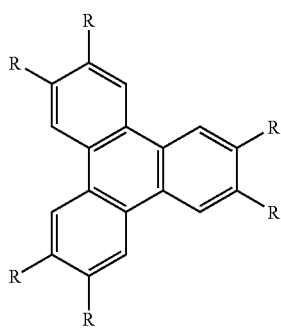

discotic liquid crystal compound (DA)

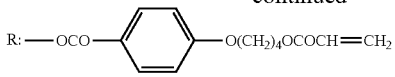

fluorinated surfactant (PF-3): $C_8F_{17}CH_2CH_2O(CH_2CH_2O)_{10}H$ (Surface Treatment)

A film surface, opposite to the optical anisotropic layer, of the obtained optical compensation sheet was subjected to a saponification process in a similar manner as the saponification process for a surface of the antireflection film.

[Polarizing Sheet (H-2) and Polarizing Plate (SHB-4) of Viewing Side]

A PVA film of an average polymerization degree of 2,400 and a thickness of 75 nm was subjected to a preliminary swelling in ion-exchanged water of 40° C. for 60 seconds, then, after water on the film being scraped off with a stainless steel blade, was immersed in an aqueous solution containing iodine at 0.7 g/L, potassium iodide at 60.0 g/L and boric acid at 1 g/L for 55 seconds at 40° C. under a concentration adjustment so as to maintain a constant concentration, then in an aqueous solution containing boric acid at 42.5 g/L, potassium iodide at 30 g/L, C.I. Direct Yellow 44 (λmax 410 nm) at 0.1 g/L and C.I. Direct Blue 1 (λmax 650 nm) at 0.1 g/L for 90 seconds at 40° C. under a concentration adjustment so as to maintain a constant concentration, and, after elimination of excessive liquid on both surfaces by scraping with stainless steel blades, introduced into a tenter machine for a transversal monoaxial extension. After 100 m of the film were extended 4.12 times in an atmosphere of 60° C., 95% RH under a transporting speed of 4 n/min, the film was maintained at a constant width, dried in an atmosphere of 65° C. under shrinking and was detached from the tenter to obtain a polarizing sheet (H-2). The polarizing sheet had a thickness of 17.5 μm and a moisture content of 3 weight %.

Then, after lateral edges were cut off by 3 cm with cutters, a 3% aqueous solution of PVA (PVA-124H, manufactured by Kuraray Co.) was used as an adhesive to adhere a saponified surface of the antireflection film (AF-4) and a saponified surface of the saponified optical compensation sheet, and these were heated for 10 minutes at 70° C. to obtain a viewing-side polarizing plate (SHB-4) an effective width of 650 mm and a length of 100 m.

[Liquid Crystal Display Device]

In a 20-inch IPS-mode liquid crystal display device (W20-1c3000, manufactured by Hitachi Ltd.), an optical film provided therein was replaced by the polarizing plate (SHB-4), which was adhered with an acrylic adhesive at the observing side in such a manner that the optical anisotropic layer was positioned at the side of a liquid crystal cell. Also at the rear side, the polarizing plate (BHB-1) was adhered with an acrylic adhesive in such a manner that the transparent protective film of the polarizing sheet was positioned at the side of a liquid crystal cell.

[Image Display Performance of Liquid Crystal Display Device]

Image quality of a displayed image on the display apparatus of Example D-14 was evaluated in a similar manner as in Example D-11. As a result there was obtained a satisfactorily uniform image without glare, satisfactory in a black display hue, a contrast, a viewing angle and a hue neutrality.

Example D-15

Polarizing Sheet (H-3) and Viewing-Side Polarizing Plate (SHB-5)

A viewing-side polarizing plate (SHB-5) was prepared in the same manner as in the viewing-side polarizing plate (SHB-1) of Example D-11 except that the polarizing sheet (H-1) was replaced by a following polarizing sheet (H-3).

(Polarizing Sheet H-3)

A PVA film of an average polymerization degree of 2,400 and a thickness of 75 nm was subjected to a preliminary swelling in ion-exchanged water of 40° C. for 60 seconds, then, after water on the surface being scraped off with a stainless steel blade, was immersed in an aqueous solution containing iodine at 0.7 g/L, potassium iodide at 60.0 g/L and boric acid at 1 g/L for 55 seconds at 40° C. under a concentration adjustment so as to maintain a constant concentration, then in an aqueous solution containing boric acid at 42.5 g/L and potassium iodide at 30 g/L for 90 seconds at 40° C. under a concentration adjustment so as to maintain a constant concentration, and, after elimination of excessive liquid on both surfaces by scraping with stainless steel blades, introduced into a tenter machine of a form shown in FIG. 1. After 100 m of the film were extended 4.5 times in an atmosphere of 60° C., 95% RH under a transporting speed of 4 m/min, the tenter was bent with respect to the extending direction as shown in FIG. 1, and the width was thereafter maintained constant. The film was dried in an atmosphere of 65° C. under shrinking and was detached from the tenter to obtain a polarizing sheet (H-3). The polarizing sheet (H-3) had a thickness of 16 μm and a moisture content of 3 weight %.

At the stretching operation for preparing the antireflection film, the temperature was maintained in a variation range of 60±0.1° C. and the humidity was maintained in a range of 95±0.5%. The PVA film had a water content of 33 vol. % prior to the start of extension and 3 weight % after drying.

Tenter clips (holding means) at left and right for the PVA film had a difference in transporting speed less than 0.05%, and a center line of the introduced film and a center line of the film advanced to a next step formed an angle of 47°. There were maintained conditions of |L1−L2| of 0.7 m and W of 0.7 m, so that |L1−L2|=W. A substantial extending direction Ax-Cx at the exit of the tenter was inclined by 45° with respect to the center line 22 of the film advanced to the next step. At the exit of the tenter, wrinkles or a film deformations were not observed.

The obtained polarizing plate had an absorption axis inclined by 45° to the machine direction.

[Liquid Crystal Display Device]

In a 22-inch VA-mode liquid crystal display device (TH22-LH10, manufactured by Matsushita Electric Co.), a polarizing plate at the viewing side was replaced by the aforementioned polarizing plate (SHB-5), which was adhered with an acrylic adhesive at the observing side in such a manner that the optical anisotropic layer was positioned at the side of a liquid crystal cell.

Performances of the polarizing plate and the display apparatus thus obtained were evaluated as in Example D-1. Results were satisfactory as in Example D-1.

Example C-16

In the polarizing plate (P-1) with antireflection film on one side prepared in Example C-1, a transparent protective film opposite to the antireflection film was adhered to a %/4 plate, and adhered to a front glass plate of an organic EL display apparatus. As a result, reflections on the glass surface and from the interior of the glass plate were suppressed, and a display of an extremely high visibility with a neutral hue was obtained.

Example E

Example E-1

Preparation of Substrate (Preparation of Fine Particle Dispersion (RL-1))

A mixture of following composition and zirconia beads of a diameter of 0.2 mm were wet dispersed in a Dyno mill so as to obtain a volume-averaged particles size of 55 nm. Beads were separated from the obtained dispersion with a nylon cloth of 200 mesh to obtain a particle dispersion (RL-1).

A particle size distribution measured on the obtained particle dispersion proved that particles of a size of 300 nm or larger represented 0%.

The volume-averaged particle size was measured with a particle size distribution measuring apparatus LA920 (manufactured by Horiba Mfg. Co.).

Composition of Particle Dispersion (RL-1):

| | |
|---|---|
| hydrophobic silica (Aerosil R812, methyl group modified, primary particle size: 7 nm, manufactured by Nippon Aerosil Co.) | 2.00 parts by weight |
| cellulose triacetate (substitution degree: 2.85, 6-position substitution: 0.90) | 2.00 parts by weight |
| following dispersant (DP-2) | 0.25 parts by weight |
| methylene chloride | 78.70 parts by weight |
| methanol | 14.20 parts by weight |
| 1-butanol | 2.86 parts by weight. | dispersant (DP-2)

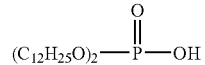

(Preparation of Cellulose Acylate Solution (A-1))

A mixture of following composition was dissolved by agitation to obtain a cellulose acylate solution (A-1).

Composition of Cellulose Acylate Solution (A-1):

| | |
|---|---|
| cellulose triacetate of substitution degree of 2.85 (6-position substitution 0.90) | 89.3 parts by weight |
| triphenyl phosphate (logP 5.60) | 7.1 parts by weight |
| biphenyldiphenyl phosphate (logP 7.28) | 3.6 parts by weight |
| following UV absorber: UV-E1 | 0.5 parts by weight |
| following UV absorber: UV-E2 | 0.7 parts by weight |
| following UV absorber: UV-E3 | 0.8 parts by weight |
| methylene chloride | 300 part by weight |
| methanol | 54 parts by weight |
| 1-butanol | 11 parts by weight |

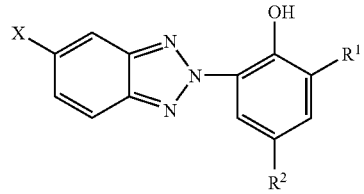

| | X | $R^1$ | $R^2$ |
|---|---|---|---|
| UV-E1: | —Cl | —$C_4H_9$(t) | —$CH_3$ |
| UV-E2: | —Cl | —$C_4H_9$(t) | —$(CH_2)_2COOC_8H_{17}$ |
| UV-E3: | —H | —$C_{12}H_{25}$ | —$CH_3$ |

(Preparation of Dope)

In 474 parts by weight of the cellulose acylate solution (A-1), 15.3 parts by weight of the particle dispersion (RL-1) were added under agitation, then the mixture was sufficiently agitated, and let to stand for 3 hours at the room temperature (25° C.), and an obtained inhomogeneous gel-like solution was cooled for 6 hours at −70° C. and heated and agitated at 50° C. to obtain a completely dissolved dope.

The obtained dope was filtered, at 50° C., with a filter paper of an absolute filtering precision of 0.01 mm (#63, manufactured by Toyo Filter Paper Co.), and further subjected to filtration and bubble elimination with a filter paper of an absolute filtering precision of 0.0025 mm (FH025, manufactured by Pall Inc.) to obtain a dope.

(Solution Casting Process)

After the aforementioned preparation of the cellulose acylate solution, the dope obtained therefrom was cast with a band casting machine for a process of preparing a cellulose acylate film from the cellulose acylate solution.

There was employed a metal substrate (casting band) of stainless steel with a width of 2 m and a length of 56 m (area 112 m$^2$). The metal substrate had an arithmetic average roughness (Ra) of 0.006 μm, a maximum height (Ry) of 0.06 μm and a ten-point averaged roughness (Rz) of 0.009 μm. The arithmetic average roughness (Ra), the maximum height (Ry) and the ten-point averaged roughness (Rz) were measured according to JIS B0601.

The cast dope was dried with an air speed of 0.5 m/s or less for 1 second immediately after casting, and was thereafter dried with an air speed of 15 m/s. The drying air had a temperature of 50° C.

A film peeled off from the casting band had a residual solvent amount of 230 weight % and a temperature of −6° C. An average drying speed in a period from the casting to the peeling was 744%/min, and the dope had a gelling temperature of about 10° C. at the time of peeling.

The film was dried for 1 minute after the film surface temperature on the metal substrate reached 40° C., and then peeled off, and the temperature of the drying air was shifted to 120° C. In this state, the film had a temperature distribution in the transversal direction of 5° C. or less, the drying air had an average speed of 5 m/s, a heat transmission coefficient had an average of 25 kcal/m$^2$·Hr·° C., and the film had a distribution of these within 5% in the transversal direction. In a drying zone, a film portion supported by tenter pins is shielded from the drying hot air by an air shield.

Then a process of extending the cellulose acylate film was conducted. The film, in a film state having a residual solvent amount of 15 weight %, was extended at 130° C. in a transversal direction by a tenter with an extending factor of 25%, then maintained at the extended width for 30 seconds at 50° C., then released from clips of the tenter and wound in a roll. Solvent evaporating from the peeling to the winding corresponded to 97 weight % of the initially employed solvent. The dried film was further dried with a drying air of 145° C. in a drying step under transportation by rollers, then subjected to an adjustment of temperature and humidity and wound with a residual solvent amount of 0.35 weight % and a moisture content of 0.8 weight % thereby obtaining a cellulose acylate film (CA-1) (length 3500 m, width 1300 mm, thickness 80 μm, refractive index 1.48) as a transparent substrate. It showed a variation of thickness of ±2.4%, and a curl value of 0.2/m in the transversal direction.

[Surface Irregularities of Film]

Surface irregularities on the surface, at the side of the band, of the obtained sample CA-1 of the cellulose acylate film were measured, and results are shown in Table 35. Table 35 also shows results of evaluations on following optical characteristics and mechanical properties.

(Optical Characteristics of Film)

Haze

A haze was measured with a haze meter (model 1001DP, manufactured by Nippon Denshoku Kogyo Co.). Measurement was made on 5 points on each film sample and an average value was calculated.

(Evaluation of Mechanical Properties)

Curl

A curl value was measured according to a measuring method defined by American National Standard Institute (ANSI/ASCPH 1.29-1985, Method-A). A polymer film is cut into a size of 35 mm in the transversal direction and 2 mm in the machine direction, and set on a curl plate. A curl value is read after a humidity conditioning in an environment of 25° C., 65% RH for 1 hour. Similarly, a polymer film is cut into a size of 2 mm in the transversal direction and 35 mm in the machine direction, and set on a curl plate. A curl value is read after a humidity conditioning in an environment of 25° C., 65% RH for 1 hour. Measurement was conducted in transversal direction and machine direction, and a larger value was taken as the curl value. The curl value is represented by a reciprocal of a radius of curvature (m).

Tear Strength

A sample was prepared by cutting a film into a size of a width of 65 mm and a length of 50 mm, then subjected to a humidity conditioning in a room of a temperature of 30° C. and a relative humidity of 85%, and subjected to a measurement of a load (g) required for tearing, with a light load tear strength tester manufactured by Tokyo Seiki Mfg. Co. and according to the standard of ISO6383/2-1983.

(Film Properties)

Optical Defect

Two polarizing plates were positioned in a cross Nichol position, and a sample of a width of 1300 mm and a length of 5 m was positioned therebetween and defects in brightness were counted in a visual observation. A number of bright spots having a size of 100 μm or larger was counted and represented as a number per 1 meter.

Humidity Permeability

Measurement was conducted according to a method defined in JIS Z0208 in a condition A of a temperature 25° C. and a humidity of 90% RH.

TABLE 35

| Film No. | Film thickness (μm) | Film Thickness variation (%) | Ra (μm) | Rz (μm) | Haze (%) | Curl/m | Tear strength (g) | Optical defect | Moisture permeability* |
|---|---|---|---|---|---|---|---|---|---|
| CA-1 | 80 | ±2.5 | 0.005 | 0.015 | 0.3 | 0.2/m | 12 | 0.2 | 250 |

<Preparation of Antireflection Film (AF-1)>
(Preparation of Coating Liquid for Hard-Coat Layer)

750.0 parts by weight of trimethylolpropane triacrylate (TMPTA, manufactured by Nippon Kayaku Co.), 270.0 parts by weight of poly(glycidyl methacrylate) of a weight-averaged molecular weight of 3,000, 730.0 parts by weight of methyl ethyl ketone, 500.0 parts by weight of cyclohexanone and 50.0 parts by weight of a photopolymerization initiator (Irgacure 184, manufactured by Nippon Ciba-Geigy Ltd.) were added, agitated and filtered by a polypropylene filter of a pore size of 0.4 μm to obtain a coating liquid for a hard-coat layer.

(Preparation of Titanium Dioxide Particle Dispersion A)

As the titanium dioxide particles, there were employed titanium dioxide particles containing cobalt and subjected to a surface treatment with aluminum hydroxide and zirconium hydroxide (MPT-129, manufactured by Ishihara Sangyo Co.).

To 257.1 parts by weight of these particles, 38.6 parts by weight of a following dispersant, and 704.3 parts by weight of cyclohexanone were added and dispersed in a Dyno mill to obtain a titanium dioxide dispersion A with a weight-averaged particle size of 70 nm.

Dispersant

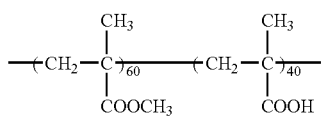

Mw: 1.5 x $10^4$ (in molar composition ratio)

(Preparation of Coating Liquid for Middle-Refractive Index Layer)

88.9 parts by weight of an aforementioned titanium dioxide dispersion A, 58.4 parts by weight of a mixture of dipentaerythritol pentaacrylate and dipentaerythritol hexaacrylate (DPHA®), 3.1 parts by weight of a photopolymerization initiator (Irgacure 907), 1.1 parts by weight of a photosensitizer (Kayacure DETX, manufactured by Nippon Kayaku Co.), 482.4 parts by weight of methyl ethyl ketone, and 1869.8 parts by weight of cyclohexanone were agitated and filtered with a polypropylene filter of a pore size of 0.4 μm to obtain a coating liquid for a middle-refractive index layer.

(Preparation of Coating Liquid for High-Refractive Index Layer)

586.8 parts by weight of the aforementioned titanium dioxide dispersion, 47.9 parts by weight of DPHA, 4.0 parts by weight of Irgacure 907, 1.3 parts by weight of Kayacure DETX, 455.8 parts by weight of methyl ethyl ketone, and 1427.8 parts by weight of cyclohexanone were agitated and filtered with a polypropylene filter of a pore size of 0.4 μm to obtain a coating liquid for a high-refractive index layer.

(Preparation of Coating Liquid for Low-Refractive Index Layer)

1.4 parts by weight of DPHA, 5.6 parts by weight of a fluorine-containing polymer (PF-1) of following structure, 20.0 parts by weight of hollow silica (average particle size: 40 nm, shell thickness: 7 nm, refractive index: 1.31, 18 weight % in isopropanol) as hollow particles, 0.7 parts by weight of reactive silicone "RMS-033" (manufactured by Gelest Inc.), 6.2 parts by weight of following sol liquid a, 0.2 parts by weight of Irgacure 907, and 315.9 parts by weight of methyl ethyl ketone were agitated and filtered by a polypropylene filter of a pore size of 1 μm to obtain a coating liquid for a low-refractive index layer.

fluorine-containing polymer (FP-1)

$$-\!\!\left(\mathrm{CF}_2-\mathrm{CF}\right)_{\!\!50}\!\!-\!\!\left(\mathrm{CH}_2-\mathrm{CH}\right)_{\!\!50}\!\!-$$
$$\quad\quad\quad\;\;|\quad\quad\quad\quad\quad\quad\;\;|$$
$$\quad\quad\quad\;\;\mathrm{CF}_3\quad\quad\quad\quad\mathrm{O(CH_2)_2OCOCH}\!=\!\mathrm{CH}_2$$

Mw: 5 x $10^4$ (molar composition ratio)

(Preparation of Sol Liquid a)

In a reactor equipped with an agitator and a reflux condenser, 120 parts of methyl ethyl ketone, 100 parts of acryloyloxypropyl trimethoxysilane (KBM-5103, manufactured by Shin-Etsu Chemical Co.) and 3 parts of diisopropylaluminum ethyl acetacetate were mixed, then 30 parts of ion-exchanged water were added and the mixture was reacted for 4 hours at 60° C. and cooled to the room temperature to obtain a sol liquid. It had a weight-averaged molecular weight of 1,600, and, among components equal to or larger than oligomers, components with a molecular weight of 1,000 to 20,000 represented 100%. Also a gas chromatography analysis indicated that the acryloyloxypropyl trimethoxysilane employed as the raw material did not remain at all.

(Preparation of Antireflection Film (AF-1))

On the aforementioned cellulose triacetate film of in a roll form, the coating liquid for the hard-coat layer was coated with a gravure coater. After drying at 100° C., it was irradiated with an ultraviolet light of an illumination intensity of 400 mW/cm² and an illumination amount of 300 mJ/cm² utilizing an air-cooled metal halide lamp of 160 W/cm (manufactured by Eyegraphics Co.) under nitrogen purging so as to obtain an atmosphere with an oxygen concentration of 1.0 vol. % or less to harden the coated layer, thereby obtaining a hard-coat layer of a thickness of 8 μm.

On the obtained hard-coat layer, the coating liquid for the middle-refractive index layer, and the coating liquid for the high-refractive index layer were coated in continuation with a gravure coater having three coating stations.

The drying conditions for the middle-refractive index layer were 2 minutes at 100° C., and the ultraviolet curing conditions were an illumination intensity of 400 mW/cm² and an illumination amount of 400 mJ/cm² utilizing an air-cooled metal halide lamp of 180 W/cm (manufactured by Eyegraphics Co.) under nitrogen purging to obtain an oxygen concentration of 1.0 vol. % or less. The middle-refractive index layer after curing had a refractive index of 1.630 and a thickness of 67 μm.

The drying conditions for the high-refractive index layer were 1 minute at 90° C. and 1 minute at 100° C., and the ultraviolet curing conditions were an illumination intensity of 600 mW/cm² and an illumination amount of 600 mJ/cm² utilizing an air-cooled metal halide lamp of 240 W/cm (manufactured by Eyegraphics Co.) under nitrogen purging to obtain an oxygen concentration of 1.0 vol. % or less. The high-refractive index layer after curing had a refractive index of 1.905 and a thickness of 107 nm.

On the high-refractive index layer, the coating liquid for the low-refractive index layer was coated, utilizing a microgravure roll of a diameter of 50 mm having a gravure pattern of lines of 180 line/inch and a depth of 40 μm and a doctor blade, under conditions of a gravure roll revolution of 30 rpm and a transporting speed of 15 m/min, then dried for 150 seconds at 120° C., further for 8 minutes at 140° C. and irradiated with an ultraviolet light of an illumination intensity of 400 mW/cm² and an illumination amount of 900 mJ/cm² utilizing an air-cooled metal halide lamp of 240 W/cm (manufactured by Eyegraphics Co.) under nitrogen purging to form a low-refractive index layer (AL-1) of a thickness of 100 nm, thereby obtaining an antireflection film (AF-1).

Comparative Examples E1-1-E1-3 antireflection films (AFR-1)-(AFR-3) of Comparative Examples E1-1-E1-3 were prepared in the same manner as in Example E-1, except that, in the antireflection film (AF-1) of Example E-1, hollow particles in the low-refractive index layer were changed in an average particle size and a shell thickness as shown in Table 36 so as to maintain a refractive index substantially same as in the hollow silica in Example E-1.

TABLE 36

|  | Antireflection film | Low refractive index layer | Hollow particle particle size/shell thickness | Low-refractive index layer thickness | Thickness ratio of hollow particles | Refractive index of low-refractive index layer |
|---|---|---|---|---|---|---|
| Example E-1 | AF-1 | AL-1 | 40 nm/7 nm | 100 nm | 40% | 1.43 |
| Comp. Ex. E1-1 | AFR-1 | ALR-1 | none | 100 nm | — | 1.46 |
| Comp. Ex. E1-2 | AFR-2 | ALR-2 | 25 nm/4 nm | 100 nm | 25% | 1.43 |
| Comp. Ex. E1-3 | AFR-3 | ALR-3 | 105 nm/18 ns | 100 nm | 105% | 1.43 |

(Evaluation of Antireflection Film)

Each of antireflection films of Example E-1 and Comparative Examples E1-1-E1-3 was evaluated on following performances, and results are shown in Table 37. Haze was evaluated in a similar manner as in the cellulose acylate film.

(1) Pencil Hardness Test

As an index for scratch resistance, a pencil hardness evaluation according to JIS K-5400 was executed. A polarizing plate with antireflection film was conditions for 2 hours at a temperature 25° C. and a humidity of 60% RH, and was tested in 5 spots on the surface of the antireflection film with a 3H testing pencil defined in JIS S-6006 under a load of 1 kg, and results were visually evaluated in following levels:
A: no scratches observed at all spots;
B: 1 or 2 scratches;
C: 3 or more scratches.

(2) Surface Energy

As an index for a surface stain resistance (fingerprint resistance), a surface energy was measured in the aforementioned method after a sample was conditioned for 2 hours at 25° C. and 60% RH.

(3) Dynamic Friction Coefficient

A dynamic friction coefficient was used for evaluating a surface lubrication. The dynamic friction coefficient was measured with a dynamic friction meter Heidon-14 (manufactured by Shinto Kagaku Co.), utilizing a stainless steel ball of a diameter of 5 mm and under a load of 100 g and a speed of 60 cm/min, after a sample was conditioned for 2 hours at 25° C. and 60% RH.

(4) Adhesion Property

An antireflection film was subjected to a humidity conditioning for 2 hours under conditions of a temperature of 25° C. and a humidity of 60% RH. Then, on a surface of the light-diffusing layer of the antireflection film, eleven notches were made with a cutter knife in longitudinal and lateral directions to form 100 squares, then an adhesion test with a polyester adhesive tape (No. 31B, manufactured by Nitto Denko Co.) was repeated three times in a same position and a peeling level was visually inspected and evaluated in following four levels:
AA: no peeling observed in all 100 squares;
A: peeling observed in 2 or less among 100 squares;
B: peeling observed in 3 to 10 among 100 squares;
C: peeling observed in more than 10 among 100 squares.

(5) Steel Wool Scratch Resistance

On the antireflection film before and after the exposure, scratches after moving #0000 steel wool in 60 reciprocating cycles under a load of 500 g/cm² were observed visually and evaluated in following three levels:
A: no scratches at all;
B: scratches being formed by not easily visible;
C: evident scratches.

(6) Hue Uniformity

A mirror surface reflectivity at an incident angle of 5° and an exit angle of −5° in a wavelength range of 380-780 nm was measured by a spectrophotometer V-550 (manufactured by Jasco Corp.) mounted with an adaptor ARV-474, then the reflective spectrum measured in the wavelength range of 450-650 nm was used to calculate L*, a* and b* values of a CIE1976 L*a*b* color space representing the hue of a normal reflected light for a 5° incident angle of a CIE standard light source D65, and the hue of the reflected light was evaluated by the a* and b* values.

A film of a length of 1 m was taken as a sample, and the measurement was conducted at 3 points at the center and at both ends in the longitudinal and transversal directions of the roll. Samples were taken from a front end portion, a central portion and an end portion of a coated roll. Each value indicates a center value of these measuring points, and a change rate is obtained by dividing a difference of a maximum value and a minimum value with the center value and is represented by %. Evaluation was made in following four levels:
A: change rate 10% or less;
B: change rate exceeding 10% but less than 20%;
C: change rate 21% or higher.

(7) Weather Resistance

A weather resistance test was conducted with a sunshine weather meter (S-80, manufactured by Suga Shiken-ki Co.) for an exposure time of 200 hours at a humidity of 50%.

(Measurement of Reflectivity and Reflective Spectrum)

On a sample before and after the weather resistance test, a mirror surface reflectivity and a reflection spectrum for an incident light of an inclination angle of 5° were measured in the same manner as in the measurement of mirror surface reflectivity, and a reflectivity in a wavelength range of 380-780 nm and a hue of the reflected light on a CIE chromaticity chart were calculated to determine a change in the average reflectivity and in the hue between before and after the weather resistance test for an evaluation in following four levels:
(hue Change ΔE in the Reflected Light)
AA: ΔE being 5 or less;
A: ΔE being 5-10;
B: ΔE being 10-15;
C: ΔE being 15 or more.
(8) Sharpness A sample placed between two polarizing plates in a cross Nichol arrangement was visually observed for an unevenness in the transmitted light:
A: Unevenness not generated at all (a level not recognized by any of 10 evaluators);
B: Unevenness generated weakly (a level recognized by 1 to 5 in 10 evaluators);
C: Unevenness generated strongly (a level recognized by 6 or more in 10 evaluators).

ing film AF-1 for polarizing plate). Also a same polyvinyl alcohol-based adhesive was employed to adhere the other surface of the polarizing sheet to a cellulose acylate film (CA-1) similarly saponified.

(Antireflective Polarizing Plate with Optical Compensation Function (Viewing-Side Polarizing Plate/Upper Polarizing Plate))

An optical compensation film (Wide View Film A 12B, manufactured by Fuji Photo Film Co.) having an optical compensation layer, in which a disc face of a discotic structural unit is inclined to the surface of a substrate and an angle between the disc face of the discotic structural unit and the surface of the substrate varies with a depth in an optical anisotropic layer, was subjected to a saponification process in conditions similar to those described above, on a surface of the substrate opposite to the optical compensation layer.

TABLE 37

|  | Haze (%)/ reflectivity (%) | Pencil hardness | Surface energy | Dynamic friction coeff. | Adhesion | Scratch resistance | Hue uniformity | Weather resistance | Sharpness |
|---|---|---|---|---|---|---|---|---|---|
| Example E1 | 0.31/0.40 | A | 25 mN/m | 0.12 | A | A | A | AA | A |
| Comp. Ex. E1-1 | 0.31/0.56 | A | 25 mN/m | 0.12 | C | B | A | B | A |
| Comp. Ex. E1-2 | 0.30/0.49 | B | 25 mN/m | 0.12 | A | C | B | C | A |
| Comp. Ex. E1-3 | 0.39/0.42 | C | 26 mN/m | 0.21 | C | C | C | C | B |

Example E-1 corresponding to the invention showed a low reflectivity and excellent mechanical properties of the film. Also it showed an excellent sharpness and an almost neutral hue in the displayed image. Also characteristics after the weather resistance test were satisfactory. Comparative Example E1-1 was inferior in the adhesion, the scratch resistance and the image sharpness. Comparative Example E1-2 was inferior in the film strength, the image sharpness and the hue. Comparative Example E1-3 was insufficient in the adhesion, the film strength, the image displaying properties (sharpness and hue) and the weather resistance.

(Antireflection Polarizing Plate (Upper Polarizing Plate))

The aforementioned antireflection film was subjected, on a surface of the cellulose acylate film opposite to The antireflection layer, to a saponification treatment by coating a saponifying solution, which is an alkaline solution constituted of 57 parts by weight of potassium hydroxide, 120 parts by weight of propylene glycol, 535 parts by weight of isopropyl alcohol and 288 parts by weight of water and maintained at 40° C.

The alkaline solution on the saponified surface of the substrate was sufficiently washed off with water and sufficiently dried at 100° C.

A polyvinyl alcohol film of a thickness of 75 μm (manufactured by Kuraray Co.) was immersed in an aqueous solution constituted of 1000 g of water, 7 g of iodine and 105 g of potassium iodide for 5 minutes to execute iodine adsorption. Then the film was monoaxially extended in 4.4 times in the machine direction in a 4 weight % aqueous solution of boric acid, and dried in a tensioned state to obtain a polarizing sheet.

A polyvinyl alcohol-based adhesive was employed to adhere a surface of the polarizing sheet to a saponified cellulose acylate surface of the antireflection film (surface protect- A cellulose triacetate film surface of the aforementioned polarizing plate with antireflection film, opposite to the antireflection film, was similarly subjected to an alkali saponification.

The saponified cellulose triacetate film surfaces of the optical compensation film and the polarizing plate with antireflection film were mutually adhered, utilizing a polyvinyl alcohol-based adhesive, thereby preparing a polarizing plate of the observing side (SHB-1).
(Polarizing Plate at Rear Side)

On both sides of a polarizing sheet same as the polarizing sheet prepared in the polarizing plate, a cellulose acylate film (CA-1), subjected on a side to an alkali saponification treatment as explained before, was adhered as protective films with a polyvinyl alcohol-based adhesive to obtain a polarizing plate.

Then, on a surface of thus prepared polarizing plate, a light diffusing tacky substance of a thickness of 25 μm (refractive index 1.47) was adhered. The light diffusing tacky substance was prepared by adding silica particles (particle size: 4 μm, refractive index: 1.44) by 50 weight % to an acrylic tacky material (refractive index 1.47) and forming a film, and corresponded to a haze 88. Then a brightness increasing film PCF400 (having a base material of a PET film of a thickness of 50 μm and a total thickness of about 53 μm; manufactured by Nitto Denko Co.) was adhered. Then a light condensing film was prepared by evaporated thin films, namely 15 laminated layers of $TiO_2/siO_2$. The light condensing film corresponds to emission spectra of 435, 545 and 610 nm of a cold cathode tube and has a property of condensing these lights into a front range of ±45°.

A surface of the polarizing plate at the side of the cellulose acylate film (CA-1) opposite to the brightness increasing film, and a substrate surface of the optical compensation film Wide View A 12B were subjected to a saponification treatment by coating with the aforementioned alkali solution.

The saponified surfaces were adhered with a polyvinyl alcohol-based adhesive.

In this manner a rear-side polarizing plate (BHB-1) was prepared.

<Liquid Crystal Display Element and Liquid Crystal Display Device>

(TN Mode Liquid Crystal Display Device)

In a 20-inch TN-mode liquid crystal display device (TH-20TA3, manufactured by Matsushita Electric Co.), a polarizing plate at the viewing side was replaced by a viewing-side polarizing plate (SHB-1) of the invention, which was adhered with an acrylic adhesive at the observing side in such a manner that the optical anisotropic layer was positioned at the side of a liquid crystal cell. Also at a backlight side, the backlight-side polarizing plate (BHB-1) was adhered with an adhesive in such a manner that the optical anisotropic layer was positioned at the side of the liquid crystal cell, whereby a display element was completed. A transmission axis of the polarizing plate at the observing side and a transmission axis of the polarizing plate at the backlight side were so positioned as to constitute an O-mode.

<Image Display Performance of Liquid Crystal Display Device>

Image display performance was evaluated on following items on the aforementioned liquid crystal display device. Results are shown in Table 38.

Also viewing-side polarizing plates SHB-R1-SHB-R3 were prepared in the same manner as explained in the foregoing, except that AF-1 in the viewing-side polarizing plate (SHB-1) was replaced respectively by AFR-1, AFR-2 and AFR-3, and liquid crystal display elements and liquid crystal display devices are obtained in otherwise same manner. These were evaluated as Comparative Examples in the same manner as Example E-1.

(Unevenness in Displayed Image)

An image display unevenness in a black display (L1) was visually observed, utilizing a measuring instrument (EZ-Contrast 160D, manufactured by ELDIM Ltd.):

A: Unevenness not generated at all (a level not recognized by any of 10 evaluators);
B: Unevenness generated weakly (a level recognized by 1 to 5 in 10 evaluators);
C: Unevenness generated strongly (a level recognized by 6 or more in 10 evaluators).

(Reflection of External Light)

Reflection of external light was evaluated, utilizing a fluorescent light, in following four levels in visual observation:
AA: Change of reflection present but not annoying at all;
A: Change of reflection present but scarcely annoying;
B: Change of reflection annoying but permissible;
C: Change of reflection annoying.

(Hue of Black Display)

A hue change in a black display (L1) was visually observed, utilizing a measuring instrument (EZ-Contrast 160D, manufactured by ELDIM Ltd.):
AA: Not recognizable at all (a level not recognized by any of 10 evaluators);
A: Slightly recognizable (a level recognized by 1-2 of 10 evaluators);
B: Weakly recognizable (a level recognized by 3-5 of 10 evaluators);
C: Strongly recognizable (a level recognized by 6 or more of 10 evaluators).

(Brightness Improving Ability)

A brightness ($cd/cm^2$) in front direction was measured with a brightness meter (BM-7, manufactured by Topcon Co.). As a comparative sample, a brightness in a case without the brightness increasing film of the example was also measured, and was used for calculating a brightness increasing ratio, which was evaluated in following levels:
A: brightness increasing ratio of 1.5 or higher;
B: brightness increasing ratio of 1.25 or higher but less than 1.5;
C: brightness increasing ratio less than 1.25.

Also a uniformity in the brightness was visually evaluated by presence/absence of unevenness in a diagonal viewing direction (450).

(Contrast and Viewing Angle)

A white display voltage of 2V and a black display voltage of 6 V were applied to a liquid crystal cell of a liquid crystal display device, and a contrast ratio and a viewing angle (an angular range in which a contrast ratio became 10 or higher) in a lateral direction (perpendicular to the rubbing direction of the cell) were investigated with a measuring instrument (EZ-Contrast 160D, manufactured by ELDIM Ltd.):
AA: changes not annoying at all;
A: changes present but scarcely annoying;
B: changes annoying but permissible;
C: changes annoying.

(Change in Hue)

A level of change in the hue within a viewing angle from front to 60° was visually observed with an instrument same as in the evaluation of "Contrast and viewing angle" and evaluated in following criteria:
AA: change not annoying at all;
A: change present but scarcely annoying;
B: change annoying but permissible;
C: change annoying.

Image quality of the displayed image was evaluated in the aforementioned methods on the display apparatuses of Examples E-1 and Comparative Examples E1-1-E1-3. Results are shown in Table 38.

TABLE 38

| | Viewing-side polarizing plate | Image unevenness | External light reflection | Hue of black display | Brightness increase | Brightness unevenness | Contrast | Viewing angle | Hue change |
|---|---|---|---|---|---|---|---|---|---|
| Example E-1 | SHB-1 | A | A | A | A | absent | A | A | A |
| Comp. Ex. E1-1 | SHB-R1 | A | C | A | A | absent | B | A | A |
| Comp. Ex. E1-2 | SHB-R2 | B | B | A | A | present | B | A | B – A |
| Comp. Ex. E1-3 | SHB-R3 | B | C | B | A | present | B | B | B |

Example E-1 was satisfactory in all the image display properties, and provided a bright image with improved brightness, without unevenness in the brightness. Comparative Example E1-1 was inferior in the external light reflection and was insufficient in the contrast. Comparative Examples E1-2 and E1-3 were inferior in the image unevenness, external light reflection, contrast and hue change. Also a unevenness in brightness was generated to result in an insufficient uniformity of the displayed image.

Thus the invention alone was capable of displaying a bright and sharp image.

Examples E-2-E-3

Viewing-side polarizing plates (SHB-2 and -3) were prepared in the same manner as in Example E-1 except that the low-refractive index layer (LL-1) in the antireflection film of the viewing-side polarizing plate (SHB-1) was replaced by following low-refractive index layers. Then these polarizing plates (SHB-2 and -3) were equipped in liquid crystal display devices.

Characteristics of the polarizing plates and the display apparatuses thus obtained were evaluated in the same manner as in Example E-1. Results are shown in Table 39.
<Low-Refractive Index Layer>
(Low-Refractive Index Layer AL-2)

130 parts by weight of a thermally crosslinkable fluorine-containing polymer of a refractive index 1.42 (JTA113, solid concentration: 6%, manufactured by JSR Corp.), 5 parts by weight of silica sol (MEK-ST, average particle size: 15 nm, solid content: 30%, manufactured by Nissan Chemical Industries Ltd.), 15 parts by weight of hollow silica (CS60-IPA, average particle size: 60 nm, shell thickness: 10 nm, refractive index: 1.31, 20 weight % dispersion in isopropanol, manufactured by Catalysts & Chemicals Ind. Co.), 6 parts by weight of the aforementioned sol liquid a, 50 parts by weight of methyl ethyl ketone and 60 parts by weight of cyclohexanone were added and mixed, and filtered by a polypropylene filter of a pore size of 1 μm to obtain a coating liquid for a low-refractive index layer. This coating liquid was used in the same coating conditions as in Example E-1 to form a low-refractive index layer (AL-2) of a thickness of 100 nm, and an antireflective polarizing plate was prepared.

The obtained antireflective polarizing plate had a surface with a surface energy of 21 mN/m and a dynamic friction coefficient of 0.12.
(Low-Refractive Index Layer AL-3)

130 parts by weight of a thermally crosslinkable fluorine-containing polymer of a refractive index 1.42 (JN-7228, solid concentration: 6%, manufactured by JSR Corp.), 3.5 parts by weight of DHPMA, 15 parts by weight of silica sol MEK-ST, 15 parts by weight of hollow silica CS60-IPA, 6 parts by weight of the aforementioned sol liquid a, 3 parts by weight of reactive silicone X22-164C, 50 parts by weight of methyl ethyl ketone and 60 parts by weight of cyclohexanone were added and mixed, and filtered by a polypropylene filter of a pore size of 1 μm to obtain a coating liquid for a low-refractive index layer AL-3. This coating liquid was used in the same coating conditions as in Example E-1 to form a low refractive index hardened film of a thickness of 100 nm, and an antireflective polarizing plate was prepared.

The obtained antireflective polarizing plate had a surface with a surface energy of 20 mN/m and a dynamic friction coefficient of 0.11.

(Antireflective Polarizing Plate with Optical Compensation Function (Viewing-Side Polarizing Plate/Upper Polarizing Plate))

Polarizing plates of viewing side (SHB2) and (SHB-3) were prepared in the same manner as in Example E-1 except that the antireflective polarizing plate in the viewing-side polarizing plate (SHB-1) was replaced by the aforementioned antireflective polarizing plates.
<OCB Mode Liquid Crystal Display Device>

On a glass substrate with an ITO electrode, a polyimide film was provided as an orientation film and was subjected to a rubbing process. Two glass substrates thus obtained were opposed in such a manner that rubbing directions became mutually parallel with a cell gap of 6 μm. A liquid crystal compound of Δn of 0.1396 (ZLI1132, manufactured by Merck Inc.) was poured into the cell gap to obtain a bend orientation liquid crystal cell. In a sandwiching manner on the prepared bend orientation cell, an aforementioned polarizing plate (SHB-2 or SHB-3) was adhered with an adhesive to the observing side of the cell in such a manner that the optical compensation sheet was positioned at the side of the liquid crystal cell, while, at the backlight side, a backlight-side polarizing plate (BHB-1) was adhered with an adhesive in such a manner that the optical anisotropic layer was positioned at the side of the liquid crystal cell. A transmission axis of the polarizing plate at the observing side and a transmission axis of the polarizing plate at the backlight side were so positioned as to constitute an O-mode.

TABLE 39

|  | Low-refractive index layer | Viewing-side polarizing plate | Rear-side polarizing plate |
| --- | --- | --- | --- |
| Example E-2 | AL-2 | SHB-2 | BHB-1 |
| Example E-3 | AL-3 | SHB-3 | BHB-1 |

Performances of Examples E-2 and E-3 were evaluated in the same manner as in Example E-1. Both showed satisfactory results comparable to those in Example E-1.

Example E-4

Preparation of Antireflection Film (AF-4)

On a film Fujitac TD80UL (manufactured by Fuji Photo Film Co.), Pelnox C-4456-S7 (trade name of an ATO-dispersed hard coat agent, solid: 45%, manufactured by Nippon Pelnox Ltd.) was coated, dried and hardened by an ultraviolet irradiation to form a conductive layer of a thickness of 1 μm. The film had a surface resistivity of about $10^8$ Ω/sq.

The surface resistivity was measured with a resistivity meter MCP-HT260, manufactured by Mitsubishi Chemical Corp., after the sample was let to stand for 1 hour under conditions of 25° C./65% RH.
(Coating Liquid for Antiglare Hard-coat Layer)

50 parts by weight of a pentaexythritol triacrylate/pentaerythritol tetraacrylate mixture (Peta, manufactured by Nippon Kayaku Co.), 2 parts by weight of a curing initiator (Irgacure 184, manufactured by Ciba-Geigy Inc.), 5 parts by weight of acryl-styrene beads (manufactured by Soken Chemical and Engineering Co., particle size: 3.5 μm, refractive index: 1.55) as the first translucent particles, 5.2 parts by weight of styrene beads (manufactured by Soken Chemical and Engineering Co., particle size: 3.5 pin, refractive index: 1.60) as the second translucent particles, 10 parts by weight of a silane coupling agent KBM-5103 (manufactured by Shin- Etsu Chemical Co.) and 0.03 parts by weight of a following fluorine-containing polymer (PF-3) were mixed with 50 parts by weight of toluene to obtain a coating liquid. The aforementioned cellulose acylate film with conductive layer was unwound from a roll and coated with this coating liquid so as to obtain a dry film thickness of 6.0 μm, and, after solvent evaporation, irradiated with an ultraviolet light of an illumination intensity of 400 mW/cm² and an illumination amount of 300 mJ/cm² utilizing an air-cooled metal halide lamp of 160 W/cm (manufactured by Eyegraphics Co.) to harden the coated layer, thereby obtaining an antiglare hard-coat layer.

fluorine-containing polymer (PF-3)

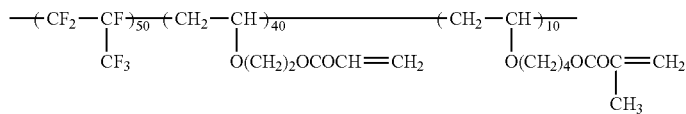

Mw: 4.5 × 10⁴ (in molar composition ratio)

On the antiglare layer, the coating liquid for the low-refractive index layer (AL-1) was coated with a gravure coater. After drying at 80° C., it was irradiated with an ultraviolet light of an illumination intensity of 550 mW/cm² and an illumination amount of 600 mJ/cm² utilizing an air-cooled metal halide lamp of 160 W/cm (manufactured by Eyegraphics Co.) in an atmosphere of an oxygen concentration of 1.0 vol. % or less under nitrogen purging to obtain a low-refractive index layer (refractive index: 1.43, film thickness: 86 nm). In this manner there was produced an antireflection film (AF-4) of the invention.

The obtained antireflection film had an average reflectivity of 2.3% and a haze of 43%.

Performances relating to mechanical properties and durability described in Example E-1 were evaluated in the same manner as in Example E-1. Results were satisfactory as in the antireflection film of Example E-1.

<Preparation of Antireflective Polarizing Plate with Antiglare Function>

A polarizing sheet was prepared by adsorbing iodine to an extended polyvinyl alcohol film. The aforementioned film (AF-4) was subjected, at a substrate side thereof, to a saponification process with an aqueous alkali solution in a similar manner as in Example E-1, and was adhered to a side of the polarizing sheet with a polyvinyl alcohol-based adhesive in such a manner that the transparent substrate film (cellulose acylate) of AF-4 was positioned at the side of the polarizing sheet.

(Preparation of Optical Compensation Film)
(Preparation of Substrate)
(Preparation of Particle Dispersion (RL-2))

A particle dispersion of a following composition, an auxiliary dispersant and zirconia beads of a diameter of 0.3 mm were wet dispersed in a Dyno mill so as to obtain a volume-averaged particles size of 65 nm. Beads were separated from the obtained dispersion with a nylon cloth of 200 mesh to obtain a particle dispersion (RL-2).

The obtained dispersion was subjected to a measurement of a particle size with a scanning electron microscope, and a measurement of a particle size distribution with a later scattering particle size distribution measuring apparatus LA920 (manufactured by Horiba Mfg. Co.). As a result, particles of a size of 300 nm or larger represented 0%.

Composition of Particle Dispersion (RL-2):

| | |
|---|---|
| hydrophobic silica (Aerosil 972, methyl group modified, primary particle size: 16 nm, manufactured by Nippon Aerosil Co.) | 2.20 parts by weight |
| cellulose acetate propionate (substitution degree: 2.70, acetate/propionate = 1/0.4) | 2.00 parts by weight |

-continued

| | |
|---|---|
| monododecyl phosphate (auxiliary dispersant) | 0.22 parts by weight |
| biphenyldiphenyl phosphate | 0.08 parts by weight |
| methyl acetate | 71.0 parts by weight |
| methanol | 6.2 parts by weight |
| acetone | 6.1 parts by weight |
| ethanol | 6.1 parts by weight |
| 1-butanol | 6.1 parts by weight |

Components in a following composition were agitated under heating in a mixing tank to obtain a cellulose acylate solution (A-2).

Composition of Cellulose Acylate Solution (A-2):

| | |
|---|---|
| cellulose acetate propionate (substitution degree: 2.70, acetate/propionate = 1/0.4) | 100 parts by weight |
| triphenyl phosphate | 7.5 parts by weight |
| following plasticizer (logP 1.88) | 4.2 parts by weight |
| following UV absorber: UV-E4 | 1.0 parts by weight |
| following UV absorber: UV-E5 | 1.0 parts by weight |
| methyl acetate | 290 part by weight |
| methanol | 25 parts by weight |
| acetone | 25 parts by weight |
| ethanol | 25 parts by weight |
| 1-butanol | 11 parts by weight | plasticizer

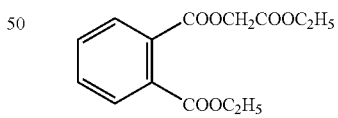

UV absorber

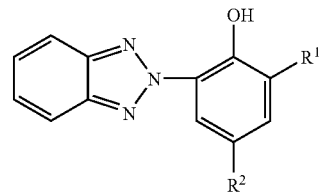

UV-E4: R¹ = R²; —C₅H₁₁(t)
UV-E5: R¹ = R²; —C₄H₉(t)

(Solution of Retardation Adjusting Agent).

16 parts by weight of a following retardation adjusting agent, 74.4 parts by weight of methyl acetate, 6.4 parts by weight of methanol, 6.4 parts by weight of acetone, 6.4 parts by weight of ethanol and 6.4 parts by weight of i-butanol were charged and agitated under heating to obtain a solution of the retardation adjusting agent.

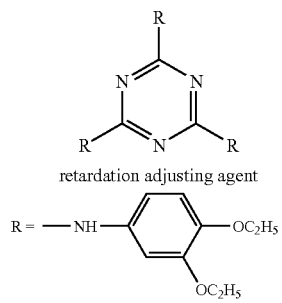

retardation adjusting agent $R = -NH-\langle\text{phenyl with } OC_2H_5, OC_2H_5\rangle$ In 475 parts by weight of a cellulose acylate solution, 36 parts by weight of the solution of retardation adjusting agent and 14.8 parts by weight of an inorganic particle dispersion (RL-2) were added, then the mixture was sufficiently agitated, and let to stand for 3 hours at the room temperature (25° C.), and an obtained inhomogeneous gel-like solution was cooled for 6 hours at −70° C. and heated at 50° C. under agitation to obtain a completely dissolved dope.

The obtained dope was subjected to filtration and bubble elimination in the same manner as in Example E-1 and was cast with a rotary drum casting apparatus.

The drum had a diameter of 200 mm and a width of 2000 mm, with a hard chromium plated surface having an arithmetic average roughness (Ra) of 0.010 μm and a ten-point averaged roughness (Rz) of 0.016 μm.

The casting was conducted in the same manner as a band casting described in Example E-1. The film was dried for 1 minute after the film surface temperature on the drum reached 40° C., then peeled off in a state of a residual solvent amount of 50 weight %, and the film was brought to a state of a residual solvent amount of 40 weight % by a drying air of 140° C., then extended by 17% in the transversal direction by a tenter and retained at the extended width for 30 seconds at 130° C. Thereafter the film was dried for 20 minutes by a drying air of 130° C. to obtain a cellulose acylate film (CA-2) of a residual solvent amount of 0.2 weight %, a thickness of 78 μm, a length of 1000 m and a width of 1.34 m in a wound roll. The cellulose acylate film (CA-2) of the roll form had a film thickness variation of 2.8%, a curl value of 0.5/m, and following surface irregularities:

Ra: 0.003 μm, Rz: 0.075 μm, Ry: 0.084 μm, Sm: 0.20 μm.

The obtained cellulose acylate film (CA-2) had, at a wavelength of 590 nm, retardation values Re of 100 nm and Rth of 50 nm.

(Saponification Process)

The cellulose acetate film (CA-2) was passed under an induction heated roll of a temperature of 60° C. to heat the film surface to 40° C., then coated with an alkaline solution (S-1) of a following composition by a rod coater with a coating amount of 12 cc/m², then made to stay for 15 seconds under a steam-type far infrared heater (manufactured by Noritake Co.) heated at 110° C. and further coated with purified water by a similar rod coater with a coating amount of 3 cc/m². The film temperature in this operation was 40° C. Then the film was subjected to a rinsing with water by a fountain coater and a water squeezing with an air knife in three repeated cycles and dried by staying in a drying zone of 70° C. for 5 seconds.

Composition of Alkaline Solution (S-1):

| | |
|---|---|
| potassium hydroxide | 8.55 weight % |
| water | 23.235 weight % |
| isopropanol | 54.20 weight % |
| surfactant K-1: $C_{14}H_{29}O(CH_2CH_2O)_{20}$ | 1.0 weight % |
| propylene glycol | 13.0 weight % |
| defoamer Surfinol DF110D (manufactured by Nisshin Chemical Industries Co.) | 0.015 weight % |
| An obtained saponified surface of the film had a contact angle with water of 37°, and a surface energy of 63 mN/m. | |

(Preparation of Orienting Film)

On thus surface treated film, a coating liquid for an orienting film of a following composition was coated by a rod coater with a coating amount of 28 ml/m², and dried for 60 seconds by a drying air of 60° C. and then for 150 seconds by a drying air of 90° C.

Coating Liquid for Orienting Film:

| | |
|---|---|
| following denatured polyvinyl alcohol | 20 parts by weight |
| citric acid | 0.05 parts by weight |
| glutaraldehyde | 0.5 parts by weight |
| water | 360 parts by weight |
| methanol | 120 parts by weight | denatured polyvinyl alcohol:

$$-(CH_2-CH)_{87.2}-(CH_2-CH)_{0.8}-(CH_2-CH)_{12}-$$
$$\phantom{-(CH_2-CH)_{87.2}}|\phantom{-(CH_2-CH)_{0.8}}|\phantom{-(CH_2-CH)_{12}}|$$
$$\phantom{-(CH_2-}OH\phantom{)_{87.2}-(CH_2-}O\phantom{H)_{0.8}-(CH_2-CH)_{1}}OCOCH_3$$
$$O=C-\langle\text{phenyl}\rangle-O(CH_2)_4OCOCH=CH_2$$

(Rubbing of Orienting Film)

A rubbing process was executed, in an environmental condition of 25° C./45% RH, on the surface of the orienting film in a machine direction of the film and parallel to a transporting direction by a rubbing roll on which a commercially available rubbing cloth was applied.

(Formation of Optical Anisotropic Layer)

On the orienting film, a coating liquid formed by dissolving 41.01 parts by weight of a discotic liquid crystal compound (DA) of a following structure, 4.06 parts by weight of an ethylene oxide-denatured trimethylopropane triacrylate (V#360, manufactured by Osaka Organic Chemical Industries, Ltd.), 0.90 parts by weight of cellulose acetate butyrate (CAB551-0.2, manufactured by Eastman Chemical Ltd.), 0.23 parts by weight of cellulose acetate butyrate (CAB531-1, manufactured by Eastman Chemical Ltd.), 1.35 parts by weight of a photopolymerization initiator (Irgacure 907, manufactured by Ciba-Geigy Ltd.), 0.45 parts by weight of a sensitizer (Kayacure DETX manufactured by Nippon Kayaku Co.) and 0.40 parts by weight of a fluorinated surfactant (F-1) of a following structure in 102 parts by weight of methyl ethyl ketone, was coated with a wire bar of #3.4. The discotic liquid crystal compound was oriented by heating for 2 minutes in a constant temperature zone of 130° C., and was then polymerized by a UV irradiation for 1 minute with a high pressure mercury lamp of 120 W/cm in an atmosphere of 60° C. It was then let to cool by standing to the room temperature. In this manner there was prepared an optical anisotropic layer of a thickness of 2.0 μm thereby completing an optical compensation sheet (WV-1).

discotic liquid crystal compound (DA):

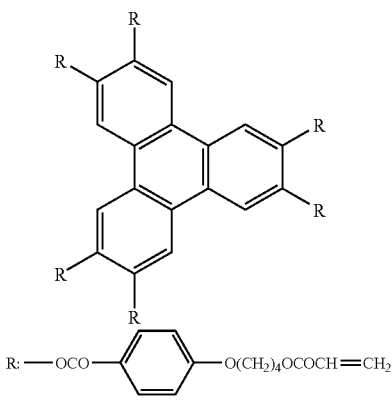

fluorinated surfactant (F-1): $C_8F_{17}CH_2CH_2O(CH_2CH_2O)_{10}H$ (Antireflective Polarizing Plate with Optical Compensation Function (Viewing-Side Polarizing Plate))
(Preparation of Viewing-Side Polarizing Plate (SHB-4))

An optical compensation film (WV-1) having an optical compensation layer of a liquid crystal compound was subjected to a saponification process, and was adhered, with a polyvinyl alcohol-based adhesive, to the opposite side in such a manner that the transparent substrate of WV-1 was positioned at the side of the polarizing sheet of the antireflection film AF-4, thereby obtaining a viewing-side polarizing plate (SHB-4).

(Preparation of Rear-Side Polarizing Plate (BHB-2))

A polarizing sheet was prepared by adsorbing iodine to an extended polyvinyl alcohol film. A triacetyl cellulose film Fujitac TD80UL was subjected to a saponification process, and was adhered on both surfaces of the polarizing sheet with a polyvinyl alcohol-based adhesive. On a side of the polarizing plate, a brightness increasing film Vikuiti BEF-RP90/24 (manufactured by Sumitomo-3M Co.) was adhered with an acrylate adhesive, thereby obtaining a rear-side polarizing plate (BHB-2).

<Liquid Crystal Display Device>

In a 20-inch IPS-mode liquid crystal display device (W20-1c3000, manufactured by Hitachi Ltd.), an optical film provided therein was replaced by the polarizing plate (SHB-4), which was adhered with an acrylic adhesive at the observing side in such a manner that the optical anisotropic layer was positioned at the side of a liquid crystal cell. Also at the rear side, the polarizing plate (BHB-2) was adhered with an acrylic adhesive in such a manner that the protective film for the polarizing sheet was positioned at the side of a liquid crystal cell.

<Image Display Performance of Liquid Crystal Display Device>

Image quality of a displayed image on the display apparatus of Example E-4 was evaluated in a similar manner as in Example E-1. As a result there was obtained a satisfactory performance comparable to Example E-1.

Example E-5

Antireflection Film

On a cellulose acylate film (CA-1) described in Example E-1, Peltron C-4456-S7 (trade name of an ATO-dispersed hard coat agent, solid: 45%, manufactured by Nippon Pelnox Ltd.) was coated, dried for 150 seconds at 60° C., and subjected to an ultraviolet irradiation of an illumination intensity of 400 mW/cm² and an illumination amount of 400 mJ/cm² utilizing an air-cooled metal halide lamp of 160 W/cm (manufactured by Eyegraphics Co.) under nitrogen purging to obtain an antistatic layer of a thickness of 1 μm.

On the antistatic layer, a multi-layered antireflection film employed in the antireflection film of Example E-1 (hard-coat layer/middle-refractive index layer/high-refractive index layer/low-refractive index layer) was formed by successive coatings as in Example E-1 to obtain an antireflection film (AF-5).

<Optical Compensation Film>
(Substrate)

Following components were charged in a mixing tank and agitated under agitation to obtain a cellulose acylate solution.

| | |
|---|---|
| cellulose triacetate of substitution degree of 2.78 (6-position substitution 0.90) | 89.3 parts by weight |
| triphenyl phosphate (logP 5.60) | 7.6 parts by weight |
| following plasticizer (logP 2.54) | 4.0 parts by weight |
| following UV absorber: UV-1 | 1.0 parts by weight |
| following UV absorber: UV-2 | 1.0 parts by weight |
| particle dispersion (RL-2) (as solid) | 0.15 parts by weight |
| methyl acetate | 290 part by weight |
| methanol | 25 parts by weight |
| acetone | 25 parts by weight |
| ethanol | 25 parts by weight |
| 1-butanol | 25 parts by weight | plasticizer:

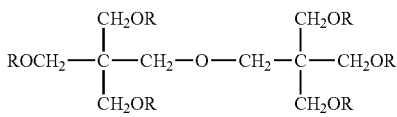

R: —COC$_2$H$_5$ (Solution of Retardation Adjusting Agent)

17 parts by weight of a following retardation adjusting agent, 74.4 parts by weight of methyl acetate, 6.4 parts by weight of methanol, 6.4 parts by weight of acetone, 6.4 parts by weight of ethanol and 6.4 parts by weight of i-butanol were charged and agitated under heating to obtain a solution of the retardation adjusting agent.

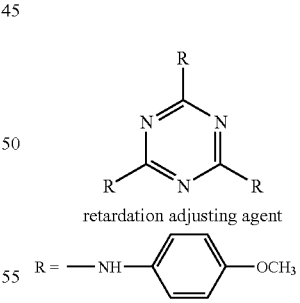

retardation adjusting agent

R = —NH—⟨⟩—OCH$_3$

In 464 parts by weight of a cellulose acylate solution, 36 parts by weight of the solution of retardation adjusting agent were added, then the mixture was sufficiently agitated, and let to stand for 3 hours at the room temperature (25° C.), and an obtained inhomogeneous gel-like solution was cooled for 6 hours at −70° C. and heated at 50° C. under agitation to obtain a completely dissolved dope.

The obtained dope was subjected to filtration and bubble elimination in the same manner as in Example E-1 thereby obtaining a dope.

The dope was cast by a band casting method as in Example E-1 to obtain a cellulose acylate film (CA-3) of a residual solvent amount of 0.25 weight %, a thickness of 100 μm, a length of 1000 m and a width of 1.34 m in a wound roll.

The cellulose acylate film (CA-3) had, at a wavelength of 590 nm, retardation values Re of 51 nm and Rth of 94 nm.

(Preparation of Optical Compensation Film)

An optical compensation film (WV-2) was prepared by forming, on the substrate (CA-3), an optical anisotropic layer as in Example E-4.

<Preparation of Antireflective Polarizing Plate (Viewing-Side Polarizing Plate) with Optical Compensation Function (SHB-5)>

Substrate surfaces of the antireflection film (AF-5) and of the optical compensation film (WV-2) having an optical anisotropic layer of a liquid crystal compound were subjected to a saponification process. The polarizing sheet employed in Example E-1 was adhered, at a side thereof, to the substrate of AF-5 and, at the other side, to the substrate of WV-2, with a polyvinyl alcohol-based adhesive, thereby obtaining a viewing-side polarizing plate (SHB-5).

<Preparation of Rear-Side Polarizing Plate (BHB-3)>

A rear-side polarizing plate (BHB-3) was prepared in the same manner as in Example E-1 except that the optical compensation film in the rear-side polarizing plate (BHB-1) in Example E-1 was replaced by the optical compensation film (WV-2).

<Liquid Crystal Display Device>

In a 22-inch VA-mode liquid crystal display device (TH22-LH10, manufactured by Matsushita Electric Co.), a polarizing plate at the viewing side was replaced by the aforementioned polarizing plate (SHB-5), which was adhered with an acrylic adhesive at the observing side in such a manner that the optical anisotropic layer thereof was positioned at the side of a liquid crystal cell.

Performances of the polarizing plate and the display apparatus thus obtained were evaluated as in Example E-1. Results were satisfactory as in Example E-1.

The present invention has been explained in detail and by referring to specific embodiments, but it will be apparent for those skilled in the art that various modification and alterations can be added within the scope and spirit of the invention.

This application is based on Japanese Patent Application Nos. JP2003-434142, JP-2004-6062, JP2004-35077, JP2004-65991 and JP2004-96227, filed on Dec. 26, 2004, Jan. 13, 2004, Feb. 12, 2004, Mar. 9, 2004 and Mar. 29, 2004, respectively, the contents of which is incorporated herein by reference.

The invention claimed is:

1. An antireflection film comprising:
a transparent support; and
a low-refractive index layer having a lower refractive index than the transparent support, wherein the low-refractive index layer is an outermost layer of the antireflection film, and the low-refractive index layer comprises: a hollow silica particle; and a compound lowering a surface free energy of the antireflection film,
wherein a silicone is segregated at an outer surface of the low-refractive index layer such that a spectral intensity ratio Si/C in a photoelectron spectrum at the outer surface is larger by at least 5 times than that at a depth from the outer surface, the depth being equal to 80% of a thickness of the low-refractive index layer,
wherein the compound is a silicone compound having a plurality of (meth)acryloyl groups at a terminal or a side chain of a compound chain that contains a plurality of dimethylsilyloxy units as repetitive units, and having a molecular weight of from 3,000 to 30,000,
wherein the low-refractive index layer comprises a binder, and the compound comprises a reactive group with the binder,
wherein the binder consists of a (co)polymer of at least one monomer having two or more ethylenic unsaturated groups, wherein the monomer having two or more ethylenic unsaturated groups consists of ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, polyester polyacrylate, or a combination thereof,
wherein the hollow silica particle has a porosity x of from 10 to 60%, the porosity being represented by the following formula (V):

$$x = (4\pi a^3/3)/(4\pi b^3/3) \times 100 \tag{V}$$

wherein a represents a radius of a hollow of the particle and b represents a radius of an outer shell of the particle.

2. A polarizing plate comprising the antireflection film of claim 1.

3. A polarizing plate comprising:
a polarizing sheet; and
a transparent protective film on one side of the polarizing sheet, the transparent protective film comprising an antireflection film of claim 1.

4. A method for producing a polarizing plate, which comprises: feeding a polymer film for a polarizing sheet; holding each edge of the polymer film with a holding unit; and stretching the polymer film by imparting a tension to the polymer film while moving the holding unit in a machine direction of the polymer film wherein the stretching is performed under a condition satisfying formula (III):

$$|L2-L1| > 0.4W$$

wherein L1 indicates a locus of the first holding unit from a substantial holding start point to a substantial holding release point on one edge of the polymer film; L2 indicates a locus of the second holding unit from a substantial holding start point to a substantial holding release point on the other edge of the polymer film; and W indicates a distance between two substantial holding release points of the first holding unit and the second holding unit, and a speed difference of the moving between the first holding unit and the second holding unit is less than 1%, forming a polarizing plate comprising the anti reflection film of claim 1.

5. The method for producing a polarizing plate as claimed in claim 4, wherein the stretching is performed under keeping a volatile content of the polymer film at least 5% by volume, and the volatile content is decreased while the polymer film is shrunk.

6. The method for producing a polarizing plate as claimed in claim 4, which comprises sticking a transparent protective film to one side of the polarizing sheet, the protective film having the antireflection film.

7. An image display comprising the antireflection film of claim 1.

8. The image display device as claimed in claim 7, which is a liquid crystal display device.

9. The image display device as claimed in claim 7, which is a transmissive, reflective or semi-transmissive liquid crystal display of any mode of TN, STN, IPS, VA or OCB.

10. The antireflection film as claimed in claim 1, wherein the porosity x represented by the formula (V) is from 20 to 60%.

11. The antireflection film as claimed in claim 1, wherein the porosity x represented by the formula (V) is from 30 to 60%.

12. The antireflection film as claimed in claim 1, wherein the particle has a refractive index of from 1.17 to 1.40.

13. The antireflection film as claimed in claim 1, wherein the particle has a refractive index of from 1.17 to 1.35.

14. The antireflection film as claimed in claim 1, wherein the particle has a refractive index of from 1.17 to 1.30.

* * * * *